United States Patent
Karche et al.

(10) Patent No.: US 12,479,858 B2
(45) Date of Patent: Nov. 25, 2025

(54) MACROCYCLIC COMPOUNDS AS STING AGONISTS AND METHODS AND USES THEREOF

(71) Applicant: Lupin Limited, Mumbai (IN)

(72) Inventors: Navnath Popat Karche, Pune (IN); Moloy Banerjee, Pune (IN); Nishant Ramnivasji Gupta, Pune (IN); Ganesh Rajaram Jadhav, Pune (IN); Vinod Popatrao Vyavahare, Pune (IN); Amit Kumar Das, Pune (IN); Deepak Sahebrao Walke, Pune (IN); Vaibhav Madhukar Kalhapure, Pune (IN); Smita Aditya Bhoskar, Pune (IN); Vidya Ramdas, Pune (IN); Venkata P. Palle, Pune (MH); Rajender Kumar Kamboj, Pune (IN)

(73) Assignee: LUPIN LIMITED, Mumbai (IN)

( * ) Notice: Subject to any disclaimer, the term of this patent is extended or adjusted under 35 U.S.C. 154(b) by 946 days.

(21) Appl. No.: 17/628,619

(22) PCT Filed: Jul. 22, 2020

(86) PCT No.: PCT/IB2020/056875
§ 371 (c)(1),
(2) Date: Jan. 20, 2022

(87) PCT Pub. No.: WO2021/014365
PCT Pub. Date: Jan. 28, 2021

(65) Prior Publication Data
US 2022/0289763 A1    Sep. 15, 2022

(30) Foreign Application Priority Data

| Jul. 22, 2019 | (IN) | 201921029556 |
| Dec. 10, 2019 | (IN) | 201921051086 |
| Jan. 29, 2020 | (IN) | 202021003961 |

(51) Int. Cl.
C07D 498/16 (2006.01)
A61P 35/00 (2006.01)
C07D 519/00 (2006.01)

(52) U.S. Cl.
CPC ............ *C07D 498/16* (2013.01); *A61P 35/00* (2018.01); *C07D 519/00* (2013.01)

(58) Field of Classification Search
CPC .. C07D 498/16; C07D 519/00; C07D 498/18; A61P 35/00; A61P 31/00; A61P 35/02;
(Continued)

(56) References Cited
U.S. PATENT DOCUMENTS

2005/0080067 A1   4/2005   Allegretti
2005/0256153 A1   11/2005  Dhanoa et al.
(Continued)

FOREIGN PATENT DOCUMENTS

EP    1366018 A1    12/2003
WO    2005/058871 A1    6/2005
(Continued)

OTHER PUBLICATIONS

PCT International Search Report dated Oct. 21, 2020, Application No. PCT/IB2020/056875.
(Continued)

*Primary Examiner* — James H Alstrum-Acevedo
*Assistant Examiner* — Pierre Paul Eleniste
(74) *Attorney, Agent, or Firm* — The Dobrusin Law Firm, P.C.

(57) ABSTRACT

Disclosed are macrocyclic compounds having the general Formula (I) or (II) and their tautomeric forms, stereoisomers, pharmaceutically acceptable salts, hydrates, solvates and prodrugs thereof, and their combination with suitable medicament, corresponding processes for the synthesis and pharmaceutical compositions and uses of compounds disclosed herein.

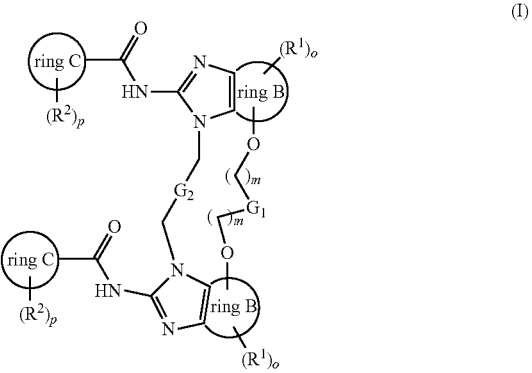

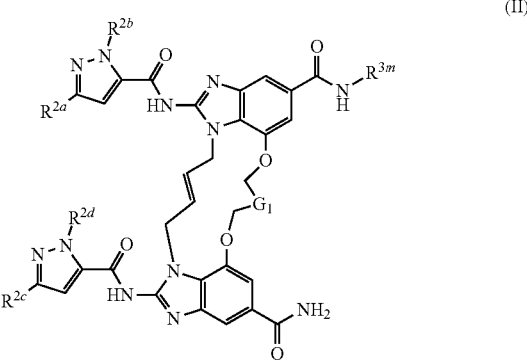

21 Claims, 7 Drawing Sheets

(58) Field of Classification Search
CPC .......... A61P 31/04; A61P 31/12; A61P 31/16; A61P 31/18; C07F 9/6584; A61K 31/4188; A61K 31/5377; A61K 31/5386; A61K 31/541; A61K 39/39; A61K 2039/55511
See application file for complete search history.

(56) References Cited

U.S. PATENT DOCUMENTS

| | | | |
|---|---|---|---|
| 2007/0043022 | A1 | 2/2007 | Bonfanti et al. |
| 2007/0293494 | A1 | 12/2007 | Djung et al. |
| 2009/0156576 | A1 | 6/2009 | Aay et al. |
| 2015/0322024 | A1 | 11/2015 | Ookubo et al. |
| 2018/0105514 | A1 | 4/2018 | Mehlmann et al. |
| 2018/0147187 | A1 | 5/2018 | Bastos et al. |
| 2018/0208586 | A1 | 7/2018 | Wu et al. |
| 2019/0031655 | A1 | 1/2019 | Vankayalapati et al. |
| 2020/0138827 | A1 | 5/2020 | Banerjee et al. |
| 2020/0199120 | A1 | 6/2020 | Zhang et al. |
| 2020/0291001 | A1 | 9/2020 | Fosbenner et al. |
| 2020/0330427 | A1 | 10/2020 | Cemerski et al. |
| 2021/0130466 | A1 | 5/2021 | Cemerski et al. |
| 2021/0238172 | A1 | 8/2021 | Charnley et al. |

FOREIGN PATENT DOCUMENTS

| | | | | |
|---|---|---|---|---|
| WO | 2007/044515 | A1 | 4/2007 | |
| WO | 2008/090570 | A1 | 7/2008 | |
| WO | 2009/145719 | A1 | 12/2009 | |
| WO | 2014/104272 | A1 | 7/2014 | |
| WO | 2016/115090 | A1 | 7/2016 | |
| WO | 2017/011920 | A1 | 1/2017 | |
| WO | 2017/175147 | A1 | 10/2017 | |
| WO | 2017/175156 | A1 | 10/2017 | |
| WO | 2017/202390 | A1 | 11/2017 | |
| WO | 2018/234805 | A1 | 12/2018 | |
| WO | 2018/234807 | A1 | 12/2018 | |
| WO | 2018/234808 | A1 | 12/2018 | |
| WO | 2019/023635 | A1 | 1/2019 | |
| WO | 2019/027857 | A1 | 2/2019 | |
| WO | 2019/027858 | A1 | 2/2019 | |
| WO | 2019-069269 | A1 | 4/2019 | |
| WO | 2019-069270 | A1 | 4/2019 | |
| WO | WO-2020132582 | A1 * | 6/2020 | ........... C07D 403/14 |
| WO | 2020/194160 | A1 | 10/2020 | |

OTHER PUBLICATIONS

Nature Reviews Immunol, (20150000), vol. 15, pp. 760-770.
Cell Reports, (20150000), vol. 11, pp. 1018-1030.
J. Exp. Med., (20110000), vol. 208, pp. 1989-2003.
Cancer Res., (20090000), vol. 69, pp. 3077-3085.
Nature, (20180000), vol. 564, No. 7736, pp. 439-443.
Gaudana, R. et al., The AAPS Journal, (20120000), vol. 12, No. 3, pp. 348-360.
Immunity, (20140000), vol. 41, pp. 843-852.
J. Transl. Med., (20120000), vol. 10, p. 205.
Cancer J., (20120000), vol. 18, pp. 153-159.
J. Immunol., (20130000), vol. 190, pp. 5216-5225.
Cell Rep., (20150000), vol. 11, No. 7, pp. 1018-1030.
Nature, (20080000), vol. 455, pp. 674-678.
PLoS Pathog., (20150000), vol. 11, p. 12.
Antimicrob. Agents Chemother., (20150000), vol. 59, No. 2, pp. 1273-1281.
J Leukocyte Biol., (20110000), vol. 89, No. 3, pp. 351-357.
Angew Chem. Intl. Ed. Engl., (19940000), vol. 33, pp. 183-186.
Fingl et al., The Pharmacological Basis of Therapeutics, (19750000), p. 1.
Synth. Commun., (20000000), vol. 30, No. 9, pp. 1587-1591.
J Leukocyte Bio., (20110000), vol. 89, No. 3, pp. 351-357.
Journal of Medicinal Chemistry, (20120000), vol. 55, No. 15, pp. 6866-6880.
"International Edition", Angewandte Chemie, (20180000), vol. 57, No. 1, pp. 292-295.
J. of Heterocyclic Chemistry, (19930000), vol. 30, No. 2, pp. 473-476.
European Journal of Medicinal Chemistry, (20180000), vol. 158, pp. 184-200.
J. of Organometallic Chemistry, (20010000), vol. 620, No. 1-2, pp. 94-105.
Org. Biomol. Chem., (20110000), vol. 9, No. 12, pp. 4498-4506.
Chem. Eur. J., (20140000), vol. 20, No. 6, pp. 1530-1538.
ACS Med. Chem. Lett., (20160000), vol. 7, No. 3, pp. 245-249.
Eur. J. Org. Chem., (20110000), vol. 17, pp. 3156-3164.
"International Edition", Angewandte Chemie, (20070000), vol. 46, No. 40, pp. 7671-7673.
"International Edition", Angewandte Chemie, (20170000), vol. 56, No. 43, pp. 13351-13355.
Eur. J. Med. Chem., (20140000), vol. 84, pp. 200-205.
Organometallics, (20120000), vol. 31, No. 16, pp. 5958-5967.
MedChemComm, (20140000), vol. 5, No. 1, pp. 72-81.
Eur. J. Org. Chem., (20170000), vol. 37, pp. 5592-5596.

\* cited by examiner

MACROCYCLIC COMPOUNDS AS STING AGONISTS AND METHODS AND USES THEREOF

CROSS REFERENCE TO THE RELATED APPLICATIONS

This PCT application claims the benefit of Indian Provisional Patent Application Nos. 201921029556, filed Jul. 22, 2019; 201921051086, filed Dec. 10, 2019, and 202021003961, filed Jan. 29, 2020, the disclosure of each of which are incorporated herein by reference in their entirety for all purposes.

FIELD OF THE INVENTION

The invention relates to macrocyclic compounds having the general Formula (I) and their tautomeric forms, stereoisomers, pharmaceutically acceptable salts, and their combination with suitable medicament, corresponding processes for the synthesis and pharmaceutical compositions and uses of compounds containing the invention.

INCORPORATION BY REFERENCE

All U.S. patents, U.S. patent application publications, foreign patents, foreign and PCT published applications, articles and other documents, references and publications noted herein, and all those listed as References Cited in any patent or patents that issue herefrom, are hereby incorporated by reference in their entirety. The information incorporated is as much a part of this application as if all the text and other content was repeated in this application, and will be treated as part of the text and content of this application as filed.

BACKGROUND OF THE INVENTION

The following includes information that may be useful in understanding the invention. It is not an admission that any of the information, publications or documents specifically or implicitly referenced herein is prior art, or essential, to the presently described or claimed invention.

Stimulator of interferon genes (STING, also known as transmembrane protein 173/TMEM173/MPYS/MITA/ERIS) is a signalling molecule that in humans is encoded by TMEM173 gene. STING is protein with 379 amino acids, consisting of several transmembrane regions. STING protein is expressed in several endothelial and epithelial cell types, as well as in haematopoietic lineage, which can include or exclude: T cells, dendritic cells (DCs) including plasmacytoid dendritic cells (pDCs) and macrophages. STING is associated with endoplasmic reticulum (ER) in the cell and has a major role in controlling the transcription of numerous host defence genes, including type I interferons (IFNs) and pro-inflammatory cytokines.

Recognition of aberrant DNA species or cyclic dinucleotides (CDNs) in the cytosol of the cell leads to the activation of STING. Cytosolic DNA species can activate STING signalling following binding to cyclic GMP-AMP synthase (cGAS). Binding of cytosolic DNA to cGAS catalyses the production of a type of CDN known as cGAMP (cyclic GMP-AMP), which contains one 2',5'-phosphodiester linkage and a canonical 3',5' linkage (c[G(2',5')pA(3',5')p]). The binding of cGAMP and other bacterial CDNs induce changes in the conformation of STING protein and facilitates the binding of TANK-binding kinase 1 (TBK1). STING-TBK1 complex, further transposes to perinuclear regions of the cell to transport TBK1 to endolysosomal compartments where it phosphorylates the transcription factors like, interferon regulatory factor 3 (IRF3). Similarly, STAT6 and nuclear factor-κB (NF-κB) also get activated downstream to STING activation. These transcription factors then translocate into the nucleus to initiate innate immune gene transcription and production of type I IFN and other cytokines. STING is then rapidly degraded, an event that may avoid problems associated with sustained cytokine production. (Nature Reviews Immunol, 2015, 15:760-770; Cell Reports, 2015, 11:1018-1030).

Studies in mice have shown that type I IFN signalling plays an important role in tumour-initiated T cell priming and tumour control (J. Exp. Med. 2011, 208, 1989-2003). Mice lacking the IFN-α/β receptor in DCs failed to reject immunogenic tumours, and CD8α+ DCs from these mice are defective in antigen cross-presentation to CD8+ T cells. Additionally, transcriptional profiling analyses of melanoma patients has publicized that tumours containing infiltrating activated T cells are characterized by a type I IFN transcriptional signature (Cancer Res. 2009, 69:3077-3085). Thus, STING activation may play a role in tumour control.

PCT International Application Publications Nos. WO2017/011920, WO2017/175147, WO2017/175156, WO2018/234805, WO2018/234807, WO2018/234808, WO2019/023635, WO2019/027857, WO2019/027858, and Nature (2018), 564 (7736):439-443, discloses STING modulators.

SUMMARY OF THE INVENTION

The invention described and claimed herein has many attributes and embodiments including, but not limited to, those set forth or described or referenced in this Summary. It is not intended to be all-inclusive and the invention described and claimed herein is not limited to or by the features or embodiments identified in this introduction, which is included for purposes of illustration only and not restriction.

It is an object of the invention to provide compounds, compositions, formulations, kits and methods for the modulation of a STING protein and/or STING protein complex, and/or for the treatment of disorders that will benefit from modulation of a STING protein and/or STING protein complex. In some embodiments, the modulation of a STING protein and/or STING protein complex is the activation of said STING protein and/or STING protein complex. Thus, in one aspect, the invention relates to compounds and methods for the modulation of a STING protein and/or STING protein complex, and particularly, but not exclusively, to methods for the treatment of disorders for which modulation of a STING protein and/or STING protein complex, may be of benefit, the methods comprising administering a STING protein and/or STING protein complex modulator, for example, compounds of formula I or formula II, and/or one or more analogue or prodrug of any of the foregoing compounds thereof.

The compounds of invention having STING protein and/or STING protein complex modulator activity are described herein.

The invention relates to compounds of general Formula (I), and their tautomeric forms, stereoisomers, pharmaceutically acceptable salts, hydrates, solvates, or prodrugs thereof.

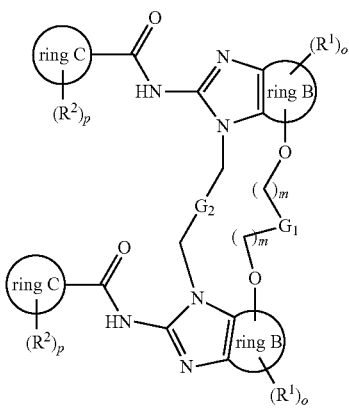

(I)

wherein,
$G_1$ is independently selected from —$CH_2$— or

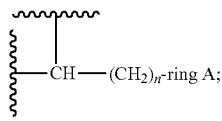

$G_2$ is —CH=CH—;
ring A is optionally substituted heterocyclyl, and optionally substituted heteroaryl;
ring B is aromatic ring;
ring C is optionally substituted five membered heteroaryl;
$R^1$ is independently selected from optionally substituted heteroaryl, —$CONHSO_2R^{3a}$, and —$CON(R^3)_2$;
$R^2$ is independently selected from hydrogen, optionally substituted $C_1$-$C_6$ alkyl, and optionally substituted $C_3$-$C_5$ monocyclic cycloalkyl;
$R^3$ is independently selected from hydrogen, substituted alkyl, optionally substituted cycloalkyl, optionally substituted cycloalkylalkyl, optionally substituted heterocyclyl, optionally substituted heterocyclylalkyl, optionally substituted heteroarylalkyl, optionally substituted arylalkyl, and

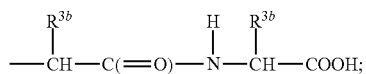

wherein when $R^1$ substitution on both ring B are —$CON(R^3)_2$, then at least for one $R^1$ substitution, both $R^3$ substitutions cannot be hydrogen at the same time;
$R^{3a}$ is independently selected from optionally substituted alkyl, and optionally substituted cycloalkyl;
$R^{3b}$ is independently selected from hydrogen or optionally substituted alkyl;
m is 1;
n is 0;
o is 1;
p is selected from 0, 1, or 2;
when 'alkyl' group is substituted, it is substituted with 1 to 4 substituents independently selected from halogen, oxo (=O), alkyl, perhaloalkyl, cycloalkyl, aryl, heteroaryl, heterocyclyl, —$N(R^4)_2$, —C(=O)OH, —N(H)—$SO_2$-alkyl, and —$OR^4$;

when 'carbocycle' or 'cycloalkyl' group is substituted, it is substituted with 1 to 4 substituents independently selected from halogen, alkyl, perhaloalkyl, heteroaryl, heterocyclyl, —$N(R^4)_2$, —C(=O)OH, and —$OR^4$;

when 'heterocycle' or 'heterocyclyl' group is substituted, it is substituted with 1 to 4 substituents independently selected from oxo (=O), halogen, cyano, alkyl, perhaloalkyl, heterocyclyl, —$OR^4$, —$OP(O)(OR^4)_2$, —$P(O)(OR^4)_2$, —$P(O)(OR^4)R^{4a}$, —$SO_2R^{4a}$, —C(=O)OH, —C(=O)N(H)$R^4$, —C(=O)N(alkyl)$R^4$, —N(H)C(=O)$R^{4a}$, —N(H)—$SO_2$-alkyl, —N(H)$R^4$, and —N(alkyl)$R^4$;

when the 'aryl' group is substituted, it is substituted with 1 to 4 substituents selected from halogen, cyano, alkyl, perhaloalkyl, cycloalkyl, heterocyclyl, —O-alkyl, —O-perhaloalkyl, —N(alkyl)alkyl, —N(H)alkyl, —$SO_2$-alkyl, —N(alkyl)C(=O)alkyl, —N(H)C(=O)alkyl, —C(=O)N(alkyl)alkyl, —C(=O)N(H)alkyl, —C(=O)$NH_2$, —$SO_2$N(alkyl)alkyl, —$SO_2$N(H)alkyl, —$SO_2NH_2$, —$OP(O)(OR^4)_2$, —$P(O)(OR^4)_2$, —$P(O)(OR^4)R^{4a}$, and —C(=O)OH;

when the 'heteroaryl' group is substituted, it is substituted with 1 to 4 substituents selected from halogen, cyano, alkyl, perhaloalkyl, cycloalkyl, heterocyclyl, —O-alkyl, —O-perhaloalkyl, —N(alkyl)alkyl, —N(H)alkyl, —$SO_2$-alkyl, —N(alkyl)C(=O)alkyl, —N(H)C(=O)alkyl, —C(=O)N(alkyl)alkyl, —C(=O)N(H)alkyl, —C(=O)$NH_2$, —$SO_2$N(alkyl)alkyl, —$SO_2$N(H)alkyl, —$SO_2NH_2$, —$OP(O)(OR^4)_2$, —$P(O)(OR^4)_2$, —$P(O)(OR^4)R^{4a}$, and —C(=O)OH;

each $R^4$ is independently selected from hydrogen, alkyl, and cycloalkyl;
each $R^{4a}$ is independently selected from alkyl, and cycloalkyl.

The invention relates to compounds of general Formula (I), and their tautomeric forms, stereoisomers, pharmaceutically acceptable salts, hydrates, solvates, or prodrugs thereof.

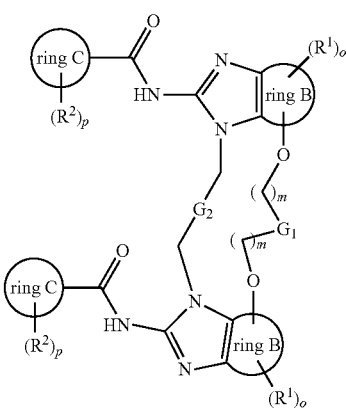

(I)

wherein,
$G_1$ is independently selected from —$CH_2$— or

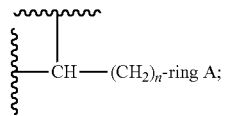

G$_2$ is —CH=CH—;

ring A is optionally substituted heterocyclyl, and optionally substituted heteroaryl;

ring B is aromatic ring;

ring C is optionally substituted five membered heteroaryl;

R$^1$ is —CON(R$^3$)$_2$;

R$^2$ is independently selected from hydrogen, optionally substituted C$_1$-C$_6$ alkyl, and optionally substituted C$_3$-C$_5$ monocyclic cycloalkyl;

R$^3$ is independently selected from hydrogen, optionally substituted cycloalkyl, optionally substituted heterocyclyl, optionally substituted heterocyclylalkyl, optionally substituted heteroarylalkyl, and optionally substituted arylalkyl, wherein at least for one R$^1$ substitution, both R$^3$ substitutions cannot be hydrogen at the same time;

m is 1;

n is 0;

o is 1;

p is selected from 0, 1, or 2;

when 'alkyl' group is substituted, it is substituted with 1 to 4 substituents independently selected from halogen, oxo (=O), alkyl, perhaloalkyl, cycloalkyl, aryl, heteroaryl, heterocyclyl, —N(R$^4$)$_2$, —C(=O)OH, —N(H)—SO$_2$-alkyl, and —OR$^4$;

when 'carbocycle' or 'cycloalkyl' group is substituted, it is substituted with 1 to 4 substituents independently selected from halogen, alkyl, perhaloalkyl, heteroaryl, heterocyclyl, —N(R$^4$)$_2$, —C(=O)OH, and —OR$^4$;

when 'heterocycle' or 'heterocyclyl' group is substituted, it is substituted with 1 to 4 substituents independently selected from oxo (=O), halogen, cyano, alkyl, perhaloalkyl, heterocyclyl, —OR$^4$, —OP(O)(OR$^4$)$_2$, —P(O)(OR$^4$)$_2$, —P(O)(OR$^4$)R$^{4a}$, —SO$_2$R$^{4a}$, —C(=O)OH, —C(=O)N(H)R$^4$, —C(=O)N(alkyl)R$^4$, —N(H)C(=O)R$^{4a}$, —N(H)—SO$_2$-alkyl, —N(H)R$^4$, and —N(alkyl)R$^4$;

when the 'aryl' group is substituted, it is substituted with 1 to 4 substituents selected from halogen, cyano, alkyl, perhaloalkyl, cycloalkyl, heterocyclyl, —O-alkyl, —O-perhaloalkyl, —N(alkyl)alkyl, —N(H)alkyl, —SO$_2$-alkyl, —N(alkyl)C(=O)alkyl, —N(H)C(=O)alkyl, —C(=O)N(alkyl)alkyl, —C(=O)N(H)alkyl, —C(=O)NH$_2$, —SO$_2$N(alkyl)alkyl, —SO$_2$N(H)alkyl, —SO$_2$NH$_2$, —OP(O)(OR$^4$)$_2$, —P(O)(OR$^4$)$_2$, —P(O)(OR$^4$)R$^{4a}$, and —C(=O)OH;

when the 'heteroaryl' group is substituted, it is substituted with 1 to 4 substituents selected from halogen, cyano, alkyl, perhaloalkyl, cycloalkyl, heterocyclyl, —O-alkyl, —O-perhaloalkyl, —N(alkyl)alkyl, —N(H)alkyl, —SO$_2$-alkyl, —N(alkyl)C(=O)alkyl, —N(H)C(=O)alkyl, —C(=O)N(alkyl)alkyl, —C(=O)N(H)alkyl, —C(=O)NH$_2$, —SO$_2$N(alkyl)alkyl, —SO$_2$N(H)alkyl, —SO$_2$NH$_2$, —OP(O)(OR$^4$)$_2$, —P(O)(OR$^4$)$_2$, —P(O)(OR$^4$)R$^{4a}$, and —C(=O)OH;

each R$^4$ is independently selected from hydrogen, alkyl, and cycloalkyl;

each R$^{4a}$ is independently selected from alkyl, and cycloalkyl.

In some embodiments, the invention provides a compound of general Formula (II), and their tautomeric forms, stereoisomers, pharmaceutically acceptable salts, hydrates, solvates, or prodrugs thereof,

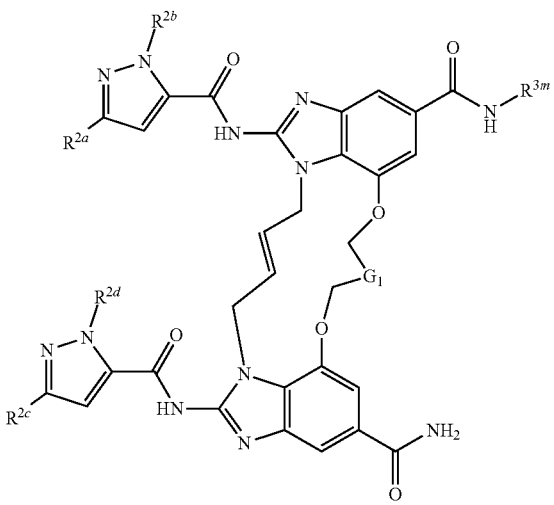

(II)

wherein,

R$^{3m}$ is optionally substituted cycloalkyl, optionally substituted heterocyclyl, optionally substituted heterocyclylalkyl, optionally substituted heteroarylalkyl, and optionally substituted arylalkyl;

G$_1$ is independently selected from —CH$_2$— or

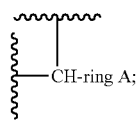

ring A is optionally substituted heterocyclyl, and optionally substituted heteroaryl;

R$^{2a}$, R$^{2b}$, R$^{2c}$, and R$^{2d}$ are independently selected from hydrogen, optionally substituted C$_1$-C$_6$ alkyl, and optionally substituted C$_3$-C$_5$ monocyclic cycloalkyl.

According to some embodiments, the invention relates the compound of Formula (I), Formula (II), its tautomeric form, its stereoisomer, its pharmaceutically acceptable salt, its hydrate, its solvate or its prodrug, wherein, G$_1$ is —CH$_2$— or

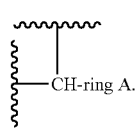

According to some embodiments, the invention relates the compound of Formula (I), Formula (II), its tautomeric form, its stereoisomer, its pharmaceutically acceptable salt, its hydrate, its solvate or its prodrug, wherein, G$_1$ is —CH$_2$.

According to some embodiments, the invention relates the compound of Formula (I), Formula (II), its tautomeric form, its stereoisomer, its pharmaceutically acceptable salt, its hydrate, its solvate or its prodrug, wherein, G$_1$ is

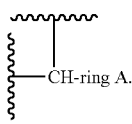

According to some embodiments, the invention relates the compound of Formula (I), Formula (II), its tautomeric form, its stereoisomer, its pharmaceutically acceptable salt, its hydrate, its solvate or its prodrug, wherein, ring A is optionally substituted heterocyclyl or optionally substituted heteroaryl.

According to some embodiments, the invention relates the compound of Formula (I), Formula (II), its tautomeric form, its stereoisomer, its pharmaceutically acceptable salt, its hydrate, its solvate or its prodrug, wherein, ring A is selected from the group consisting of:

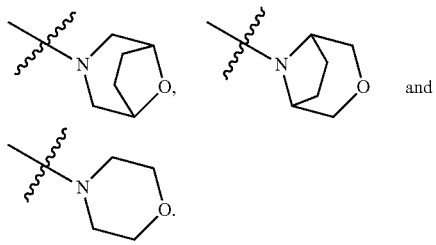

According to some embodiments, the invention relates the compound of Formula (I), Formula (II), its tautomeric form, its stereoisomer, its pharmaceutically acceptable salt, its hydrate, its solvate or its prodrug, wherein $R^{2a}$, $R^{2b}$, $R^{2c}$, and $R^{2d}$ are independently selected from methyl or ethyl.

According to some embodiments, the invention relates the compound of Formula (I), its tautomeric form, its stereoisomer, its pharmaceutically acceptable salt, its hydrate, its solvate or its prodrug, wherein, $R^1$ is —CON($R^3$)$_2$, wherein $R^3$ is independently selected from hydrogen, optionally substituted cycloalkyl, optionally substituted heterocyclyl, optionally substituted heterocyclylalkyl, optionally substituted heteroarylalkyl, and optionally substituted arylalkyl, wherein at least for one $R^1$ substitution, both $R^3$ substitutions cannot be hydrogen at the same time.

According to some embodiments, the invention relates the compound of Formula (II), its tautomeric form, its stereoisomer, its pharmaceutically acceptable salt, its hydrate, its solvate, or its prodrug, wherein $R^{3m}$ is selected from the group consisting of:

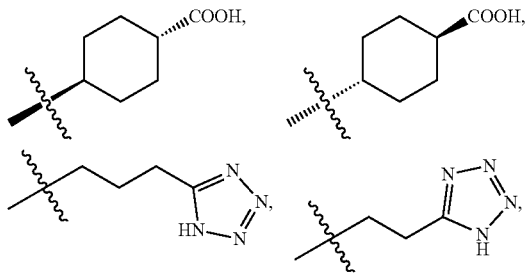

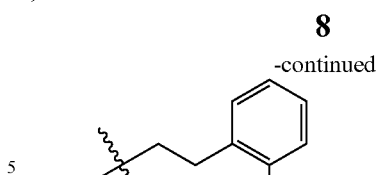

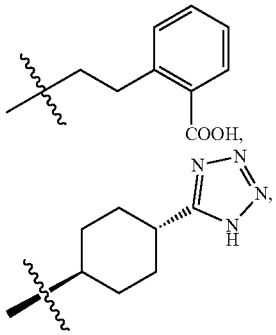

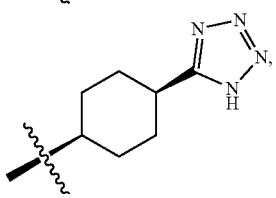

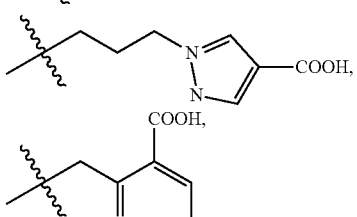

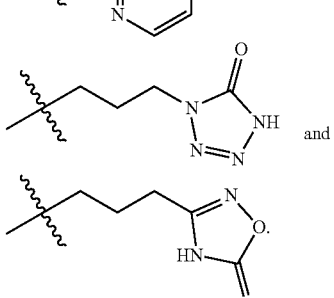

According to some embodiments, the invention relates the compound of Formula (I), its tautomeric form, its stereoisomer, its pharmaceutically acceptable salt, its hydrate, its solvate, or its prodrug, wherein $R^{2a}$, $R^{2b}$, $R^{2c}$, and $R^{2d}$ are independently selected from optionally substituted $C_1$-$C_6$ alkyl; $G_2$ is —CH=CH—; ring C is pyrazole; ring B is aromatic ring; n is 0; m is 1; p is 1 or 2; o is 1; $G_1$ is —CH$_2$— or

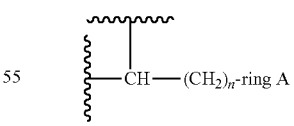

wherein ring A is optionally substituted heterocyclyl or optionally substituted heteroaryl, and $R^1$ is —CON($R^3$)$_2$, wherein in $R^3$ hydrogen, optionally substituted cycloalkyl, optionally substituted heterocyclylalkyl, optionally substituted heteroarylalkyl, and optionally substituted arylalkyl, wherein at least for one $R^1$ substitution, both $R^3$ substitutions cannot be hydrogen at the same time.

In some embodiments, the invention provides a compound of Formula (I), their tautomeric forms, and their all possible geometrical isomers, including, but not limiting to Formula (A), Formula (B), Formula (C), Formula (D), and Formula (E) as represented below:

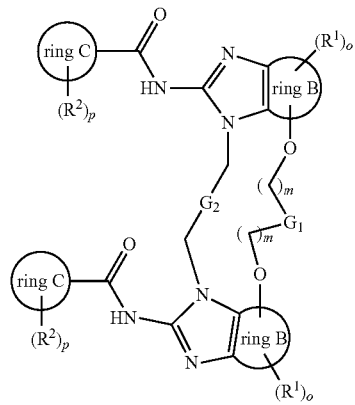

(A)

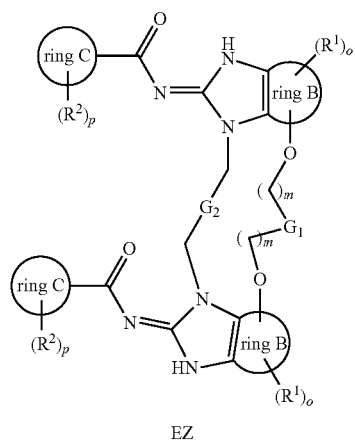

(B)

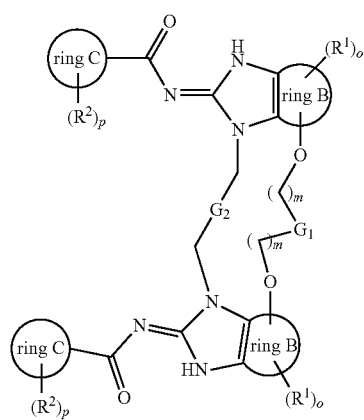

(I)

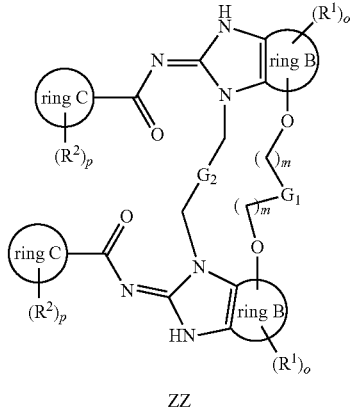

(C)

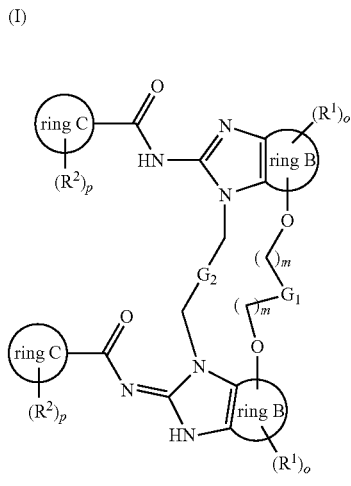

(D)

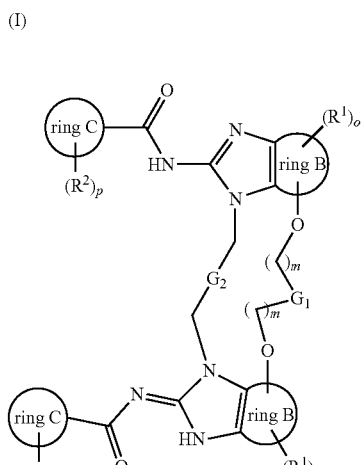

(E)

In some aspects, any R group described herein can include or exclude the recited options.

In some embodiments, the invention provides a compound of Formula (I), and Formula (II) and their tautomeric forms, its pharmaceutically acceptable salt, its hydrate, its solvate, or its prodrug, wherein the compound is selected from a compound set forth in Table 1 below.

TABLE 1

Exemplary Compounds of the Invention

| Ex. No | Structure | IUPAC Name |
|---|---|---|
| 1 | 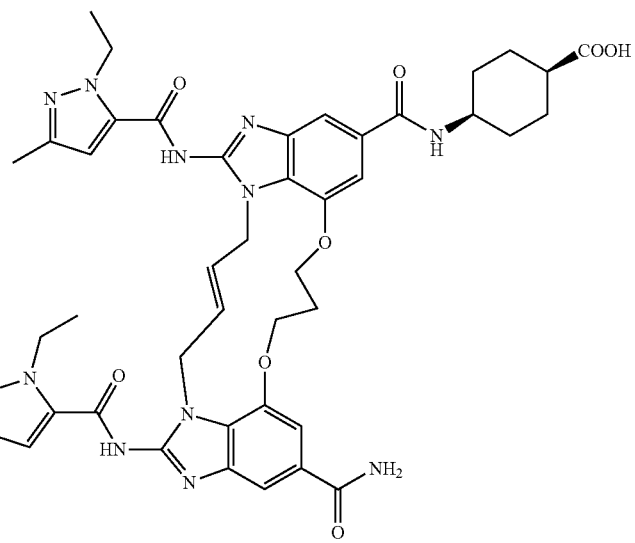 | (1S,4S)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid |
| 2 | 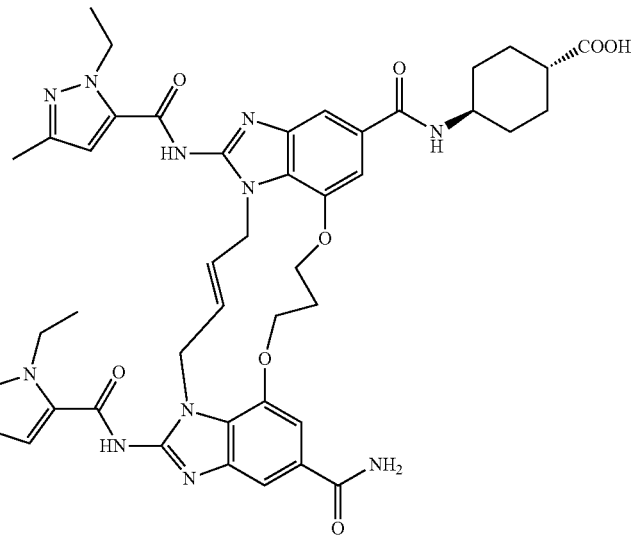 | (1R,4R)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid |

TABLE 1-continued

Exemplary Compounds of the Invention

| Ex. No | Structure | IUPAC Name |
|---|---|---|
| 3 | 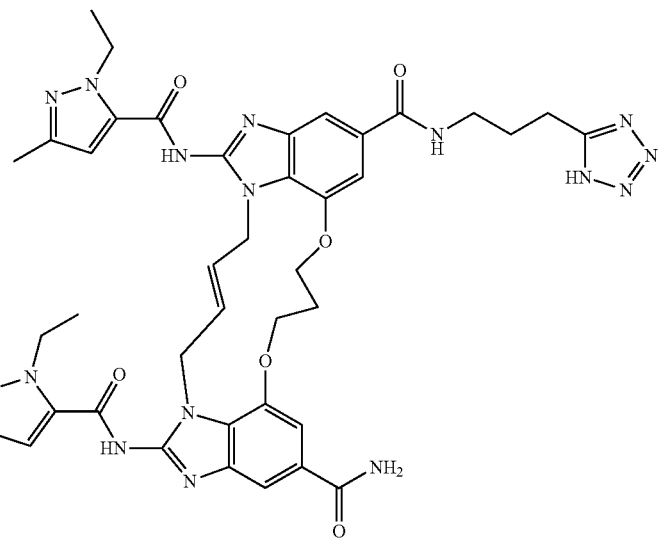 | (E)-N-(3-(1H-tetrazol-5-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 4 | 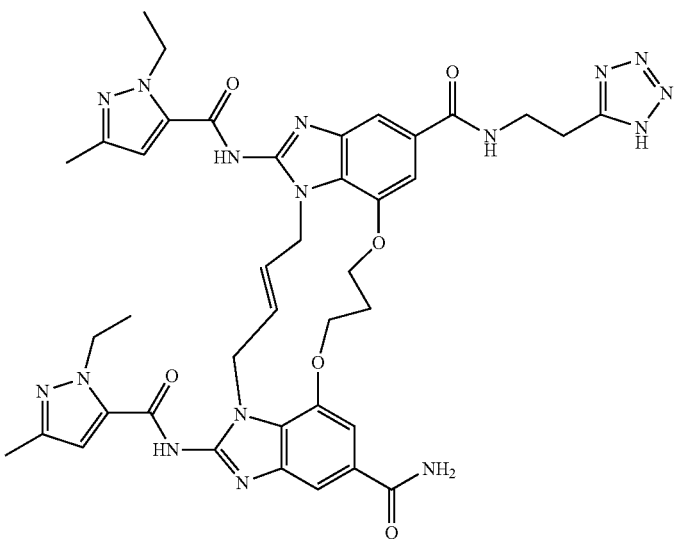 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCc4nnn[nH]4)cc(c21)OCCCO3] | (E)-N-(2-(1H-tetrazol-5-yl)ethyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 5 | 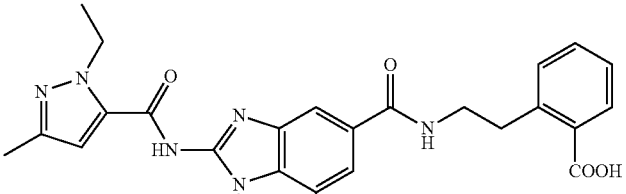 | (E)-2-(2-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)ethyl)benzoic acid |
| 6 | 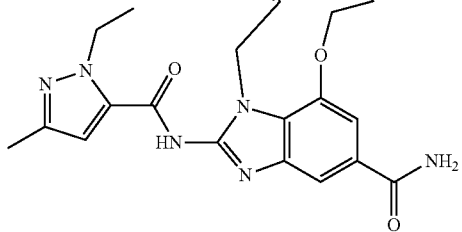 | (E)-N-((1R,4R)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 7 | | (E)-N-((1S,4S)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-_cd:8,9,10-c'd']diindene-4,12-dicarboxamide |
| 8 | | (E)-1-(3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid |

TABLE 1-continued

Exemplary Compounds of the Invention

| Ex. No | Structure | IUPAC Name |
|---|---|---|
| 9 | 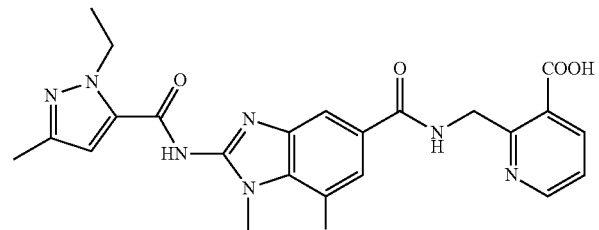 | (E)-2-((12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)methyl)nicotinic acid |
| 10 | 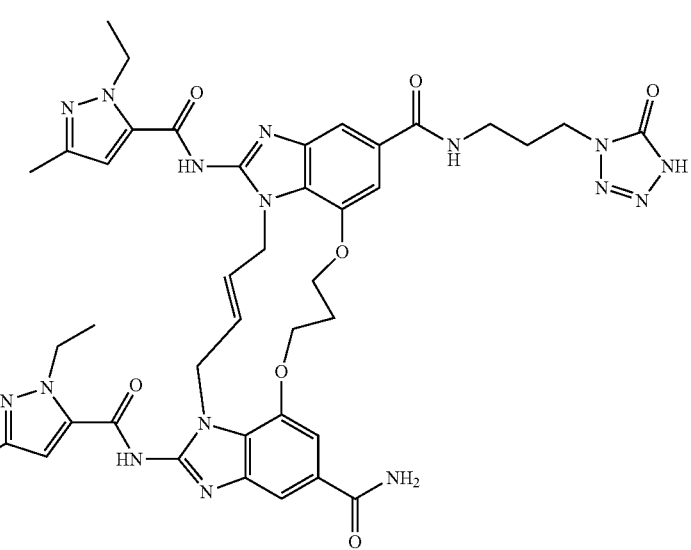 | (E)-1,15-bis(1-ethyl-3-methyl-1H-pyrazole-5-carboxamido)-N-(3-(5-oxo-4,5-dihydro-1H-tetrazol-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 11 | 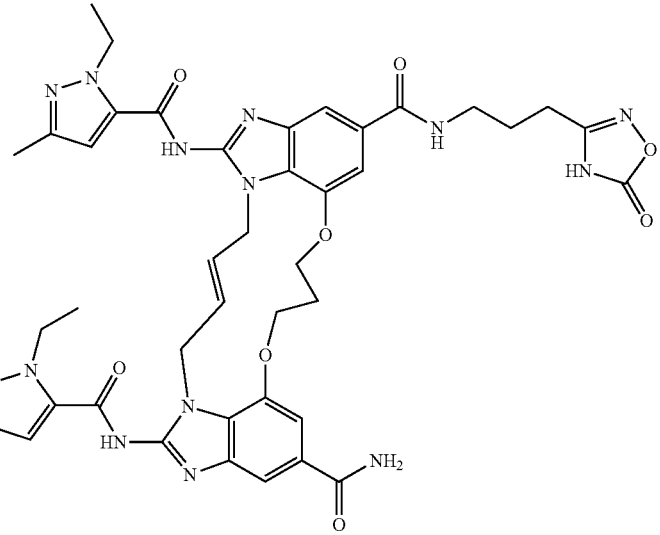 | (E)-1,15-bis(1-ethyl-3-methyl-1H-pyrazole-5-carboxamido)-N-(3-(5-oxo-4,5-dihydro-1,2,4-oxadiazol-3-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 12 | 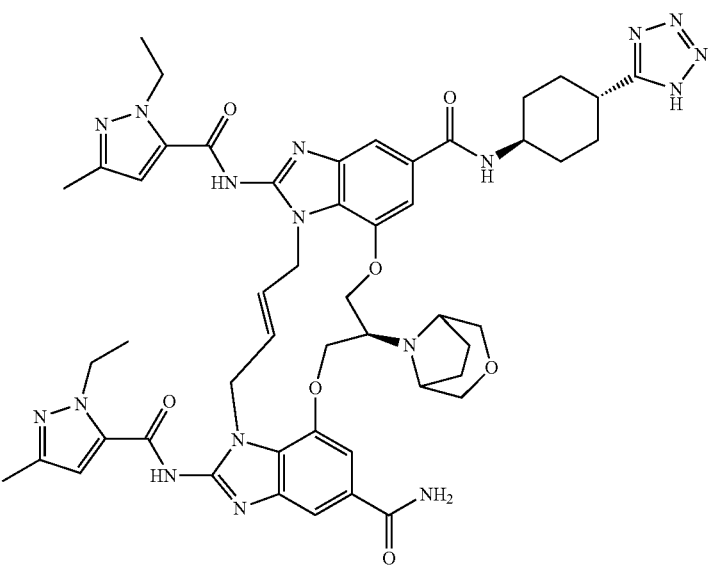 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@H](c5nnn[nH]5)CC4)cc(c21)OC[C@@H](N1C2CCC1COC2)CO3] | (8S,E)-N4-((1R,4S)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 13 | 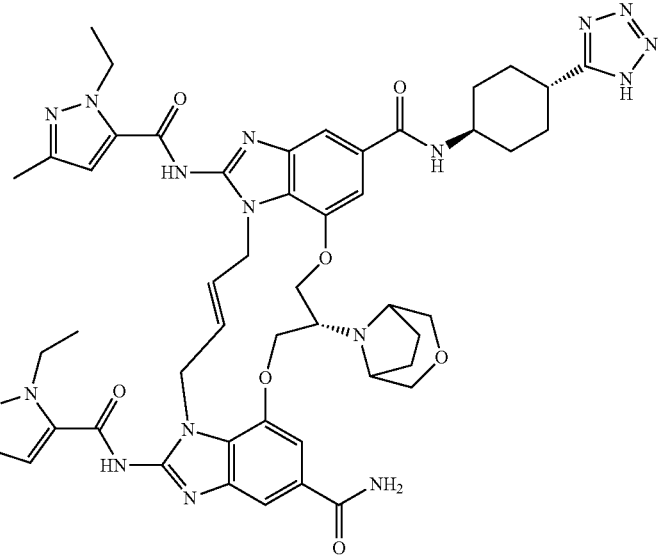 | (8R,E)-N4-((1R,4R)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 14 | 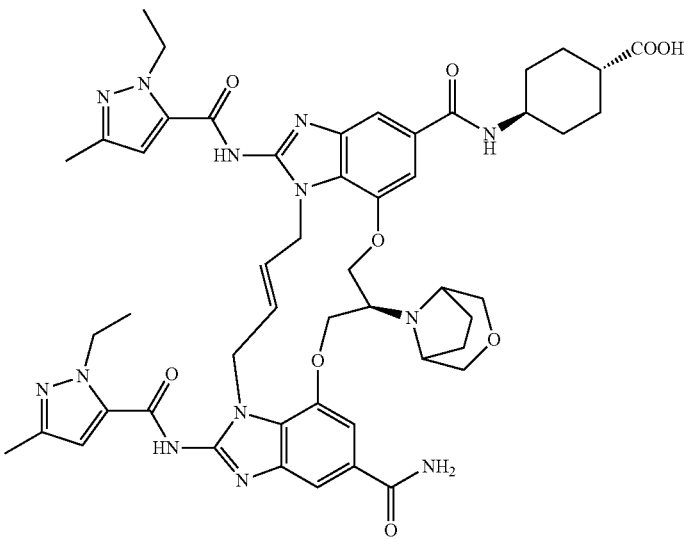 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@H](C(=O)O)CC4)cc(c21)OC[C@@H](N1C2CCC1COC2)CO3] | (1S,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid |

TABLE 1-continued

Exemplary Compounds of the Invention

| Ex. No | Structure | IUPAC Name |
|---|---|---|
| 15 | 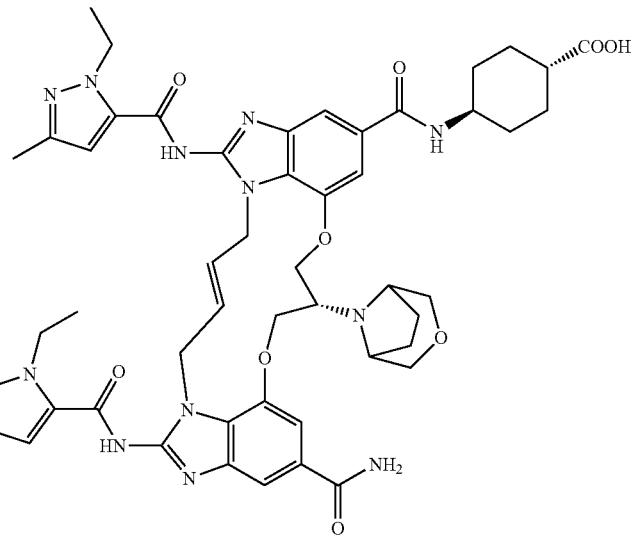 | (1R,4R)-4-((8R,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid |
| 16 | 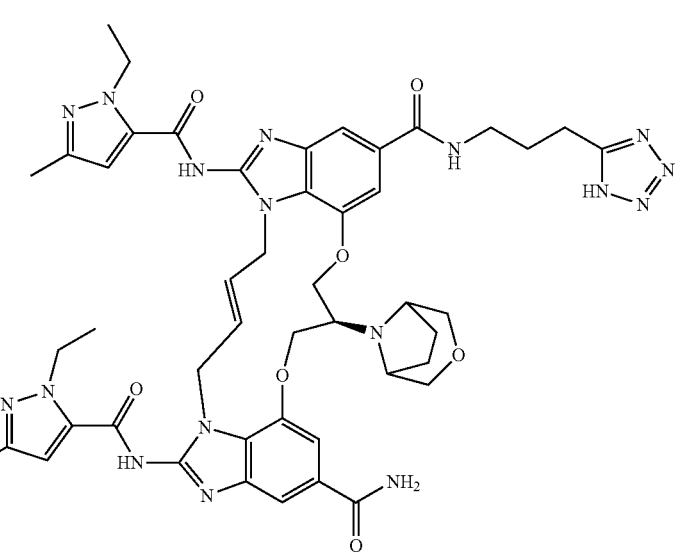 | (8S,E)-N4-(3-(1H-tetrazol-5-yl)propyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 17 | 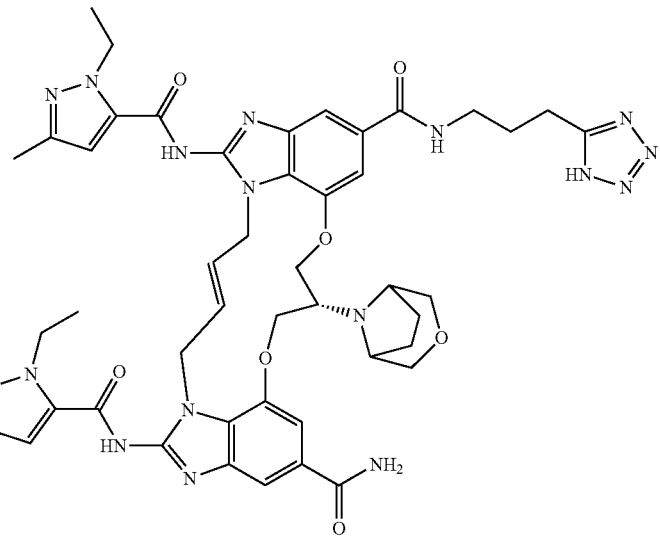 | (8R,E)-N4-(3-(1H-tetrazol-5-yl)propyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 18 | 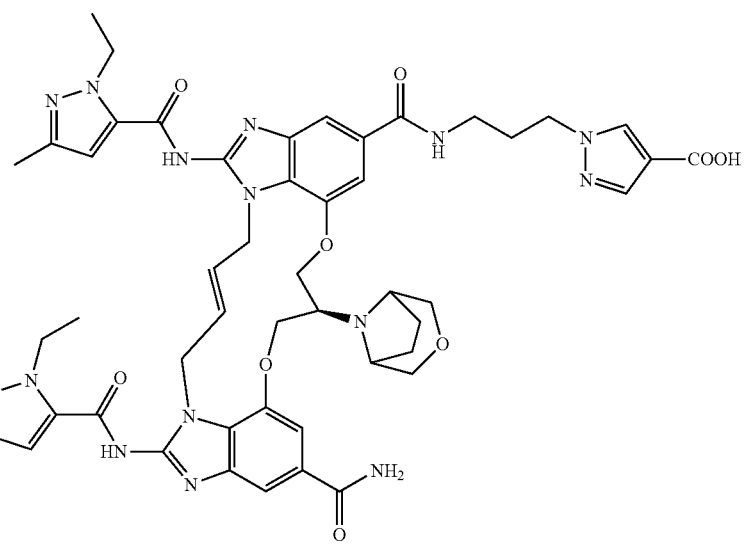 | 1-(3-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid |

TABLE 1-continued

Exemplary Compounds of the Invention

| Ex. No | Structure | IUPAC Name |
|---|---|---|
| 19 | | 1-(3-((8R,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid |
| 20 | | (1R,4R)-4-((E)-8-(8-oxa-3-azabicyclo[3.2.1]octan-3-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid |

TABLE 1-continued

Exemplary Compounds of the Invention

| Ex. No | Structure | IUPAC Name |
|---|---|---|
| 21 | 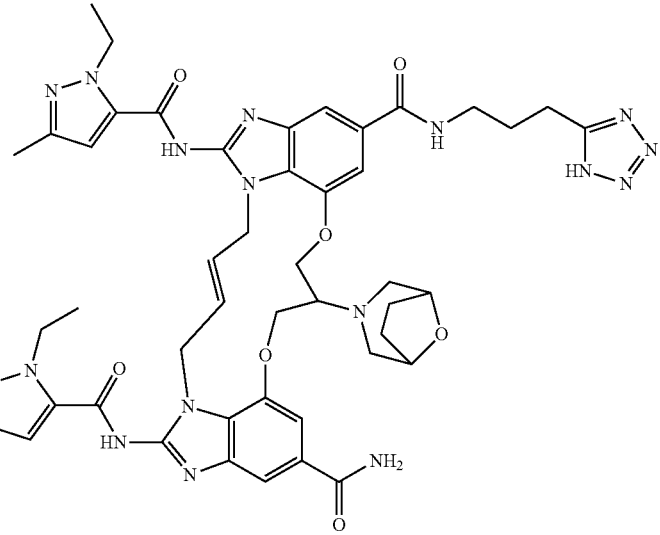 | (E)-N-(3-(1H-tetrazol-5-yl)propyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 22 | 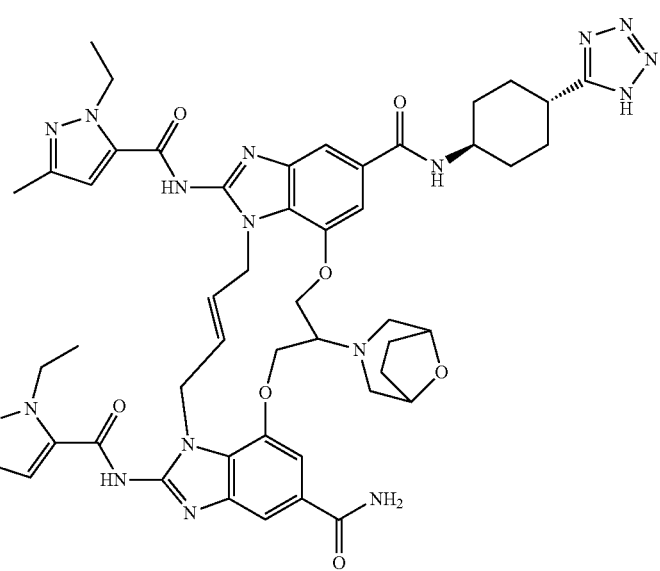 | (E)-N-((1R,4R)-4-(1H-tetrazol-5-yl)cyclohexyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 23 | 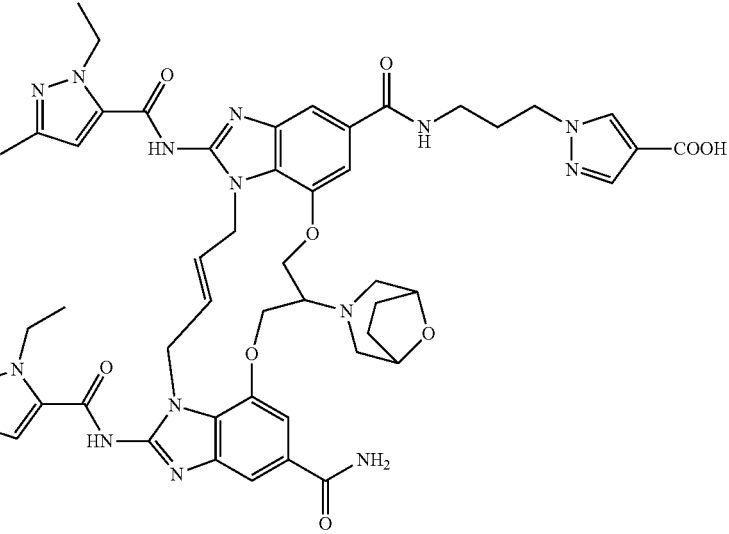 | (E)-1-(3-(8-(8-oxa-3-azabicyclo[3.2.1]octan-3-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid |
| 24 | 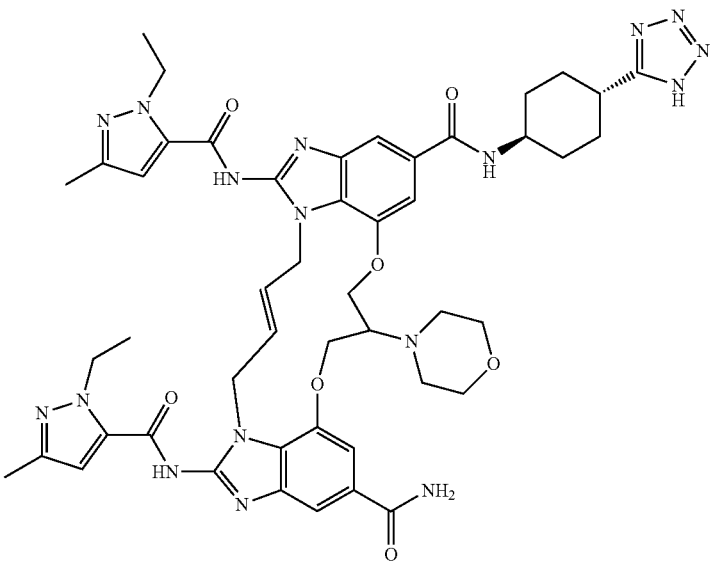 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@H](c5nnn[nH]5)CC4)cc(c21)OCC(N1CCOCC1)CO3] | (E)-N-((1R,4R)-4-(1H-tetrazol-5-yl)cyclohexyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 25 | 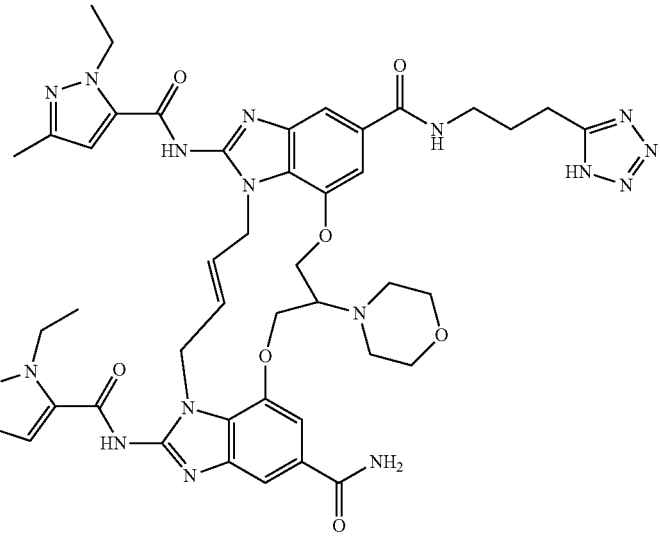 | (E)-N-(3-(1H-tetrazol-5-yl)propyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxamide |
| 26 | 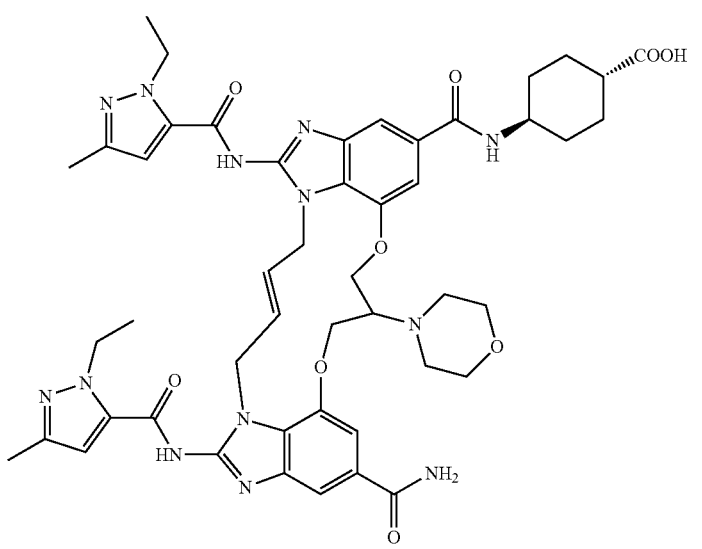 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@H](C(=O)O)CC4)cc(c21)OCC(N1CCOCC1)CO3] | (1R,4R)-4-((E)-12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid |

TABLE 1-continued

Exemplary Compounds of the Invention

| Ex. No | Structure | IUPAC Name |
|---|---|---|
| 27 | 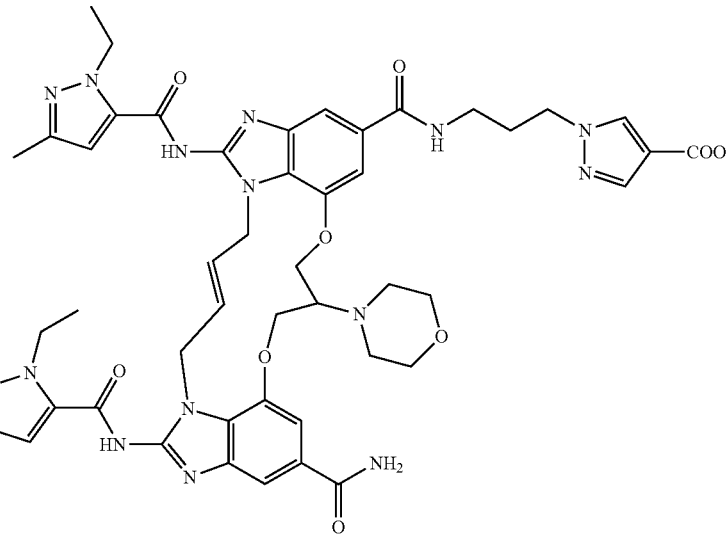 | (E)-1-(3-(12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid |
| 28 | 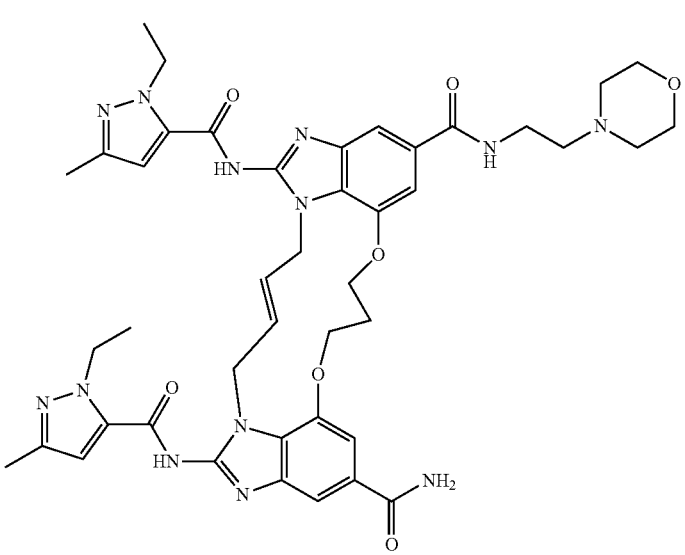 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCN4CCOCC4)cc(c21)OCCCO3] | (E)-1,15-bis(1-ethyl-3-methyl-1H-pyrazole-5-carboxamido)-N-(2-morpholinoethyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 29 | 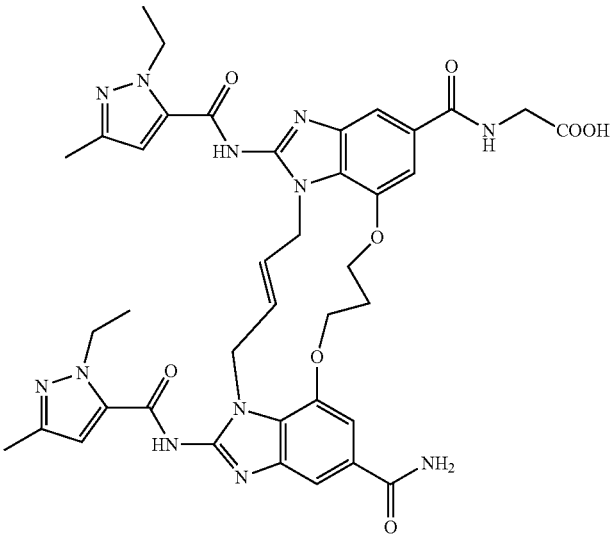 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCC(=O)O)cc(c21)OCCCO3] | (E)-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carbonyl)glycine |
| 30 | 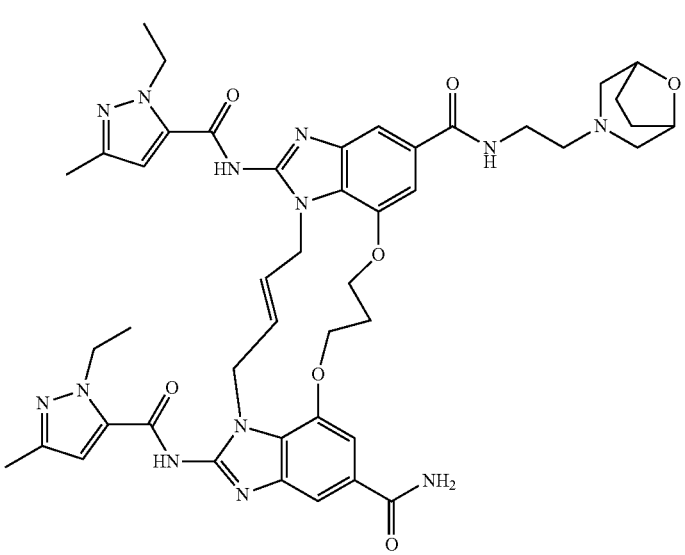 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCN4CC5CCC(C4)O5)cc(c21)OCCCO3] | (E)-N-(2-(8-oxa-3-azabicyclo[3.2.1]octan-3-yl)ethyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-_cd:8,9,10-c'd']diindene-4,12-dicarboxamide |

TABLE 1-continued

Exemplary Compounds of the Invention

| Ex. No | Structure | IUPAC Name |
|---|---|---|
| 31 | 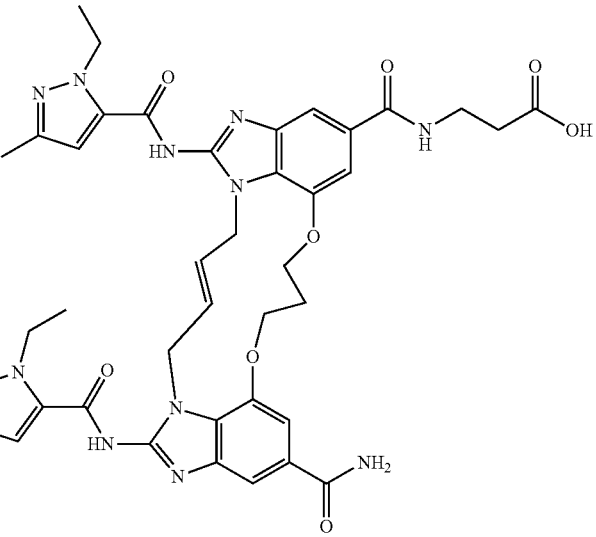 | (E)-3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propanoic acid |
| 32 | 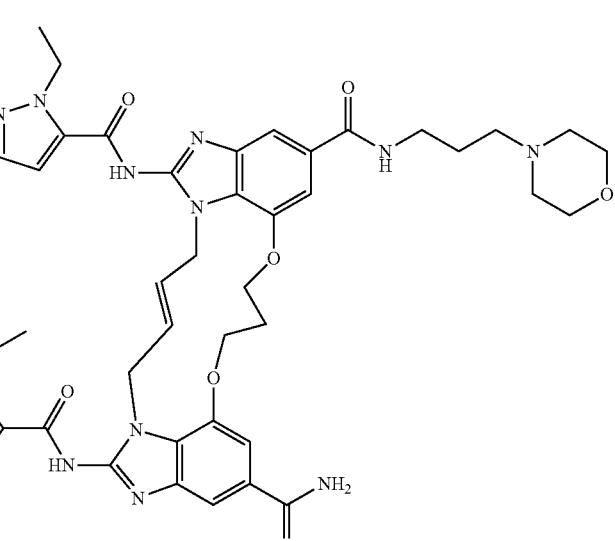 | (E)-1,15-bis(1-ethyl-3-methyl-1H-pyrazole-5-carboxamido)-N-(3-morpholinopropyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 33 | 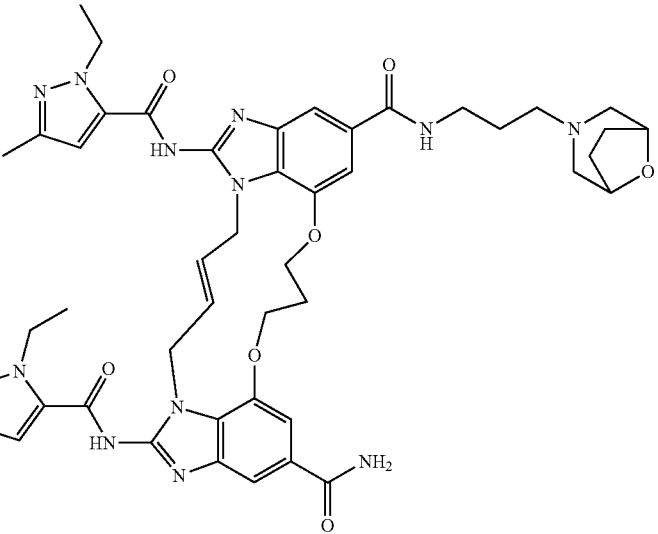 | (E)-N-(3-(8-oxa-3-azabicyclo[3.2.1]octan-3-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 34 | 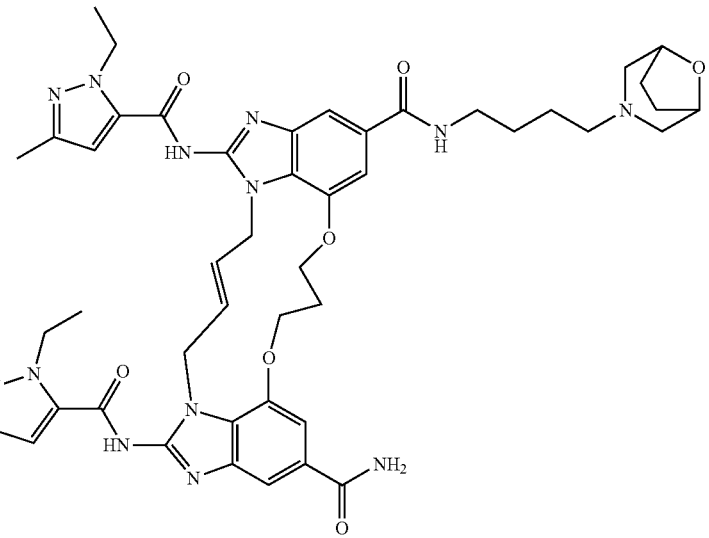 | (E)-N-(4-(8-oxa-3-azabicyclo[3.2.1]octan-3-yl)butyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 35 | 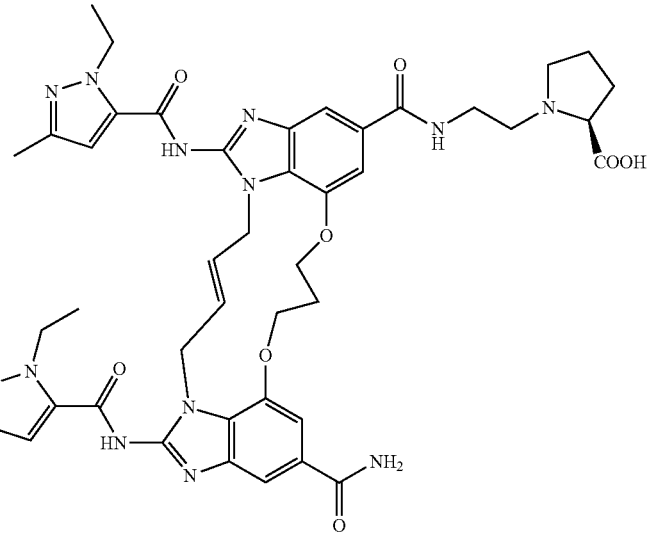 | (E)-(2-(4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxamido)ethyl)-L-proline |
| 36 | 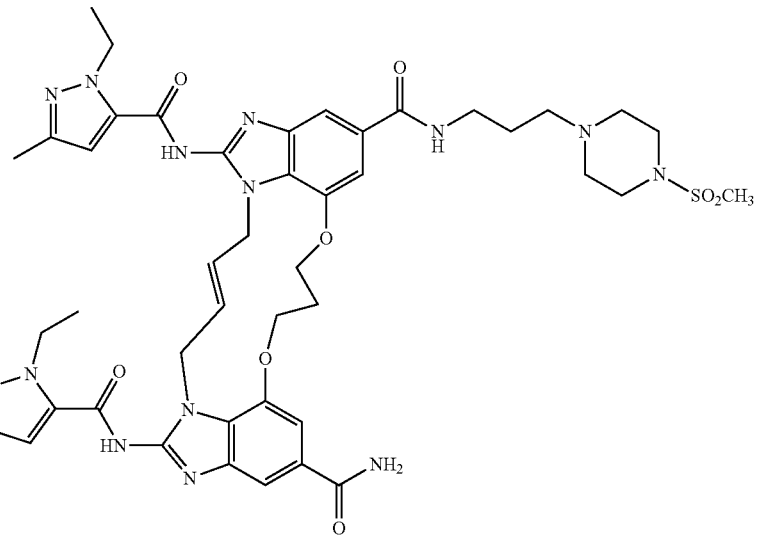 | (E)-1,15-bis(1-ethyl-3-methyl-1H-pyrazole-5-carboxamido)-N-(3-(4-(methylsulfonyl)piperazin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 37 | 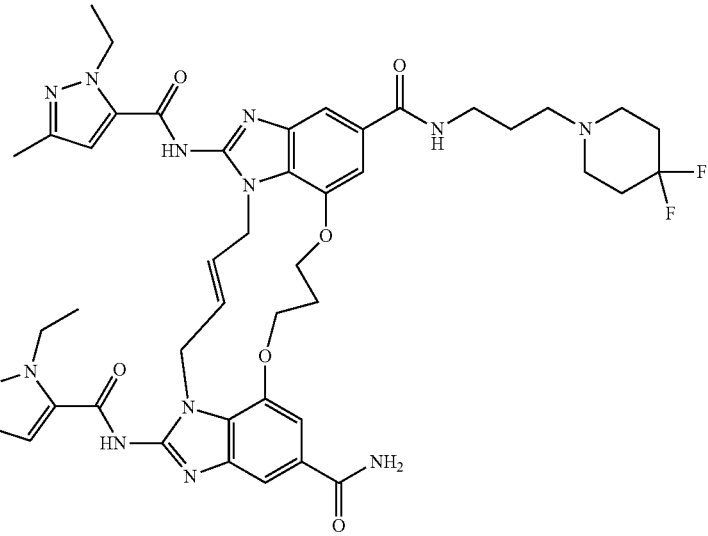 | (E)-N-(3-(4,4-difluoropiperidin-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 38 | 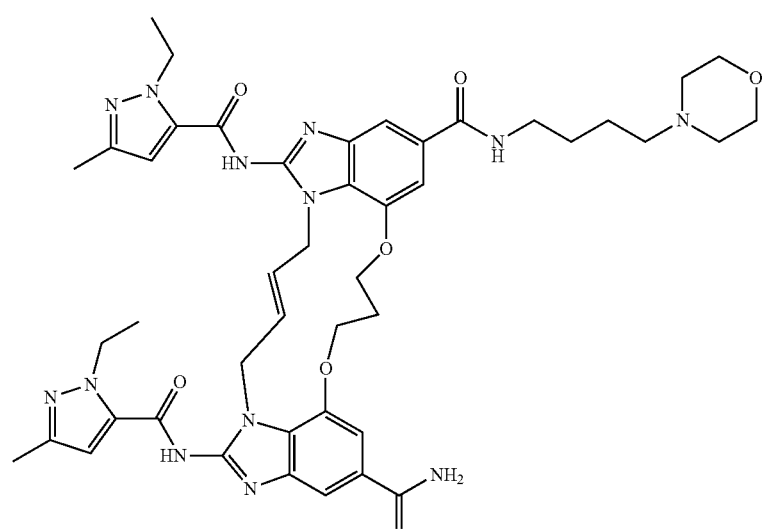 | (E)-1,15-bis(1-ethyl-3-methyl-1H-pyrazole-5-carboxamido)-N-(4-morpholinobutyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 39 | 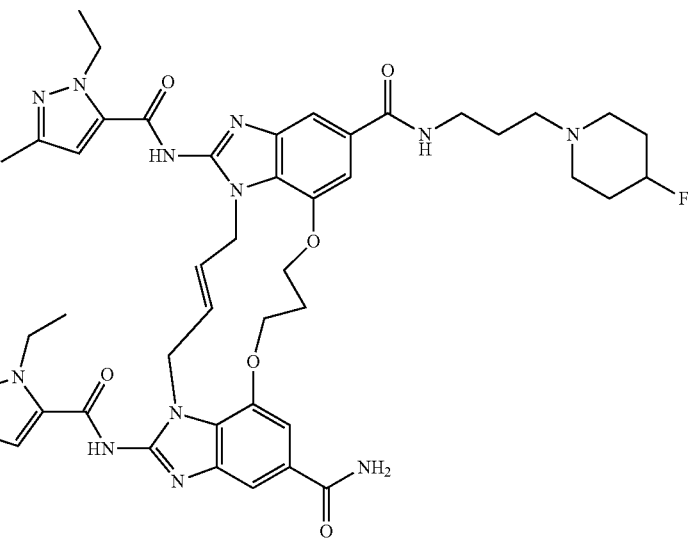 | (E)-1,15-bis(1-ethyl-3-methyl-1H-pyrazole-5-carboxamido)-N-(3-(4-fluoropiperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 40 | 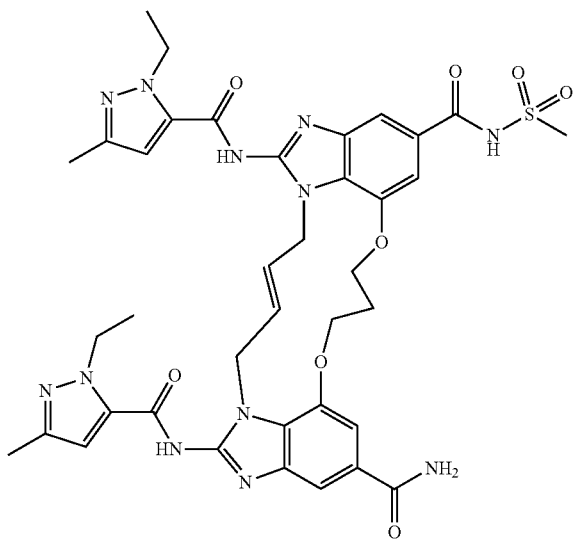 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NS(C)(=O)=O)cc(c21)OCCCO3] | (E)-1,15-bis(1-ethyl-3-methyl-1H-pyrazole-5-carboxamido)-N-(methylsulfonyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 41 | 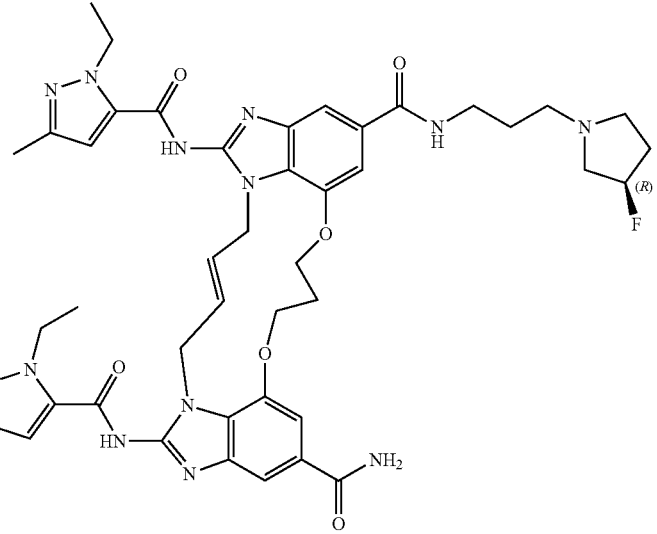 (R-stereoisomer) | (R,E)-1,15-bis(1-ethyl-3-methyl-1H-pyrazole-5-carboxamido)-N-(3-(3-fluoropyrrolidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 42 | 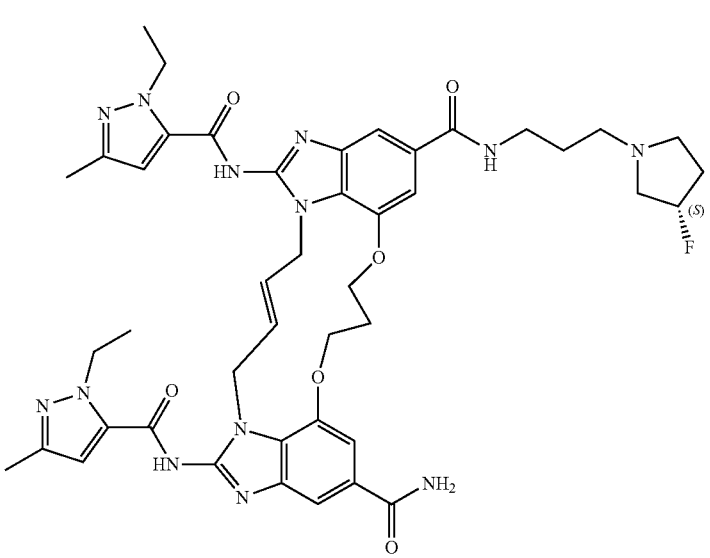 (S-stereoisomer) | (S,E)-1,15-bis(1-ethyl-3-methyl-1H-pyrazole-5-carboxamido)-N-(3-(3-fluoropyrrolidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 43 | 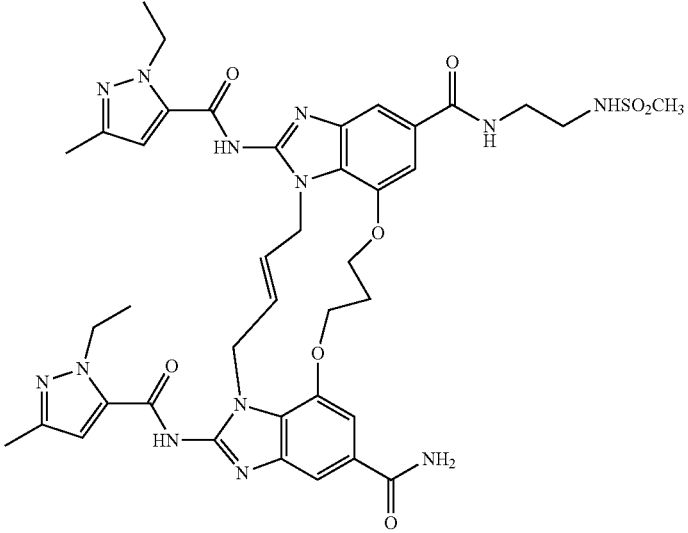 | (E)-1,15-bis(1-ethyl-3-methyl-1H-pyrazole-5-carboxamido)-N-(2-(methylsulfonamido)ethyl)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 44 | 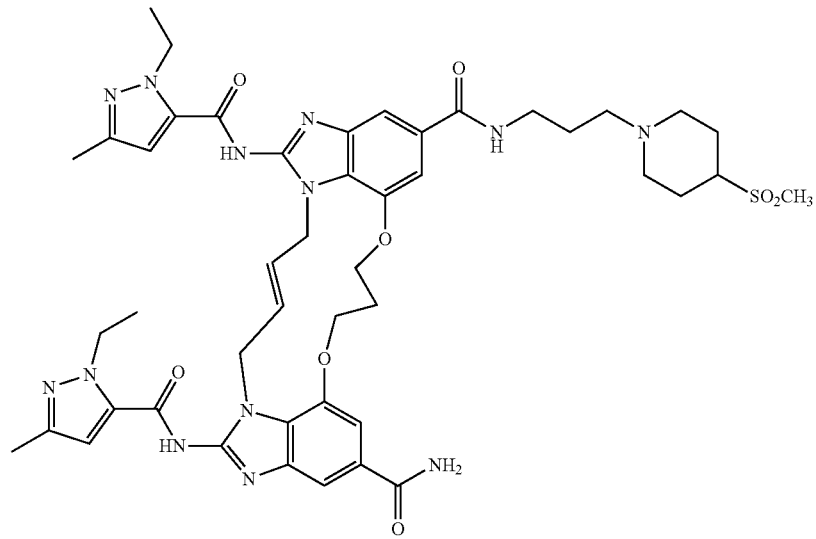 | (E)-1,15-bis(1-ethyl-3-methyl-1H-pyrazole-5-carboxamido)-N-(3-(4-(methylsulfonyl)piperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 45 | 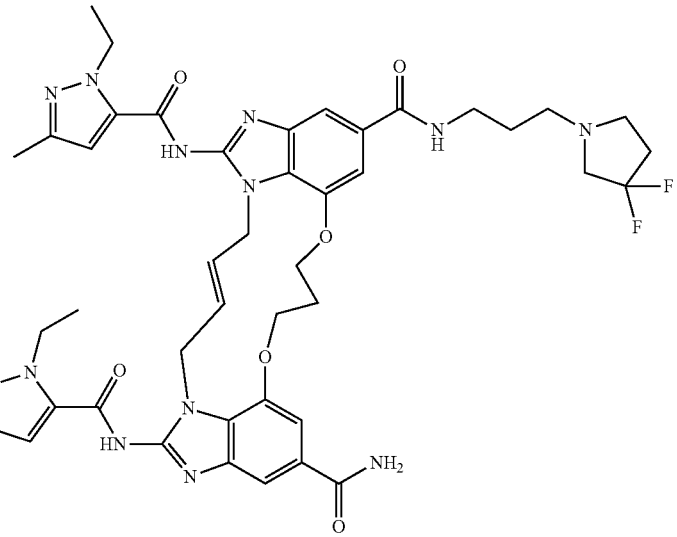 | (E)-N-(3-(3,3-difluoropyrrolidin-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 46 | 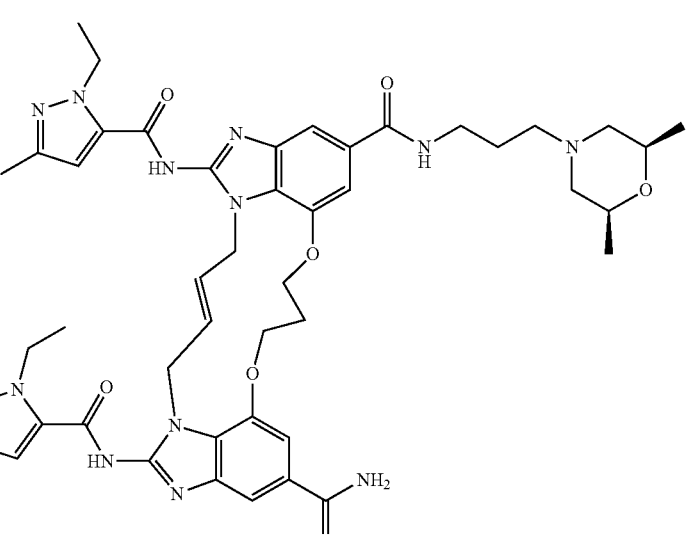 | (E)-N-(3-((2R,6S)-2,6-dimethylmorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 47 | 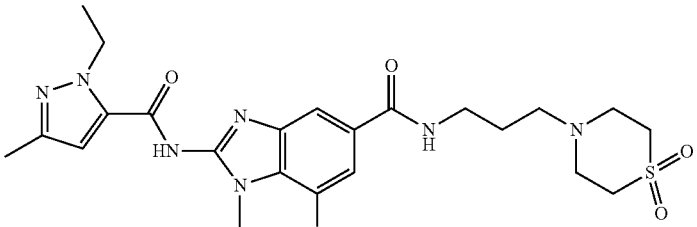 | (E)-N-(3-(1,1-dioxidothiomorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 48 | 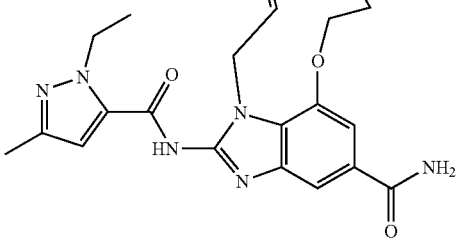 | (E)-N-(3-(1H-imidazol-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 49 | (S-stereoisomer) | (S,E)-2-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)-3-(dimethylamino)propanoic acid |
| 50 | | (E)-1,15-bis(1-ethyl-3-methyl-1H-pyrazole-5-carboxamido)-N-(3-(pyridin-2-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 51 | 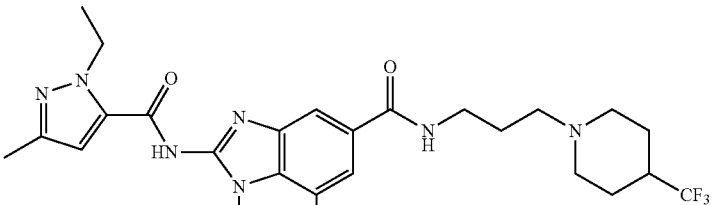 | (E)-1,15-bis(1-ethyl-3-methyl-1H-pyrazole-5-carboxamido)-N-(3-(4-(trifluoromethyl)piperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide |
| 52 | 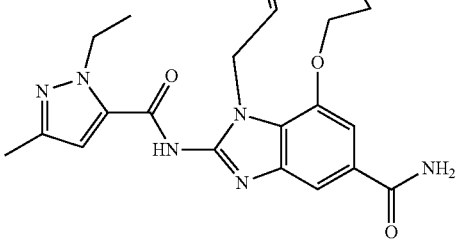 | (E)-N-(3-(3,3-dimethylmorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

TABLE 1-continued

Exemplary Compounds of the Invention

| Ex. No | Structure | IUPAC Name |
|---|---|---|
| 53 | 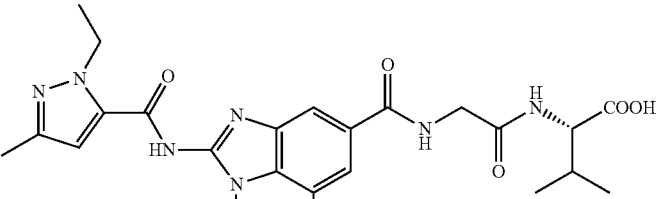 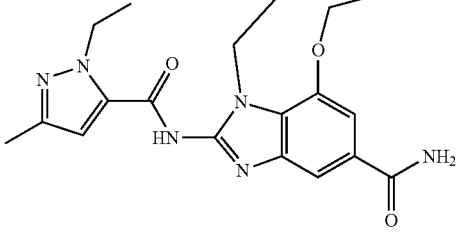 | (E)-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carbonyl)glycyl-L-valine |
| 54 | 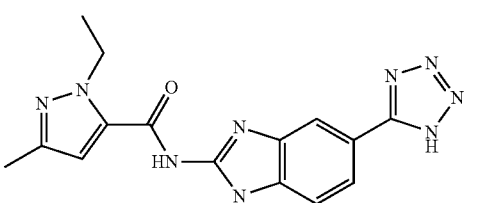 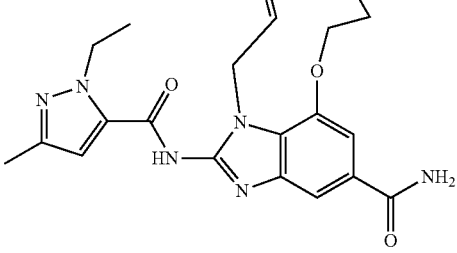 | (E)-N,N'-(12-carbamoyl-4-(1H-tetrazol-5-yl)-8,9,16,19-tetrahydro-7H-6,10-dioxa-2,14,15a,19a-tetraazacyclopentadeca[3,2,1-cd:8,9,10-c'd']diindene-1,15-diyl)bis(1-ethyl-3-methyl-1H-pyrazole-5-carboxamide |

TABLE 1-continued

Exemplary Compounds of the Invention

| Ex. No | Structure | IUPAC Name |
|---|---|---|
| 55 | 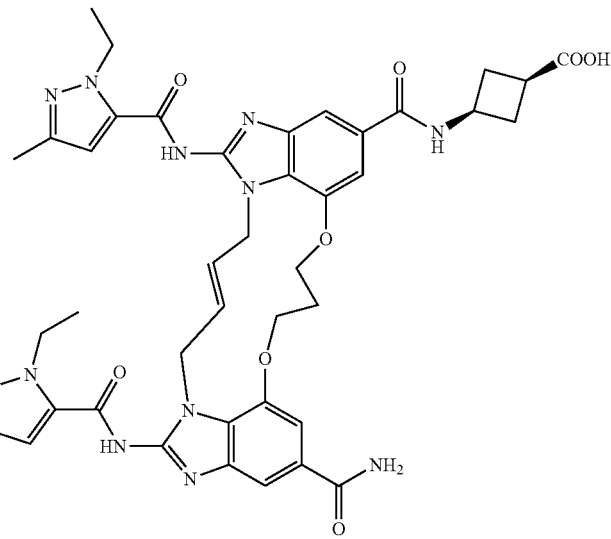 | (1S,3S)-3-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclobutane-1-carboxylic acid |
| 56 | | (1R,3R)-3-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclobutane-1-carboxylic acid |

TABLE 1-continued

Exemplary Compounds of the Invention

| Ex. No | Structure | IUPAC Name |
|---|---|---|
| 57 | 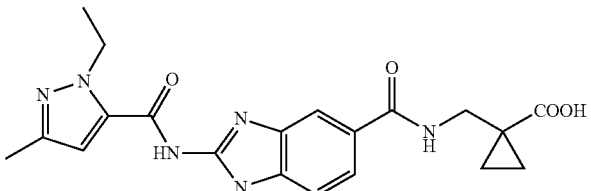 | (E)-1-((12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)methyl)cyclopropane-1-carboxylic acid |
| 58 | 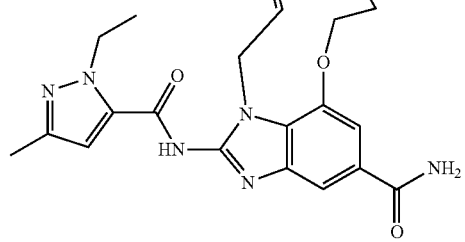 | (E)-2-(2-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)ethyl)nicotinic acid |

TABLE 1-continued

Exemplary Compounds of the Invention

| Ex. No | Structure | IUPAC Name |
|---|---|---|
| 59 | 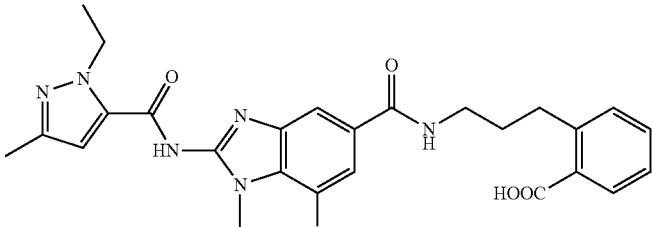 | (E)-2-(3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)benzoic acid |
| 60 | 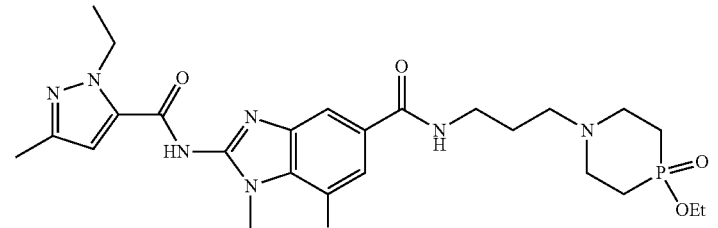 | (E)-N-(3-(4-ethoxy-4-oxido-1,4-azaphosphinan-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide |

In some embodiments, the invention provides a compound of Formula (I), Formula (II), and their tautomeric forms, stereoisomers, pharmaceutically acceptable salts, hydrates, solvates or prodrugs, wherein the compound is selected from:
(1R,4R)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 2);
(E)-N-((1R,4R)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 6);
(E)-1-(3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 8);
(8S,E)-N4-((1R,4S)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 12); and
(1S,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 14).

In some embodiments, the invention provides a pharmaceutical composition comprising a compound of Formula (I), Formula (II), or a prodrug thereof, or a pharmaceutically acceptable salt thereof, and at least one or more pharmaceutically acceptable excipient.

In some embodiments, the invention provides a compound of Formula (I), Formula (II), or a prodrug thereof, or a pharmaceutically acceptable salt thereof for use in the treatment of a disease or condition in which activation of STING is beneficial.

In some embodiments, the invention provides the use of a compound or pharmaceutical composition of Formula (I), Formula (II), or a prodrug thereof, or a pharmaceutically acceptable salt thereof in the manufacture of a medicament for the treatment of a disease or condition in which activation of STING is beneficial.

In some embodiments, the invention provides a method of treating a disease or condition in which activation of STING is beneficial in a subject in need thereof, the method comprising administering to the subject a therapeutically effective amount of a compound of Formula (I), Formula (II), or a pharmaceutically acceptable salt thereof.

In some embodiments, the invention provides a method of treating cancer or one or more infectious diseases in a subject in need thereof, the method comprising administering to the subject a therapeutically effective amount of a compound of Formula (I), Formula (II), or a prodrug thereof, or a pharmaceutically acceptable salt thereof.

In some embodiments, the invention provides a method of treating cancer, wherein cancer can be one or more solid tumors, one or more leukemias, one or more lymphomas, or a combination thereof.

In some embodiments, the invention provides a method of treating one or more infectious diseases, wherein the infectious diseases can include or exclude: viral infection, bacterial infection, or a combination thereof.

In some embodiments, the invention provides a composition comprising a compound of Formula (I), Formula (II), or a prodrug thereof, or a pharmaceutically acceptable salt thereof, and one or more additional therapies.

In some embodiments, the invention provides a composition comprising a compound of Formula (I), Formula (II), or a prodrug thereof, or a pharmaceutically acceptable salt thereof, and one or more additional therapies which can include or exclude: chemotherapy, immunotherapy, radiotherapy or a combination thereof.

In some embodiments, the invention provides a vaccine adjuvant comprising a compound of Formula (I), Formula (II), or a prodrug thereof, or a pharmaceutically acceptable salt thereof.

In some embodiments, the invention provides a composition comprising (i) a compound of Formula (I), Formula (II), or a prodrug thereof, or a pharmaceutically acceptable salt thereof, and (ii) one or more antigens, one or more antigen compositions, or a combination thereof.

In some embodiments, the invention provides a vaccine composition comprising (i) a compound of Formula (I), Formula (II), or a prodrug thereof, or a pharmaceutically acceptable salt thereof, and (ii) one or more antigens, one or more antigen compositions, or a combination thereof.

BRIEF DESCRIPTION OF THE FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects. The drawings are for illustration purposes only, show exemplary non-limiting embodiments, and are not necessarily drawn to scale.

DETAILED DESCRIPTION OF THE INVENTION

Figure 1A:
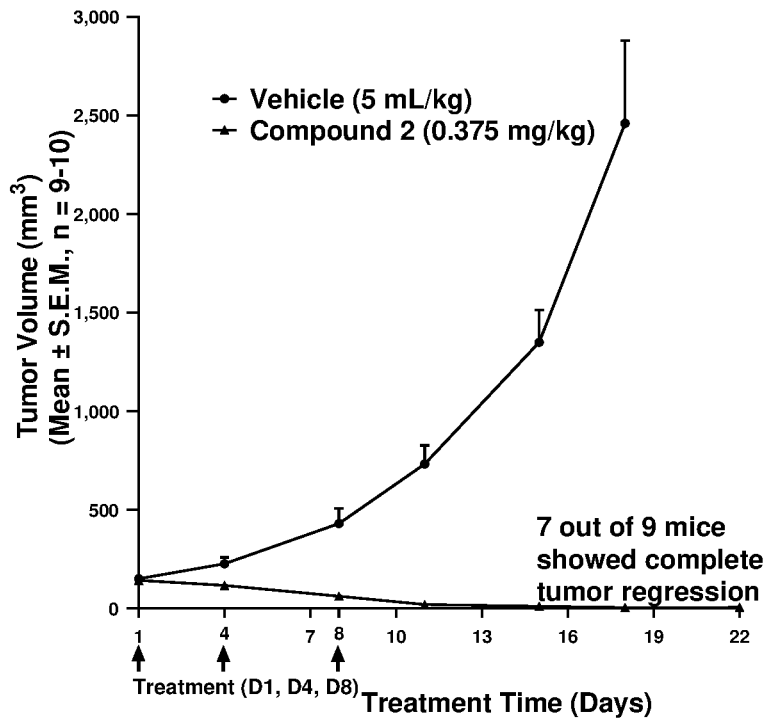
FIG. 1A shows the effect of a representative compound of the invention, Compound 2, in CT26 Ectopic Allograft BALB/c Mice Model, on tumor volume reduction, indicating that Compound 2 reduces tumor volume, with 7 out of 9 subjects exhibiting complete tumor regression. Compound 2 was administered to the subjects (n=9) at the indicated dose at days 1, 4, and 8.

This description of the exemplary embodiments is intended to be read in connection with the accompanying drawings, which are to be considered part of the entire written description. Additionally, the section headings used herein are for organizational purposes only, and are not to be construed as limiting the subject matter described.

General terms used in formula can be defined as follows; however, the meaning stated should not be interpreted as limiting the scope of the term per se.

The term "alkyl" as used herein refers to an alkane derived hydrocarbon radical that includes solely carbon and hydrogen atoms in the backbone, contains no unsaturation, has from one to six carbon atoms, and is attached to the remainder of the molecule by a single bond, e.g., methyl, ethyl, n-propyl, 1-methylethyl (isopropyl), n-butyl, n-pentyl, 1,1-dimethylethyl (t-butyl) and the like. Unless set forth or recited to the contrary, all alkyl groups described or claimed herein may be straight chain or branched, substituted or unsubstituted.

The term "perhaloalkyl," as used herein, refers to an alkyl group as defined hereinabove wherein all the hydrogen atoms of the said alkyl group are substituted with halogen. The perhaloalkyl group is exemplified by trifluoromethyl, pentafluoroethyl, and the like.

The term "heteroaromatic ring," as used herein, refers to a 5-6 membered monocyclic aromatic ring system having 1-2 ring heteroatoms selected from O, N, or S.

The term "cycloalkyl" or 'carbocycle,' as used herein, refers to a non-aromatic mono or multicyclic ring system having 3 to 12 carbon atoms, which can include or exclude: cyclopropyl, cyclobutyl, cyclopentyl, cyclohexyl and the like. Unless set forth or recited to the contrary, all cycloalkyl groups described or claimed herein may be substituted or unsubstituted.

The term "$C_3$-$C_5$ monocyclic cycloalkyl," as used herein, refers to a substituted or unsubstituted non-aromatic monocyclic ring system having 3 to 5 carbon atoms, which can include or exclude: cyclopropyl, cyclobutyl, cyclopentyl, and the like.

The term "aromatic ring," as used herein, refers to aromatic hydrocarbon ring system. Examples include benzene ring, and the like.

The term "aryl," as used herein, refers to a monovalent monocyclic, bicyclic or tricyclic aromatic hydrocarbon ring system. Examples of aryl groups include phenyl, naphthyl, anthracenyl, fluorenyl, indenyl, azulenyl, and the like.

The term "aralkyl," unless otherwise specified, refers to alkyl-aryl linked through an alkyl portion (wherein alkyl is as defined above) and the alkyl portion contains 1-6 carbon atoms and aryl is as defined above. Examples of aralkyl groups include benzyl, ethylphenyl, propylphenyl, naphthylmethyl and the like.

The term "heteroaryl," as used herein, refers to a 5-14 membered monocyclic, bicyclic, or tricyclic ring system having 1-4 ring heteroatoms selected from O, N, or S, and the remainder ring atoms being carbon (with appropriate hydrogen atoms unless otherwise indicated), wherein at least one ring in the ring system is aromatic.

The term "heterocycle" or "heterocyclyl," unless otherwise specified, refers to substituted or unsubstituted non-aromatic, monocyclic, bicyclic, tricyclic or bridged/fused/ spiro ring system having 3- to 15-membered ring which consists of carbon atoms and with one or more (e.g., 2 or 3) heteroatom(s) independently selected from N, O, S, P(O) (OR$^4$), P(O)(R$^{4a}$) or S(O)$_2$. The point of attachment may be from any suitable carbon or nitrogen.

The term "heteroarylalkyl," as used herein, refers to heteroaryl group linked through alkyl portion, wherein the alkyl having 1 to 6 carbon atoms and heteroaryl are the same as defined herein.

The term "heterocyclylalkyl," as used herein, refers to heterocyclyl group linked through alkyl portion, wherein the alkyl having 1 to 6 carbon atoms and heterocyclyl are the same as defined herein.

The term "oxo," as used herein, refers to a divalent oxygen (=O) attached to the parent group. For example, oxo attached to carbon forms a carbonyl, oxo substituted on cyclohexane forms a cyclohexanone.

The term "prodrug," as used herein, refers to a modified compound of formula (I) or formula (II) wherein an amino, carboxylic acid, or hydroxy functional group is further connected to a promoiety. In some embodiments, "promoiety" refers to a species acting as a protecting group which masks a functional group within an active agent, thereby converting the active agent into a pro-drug. Typically, the promoiety will be attached to the drug via bond(s) that are cleaved by enzymatic or non-enzymatic means in vivo, thereby converting the pro-drug into its active form. In some embodiments, the promoiety may also be an active agent. In some embodiments, the promoiety may be bound to a compound of Formula I. In some embodiments, the promoiety may be bound to a compound of Formula II.

In some embodiments the promoiety may include or exclude C1-C4 carboxylic acids, C1-C4 alcohols, C1-C4 aldehydes, C1-C4 ketones, a single amino acid or a peptide. In some embodiments, the promoiety is a single amino acid which is optionally protected on its functional groups. Methods of forming prodrugs by coupling the aforementioned promoieties to compounds of formula (I) or formula (II) can be performed by using conventional ester, amide, or acetal formation methods which are well-understood in the art. As a non-limiting example, a carboxylic acid functional group on a compound of formula (I) or formula (II) can be reacted with ethanol in the presence of EDC for form an ester.

In some embodiments, the promoiety is a targeting species. In some aspects, the promoiety is a substrate for an influx or efflux transporters on the cell membrane, for example, those described in Gaudana, R. et al. The AAPS Journal, 12(3):348-360 (2012), herein incorporated by reference in its entirety. The promoiety can be, for example, chemically-linked biotin or chemically-linked D-serine.

The term "tautomer" or "tautomeric form," as used herein, refers to structural isomers of different energies that are interconvertible via a low energy barrier. For example, proton tautomers (also known as prototropic tautomers) include interconversions via migration of a proton, which can include or exclude: keto-enol isomerizations. Valence tautomers include interconversions by reorganization of some of the bonding electrons.

The term "geometric isomer," as used herein, refers to E or Z geometric isomers (for example, cis or trans) of double bond.

All tautomeric forms and their possible geometrical isomers, including, but not limiting to Formula (s), Formula (r), and Formula (t), of the formulas and compounds described herein are intended to be encompassed within the scope of the invention.

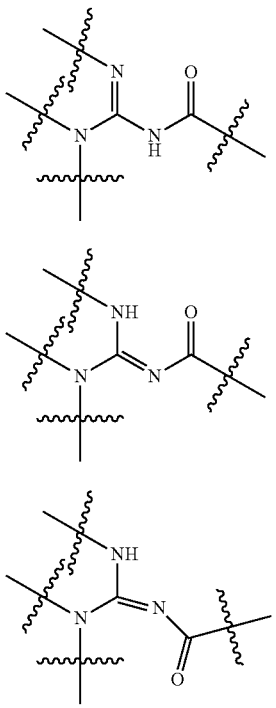

Formula (s)

Formula (r)

Formula (t)

The compounds of the invention may have one or more chiral centers. The absolute stereochemistry at each chiral center may be 'R' or 'S'. The compounds of the invention include all diastereomers and enantiomers and mixtures thereof. Unless specifically mentioned otherwise, reference to one stereoisomer applies to any of the possible stereoisomers. Whenever the stereoisomeric composition is unspecified, it is to be understood that all possible stereoisomers are included.

The term "stereoisomer," as used herein, refers to a compound made up of the same atoms bonded by the same bonds but having different three-dimensional structures that are not interchangeable. The three-dimensional structures are called configurations. As used herein, the term "enantiomer" refers to two stereoisomers whose molecules are nonsuperimposable mirror images of one another. The term "chiral center" refers to a carbon atom to which four different groups are attached. As used herein, the term "diastereomers" refers to stereoisomers which are not enantiomers. The terms "racemate" or "racemic mixture" refer to a mixture of equal parts of enantiomers.

As used herein, the term "treating" or "treatment" of a state, disease, disorder, condition or syndrome includes: (a) preventing or delaying the appearance of clinical symptoms of the state, disease, disorder, condition or syndrome developing in a subject that may be afflicted with or predisposed to the state, disease, disorder, condition or syndrome but does not yet experience or display clinical or subclinical symptoms of the state, disease, disorder, condition or syndrome; (b) inhibiting the state, disease, disorder, condition or syndrome, i.e., arresting or reducing the development of the disease or at least one clinical or subclinical symptom thereof; c) lessening the severity of a disease disorder or condition or at least one of its clinical or subclinical symptoms thereof; and/or (d) relieving the disease, i.e., causing regression of the state, disorder or condition or at least one of its clinical or subclinical symptoms.

The term "subject," as used herein, refers to a mammal and includes, but is not limited to, human, bovine, equine, feline, canine, rodent, primate, or other animals (such as domestic animals or non-domestic animals). The subject is preferably a human, which can be a man or a woman The subject can also refer to an adult or a child.

A "therapeutically effective amount," as used herein, refers to the amount of a compound that, when administered to a subject in need thereof, is sufficient to cause a desired effect. The "therapeutically effective amount" will vary depending on the compound, the disease and its severity, age, weight, physical condition and responsiveness of the subject to be treated. A therapeutically effective amount is preferably also one in which any toxic or detrimental effects of the substance/molecule, agonist or antagonist may be outweighed by the therapeutically beneficial effects.

The term "pharmaceutical formulation," as used herein, refers to a preparation which is in such form as to permit the biological activity of an active ingredient contained therein to be effective, and which does not contain additional components that are unacceptably toxic to a subject to which the formulation would be administered.

A "pharmaceutically acceptable carrier," as used herein, refers to an ingredient in a pharmaceutical formulation, other than an active ingredient, which can be safely administered to a subject. A pharmaceutically acceptable carrier includes, but is not limited to, a buffer, excipient, stabilizer, or preservative. Suitable carriers and diluents include buffered, aqueous solutions, saline, dextrose, glycerol, isotonic saline solutions, for example phosphate-buffered saline, isotonic water, and the like and combinations thereof. In some embodiments, carriers may include propylene glycol, dimethyl isosorbide, and water, and even more particularly, phosphate buffered saline, isotonic water, deionized water, monofunctional alcohols and symmetrical alcohols.

As used herein, the term "disorder where modulation of a STING protein and/or STING protein complex may be of benefit" includes any disease, disorder or condition in which a STING protein and/or STING protein complex function or activity may be involved in the treatment of the disease, disorder or condition. In one embodiment, the disease, disorder or condition can include or exclude cancer or an infectious disease.

The term "comprising," which is synonymous with "including," "containing," or "characterized by," is inclusive or open-ended and does not exclude additional, unrecited elements or ingredients from the medicament (or steps, in the case of a method). The phrase "consisting of" excludes any element, step, or ingredient not specified in the medicament (or steps, in the case of a method). The phrase "consisting essentially of" refers to the specified materials and those that do not materially affect the basic and novel characteristics of the medicament (or steps, in the case of a method).

The term "tumor," as used herein, refers to all neoplastic cell growth and proliferation, whether malignant or benign, and all pre-cancerous and cancerous cells and tissues. The terms "cancer," "cancerous," "cell proliferative disorder," "proliferative disorder," and "tumor" are not mutually exclusive as referred to herein.

The terms "cancer" and "cancerous," as used herein, refer to or describe the physiological condition in a subject that is typically characterized by unregulated cell growth and/or proliferation. Some cancers are composed of rapidly dividing cells while others are composed of cells that divide more slowly than normal. Types of cancer examples can include or exclude, for example, carcinoma, lymphoma (e.g., Hodgkin's and non-Hodgkin's lymphoma), blastoma, sarcoma, and leukemia. More particular examples of such cancers can include or exclude, for example, squamous cell cancer, small-cell lung cancer, non-small cell lung cancer, adenocarcinoma of the lung, squamous carcinoma of the lung, cancer of the peritoneum, hepatocellular cancer, gastrointestinal cancer, pancreatic cancer, glioblastoma, cervical cancer, ovarian cancer, liver cancer, bladder cancer, hepatoma, breast cancer, colon cancer, colorectal cancer, endometrial or uterine carcinoma, salivary gland carcinoma, kidney cancer, liver cancer, prostate cancer, vulval cancer, thyroid cancer, hepatic carcinoma, leukemia and other lymphoproliferative disorders, and various types of head and neck cancer.

The phrase "pharmaceutically acceptable salt," as used herein, refers to one or more pharmaceutically acceptable organic, or inorganic, salts of a compound of the invention. Exemplary salts include, but are not limited to, sulfate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucuronate, saccharate, formate, benzoate, glutamate, methanesulfonate "mesylate," ethanesulfonate, benzenesulfonate, p-toluenesulfonate, and pamoate (i.e., 1,1'-methylene-bis(2-hydroxy-3-naphthoate)) salts. A pharmaceutically acceptable salt may involve the inclusion of another molecule, such as an acetate ion, a succinate ion, or other counter ion. In some embodiments, the counter ion is any organic, or inorganic, moiety that stabilizes the charge on the parent compound. Furthermore, a pharmaceutically acceptable salt may have more than one charged atom in its structure. Instances where multiple charged atoms are part of the pharmaceutically acceptable salt can have multiple counter ions. Hence, a pharmaceutically acceptable salt can have one or more charged atoms and/or one or more counter ion.

In some embodiments, when the compound of the invention is a base, the desired pharmaceutically acceptable salt is prepared by any suitable method available in the art, e.g., treatment of the free base with an inorganic acid, such as hydrochloric acid, hydrobromic acid, sulfuric acid, nitric acid, methanesulfonic acid, phosphoric acid and the like, or with an organic acid, such as acetic acid, trifluoroacetic acid, maleic acid, succinic acid, mandelic acid, fumaric acid, malonic acid, pyruvic acid, oxalic acid, glycolic acid, salicylic acid, a pyranosidyl acid, such as glucuronic acid or galacturonic acid, an alpha hydroxy acid, such as citric acid or tartaric acid, an amino acid, such as aspartic acid or glutamic acid, an aromatic acid, such as benzoic acid or cinnamic acid, a sulfonic acid, such as p-toluenesulfonic acid or ethanesulfonic acid, or the like.

In some embodiments, when the compound of the invention is an acid, the desired pharmaceutically acceptable salt is prepared by any suitable method, e.g., treatment of the free acid with an inorganic or organic base, such as an amine (primary, secondary or tertiary), an alkali metal hydroxide or alkaline earth metal hydroxide, or the like. Illustrative examples of suitable salts include, but are not limited to, organic salts derived from amino acids, such as glycine and arginine, ammonia, primary, secondary, and tertiary amines, and cyclic amines, such as piperidine, morpholine and piperazine, and inorganic salts derived from sodium, calcium, potassium, magnesium, manganese, iron, copper, zinc, aluminum, and lithium.

As used herein, the term "solvate" refers to an association, or complex, of one or more solvent molecules and a compound of the invention. Examples of solvents that form solvates include, but are not limited to, water, isopropanol, ethanol, methanol, DMSO, ethylacetate, acetic acid, and ethanolamine.

Compounds

Numerous studies have demonstrated that activation of the STING pathway in tumour-resident host APCs is required for induction of a spontaneous CD8+ T cell response against tumour-derived antigens in vivo (Immunity, 2014, 41:830-842). Extensive evidence directs that the tumour-infiltrating lymphocytes (TILs) are correlated with favourable prediction in diverse malignancies (J. Transl. Med. 2012, 10:205) and predicts a positive clinical outcome in response to several immunotherapy strategies (Cancer J. 2012, 18:153-159). STING activation partially contributing to the antitumor activity of chemotherapeutic agents as well as radiotherapy (Immunity, 2014, 41:843-852). Further, STING activation and signalling has been discovered to be essential for protection against the development of cancer by promoting antitumor immune responses. Thus, activation of STING represents a potential immunotherapy approach for cancer treatment.

Studies have shown that direct intra-tumoral injection (I.Tu.) of modified CDNs into established B16F10 melanoma, CT26 colon, and 4T1 breast carcinomas resulted in rapid and significant tumour regression and long lasting systemic anti-tumour immunity. So, activation of the STING pathway in the TME by specific agonists might be an effective therapeutic strategy to promote broad tumour-initiated T cell priming and thereby treatment of cancer. (J. Immunol. 2013, 190:5216-5225; Cell Rep. 2015, 19, 11(7): 1018-30). Besides CDNs, other class of compounds can activate STING.

Parallel to the anticancer mechanism of STING, STING activation to its downstream also leads to induction of several antiviral genes which include IFN-0 and several interferons stimulated genes (ISGs). Ablation of STING in murine embryonic fibroblasts made them susceptible to negative-stranded virus infection, including vesicular stomatitis virus. The first-generation mouse STING agonist DMXAA shown to be effective in multiple in-vivo viral models like HBV (hepatitis B virus) DNA Hydrodynamic Mouse Model, Chikungunya virus, H1N1 PR8 influenza strain indicating the utility of STING agonist as antiviral agent against multiple viral infections. (Nature, 2008, 455: 674-678; PLoS Pathog. 2015, 11:12; Antimicrob. Agents Chemother. 2015, 59(2):1273-1281; J Leukocyte Biol. 2011, 89(3):351-357).

The inventors have recognized that modification of one or more subunits of a linked compound can significantly increase bioavailability and pharmacokinetics such that administration of asymmetrically-linked compounds presents a significant advance in STING protein activation. Moreover, the inventors have recognized that inclusion of hydrophilic moieties (e.g., ionizable and/or highly polar) at one or more subunits of a linked compound can increase solubility and ease of formulation for efficient activation of STING protein that can be used to treat an infectious disease and/or cancer.

Compounds disclosed herein and their tautomeric forms, stereoisomers, prodrugs may be prepared, for example, by techniques well known in the organic synthesis and familiar to a practitioner ordinarily skilled in art of this invention. In addition, the processes described herein may enable the synthesis of the compounds of the invention. However, these may not be the only means by which the compounds described in the invention may be synthesized. Further, the various synthetic steps described herein may be performed in alternate sequences in order to furnish the desired compounds.

In some embodiments, the invention provides a compound of Formula (I), Formula (II), or a pharmaceutically acceptable salt thereof for use in the treatment of a disease or condition in which activation of STING protein and/or a STING protein complex is beneficial.

Methods

In some embodiments, the invention provides the use of a compound or pharmaceutical composition of Formula (I), Formula (II), or a pharmaceutically acceptable salt thereof for the manufacture of a medicament for use in the treatment of a disease or condition in which activation of STING protein and/or a STING protein complex is beneficial.

In some embodiments, the invention provides a method of treating a disease or condition in which activation of STING protein and/or a STING protein complex is beneficial in a subject in need thereof, the method comprising administering a therapeutically effective amount of a compound of Formula (I), Formula (II), or its pharmaceutically acceptable salt thereof.

In some embodiments, the invention provides a method of treatment of cancer or one or more infectious diseases in a subject in need thereof, the method comprising administering to the subject a therapeutically effective amount of a compound of Formula (I), Formula (II), or a prodrug thereof, or a pharmaceutically acceptable salt thereof.

In some embodiments, the invention provides a method of treating cancer, wherein cancer which can include or exclude: one or more solid tumors, one or more leukemias, one or more lymphomas, or a combination thereof.

In some embodiments, solid tumors which may be treated with the compounds of invention can include or exclude: breast cancer, pancreatic cancer, lung cancer, colon cancer, colorectal cancer, brain cancer, renal cancer, testicular cancer, cancer of urethra, rectal cancer, cancer of fallopian tubes, penile cancer, vaginal cancer, stomach cancer, skin cancer, melanoma, liver cancer, gastrointestinal stromal tumors, urothelial cancer, thyroid cancer, parathyroid gland cancer, adrenal cancer, bone cancer, oral cancer, ovarian cancer, uterine cancer, head and neck squamous cell carcinoma, endometrial cancer, gall bladder cancer, bladder cancer, oropharyngeal cancer, lymph node cancer, glioblastoma, astrocytoma, glioblastoma multiforme or sarcomas of soft tissue, fibrosarcoma, chondrosarcoma, hemangioma, teratoma, lipoma, myxoma, fibroma, rhabdomyoma, teratoma, cholangiocarcinoma, Ewing's sarcoma. Examples of leukemia, which may be treated with the compounds of invention can include or exclude: Lymphoblastic T cell leukemia, Chronic myelogenous leukemia, Acute lymphoblastic T cell leukemia, Acute myeloblastic leukemia, Hairy-cell leukemia, Chronic neutrophilic leukemia, Mantle cell leukemia, Acute megakaryocytic leukemia, Multiple myeloma, Megakaryoblastic leukemia, Erythroleukemia, Plasmacytoma, Promyelocytic leukemia, Chronic myelomonocytic leukemia, Myelodysplastic syndrome, Myelofibrosis, Chronic myelogenous leukemia, Polycythemia vera, Thrombocythemia, Chronic lymphocytic leukemia, Prolymphocytic leukemia, Hairy cell leukemia, Waldenstrom's macroglobulinemia, Castleman's disease, Chronic neutrophilic leukemia, Immunoblastic large cell leukemia, Plasmacytoma, and Leukemias in any other parts of body. Examples of lymphoma, which may be treated with the compounds of invention can include or exclude: Hodgkin's disease, non-Hodgkin's lymphoma, Follicular lymphoma, Mantle cell lymphoma, Burkitt's lymphoma, Lymphoblastic T-cell lymphoma, Marginal zone lymphoma, Cutaneous T cell lymphoma, CNS lymphoma, Small lymphocytic lymphoma, Lymphoplasmacytic lymphoma, Diffuse large B-cell lymphoma (DLBCL), Peripheral T-cell lymphoma, Anaplastic large cell lymphoma, Primary mediastinal lymphoma, Mycosis fungoides, Small non-cleaved cell lymphoma, Lymphoblastic lymphoma, Immunoblastic lymphoma, Primary effusion lymphoma and HIV associated (or AIDS related) lymphomas. The aforementioned solid tumors can be modeled using the method and cell lines described in Examples.

In some embodiments, the invention provides a method of treating one or more infectious diseases, wherein the infectious diseases can include or exclude: viral infection, bacterial infection, or a combination thereof. Examples of viral infection which may be treated with the compounds of invention can include or exclude: human immune deficiency virus (HIV), Human papillomavirus (HPV), hepatitis C virus (HCV), hepatitis B virus (HBV), Influenza (Orthomyxoviridae—which can include or exclude Alphainfluenzavirus (Influenza A—all subtypes or serotypes) and Influenza B), Coronavirus (which can include or exclude SARS-CoV-1 and SARS-CoV-2), Alphavirus, Rotavirus, Sendai, vaccinia, respiratory syncitial virus, Lassa virus (Arenaviridae), Rabies virus (Rhabdoviridae), West nile virus, Dengue virus, Japanese encephalitis virus, and other Flaviviridae, RNA virus, DNA virus, virus belonging to the family of Alphaflexiviridae, Astroviridae, Alphatetraviridae, Alvernaviridae, Asfarviridae, Ampullaviridae, Adenoviridae, Ascoviridae, Betaflexiviridae, Bromoviridae, Barnaviridae, Bicaudaviridae. Baculoviridae Closteroviridae, Caliciviridae, Carmotetraviridae, Clavaviridae, Corticoviridae, Dicistroviridae, Endornaviridae, Filoviridae, Globuloviridae, Guttaviridae, Geminiviridae, Hytrosaviridae, Leviviridae, Luteoviridae, Lipothrixviridae, Mesoniviridae, Marnaviridae, Metaviridae, Malacoherpesviridae, Nodaviridae, Nyamiviridae, Nimaviridae, Nanoviridae, Piconaviridae, Partitiviridae, Picobirnaviridae, Paramyxoviridae, Poxviridae, Pandoraviridae, Polymaviridae, Phycodnaviridae, Papillomaviridae, Polydnaviruses, Polymaviridae, Permutotetraviridae, Potyviridae, Retroviridae, Siphoviridae, Sphaerolipoviridae, Virgaviridae, Togaviridae, Turriviridae, Tectiviridae.

Examples of bacterial infection which may be treated with the compounds of invention can include or exclude: infections caused by bacteria belonging to *Brucella, Clostridium, Clostrodium, Campylobacter, Enterococcus, Fransicella, Listeria, Legionella, Mycobacteria, Pseudomonas, Salmonella, Staphylococcus, Yersinia* genus.

In some embodiments, the invention provides a composition comprising compound of Formula (I), Formula (II), or its pharmaceutically acceptable salt thereof, and one or more additional therapies.

In some embodiments, the invention provides a composition comprising compound of Formula (I), Formula (II), or a prodrug thereof, or a pharmaceutically acceptable salt thereof, and one or more additional therapies which can include or exclude: chemotherapy, immunotherapy, radiotherapy or a combination thereof.

Chemotherapy comprises administering one or more additional chemotherapeutic agents that may be used in combination with the compounds of Formula (I), Formula (II) or prodrugs thereof, or a pharmaceutically acceptable salt thereof. Chemotherapeutic agents that may be used in combination can include or exclude: topoisomerase II inhibitors, anti-tumor antibiotics, anti-metabolites, retinoids, antiviral agents, abiraterone acetate, altretamine, anhydrovinblastine, auristatin, bexarotene, bicalutamide, BMS 184476, 2,3,4,5,6-pentafluoro-N-(3-fluoro-4-methoxyphenyl)benzene sulfonamide, bleomycin, N,N-dimethyl-L-valyl-L-valyl-N-methyl-L-valyl-L-proly-1-Lproline-tbutylamide, cachectin, cemadotin, chlorambucil, cyclophosphamide, 3',4'-didehydro-4'deoxy-8'-norvincaleukoblastine, docetaxol, doxetaxel, cyclophosphamide, carboplatin, carmustine, cisplatin, cryptophycin, cyclophosphamide, cytarabine, dacarbazine (DTIC), dactinomycin, daunorubicin, decitabine dolastatin, doxorubicin (adriamycin), etoposide, 5-fluorouracil, finasteride, flutamide, hydroxyurea and hydroxyureataxanes, ifosfamide, liarozole, lonidamine, lomustine (CCNU), MDV3100, mechlorethamine (nitrogen mustard), melphalan, mivobulin isethionate, rhizoxin, sertenef, streptozocin, mitomycin, methotrexate, taxanes, nilutamide, onapristone, paclitaxel, prednimustine, procarbazine, RPR109881, stramustine phosphate, tamoxifen, tasonermin, taxol, tretinoin, vinblastine, vincristine, vindesine sulfate, and vinflunine.

More examples of chemotherapeutic agents include: trastuzumab (HERCEPTIN®, Genentech), erlotinib (TARCEVA®, Genentech/OSI Pharm.), docetaxel (TAXOTERE®, Sanofi-Aventis), 5-FU (fluorouracil, 5-fluorouracil, CAS No. 51-21-8), gemcitabine (GEMZAR®, Lilly), PD-0325901 (CAS No. 391210-10-9, Pfizer), cisplatin (cis-diamine,dichloroplatinum(II), CAS No. 15663-27-1), carboplatin (CAS No. 41575-94-4), paclitaxel (TAXOL®, Bristol-Myers Squibb Oncology, Princeton, N.J.), pemetrexed (ALIMTA®, Eli Lilly), temozolomide (4-methyl-5-oxo-2,3,4,6,8-pentazabicyclo[4.3.0] nona-2,7,9-triene-9-carboxamide, CAS No. 85622-93-1, TEMODAR®, TEMODAL®, Schering Plough), tamoxifen ((Z)-2-[4-(1,2-diphenylbut-1-enyl)phenoxy]-N,N-dimethylethanamine, NOLVADEX®, ISTUBAL®, VALODEX®), and doxorubicin (ADRIAMYCIN®), Akti-1/2, HPPD, and rapamycin.

More examples of chemotherapeutic agents include: oxaliplatin (ELOXATIN®, Sanofi), bortezomib (VELCADE®, Millennium Pharm.), sutent (SUNITINIB®, SU11248, Pfizer), letrozole (FEMARA®, Novartis), imatinib mesylate (GLEEVEC®, Novartis), XL-518 (Mek inhibitor, Exelixis, WO 2007/044515), ARRY-886 (Mek inhibitor, AZD6244, Array BioPharma, Astra Zeneca), SF-1126 (PI3K inhibitor, Semafore Pharmaceuticals), BEZ-235 (PI3K inhibitor, Novartis), XL-147 (PI3K inhibitor, Exelixis), PTK787/ZK 222584 (Novartis), fulvestrant (FASLODEX®, AstraZeneca), leucovorin (folinic acid), rapamycin (sirolimus, RAPAMUNE®, Wyeth), lapatinib (TYKERB®, GSK572016, Glaxo SmithKline), lonafarnib (SARASAR™, SCH 66336, Schering Plough), sorafenib (NEXAVAR®, BAY43-9006, Bayer Labs), gefitinib (IRESSA®, AstraZeneca), irinotecan (CAMPTOSAR®, CPT-11, Pfizer), tipifarnib (ZARNESTRA™, Johnson & Johnson), ABRAXANE™ (Cremophor-free), albumin-engineered nanoparticle formulations of paclitaxel (American Pharmaceutical Partners, Schaumberg, Il), vandetanib (rINN, ZD6474, ZACTIMA®, AstraZeneca), chloranmbucil, AG1478, AG1571 (SU 5271; Sugen), temsirolimus (TORISEL®, Wyeth), pazopanib (GlaxoSmithKline), canfosfamide (TELCYTA®, Telik), thiotepa and cyclosphosphamide (CYTOXAN®, NEOSAR®); alkyl sulfonates such as busulfan, improsulfan and piposulfan; aziridines such as benzodopa, carboquone, meturedopa, and uredopa; ethylenimines and methylamelamines including altretamine, triethylenemelamine, triethylenephosphoramide, triethylenethiophosphoramide and trimethylomelamine; acetogenins (especially bullatacin and bullatacinone); a camptothecin (including the synthetic analog topotecan); bryostatin; callystatin; CC-1065 (including its adozelesin, carzelesin and bizelesin synthetic analogs); cryptophycins (particularly cryptophycin 1 and cryptophycin 8); dolastatin; duocarmycin (including the synthetic analogs, KW-2189 and CB1-TM1); eleutherobin; pancratistatin; a sarcodictyin; spongistatin; nitrogen mustards such as chlorambucil, chlornaphazine, chlorophosphamide, estramustine, ifosfamide, mechlorethamine, mechlorethamine oxide hydrochloride, melphalan, novembichin, phenesterine, prednimustine, trofosfamide, uracil mustard; nitrosoureas such as carmustine, chlorozotocin, fotemustine, lomustine, nimustine, and ranimnustine; antibiotics such as the enediyne antibiotics (e.g., calicheamicin, calicheamicin gamma1I, calicheamicin omega1I (Angew Chem. Intl. Ed. Engl. (1994) 33:183-186); dynemicin, dynemicin A; bisphosphonates, such as clodronate; an esperamicin; as well as neocarzinostatin chromophore and related chromoprotein enediyne antibiotic chromophores), aclacinomysins, actinomycin, authramycin, azaserine, bleomycins, cactinomycin, carabicin, caminomycin, carzinophilin, chromomycinis, dactinomycin, daunorubicin, detorubicin, 6-diazo-5-oxo-L-norleucine, morpholino-doxorubicin, cyanomorpholino-doxorubicin, 2-pyrrolino-doxorubicin and deoxydoxorubicin), epirubicin, esorubicin, idarubicin, nemorubicin, marcellomycin, mitomycins such as mitomycin C, mycophenolic acid, nogalamycin, olivomycins, peplomycin, porfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogs such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSK® polysaccharide complex (JHS Natural Products, Eugene, Oreg.); razoxane; rhizoxin; sizofiran; spirogermanium; tenuazonic acid; triaziquone; 2,2',2''-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; 6-thioguanine; mercaptopurine; methotrexate; platinum analogs such as cisplatin and carboplatin; vinblastine; etoposide (VP-16); ifosfamide; mitoxantrone; vincristine; vinorelbine (NAVELBINE®); novantrone; teniposide; edatrexate; daunomycin; aminopterin; capecitabine (XELODA®, Roche); ibandronate; CPT-11; topoisomerase inhibitor RFS 2000; difluoromethylornithine (DMFO); retinoids such as retinoic acid; and pharmaceutically acceptable salts, acids and derivatives of any of the above.

Also included in the definition of "chemotherapeutic agent" are: (i) anti-hormonal agents that act to regulate, or inhibit, hormone action on tumors, such as anti-estrogens and selective estrogen receptor modulators (SERMs), including, e.g., tamoxifen (including NOLVADEX®; tamoxifen citrate), raloxifene, droloxifene, 4-hydroxytamoxifen, trioxifene, keoxifene, LY117018, onapristone, and FARESTON® (toremifine citrate); (ii) aromatase inhibitors that inhibit the enzyme aromatase, which regulates estrogen production in the adrenal glands, such as, e.g., 4(5)-imidazoles, aminoglutethimide, MEGASE® (megestrol acetate), AROMASIN® (exemestane; Pfizer), formestanie, fadrozole, RIVISOR® (vorozole), FEMARA® (letrozole; Novartis), and ARIMIDEX® (anastrozole; AstraZeneca); (iii) anti-androgens such as flutamide, nilutamide, bicalutamide, leuprolide, and goserelin; as well as troxacitabine (a 1,3-dioxolane nucleoside cytosine analog); (iv) protein kinase inhibitors such as MEK inhibitors (WO 2007/044515); (v) lipid kinase inhibitors; (vi) antisense oligonucleotides, particularly those which inhibit expression of genes in signaling pathways implicated in aberrant cell proliferation, e.g., PKC-alpha, Raf and H-Ras, such as oblimersen (GENASENSE®, Genta Inc.); (vii) ribozymes such as VEGF expression inhibitors (e.g., ANGIOZYME®) and HER2 expression inhibitors; (viii) vaccines such as gene therapy vaccines, e.g., ALLOVECTIN®, LEUVECTIN®, and VAXID®; PROLEUKIN® rIL-2; topoisomerase 1 inhibitors such as LURTOTECAN®; ABARELIX® rmRH; (ix) anti-angiogenic agents such as bevacizumab (AVASTIN®, Genentech); and pharmaceutically acceptable salts, acids and derivatives of any of the above.

Also included in the definition of "chemotherapeutic agent" are therapeutic antibodies such as alemtuzumab (Campath), bevacizumab (AVASTIN®, Genentech); cetuximab (ERBITUX®, Imclone); panitumumab (VECTIBIX®, Amgen), rituximab (RITUXAN®, Genentech/Biogen Idec), pertuzumab (OMNITARG™, 2C4, Genentech), trastuzumab (HERCEPTIN®, Genentech), tositumomab (Bexxar, Corixia), and the antibody drug conjugate, gemtuzumab ozogamicin (MYLOTARG®, Wyeth).

Immunotherapy comprises administering one or more additional immunostimulatory agents that may be used in combination with the compound of Formula (I), Formula (II), or a pharmaceutically acceptable salt thereof. Immunostimulatory agents that may be used in combination herein includes vaccine adjuvants, which can include or exclude: Toll-like receptor agonists, T-cell checkpoint blockers, CTLA4, PD-1, PD-L1, TIM3, OX40, LAG3, B7-H3, GITR, 4-1BB, ICOS, CD40 and KIR antibody. Examples of CTLA-4 and PD-1 antagonists can include or exclude: ipilimumab, tremelimumab, nivolumab, pembrolizumab, CT-011, AMP-224, and MDX-1106.

Administration

In some embodiments, the compounds of formula (I) or formula (II), including exemplary compounds 1-60, are administered by any route appropriate to the condition to be treated. Suitable routes can include or exclude oral, parenteral (including subcutaneous, intramuscular, intravenous, intraarterial, intradermal, intrathecal and epidural), intraperitoneal (IP), transdermal, rectal, nasal, topical (including buccal and sublingual), vaginal, intrapulmonary and intranasal. In some embodiments, for local treatment, the compounds are administered by intratumor administration, including perfusing or otherwise contacting the tumor with the inhibitor. It will be appreciated that the preferred route may vary with, e.g., the condition of the recipient. In some embodiments, where the compound is administered orally, it is formulated as a pill, capsule, tablet, etc., with a pharmaceutically acceptable carrier or excipient. In some embodiments, where the compound is administered parenterally, it is formulated with a pharmaceutically acceptable parenteral vehicle, and in a unit dosage injectable form, as described herein.

In some embodiments, compounds of formula (I) or formula (II), for example the exemplary compounds 1-60, and analogs or prodrugs of any of the foregoing compounds is administered systemically, such as by intravenous, intra-arterial or intraperitoneal administration, such that the final circulating concentration is from approximately 0.001 to approximately 150 micromolar, or higher up to 200, 300, 400, 500, 600, 700, 800, 900 or 1000 micromolar. The final circulating concentration can be 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 100, 110, 120, 130, 140, or 150 micromolar, or any concentration between any of the two recited numbers, or higher as described above and any concentration within the ranges noted. Skilled persons will appreciate desirable dosages for the one or more active agent having regard to the nature of that agent and the principles discussed herein before.

In some embodiments, compounds of Formula (I) or Formula (II) or prodrugs thereof may be used alone or in combination with one or more additional agents or composition of use in the treatment of a particular disorder. Co-administration may allow for improved alleviation or amelioration of one or more symptoms, reduction of the length or extent of a disease, delay or slowing of the progression of disease, amelioration, palliation or stabilization of the disease state, partial or complete remission, prolonged survival and/or other beneficial therapeutic results. Such treatments may be administered simultaneously or sequentially in any order with a period of time between administrations. One of skill in the art will readily appreciate methods of administering agents or therapies simultaneously or sequentially and possible time periods between administrations. The therapies may be administered by the same or different routes.

In some embodiments, treatment according to the invention may involve the administration of one or more other agents to a subject. For example, one or more agents of use in promoting the general health of a subject, or reducing one or more side-effects of therapy could be administered. Skilled persons will readily appreciate various agents which may be beneficial to administer having regard to the disease to be treated, for example. In some embodiments where a compound of Formula (I) or Formula (II) is initially co-administered with a chemotherapeutic agent, the administration of the compound of Formula (I) or Formula (II) or prodrugs thereof may be stopped or tapered, while administration of the chemotherapeutic agent continues.

Administration of a compound of Formula (I) or Formula (II) or prodrugs thereof, for example exemplary compounds 1-60, and optionally one or more other active agent (which can include or exclude a chemotherapeutic agent), may occur at any time during the progression of a disease or disorder, or prior to or after the development of a disorder or one or more symptom of a disease or disorder. In one embodiment, a compound of Formula (I) or Formula (II), for example exemplary compounds 1-60, is administered on a daily basis for an extended period to assist with ongoing management of symptoms. In another embodiment, a compound of Formula (I) or Formula (II), for example exemplary compounds 1-60, is administered on a daily basis for an extended period or to prevent or delay the development of a disease or disorder.

Dosages, Pharmaceutical Formulations, and Kits

The term "a combined preparation," as used herein, includes a "kit of parts" or "article of manufacture" in the sense that the combination partners as defined above can be dosed independently or by use of different fixed combinations with distinguished amounts of the combination partners (a) and (b), i.e., simultaneously, separately or sequentially, whether in pharmaceutical form or dressing/matrix form or both. The parts of the kit can then, for example, be administered simultaneously or chronologically staggered, that is at different time points and with equal or different time intervals for any part of the kit of parts.

In one embodiment a combined preparation is administered, wherein (i) a compound of Formula (I) or Formula (II) or a prodrug thereof, or a pharmaceutically acceptable salt thereof, and (2) a chemotherapeutic agent as described herein are administered to a subject, wherein the first composition comprises a therapeutically effective amount of a compound of Formula (I) or Formula (II) or a prodrug thereof or pharmaceutically acceptable salt thereof, and the second composition comprises a therapeutically effective amount of a chemotherapeutic agent as described herein.

Pharmaceutical compositions are provided for single, combined, simultaneous, separate, sequential, or sustained administration. In one embodiment, a composition comprising one or more compounds of Formula (I) or Formula (II) or prodrugs thereof or pharmaceutically acceptable salts thereof is administered at in or more desired doses at one or more times. In another embodiment, a composition comprising one or more compounds of Formula (I) or Formula (II) or prodrugs thereof or pharmaceutically acceptable salts thereof is administered about the same time as a chemotherapeutic agent. When the two compositions are administered at different times, they may be administered within, for example, 30 minutes, 1 hour, 1 day, 1 week, or 1 month apart, or any time interval between any two of the recited time periods. Doses may be administered once a day (QD), twice a day (BID), three times a day (TID), four times a day (QID), or in weekly doses, e.g., four times a week (QIW), three times a week (TIW), twice a week (BIW), once a week (QWK). They may also be administered as needed (PRN), and every bedtime (*Hora somni*).

All descriptions with respect to dosing, unless otherwise expressly stated, apply to the compounds of the invention, including compounds of Formula (I) or Formula (II).

The compounds of Formula (I) or Formula (II) or prodrugs thereof or pharmaceutically acceptable salts thereof of the invention can be dosed, administered or formulated as described herein.

As will be appreciated, the dose of compounds of Formula (I) or Formula (II) or prodrugs thereof or pharmaceutically acceptable salts thereof administered, the period of administration, and the general administration regime may differ between subjects depending on such variables as the target site to which it is to be delivered, the severity of any symptoms of a subject to be treated, the type of disorder to be treated, size of unit dosage, the mode of administration chosen, and the age, sex and/or general health of a subject and other factors known to those of ordinary skill in the art.

Data obtained from cell culture assays and animal studies can be used in formulating a range of dosages for use in humans. The dosage may vary within this range depending upon the dosage form employed and the route of administration utilized. For any agent used in the method of the invention, the therapeutically effective dose can be estimated initially from cell culture assays. A dose may be formulated in cell cultures or animal models to achieve a cellular concentration range that includes the IC50 (i.e., the concentration of the test compound that achieves a half-maximal inhibition of symptoms) as determined in cell culture. Such information can be used to more accurately determine useful doses in humans. The exact formulation, route of administration and dosage can be chosen by the individual physician in view of the patient's condition. (See, e.g., Fingl et al., 1975, In: The Pharmacological Basis of Therapeutics, Ch.1, p.1). The dosage can be determined from the concentration of the amount administered, expected mass of the animal model tested (200-300 g per rat for adult Wistar rats), to determine the dose in units of mg/kg from concentration (micromolar) administered or amount (mg) administered.

Examples of effective doses that may be used for treating cancer or one or more infectious diseases or any other disease or disorder in a subject in need thereof described herein are claimed herein. In some embodiments, the therapeutically effective amount of the compounds of Formula (I) or Formula (II) or prodrugs thereof or pharmaceutically acceptable salts thereof, which is effective to treat cancer is a concentration of about 0.001 to about 1.0 microgram/ml, or from about 0.001 to about 0.01 mg/ml, or from about 0.1 mg/mL to about 100 mg/mL, or more, or any range between any two of the recited dosages or any dose between any two recited numbers. The dose can be 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mg/ml or any range between any two of the recited dosages or any dose between any two recited numbers. In some embodiments, the therapeutically effective amount of the compounds of Formula (I) or Formula (II) or prodrugs thereof or pharmaceutically acceptable salts thereof is present at a concentration ranging from about 0.5 to about 50 mg/mL. In some embodiments, the compounds of Formula (I) or Formula (II) or prodrugs thereof or pharmaceutically acceptable salts thereof is present at a concentration ranging from about 0.3 to about 30 mg/mL. In some embodiments, the compounds of Formula (I) or Formula (II) or prodrugs thereof or pharmaceutically acceptable salts thereof is present at a concentration ranging from about 0.1 or 1.0 to about 10 mg/mL. In some embodiments, the compounds of Formula (I) or Formula (II) or prodrugs thereof or pharmaceutically acceptable salts thereof is present at a concentration ranging from about 0.1 or 1.0 to about 0.3 or 3.0 mg/mL. In some embodiments, the compounds of Formula (I) or Formula (II) or prodrugs thereof or pharmaceutically acceptable salts thereof is present at a concentration of about 3.0 mg/mL. In any of the embodiments described herein, the carrier (vehicle) may be a pharmaceutically acceptable carrier.

In some embodiments, the compounds of Formula (I) or Formula (II) or prodrugs thereof or pharmaceutically acceptable salts thereof may be administered at a therapeutically effective dose between about 0.001 to about 100 mg/kg, between about 0.001 to about 0.01 mg/kg, between about 0.01 to about 0.1 mg/kg, between 0.1 to about 1 mg/kg, between about 1 to about 10 mg/kg, or between about 10 to about 100 mg/kg, or any range between any two recited dosages or any dose between any two recited dosages. In some aspects, the dose can be 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mg/ml or any range between any two of the recited dosages or any dose between any two recited numbers. In some embodiments, the effective dose ranges from 0.093 mg/kg to 0.375 mg/kg.

Although each of the therapeutically effective concentrations, amounts or doses for use with this invention as exemplified above may be useful for compounds of Formula (I) or Formula (II), in some aspects of this invention, for each of the therapeutically effective concentrations, amounts or doses described above, the dose of a prodrug of a compound of Formula (I) or Formula (II) may be between ¹/₁₀ to ¹/₁₀₀, or between ¹/₁₀₀, to ¹/₁₀₀₀ of any of the recited concentrations, amounts or doses. In addition, the therapeutically effective concentrations, amounts or dose for a prodrug may, in some aspects, be between ¹/₁₀ to ¹/₁₀₀, or between ¹/₁₀₀, to ¹/₁₀₀₀ of the recited concentrations, amounts or doses, or any range between any two recited dosages or any dose between any two recited dosages.

It should be appreciated that administration may include a single daily dose, administration of a number of discrete divided doses, or continuous administration, as may be appropriate. By way of example, unit doses may be administered once or more than once per day, for example 1, 2, 3, 4, 5 or 6 times a day to achieve a desired total daily dose. By way of example, a unit dose of a compound of Formula (I) or Formula (II) or prodrug thereof or pharmaceutically acceptable salts thereof may be administered in a single daily dose or a number of discrete doses, or continuously to achieve a daily dose of approximately 0.1 to 10 mg, 10 to 100 mg, 100 to 1000 mg, 1000 to 2000 mg, or 2000 mg to 5000 mg, 0.1 to approximately 2000 mg, approximately 0.1 to approximately 1000 mg, approximately 1 to approximately 500 mg, approximately 1 to approximately 200 mg, approximately 1 to approximately 100 mg, approximately 1 to approximately 50 mg, or approximately 1 to approximately 25 mg, or any range between any two recited dosages or any dose between any two recited dosages.

In one embodiment, the dose of a compound of Formula (I) or Formula (II) or prodrugs thereof or pharmaceutically acceptable salts thereof is approximately 0.001 micromolar to 0.1 micromolar, 0.1 micromolar and up to approximately 200 micromolar at the site of action, or higher, within the circulation to achieve those concentrations at the site of action. The dose may be (but not limited to) a final circulating concentration of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 micromolar, or any range between any two recited concentrations, or any concentration between any two recited numbers.

The compounds of Formula (I) or Formula (II) or prodrugs thereof or pharmaceutically acceptable salts thereof may be present in the pharmaceutical formulation in a substantially isolated form. It will be understood that the product may be mixed with carriers or diluents that will not interfere with the intended purpose of the product and still be regarded as substantially isolated. A product of the invention may also be in a substantially purified form, in which case it will generally comprise about 80%, 85%, or 90%, e.g. at least about 88%, at least about 90, 95 or 98%, or at least about 99% of a compound of Formula (I) or Formula (II) or prodrugs thereof or pharmaceutically acceptable salts thereof or dry mass of the preparation.

Pharmaceutically acceptable diluents, carriers and/or excipients include those suitable for veterinary use as well as human pharmaceutical use. Suitable carriers and/or excipients will be readily appreciated by persons of ordinary skill in the art, having regard to the nature of compounds of Formula (I) or Formula (II) or prodrugs thereof or pharmaceutically acceptable salts thereof. However, by way of example, diluents, carriers and/or excipients include solutions, solvents, dispersion media, delay agents, polymeric and lipidic agents, emulsions and the like. By way of further example, suitable liquid carriers, especially for injectable solutions, include water, aqueous saline solution, aqueous dextrose solution, and the like, with isotonic solutions being preferred for intravenous, intraspinal, and intracisternal administration and vehicles such as liposomes being also especially suitable for administration of agents.

In addition, if desired substances such as wetting or emulsifying agents, stabilizing or pH buffering agents, or preservatives may also be present in the pharmaceutical compositions of the invention. In some embodiments, the pharmaceutical compositions of this invention will comprise suitable pharmaceutically acceptable buffers, such as acetate buffers, citrate buffers, phosphate buffers, borate buffers and mixtures thereof. In some embodiments, the buffers useful in the invention include boric acid, sodium borate, sodium phosphates, including mono, di- and tri-basic phosphates, such as sodium phosphate monobasic monohydrate and sodium phosphate dibasic heptahydrate, and mixtures thereof. In some embodiments, the preservative may be stabilized chlorine dioxide, cationic polymers or quaternary ammonium compounds. In some embodiments the pharmaceutical compositions may also comprise wetting agents, nutrients, viscosity builders, antioxidants, and the like, for example, disodium ethylene diamine tetraacetate, alkali metal hexametaphosphate, citric acid, sodium citrate, sodium metabisulfite, sodium thiosulfate, N-acetylcysteine, butylated hydroxyanisole, butylated hydroxytoluene, polyvinyl alcohol, poloxamers, polyvinyl pyrollidone, hydroxypropyl methyl cellulose, hydroxyethylmethyl cellulose, and mixtures thereof and mixtures thereof. In some embodiments, the pharmaceutical formulations of this invention will not include a preservative.

In some embodiments, the pharmaceutical compositions of compounds of Formula (I) or Formula (II) or prodrugs thereof, including exemplary compounds 1-60 are in the form of a sterile injectable preparation, such as a sterile injectable aqueous or oleaginous suspension. In some embodiments, the suspension is formulated according to methods using those suitable dispersing or wetting agents and suspending agents which have been mentioned above. The sterile injectable preparation may also be a sterile injectable solution or suspension in a non-toxic parenterally acceptable diluent or solvent, such as a solution in 1,3-butanediol prepared as a lyophilized powder. In some embodiments, the acceptable vehicles and solvents that are employed can include or exclude: water, Ringer's solution (including Ringer's lactate solution), Hartmann's solution, Tyrode's solution, and isotonic sodium chloride solution. In some embodiments, sterile fixed oils are employed as a solvent or suspending medium. For this purpose, any bland fixed oil is employed including synthetic mono- or diglycerides. In some embodiments, fatty acids such as oleic acid is used in the preparation of injectables.

Compositions of the invention may contain any appropriate level of compounds of Formula (I) or Formula (II) or prodrugs thereof or pharmaceutically acceptable salts thereof, having regard to the dosage form and mode of administration. However, by way of example, compositions of use in the invention may contain from approximately 0.1% to approximately 99% by weight, preferably from approximately 1% to approximately 60% by weight, of compounds of Formula (I) or Formula (II) or prodrugs thereof or pharmaceutically acceptable salts thereof, depending on the method of administration.

In addition to standard diluents, carriers and/or excipients, a composition in accordance with the invention may be formulated with one or more additional constituents, or in such a manner, so as to enhance the activity or bioavailability of compounds of Formula (I) or Formula (II) or prodrugs thereof or pharmaceutically acceptable salts thereof, help protect the integrity or increase the half-life or shelf life thereof, enable slow release upon administration to a subject, or provide other desirable benefits, for example. For example, slow release vehicles include macromers, poly (ethylene glycol), hyaluronic acid, poly(vinylpyrrolidone), or a hydrogel. By way of further example, the compositions may also include preserving agents, solubilising agents, stabilising agents, wetting agents, emulsifying agents, sweetening agents, colouring agents, flavouring agents, coating agents, buffers and the like. Those of skill in the art to which the invention relates will readily identify further additives that may be desirable for a particular purpose.

The pharmaceutical compositions described herein may be formulated in accordance with standard techniques as may be found in such standard references as Gennaro A R: Remington: The Science and Practice of Pharmacy, 20th ed., Lippincott, Williams & Wilkins, 2000, for example Treatment of Infectious Diseases In some embodiments, the invention provides a vaccine adjuvant comprising a compound of Formula (I), Formula (II) or prodrugs thereof, or a pharmaceutically acceptable salt thereof.

In some embodiments, the invention provides a vaccine composition comprising (i) a compound of Formula (I), Formula (II) or prodrugs thereof, or a pharmaceutically acceptable salt thereof, and (ii) one or more antigens, one or more antigen compositions, or a combination thereof.

Antigens and adjuvants that may be used in combination with the compound of Formula (I), Formula (II) or prodrugs thereof, or a pharmaceutically acceptable salt thereof disclosed herein include B7 costimulatory molecule, C-34, interleukin-2, interferon-α, interferon-γ, GM-CSF, CTLA-4 antagonists, OX-40 agonist, CD40 agonist, sargramostim, levamisol, vaccinia virus, Bacille Calmette-Guerin (BCG), liposomes, alum, detoxified endotoxins, mineral oils, surface active substances which can include or exclude: lipolecithin, pluronic polyols, polyanions, peptides, and oil or hydrocarbon emulsions. Adjuvants, which can include or exclude: aluminum hydroxide or aluminum phosphate, can be added to increase the ability of the vaccine to trigger, enhance, or prolong an immune response. Additional materials, which can include or exclude: cytokines, chemokines, and bacterial nucleic acid sequences, like CpG, a toll-like receptor (TLR) 9 agonist as well as additional agonists for TLR 2, TLR 4, TLR 5, TLR 7, TLR 8, TLR9, including lipoprotein, LPS, monophosphoryllipid A, lipoteichoic acid, imiquimod, resiquimod, and in addition retinoic acid-inducible gene I (RIG-I) agonists which can include or exclude: poly I:C, used separately or in combination with the described compositions are also potential adjuvants.

In some embodiments, the invention provides a method of treatment of an infectious disease. As described herein, the in vitro data in the Examples demonstrates that STING signalling is activated using compounds of Formula (I) or Formula (II), as evidenced by cytokine secretion (particularly IFNb) in response to STING agonists. STING activation is known to lead to induction of several antiviral genes which include IFN-β, indicating the utility of a STING agonist as an antiviral agent against multiple viral infection types. As described previously, STING activation by STING agonists can be used for treating infectious disease ((Nature, 2008, 455:674-678; PLoS Pathog. 2015, 11:12; Antimicrob. Agents Chemother. 2015, 59(2):1273-1281; J Leukocyte Bio. 2011, 89(3):351-357). The inventors have recognized that the compounds of Formula (I) or Formula (II) or prodrugs thereof or pharmaceutically acceptable salts thereof can be used to treat a viral infection or bacterial infection. Examples of viral infection which may be treated with the compounds of invention can include or exclude: human immune deficiency virus (HIV), Human papillomavirus (HPV), hepatitis C virus (HCV), hepatitis B virus (HBV), Influenza (Orthomyxoviridae—which can include or exclude Alphainfluenzavirus (Influenza A—all subtypes or serotypes) and Influenza B), Coronavirus (which can include or exclude SARS-CoV-1 and SARS-CoV-2), Alphavirus, Rotavirus, Sendai, vaccinia, respiratory synctical virus, Lassa virus (Arenaviridae), Rabies virus (Rhabdoviridae), West nile virus, Dengue virus, Japanese encephalitis virus, and other Flaviviridae, RNA virus, DNA virus, virus belonging to the family of Alphaflexiviridae, Astroviridae, Alphatetraviridae, Alvernaviridae, Asfarviridae, Ampullaviridae, Adenoviridae, Ascoviridae, Betaflexiviridae, Bromoviridae, Barnaviridae, Bicaudaviridae. Baculoviridae Closteroviridae, Caliciviridae, Carmotetraviridae, Clavaviridae, Corticoviridae, Dicistroviridae, Endornaviridae, Filoviridae, Globuloviridae, Guttaviridae, Geminiviridae, Hytrosaviridae, Leviviridae, Luteoviridae, Lipothrixviridae, Mesoniviridae, Marnaviridae, Metaviridae, Malacoherpesviridae, Nodaviridae, Nyamiviridae, Nimaviridae, Nanoviridae, Piconaviridae, Partitiviridae, Picobirnaviridae, Paramyxoviridae, Poxviridae, Pandoraviridae, Polymaviridae, Phycodnaviridae, Papillomaviridae, Polydnaviruses, Polymaviridae, Permutotetraviridae, Potyviridae, Retroviridae, Siphoviridae, Sphaerolipoviridae, Virgaviridae, Togaviridae, Turriviridae, Tectiviridae.

Examples of bacterial infection which may be treated with the compounds of Formula (I) or Formula (II) or prodrugs thereof or pharmaceutically acceptable salts thereof can include or exclude: infections caused by bacteria belonging to *Brucella, Clostridium, Clostrodium, Campylobacter, Enterococcus, Fransicella, Listeria, Legionella, Mycobacteria, Pseudomonas, Salmonella, Staphylococcus, Yersinia* genus. In some embodiments, the invention provides a composition comprising compound of Formula (I), Formula (II), or a prodrug thereof, or a pharmaceutically acceptable salt thereof, and one or more additional therapies.

Manufacture and Stability

In some embodiments, the formulations of this invention are substantially pure. By substantially pure is meant that the formulations comprise less than about 10%, 5%, or 1%, and preferably less than about 0.1%, of any impurity. In some embodiments, the total impurities, including metabolites of the compounds of Formula (I) or Formula (II), will be not more than 15%. In some embodiments the total impurities, including metabolites of the compounds of Formula (I) or Formula (II), will be not more than 12%. In some embodiments the total impurities, including metabolites of the compounds of Formula (I) or Formula (II), will be not more than 11%. In other embodiments the total impurities, including metabolites of compounds of Formula (I) or Formula (II), will be not more than 10%.

In some embodiments, the purity of the formulations of this invention may be measured using a method selected from anion exchange HPLC (AEX-HPLC) or mass spectrometry. Mass spectrometry may include LC/MS, or LC/MS/MS. In some embodiments, the method used to measure the impurity may comprise both AEX-HPLC and LCIMS.

Sterile compositions comprising the compounds of Formula (I) or Formula (II) or prodrugs thereof of this invention prepared using aseptic processing by dissolving the compound in the formulation vehicle. In one embodiment, the formulation may also be sterilized by filtration. Excipients used in the manufacture of the formulations of this invention are widely used in pharmaceutical products and released to pharmacopeial standards.

General Methods of Preparation

The compounds of Formulas (I) and (II) described herein may be prepared by techniques known in the art. In addition, the compounds of Formulas (I) and (II) described herein may be prepared by following the reaction sequence as depicted in Schemes below. Further, in the following Schemes, where specific bases, acids, reagents, solvents, coupling agents, etc., are mentioned, it is understood that other bases, acids, reagents, solvents, coupling agents etc., known in the art may also be used and are therefore included within the scope of the present invention. Variations in reaction conditions, for example, temperature and/or duration of the reaction, which may be used as known in the art, are also within the scope of the present invention. All the isomers of the compounds of Formulas (I) and (II) described in these Schemes, unless otherwise specified, are also encompassed within the scope of this invention.

The processes described herein may enable the synthesis of the compounds of the present invention. However, these may not be the only means by which the compounds described in the invention may be synthesized. Further, the various synthetic steps described herein may be performed in alternate sequences to afford the desired compounds.

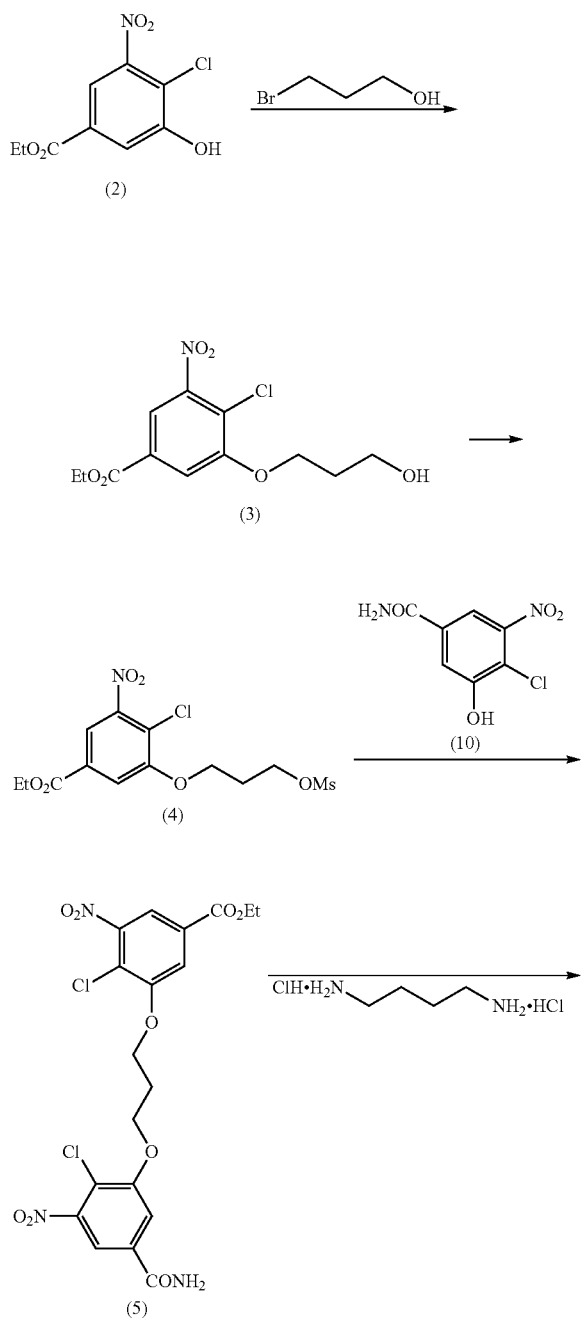

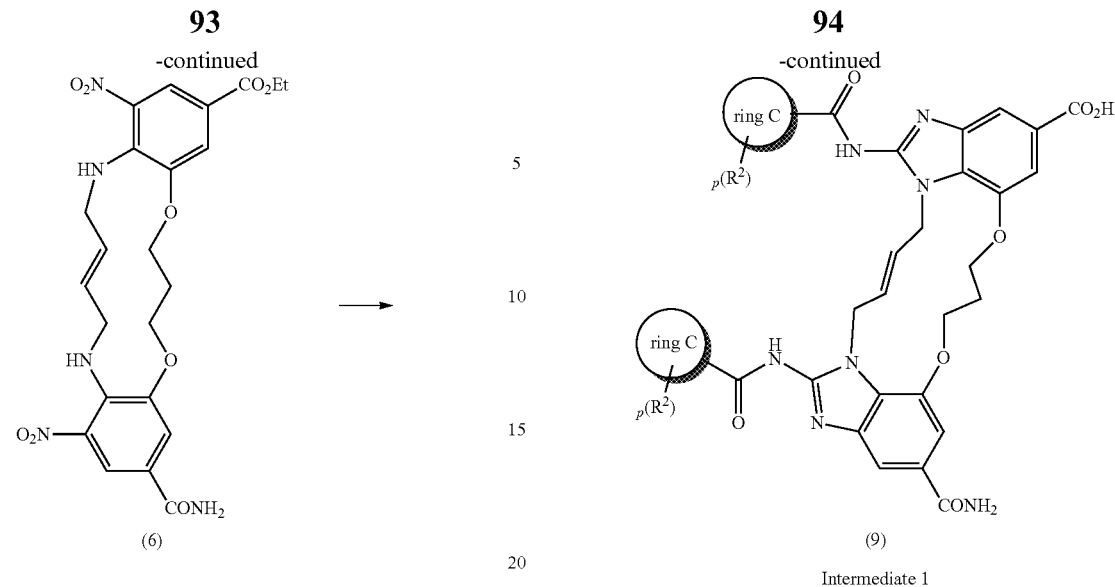

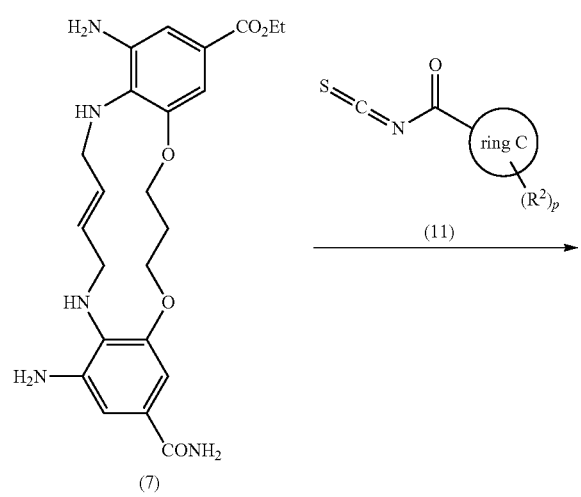

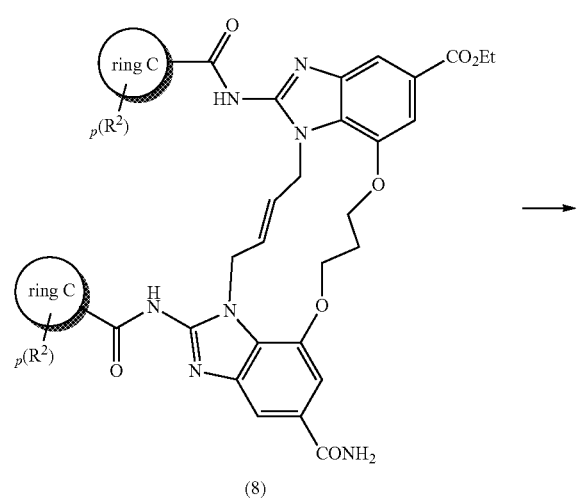

Scheme 1 shows a method of preparation of the compound (9) as Intermediate 1 [wherein ring B is phenyl, ring C, p and $R^2$ are as defined earlier for Formula I, m is 1, $G_1$ is —$CH_2$—, and $G_2$ is —CH═CH—] from the compound of formula (2).

The compound of the formula (2) is reacted with 3-bromopropan-1-ol in presence of base such as caesium carbonate, potassium carbonate, in solvents such as dimethyl formamide, acetonitrile, THF, acetone to obtain the compound of formula (3).

The compound of the formula (3) as obtained in the previous step is reacted with methanesulfonyl chloride in presence of base such as TEA, DIPEA in solvents like DCM, THF to obtain the compounds of formula (4).

The compound of the formula (4) is reacted with compound of the formula (10) in presence of base such as caesium carbonate, potassium carbonate, in solvents such as DMF, acetonitrile to obtain the compound of formula (5). Cyclization of compound of the formula (5) with (E)-but-2-ene-1,4-diamine dihydrochloride, by using base such as triethylamine or diisopropylamine in solvents like ethanol, tetrahydrofuran, to give compound of formula (6).

The compound of the formula (6) is reacted with zinc and acetic acid to obtain the compound of formula (7). Coupling of compound of the formula (7) with compounds of formula (11) can be carried out by using EDC and base such as triethylamine or diisopropylamine in solvents such as dimethyl formamide, tetrahydrofuran to give compound of formula (8).

The compounds of the formula (8) as obtained in the previous step can be treated with base like lithium hydroxide or sodium hydroxide for hydrolysis to obtain the compound of formula (9) as intermediate 1.

-continued
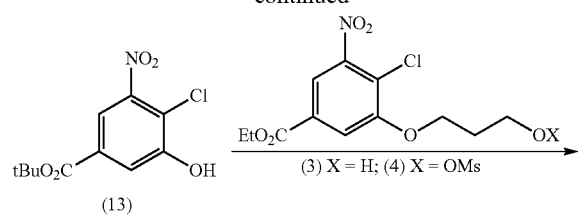
(13)
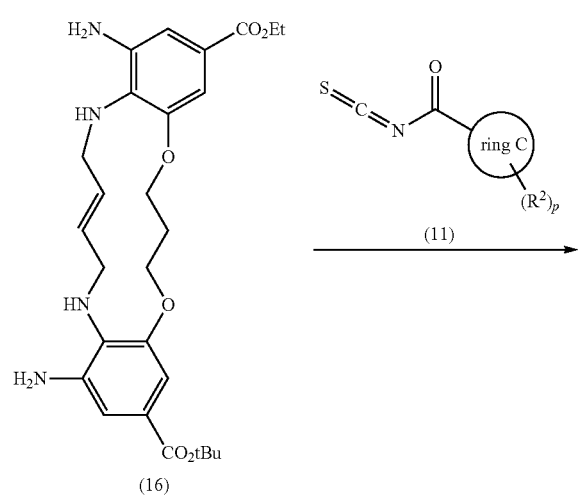
(14)
(15)
(16)
-continued
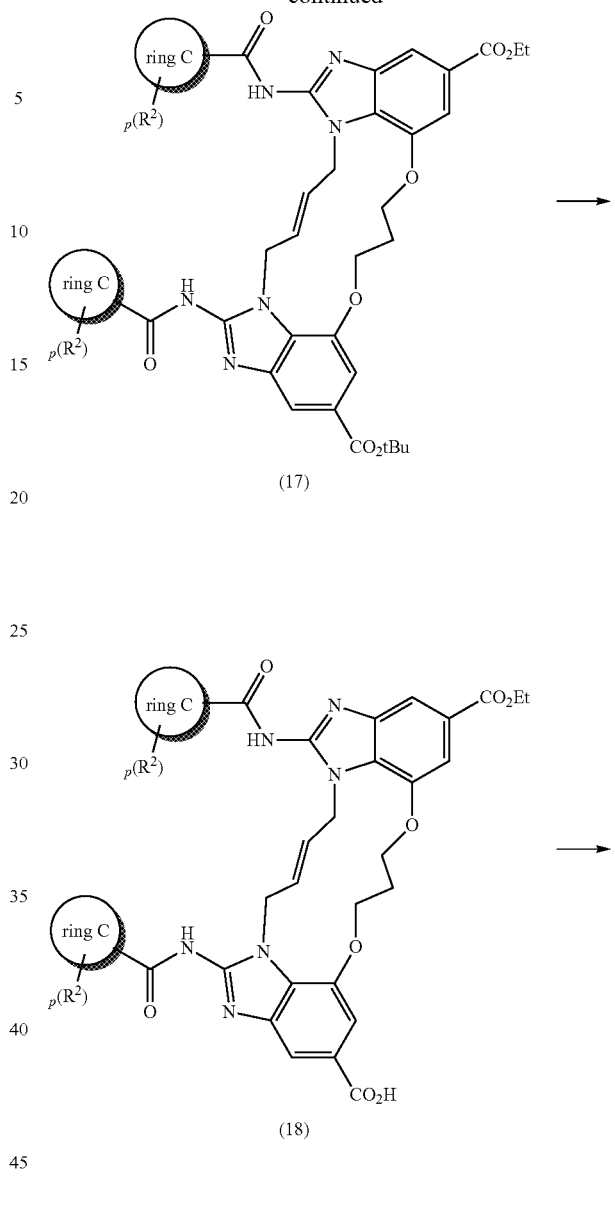
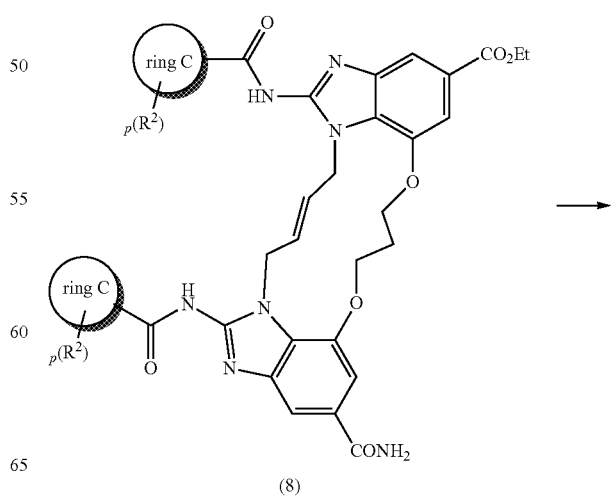

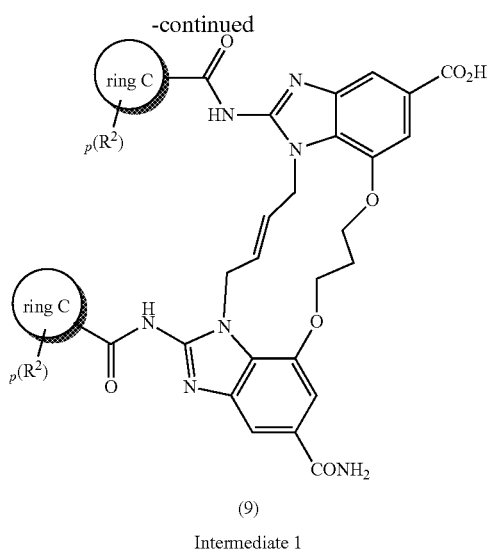

(9)

Intermediate 1

Scheme 2 shows an alternative method of preparation of the compound (9) as Intermediate 1 [wherein ring B is phenyl, ring C, p and $R^2$ are as defined earlier for Formula I, m is 1, $G_1$ is —$CH_2$—, and $G_2$ is —CH=CH—] from the compound of formula (2).

The compound of the formula (2) hydrolyzed in presence of base such as lithium hydroxide, sodium hydroxide or potassium hydroxide, in a mixture of methanol, THF and water in different combinations to obtain the compound of formula (12).

The compound of the formula (12) is reacted with t-butanol in presence of anhydrous magnesium sulphate and sulphuric acid or phosphorus pentoxide and sulphuric acid or t-butyl acetoacetate and cat. Sulphuric acid in solvents like DCM or chloroform to obtain the t-butyl ester compound of formula (13). The compound of the formula (14) was obtained by its reaction with compound of formula (3) under Mitsunobu protocol using triphenylphosphine and an azodicarboxylate such as diethyl azodicarboxylate (DEAD) or diisopropyl azodicarboxylate (DIAD) in THF or alternatively by a base mediated alkylation of the phenol (13) with the mesylate of formula (4) in presence of caesium carbonate or potassium carbonate in solvents such as DMF or acetonitrile.

Macrocyclization of compound of the formula (14) with (E)-but-2-ene-1,4-diamine dihydrochloride, by using base such as triethyl amine or diisopropyl amine in solvents like ethanol, tetrahydrofuran gave compounds of formula (15). The compound of the formula (15) was reduced to amine compound (16) in presence of sodium dithionite and ammonium hydroxide in a solvent mixture of THF, ethanol and water. Coupling of compound of the formula (16) with compound of formula (11) can be carried out by using EDC and base such as triethylamine or diisopropylamine in solvents such as dimethyl formamide or tetrahydrofuran can give compounds of formula (17). The t-butyl ester in compound (17) can be deprotected under acidic conditions in presence of trifluoroacetic acid or hydrochloric acid to give compound (18).

The compound of the formula (8) can be obtained from compound (18) by converting the acid functionality to amide using conditions such as ammonium chloride and a base like triethylamine or DIPEA in presence of coupling reagents like EDCI, TBTU, HATU or forming a complex of the acid with CDI and reacting with ammonia. Compound of formula (8) can be converted to compound of formula (9) or intermediate 1 using the conditions outlined in Scheme 1.

Scheme 3

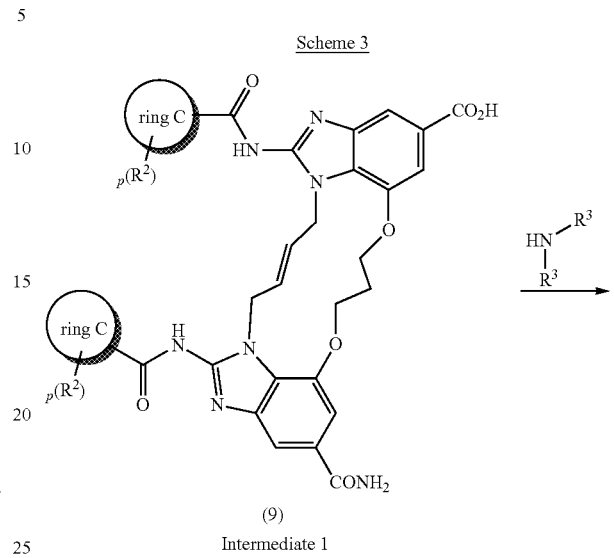

(9)

Intermediate 1

(I-A)

Scheme 3 shows a method of preparation of the compounds of formula (I-A) [wherein ring B is phenyl, ring C, p and $R^2$ are as defined earlier for Formula I, m is 1, $G_1$ is —$CH_2$—, $G_2$ is CH=CH—, and $R^1$ is —$CON(R^3)_2$] from the compounds of formula (9) intermediate 1.

Coupling of compound of formula (9) with primary or secondary amines can be carried out by using coupling reagents such as TBTU, EDC and base such as triethylamine or diisopropylamine in solvents like dimethyl formamide, dimethyl sulfoxide, etc. to give compound of formula (I-A).

Compound of formula (I-A) when having substitutions like —COOMe, —COOEt or —COOtBu on $R^3$, can be further hydrolysed to give the corresponding acids by processes known in the art by treating with base like lithium hydroxide or sodium hydroxide or alternatively, can be treated with acid like trifluoroacetic acid or hydrochloric acid for hydrolysis.

Scheme 4

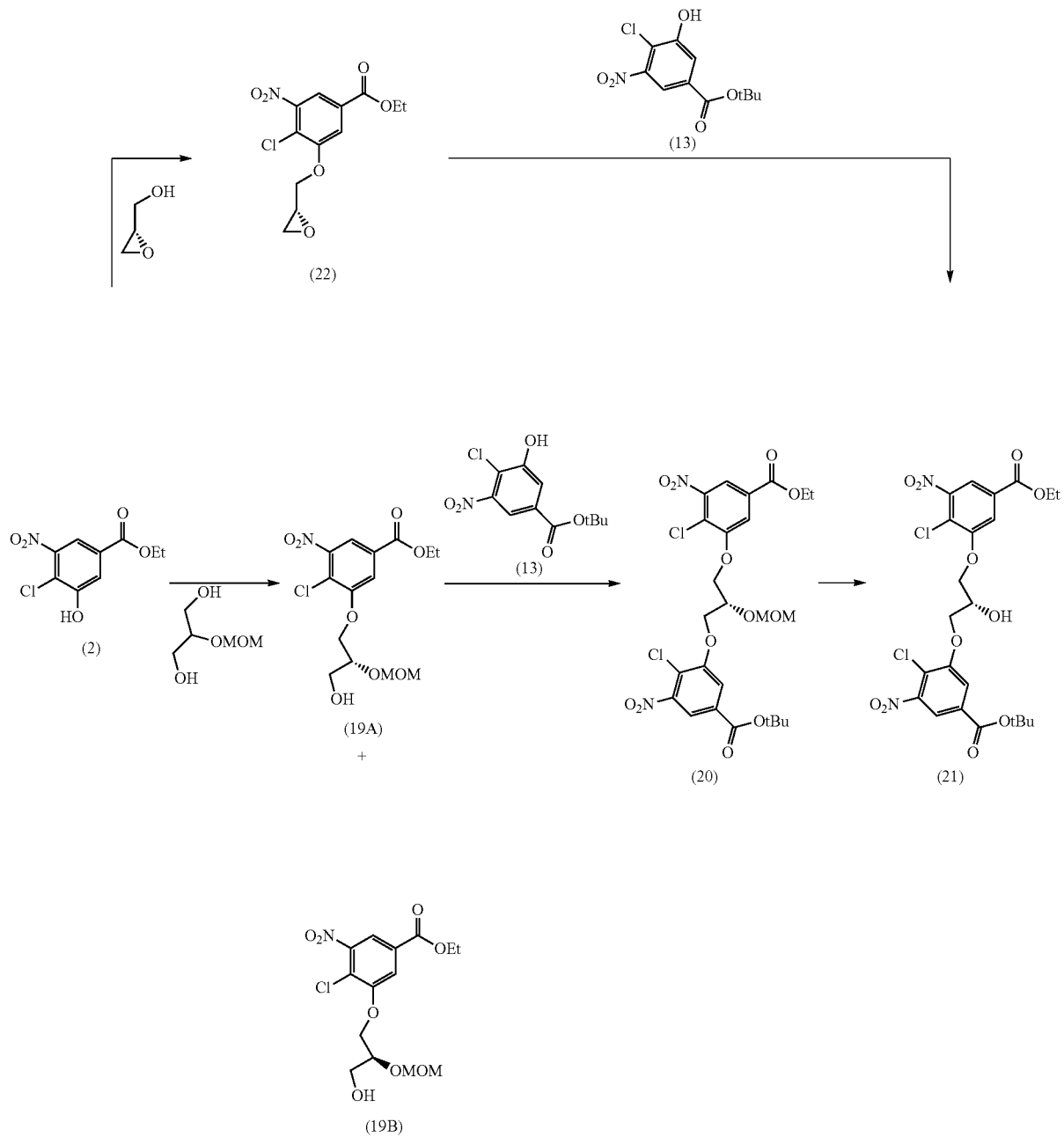

Scheme 4 shows methods of preparation of the compound (21) from the compound (2).

The compound (2) is reacted with 2-(methoxymethoxy) propane-1,3-diol under Mitsunobu condition in presence of reagents like DIAD or DEAD and TPP in solvents such as dimethyl formamide, acetonitrile, THF to obtain the mixture of enantiomers as compounds of formula (19A & 19B). The compounds 19A & 19B were separated by chiral preparative HPLC to obtain the pure enantiomers.

The compound (19A) is reacted with compound (13) under Mitsunobu condition in presence of reagents like DIAD or DEAD and TPP in solvents such as dimethyl formamide, acetonitrile, THF to obtain the compound (20).

The compound (20) is reacted with carbon tetrabromide and TPP in DCM to obtain compound (21) by deprotection of methoxy methyl (MOM) group. Similar reactions were carried out to prepare the enantiomer of compound (21) from compound (19B).

Alternatively, the compound (2) is reacted with (S)-oxiran-2-ylmethanol under Mitsunobu condition in presence of reagents like DIAD or DEAD and TPP in solvents such as dimethyl formamide, acetonitrile, THF to obtain the compound (22). The compound (22) as obtained in the previous step is reacted with compound (13) in presence of base such as 2,6 lutidine, DIPEA in solvents like ethanol, methanol to obtain the compound (21).

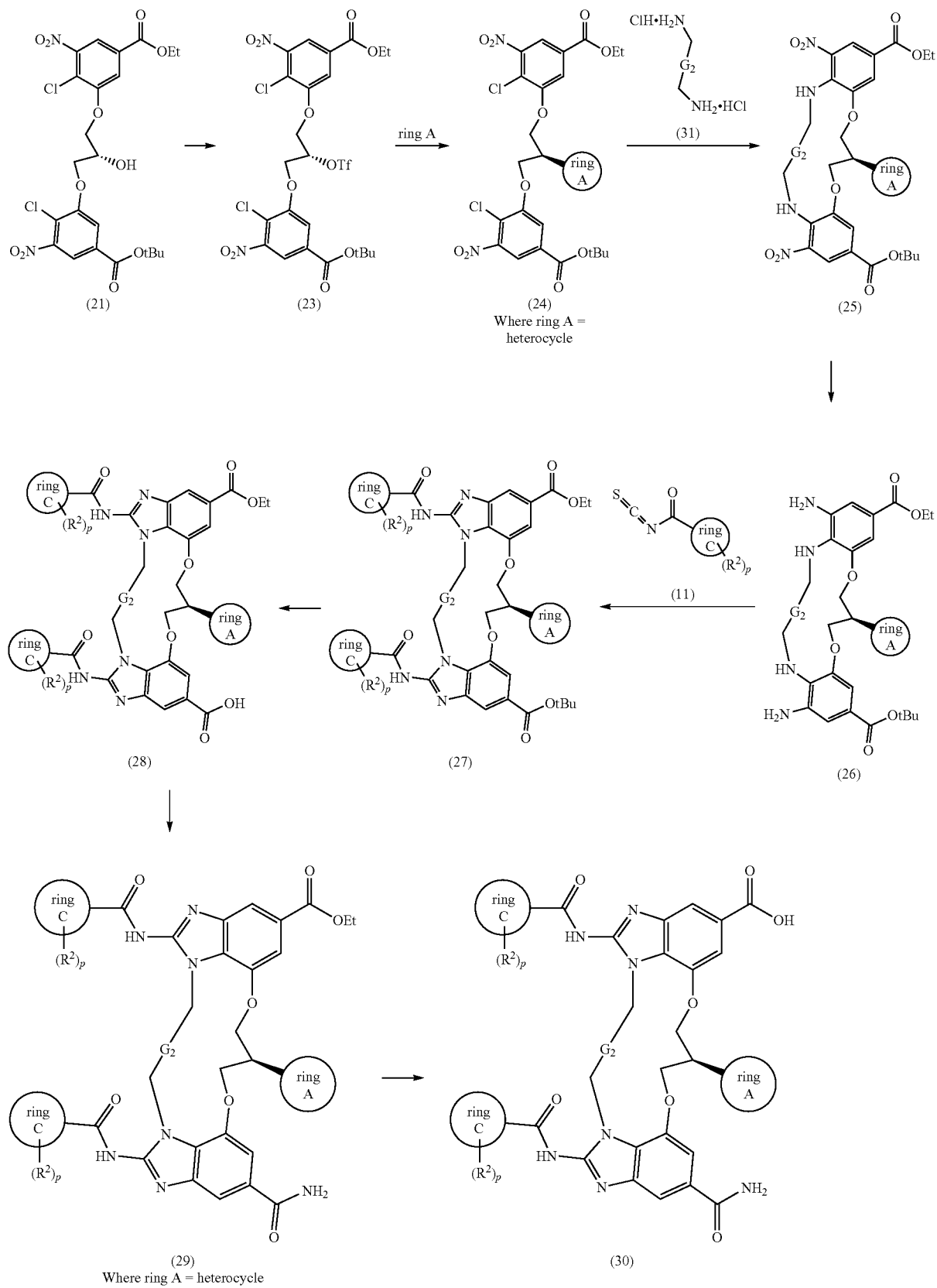
Scheme 5

Scheme 5 shows a method of preparation of the compounds of the formula (30) [wherein ring B is phenyl, ring A is heterocycle, ring C, m, $G_2$, p and $R^2$ as defined earlier for Formula 1] from the compound (21).

Compound (21) upon treatment with trifluoromethane-sulfonic anhydride in presence of base such as 2,6-lutidine obtain the compound of formula (23).

The compound of the formula (23) can be reacted with ring A in presence of base such as triethyl amine in solvents like tetrahydrofuran or chlorinated solvent to afford the compounds of formula (24).

The compounds of the formula (24) as obtained in the previous step can be reacted with compounds of formula (31) in presence of base such as DIPEA in solvents like ethanol, methanol to obtain the compounds of formula (25).

The compounds of the formula (25) can be reacted with sodium dithionite in solvents such as methanol to obtain the compounds of formula (26). Coupling of compounds of the formula (26) with compounds of formula (11) can be carried out by using EDC and base such as triethylamine or diisopropylamine in solvents like dimethyl formamide, tetrahydrofuran to give compounds of formula (27).

The compounds of the formula (27) as obtained in the previous step can be treated with acid like TFA or HCl for hydrolysis to obtain the compounds of formula (28).

The compounds of the formula (28) can be reacted with TBTU and ammonium chloride in solvents like tetrahydrofuran, dimethyl formamide to afford the compounds of formula (29), which upon further hydrolysis to give the compounds of formula (30). Similar reactions can be carried out to prepare the enantiomers of compound (30) from enantiomer of compound (21).

Scheme 6

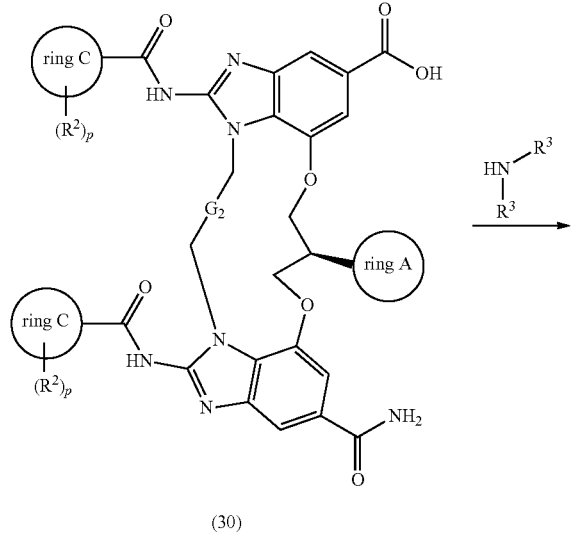

(30)

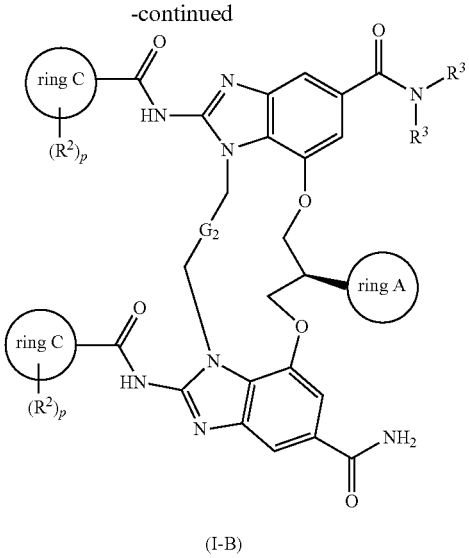

(I-B)

Scheme 6 shows a method of preparation of the compounds of formula (I-B) [wherein ring B is phenyl, ring A is heterocycle, ring C, p and $R^2$ are as defined earlier for Formula I, m is 1, $G_2$ is —CH=CH—, and $R^1$ is —CON$(R^3)_2$] from the compounds of formula (30).

Coupling of compound of the formula (30) with primary or secondary amines can be carried out by using coupling reagents such as TBTU, EDC and base such as triethylamine or diisopropylamine in solvents like dimethyl formamide, dimethyl sulfoxide, etc to give compound of formula (I-B).

Compound of formula (I-B) when having substitutions like —COOMe, —COOEt or —COOtBu on $R^3$, can be further hydrolysed to give the corresponding acids by processes known in the art by treating with base like lithium hydroxide or sodium hydroxide or alternatively, with acid like trifluoroacetic acid or hydrochloric acid for hydrolysis. Similar reactions can be carried out to prepare the enantiomers of compound (I-B) from enantiomers of compound (30).

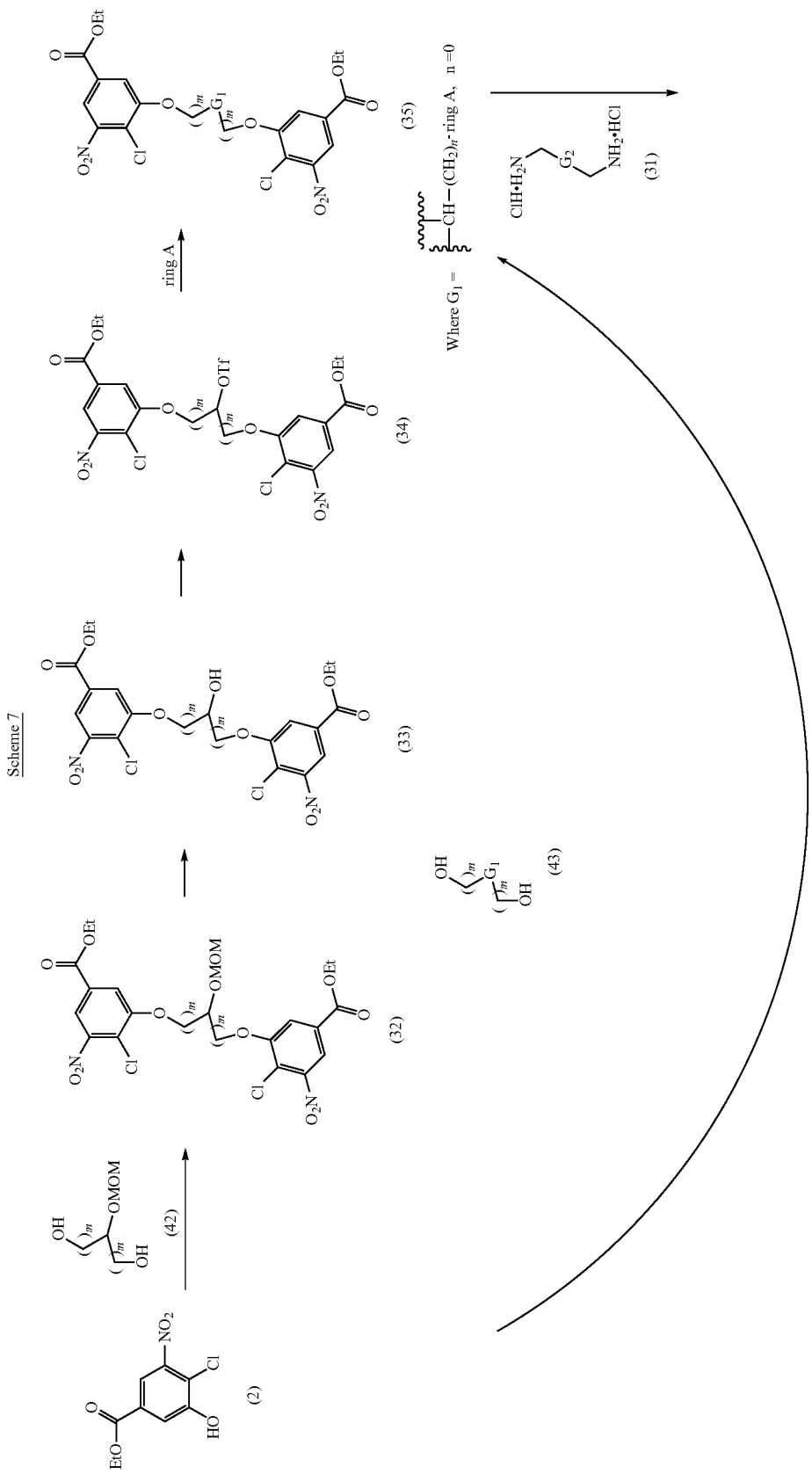
Scheme 7

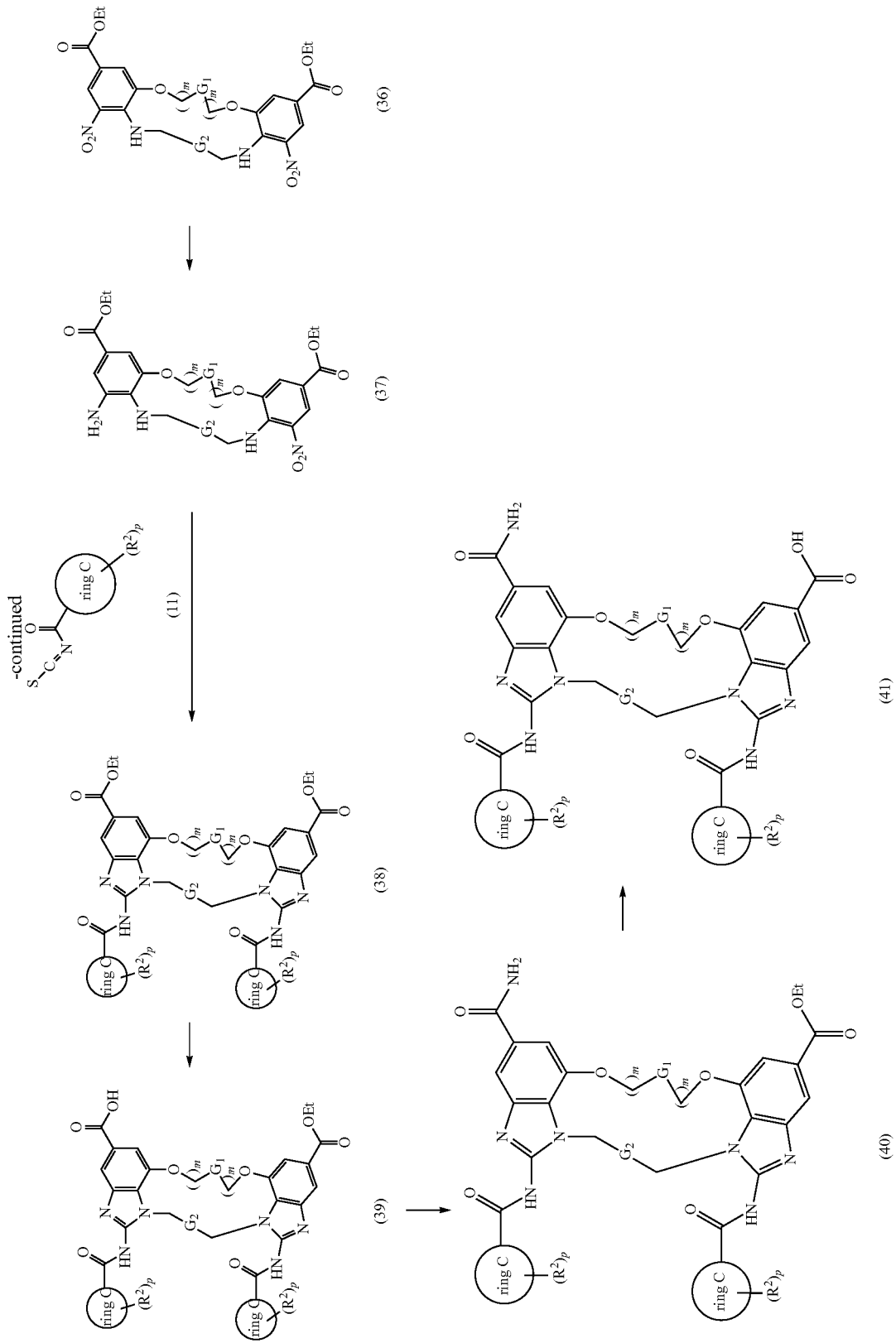

Scheme 7 shows a method of preparation of compounds of formula (41) [wherein ring B is phenyl, G₁ is

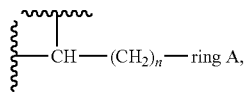

n=0, ring A is heterocycle, ring C, m, G₂, p and $R^2$ as defined earlier for Formula 1] from the compound (2).

The compound of the formula (2) can be reacted with compounds of formula (42) under Mitsunobu condition in presence of reagents like DIAD or DEAD and TPP in solvents such as dimethyl formamide, acetonitrile, THF to obtain the compounds of formula (32).

The compounds of the formula (32) can be reacted with HCl in dioxane in solvents such as chlorinated solvent or tetrahydrofuran to deprotect the methoxy methyl (MOM) group which upon further treatment with trifluoromethane-sulfonic anhydride in presence of base such as 2,6-lutidine gave the compounds of formula (34).

The compounds of the formula (34) can be reacted with ring A in presence of base such as triethyl amine in solvents like tetrahydrofuran or chlorinated solvent to afford the compounds of formula (35). The compound of the formula (2) alternatively can be reacted with compounds of formula (43), under Mitsunobu condition in presence of reagents like DIAD or DEAD and TPP in solvents such as dimethyl formamide, acetonitrile, THF to obtain the compounds of formula (35).

The compounds of the formula (35) as obtained in the previous step can be reacted with compounds of formula (31) in presence of base such as DIPEA in solvents like ethanol, methanol to obtain the compounds of formula (36).

The compounds of the formula (36) can be reacted with sodium dithionite in solvents such as methanol to obtain the compounds of formula (37). Coupling of compounds of the formula (11) with compounds of formula (37) can be carried out by using EDC and base such as triethylamine or diisopropylamine in solvents like dimethyl formamide, tetrahydrofuran to give compounds of formula (38).

The compounds of the formula (38) as obtained in the previous step can be treated with base like lithium hydroxide or sodium hydroxide for hydrolysis to obtain the compounds of formula (39).

The compounds of the formula (39) can be reacted with TBTU and ammonium chloride in solvents like tetrahydrofuran, dimethyl formamide to afford the compounds of formula (40), which upon further hydrolysis give the compounds of formula (41).

Scheme 8

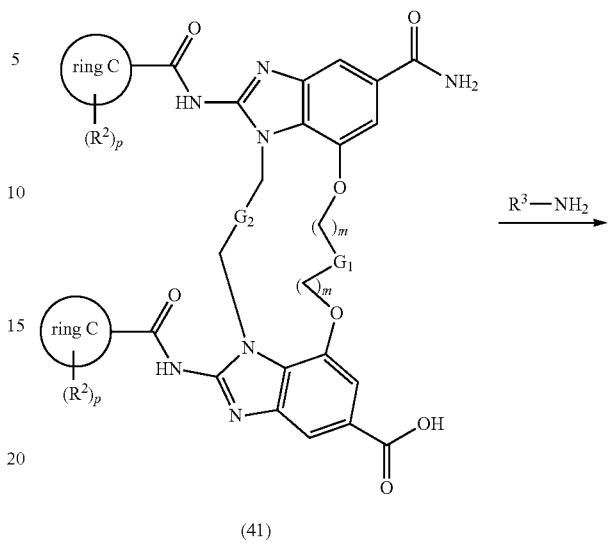

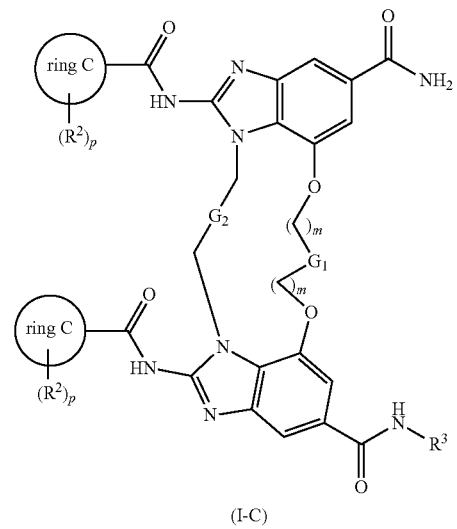

Scheme 8 shows a method of preparation of the compounds of formula (I-C) [wherein m is 1, $G_1$ is >CH-ring A, $G_2$ is —CH=CH—, and $R^1$ is —CON($R^3$)₂, where one of $R^3$ is hydrogen], wherein ring C, p and $R^2$ are as defined earlier, from the compounds of formula (41).

Coupling of compound of the formula (41) with primary amines can be carried out by using coupling reagents such as TBTU, EDC and base such as triethyl amine or diisopropyl amine in solvents like dimethyl formamide, tetrahydrofuran to give compound of formula (I-C).

Compound of formula (I-C) when having substitutions like —COOMe, —COOEt or —COOtBu on $R^3$, can be further hydrolysed to give the corresponding acids by processes known in the art by treating with base like lithium hydroxide or sodium hydroxide or alternatively, with acid like trifluoroacetic acid or hydrochloric acid for hydrolysis.

Scheme 9

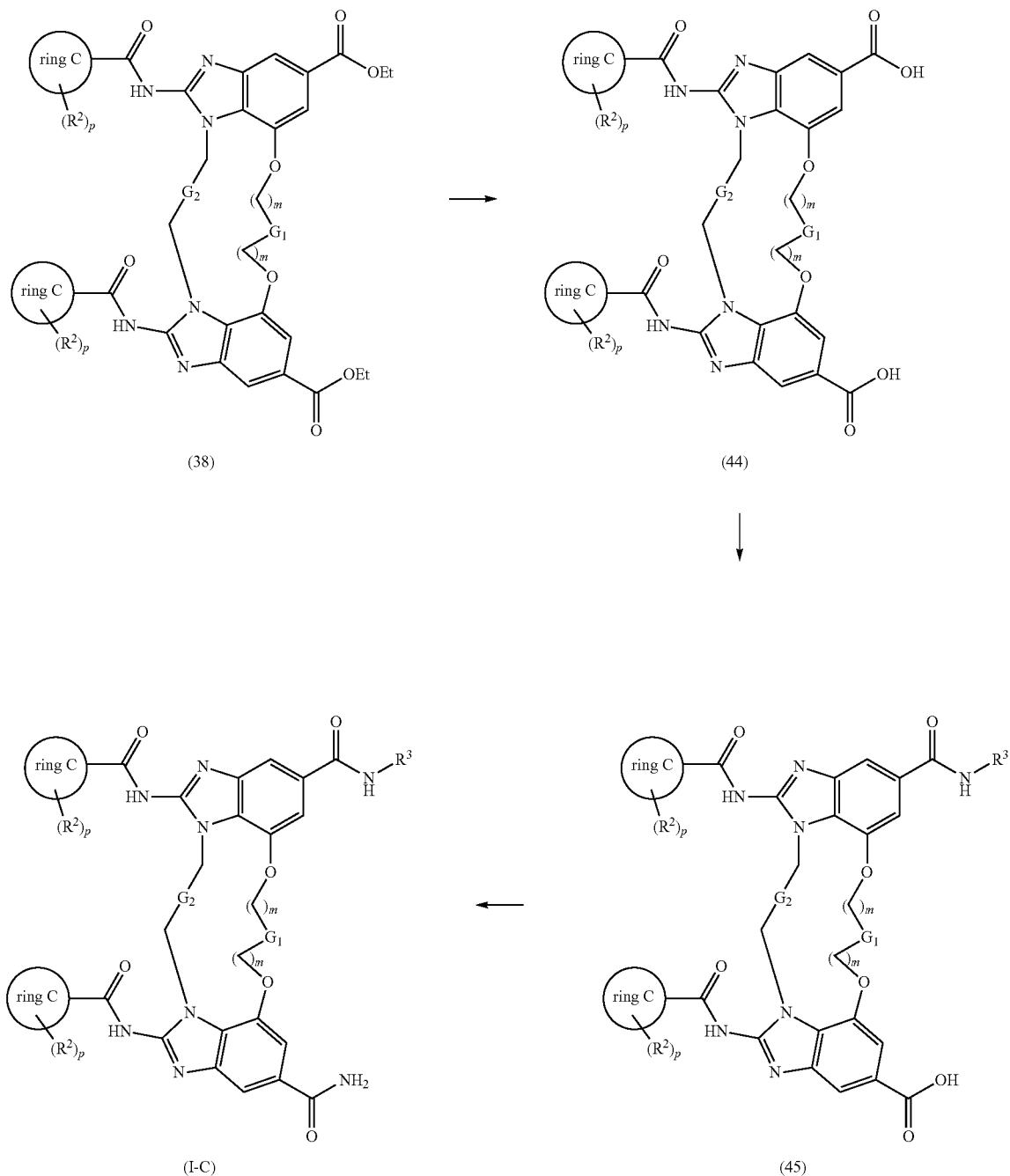

Scheme 9 shows a method of preparation of the compounds of formula (I-C) [Formula I, when m is 1, $G_1$ is >CH-ring A, $G_2$ is —CH=CH—, and $R^1$ is —CON($R^3$)$_2$, where one of $R^3$ is hydrogen], wherein ring C, p and $R^2$ are as defined earlier, from the compounds of formula (38).

The compounds of the formula (38) can be treated with base like lithium hydroxide or sodium hydroxide for hydrolysis to obtain the compounds of formula (44).

Coupling of compound of the formula (44) with primary amines can be carried out by using coupling reagents such as TBTU, EDC and base such as triethylamine or diisopropylamine in solvents like dimethyl formamide, tetrahydrofuran to gives compound of formula (45). The compounds of the formula (45) can be reacted with TBTU and ammonium chloride in solvents like tetrahydrofuran, dimethyl formamide to afford the compounds of formula (I-C).

Compound of formula (I-C) when having substitutions like —COOMe, —COOEt or —COOtBu on $R^3$, can be further hydrolysed to give the corresponding acids by processes known in the art by treating with base like lithium hydroxide or sodium hydroxide for hydrolysis or alternatively, with acid like trifluoroacetic acid or hydrochloric acid for hydrolysis.

Scheme 10

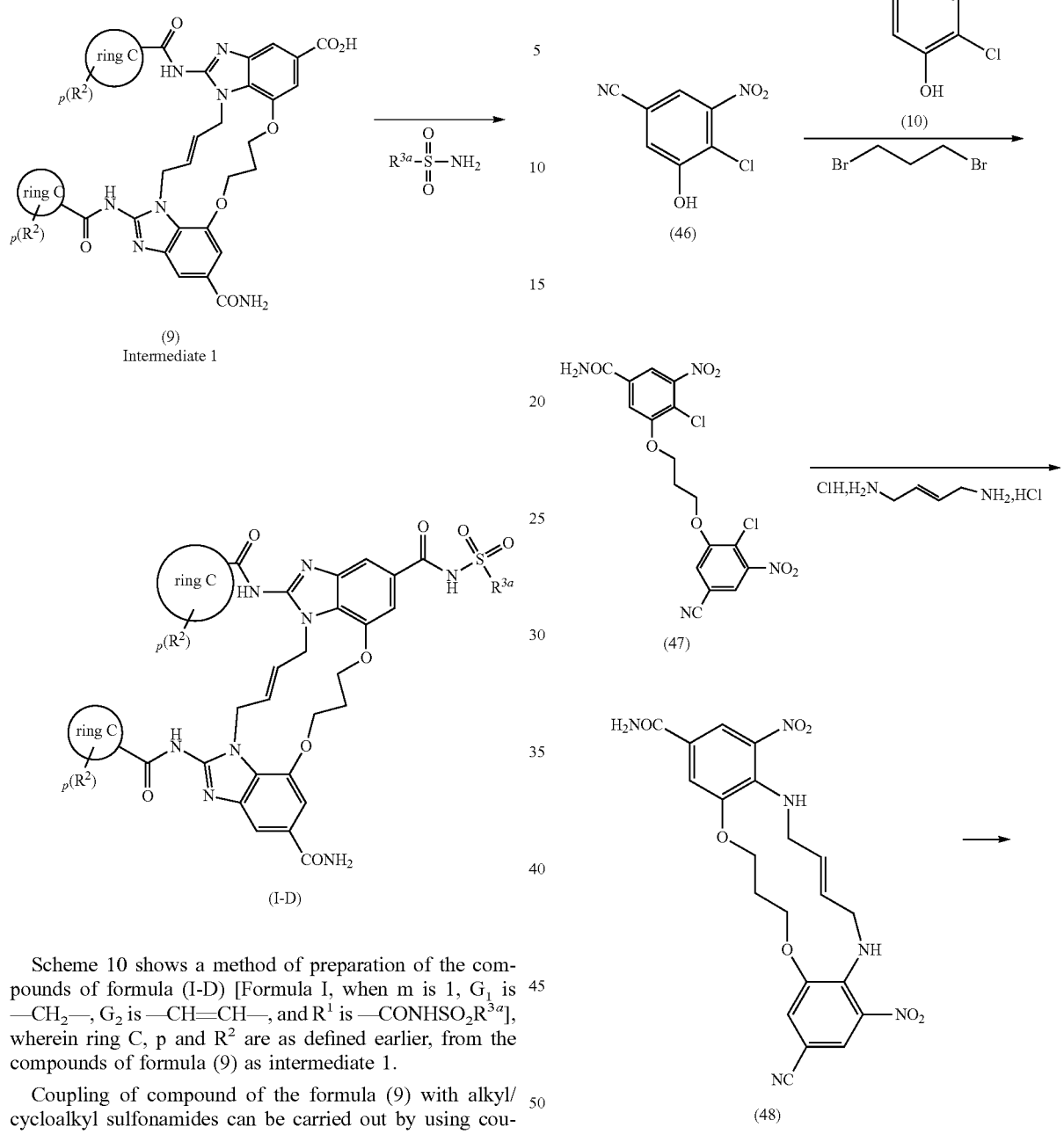

Scheme 10 shows a method of preparation of the compounds of formula (I-D) [Formula I, when m is 1, G₁ is —CH₂—, G₂ is —CH=CH—, and R¹ is —CONHSO₂R$^{3a}$], wherein ring C, p and R² are as defined earlier, from the compounds of formula (9) as intermediate 1.

Coupling of compound of the formula (9) with alkyl/cycloalkyl sulfonamides can be carried out by using coupling reagents such as TBTU, EDC and base such as triethyl amine or diisopropyl amine in solvents like dimethyl formamide, tetrahydrofuran to give compound of formula (I-D).

Scheme 11

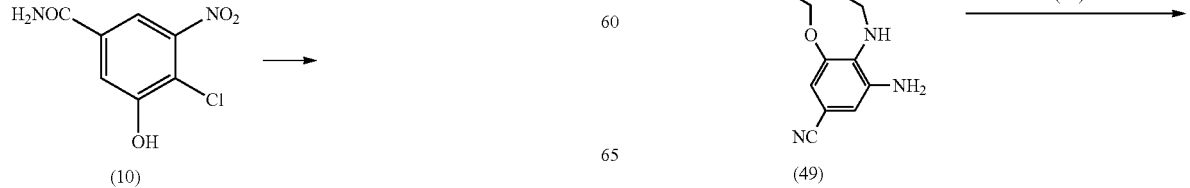

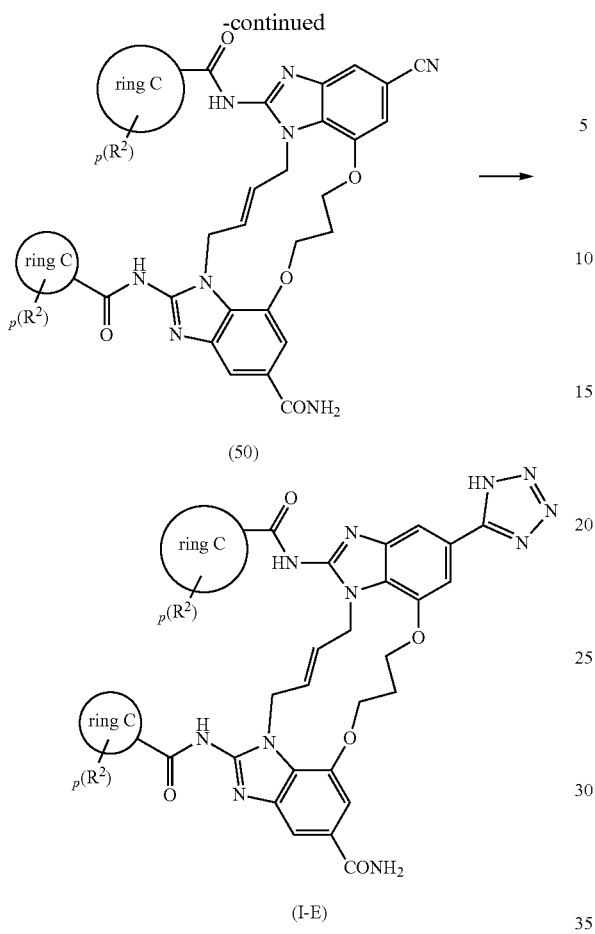

(50)

(I-E)

Scheme 11 shows a method of preparation of the compounds of formula (I-E) [Formula I, when m is 1, $G_1$ is —$CH_2$—, $G_2$ is —CH═CH—, and $R^1$ is heteroaryl (tetrazole)], wherein ring C, p and $R^2$ are as defined earlier, from the compound of formula (10).

The compound of the formula (10), can be reacted with trichloromethylcarbonochloridate in solvents such as acetonitrile, THF to obtain the compound of formula (46).

The compound of the formula (46), can be reacted with compound of formula (10) and 1,3-dibromopropane in presence of base such as TEA, DIPEA, in solvents such as NMP, dimethyl formamide, to obtain the compound of formula (47).

Cyclization of compound of the formula (47) with (E)-but-2-ene-1,4-diamine dihydrochloride, by using base such as triethyl amine or diisopropyl amine in solvents like ethanol, tetrahydrofuran, to give compound of formula (48).

The compound of the formula (48) can be reacted with zinc and acetic acid to obtain the compound of formula (49). Coupling of compound of the formula (49) with compound of formula (11) can be carried out by using EDC and base such as triethyl amine or diisopropyl amine in solvents like dimethyl formamide, tetrahydrofuran to give compound of formula (50).

The compound of the formula (50) as obtained in the previous step can be treated with sodium azide and ammonium chloride in DMF as solvent to obtain the compound of formula (I-E).

Abbreviations:
DMF: dimethylformamide
DMSO: dimethyl sulfoxide
THF: tetrahydrofuran
CDI: 1,1'-Carbonyldiimidazole
EDC: 1-Ethyl-3-(3-dimethylaminopropyl)carbodiimide
TBTU: 2-(1H-Benzotriazole-1-yl)-1,1,3,3-tetramethyluronium tetrafluoroborate
HATU: 1-[Bis(dimethylamino)methylene]-1H-1,2,3-triazolo[4,5-b]pyridinium 3-oxide hexafluorophosphate
DIPEA: diisopropyl amine
NMP: N-Methyl-2-pyrrolidone
TEA: triethyl amine
KI: potassium iodide
DCM: dichloromethane
Ms: methanesulfonyl
Ts: 4-methylbenzenesulfonyl
PMB: 4-methoxy benzyl
DEAD: diethyl azodicarboxylate
DIAD: diisopropyl azodicarboxylate
TPP: triphenyl phosphine
Int.: intermediate Some of the representative examples of the invention were prepared by following one or more reaction schemes as described above.

The invention is further illustrated by the following examples which are provided merely to be exemplary of the invention and do not limit the scope of the invention. The examples set forth below demonstrate the synthetic procedures for the preparation of the relative compounds. Certain modifications and equivalents will be apparent to those skilled in the art and are intended to be included within the scope of the invention.

Nomenclature of the compounds of the invention is according to ChemDraw Professional 18.0. Structures of the intermediates as well as the final compounds were confirmed by spectral data.

EXPERIMENTAL

Synthesis of Intermediates

Intermediate 1: Synthesis of (E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylic acid

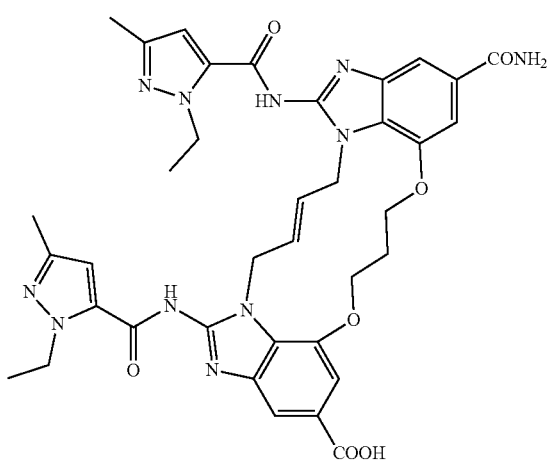 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)O)cc(c21)OCCCO3]

Step 1: 4-chloro-3-hydroxy-5-nitrobenzoic acid

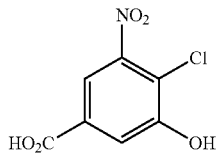

To the stirred solution of ethyl 4-chloro-3-hydroxy-5-nitrobenzoate (320 g, 1303 mmol) in a solvent mixture of 1 L methanol, 1 L THF and 1 L H$_2$O was added lithium hydroxide hydrate (164 g, 3909 mmol) at room temperature and stirred for 2 h. The reaction was monitored by TLC and after completion, the reaction mixture was concentrated under reduced pressure and water was added. The pH of the solution was adjusted to acidic by using 6N HCl, and the crude extracted with ethyl acetate. The organic phase was washed with brine, dried over Na$_2$SO$_4$ and concentrated to obtain the product as off white solid (Yield=255 g, 90%). $^1$H NMR (400 MHz, DMSO-d$_6$) δ 13.63 (s, 1H), 11.70 (s, 1H), 7.88 (d, J=1.9 Hz, 1H), 7.77 (d, J=1.9 Hz, 1H). LCMS: m/z 216.39 (M+H)$^+$.

Step 2: tert-butyl 4-chloro-3-hydroxy-5-nitrobenzoate

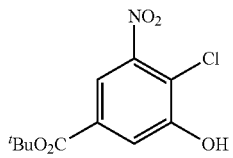

To a solution of 4-chloro-3-hydroxy-5-nitrobenzoic acid (255 g, 1172 mmol), in 3 L DCM was added anhydrous MgSO$_4$ (635 g, 5274 mmol) and the RB flask was sealed to prevent the escape of gases. H$_2$SO$_4$ (75 ml, 1407 mmol) was added followed by t-butanol (729 ml, 7619 mmol) and the reaction mixture stirred overnight at room temperature. The reaction mixture was filtered to remove MgSO$_4$ residue and the filtrate diluted with DCM. The DCM layer was washed with sat. NaHCO$_3$ solution, followed by brine and dried over Na$_2$SO$_4$ and concentrated to obtain the product as an off white solid (Yield=200 g, 62%). $^1$H NMR (400 MHz, Chloroform-d) δ 8.08 (d, J=1.9 Hz, 1H), 7.88 (d, J=1.9 Hz, 1H), 1.62 (s, 9H). LCMS: m/z 272.33 (M-H)$^-$.

Step 3: ethyl 4-chloro-3-(3-hydroxypropoxy)-5-nitrobenzoate

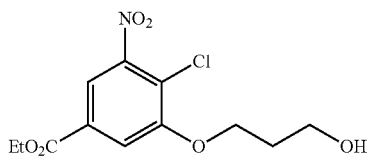 [SMILES: CCOC(=O)c1cc(OCCCO)c(Cl)c([N+](=O)[O-])c1]

To a stirred solution of ethyl 4-chloro-3-hydroxy-5-nitrobenzoate (200 g, 814 mmol) in 2 L DMF was added 3-bromopropan-1-ol (147 g, 1059 mmol) and K$_2$CO$_3$ (225 g, 1629 mmol) and the reaction mixture stirred at 80° C. for 1.5 h. After completion of the starting material, the reaction mass was cooled and poured into water and extracted with ethyl acetate. The organic phase was washed with brine, dried over Na$_2$SO$_4$ and concentrated to obtain the crude product. The crude product was purified by washing with 5% EtOAc/Hexane to get pale yellow solid (Yield=230 g, 93%). $^1$H NMR (400 MHz, Chloroform-d) δ 8.04 (d, J=1.8 Hz, 1H), 7.80 (d, J=1.8 Hz, 1H), 4.44 (q, J=7.1 Hz, 2H), 4.34 (t, J=5.9 Hz, 2H), 3.94 (t, J=5.8 Hz, 2H), 2.17 (p, J=5.9 Hz, 2H), 1.43 (t, J=7.1 Hz, 3H).

Step 4: tert-butyl 4-chloro-3-(3-(2-chloro-5-(ethoxycarbonyl)-3-nitrophenoxy)propoxy)-5-nitrobenzoate

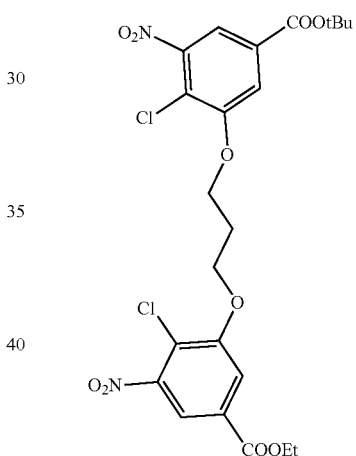

To a stirred solution of ethyl 4-chloro-3-(3-hydroxypropoxy)-5-nitrobenzoate (200 g, 659 mmol) in 3 L THF, tert-butyl 4-chloro-3-hydroxy-5-nitrobenzoate (198 g, 724 mmol) and triphenyl phosphine (242 g, 922 mmol) was added. To this solution, DIAD (192 ml, 988 mmol) was added dropwise and after the addition, the reaction mixture was stirred at room temperature for 2 h. After completion of the reaction, the mixture was concentrated to get the crude product which was triturated with ethanol. The solid precipitated was filtered and dried to get the pure product as a pale yellow solid (Yield=320 g, 87%). $^1$H NMR (400 MHz, DMSO-d$_6$) δ 8.08 (d, J=1.8 Hz, 1H), 8.01 (d, J=1.7 Hz, 1H), 7.85 (d, J=1.8 Hz, 1H), 7.80 (d, J=1.8 Hz, 1H), 4.47 (td, J=6.0, 3.3 Hz, 4H), 4.37 (q, J=7.1 Hz, 2H), 2.35 (p, J=6.1 Hz, 2H), 1.56 (s, 9H), 1.34 (t, J=7.1 Hz, 3H).

Step 5: 3-(tert-butyl) 11-ethyl (E)-1,13-dinitro-7,8,14,15,18,19-hexahydro-6H-dibenzo[b,j][1,12]dioxa[4,9]diazacyclopentadecine-3,11-dicarboxylate

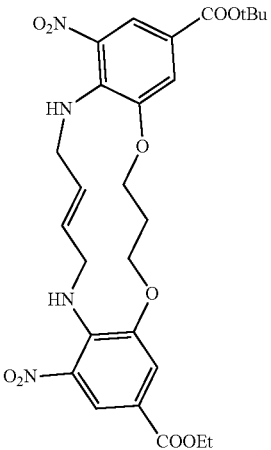

To a stirred solution of tert-butyl 4-chloro-3-(3-(2-chloro-5-(ethoxycarbonyl)-3-nitrophenoxy)propoxy)-5-nitrobenzoate (310 g, 554 mmol) in a solvent mixture of 9 L Ethanol and 3 L THF was added (E)-but-2-ene-1,4-diamine dihydrochloride (127.7 g, 802 mmol) and DIPEA (798 mL, 4567 mmol). The reaction mixture was heated at 105° C. for 36 h in a stainless steel autoclave. After completion of the reaction, the mixture was evaporated to dryness and water was added. The resulting solid was filtered and dried under vacuum. The crude product was triturated with 5% ethyl acetate in methanol and filtered. The solid was collected and dried under vacuum to afford the desired product (Yield=285 g, 90%). $^1$H NMR (400 MHz, DMSO-$d_6$) δ 8.33 (dt, J=14.5, 6.3 Hz, 2H), 8.25 (d, J=1.9 Hz, 1H), 8.18 (d, J=1.9 Hz, 1H), 7.51 (d, J=2.0 Hz, 1H), 7.47 (d, J=2.0 Hz, 1H), 5.73 (d, J=1.9 Hz, 2H), 4.42-4.32 (m, 2H), 4.21-4.11 (m, 8H), 2.23 (t, J=5.9 Hz, 2H), 1.53 (s, 9H), 1.30 (t, J=7.1 Hz, 3H). LCMS: m/z 572.95 (M+H)$^+$.

Step 6: 3-(tert-butyl) 11-ethyl (E)-1,13-diamino-7,8,14,15,18,19-hexahydro-6H-dibenzo[b,j][1,12]dioxa[4,9]diazacyclopentadecine-3,11-dicarboxylate

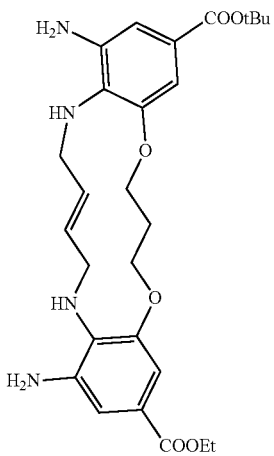

3-(tert-butyl) 11-ethyl (E)-1,13-dinitro-7,8,14,15,18,19-hexahydro-6H-dibenzo[b,j][1,12]dioxa[4,9]diazacyclopentadecine-3,11-dicarboxylate (280 g, 489 mmol) was dissolved in a solvent mixture of 1.2 L THF and 0.8 L EtOH. The solution was cooled to 0° C. and a solution of sodium dithionite (851 g, 4890 mmol) in 800 mL water was added to it followed by 28% aq solution of ammonium hydroxide (1020 ml, 7335 mmol). The reaction mixture was allowed to warm to room temperature and stirred for 2 h after which TLC indicated completion of reaction. The volatiles were then concentrated on rotavapor and the residue diluted with ethyl acetate. The ethyl acetate layer was washed with brine, dried over $Na_2SO_4$ and concentrated to obtain the product (Yield=220 g, 88%). LCMS: m/z 512.44 (M+H)$^+$.

Step 7: 12-(tert-butyl) 4-ethyl (E)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylate

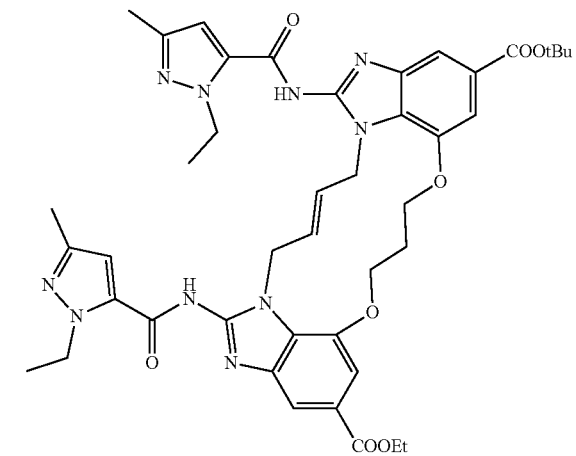

To a stirred solution of 3-(tert-butyl) 11-ethyl (E)-1,13-diamino-7,8,14,15,18,19-hexahydro-6H-dibenzo[b,j][1,12]dioxa[4,9]diazacyclopentadecine-3,11-dicarboxylate (200 g, 351 mmol) in 2.5 L of DMF was added a solution of 1-ethyl-3-methyl-1H-pyrazole-5-carbonyl isothiocyanate (137 g, 702 mmol) in 200 mL DMF dropwise at 0° C. The reaction mixture was stirred at 0° C. for 30 minutes after which 3-(ethyliminomethylideneamino)-N,N-dimethylpropan-1-amine; hydrochloride (269 g, 1405 mmol) was added to the reaction mixture followed by the addition of DIPEA (368 ml, 2107 mmol). The reaction mixture was allowed to warm to RT and stirred overnight. The progress of the reaction was monitored by LCMS and upon completion, the reaction mixture was concentrated under reduced pressure and water was added. The solid precipitate obtained was filtered to get the crude product, which was purified by column chromatography with 5% DCM-MeOH as eluent to obtain the product. For further purification the solid was washed with MeOH to get the pure product (Yield=170 g, 58%). $^1$H NMR (400 MHz, DMSO-$d_6$) δ 12.91 (d, J=7.3 Hz, 2H), 7.83 (d, J=1.3 Hz, 1H), 7.81 (d, J=1.3 Hz, 1H), 7.51 (d, J=1.4 Hz, 1H), 7.45 (d, J=1.4 Hz, 1H), 6.54 (s, 2H), 5.48 (s, 2H), 4.87 (s, 4H), 4.53 (q, J=7.1 Hz, 4H), 4.40 (q, J=5.0 Hz, 4H), 4.34 (q, J=7.1 Hz, 2H), 2.32-2.21 (m, 2H), 2.07 (s, 6H), 1.57 (s, 9H), 1.34 (t, J=7.1 Hz, 3H), 1.27 (t, J=7.1 Hz, 6H). LCMS: m/z 835.05 (M+H)$^+$.

Step 8: (E)-4-(ethoxycarbonyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylic acid

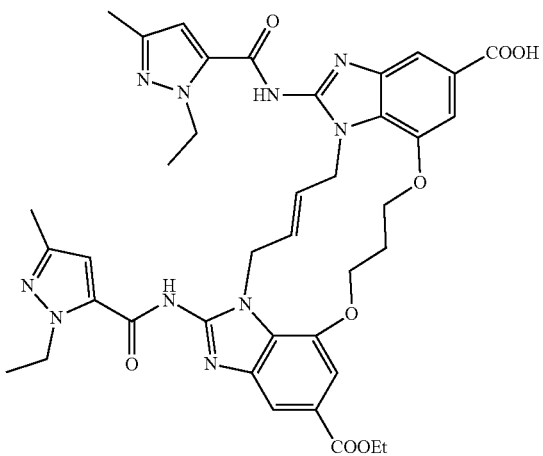 [SMILES: CCOC(=O)c1cc2c3c(c1)nc(NC(=O)c1cc(C)nn1CC)n3C/C=C/Cn1c(NC(=O)c3cc(C)nn3CC)nc3cc(C(=O)O)cc(c31)OCCCO2]

2-(tert-butyl) 4-ethyl (E)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylate (160 g, 192 mmol) was dissolved in 1.5 L DCM and TFA (517 ml, 6707 mmol) was added and the solution stirred at RT for 12 h. The reaction was monitored by LCMS and after completion, the volatiles were concentrated and diethyl ether was added resulting in the precipitation of a pale yellow solid. The solid was filtered to obtain the product which was washed with 50% EtOAc: Ether to get the pure product (Yield=143 g, 96%). $^1$H NMR (400 MHz, DMSO-$d_6$) δ 7.83 (d, J=1.3 Hz, 1H), 7.81 (d, J=1.3 Hz, 1H), 7.54-7.47 (m, 2H), 6.56 (s, 2H), 5.50 (s, 2H), 4.88 (s, 4H), 4.53 (q, J=7.1 Hz, 4H), 4.40 (t, J=5.4 Hz, 4H), 4.34 (q, J=7.1 Hz, 2H), 2.27 (t, J=5.6 Hz, 2H), 2.08 (s, 6H), 1.34 (t, J=7.1 Hz, 3H), 1.27 (t, J=7.1 Hz, 6H). LCMS: m/z 779.16 (M+H)$^+$.

Step 9: ethyl (E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylate

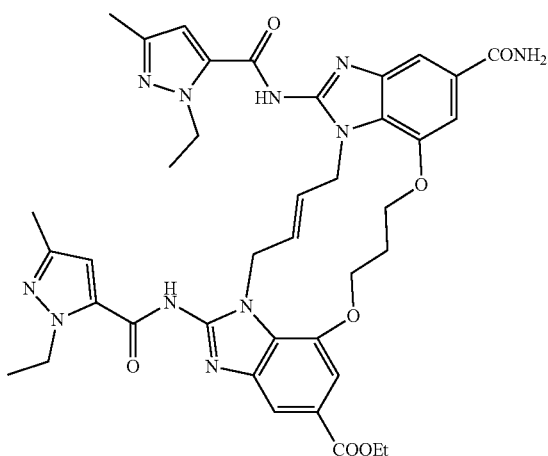 [SMILES: CCOC(=O)c1cc2c3c(c1)nc(NC(=O)c1cc(C)nn1CC)n3C/C=C/Cn1c(NC(=O)c3cc(C)nn3CC)nc3cc(C(N)=O)cc(c31)OCCCO2]

(E)-4-(ethoxycarbonyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylic acid (140 g, 180 mmol) was suspended in a 2 L solvent mixture of 1:1 DMF and THF and CDI (117 g, 719 mmol) was added portion wise. As the CDI complex formation proceeded the reaction, mixture became homogenous. After an hour at 60° C., the reaction was cooled to room temperature and a 28% aqueous solution of ammonium hydroxide (250 ml, 1798 mmol) was added and the reaction mixture stirred at room temperature. A thick off-white solid precipitate started to form and after stirring for 3 h, the volatiles were concentrated, and water was added, and the resulting crude product was filtered and dried. The crude product was heated to reflux with 1:1 MeOH:THF for 2 h and filtered and subsequently again suspended in DMF and heated to 90° C. for 2 h and filtered to obtain the pure product (Yield=125 g, 89%). $^1$H NMR (400 MHz, DMSO-$d_6$) δ 12.92 (s, 1H), 12.87 (s, 1H), 8.00 (brs, 1H), 7.84 (s, 1H), 7.70 (s, 1H), 7.52 (d, J=5.7 Hz, 1H), 7.37 (brs, 1H), 6.54 (d, J=5.6 Hz, 2H), 5.50 (s, 2H), 4.88 (brs, 4H), 4.53 (d, J=7.3 Hz, 4H), 4.42 (q, J=5.9 Hz, 4H), 4.34 (q, J=7.1 Hz, 2H), 2.36-2.21 (m, 2H), 2.08 (s, 6H), 1.35 (t, J=7.1 Hz, 3H), 1.27 (t, J=7.1 Hz, 7H). LCMS: m/z 778.16 (M+H)$^+$.

Step 10: (E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylic acid (Intermediate 1)

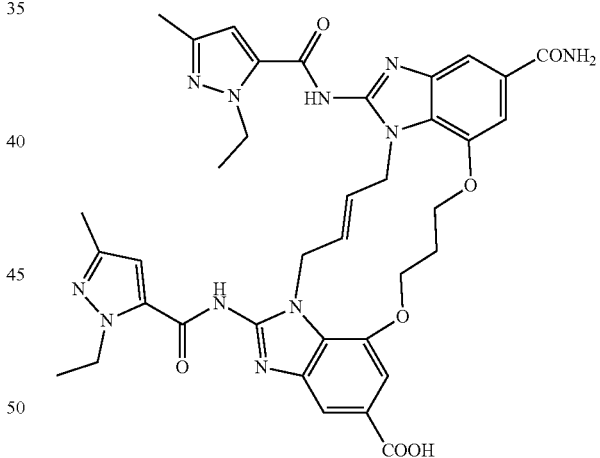

To a stirred suspension of ethyl (E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylate (105 g, 135 mmol) in a 2 L solvent mixture of 1:1 MeOH and THF was added a solution of lithium hydroxide hydrate (56.6 g, 1350 mmol) in 300 mL of water. After the addition of the base, the mixture became homogenous and was heated at 45° C. for 24 h. The reaction was monitored by LCMS. After completion the reaction mixture was concentrated under reduced pressure and water was added and the pH was adjusted 6 by using 3 N HCl. The resulting solid was filtered and washed with Acetonitrile followed by Diethyl ether to get (E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-12-carboxylic acid (Yield=100 g, 99%). ¹H NMR (400 MHz, DMSO-d$_6$) δ 12.89 (brs, 2H), 8.01 (brs, 1H), 7.81 (s, 1H), 7.71 (s, 1H), 7.53 (d, J=8.1 Hz, 2H), 7.37 (brs, 1H), 6.55 (s, 2H), 5.51 (s, 2H), 4.89 (s, 4H), 4.53 (q, J=7.1 Hz, 4H), 4.42 (q, J=6.3 Hz, 4H), 2.29 (t, J=5.7 Hz, 2H), 2.08 (s, 6H), 1.27 (t, J=7.1 Hz, 6H). LCMS: m/z 750.28 (M+H)$^+$.

Alternative Method for the Preparation of Intermediate-1

Step-1: Ethyl 4-chloro-3-(3-hydroxypropoxy)-5-nitrobenzoate

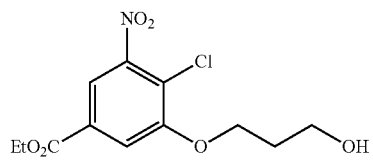 [SMILES: CCOC(=O)c1cc(OCCCO)c(Cl)c([N+](=O)[O-])c1]

To a solution of ethyl 4-chloro-3-hydroxy-5-nitrobenzoate (15 g, 61.1 mmol) in 150 mL DMF, potassium carbonate (16.88 g, 122 mmol) was added and the suspension was allowed to stir at room temperature. 3-bromopropan-1-ol (11.03 g, 79 mmol) was added after 15 min and the temperature was raised to 100° C. and the progress of the reaction monitored by TLC. After completion of the reaction, the mixture was poured into water and extracted with ethyl acetate. The organic layer was dried over Na$_2$SO$_4$ and concentrated to get the crude product, which was purified on column to obtain the pure product as a pale yellow solid. (13 g, 70%). ¹H NMR (400 MHz, CDCl$_3$) δ 8.04 (d, J=1.8 Hz, 1H), 7.80 (d, J=1.8 Hz, 1H), 4.44 (q, J=7.1 Hz, 2H), 4.34 (t, J=5.9 Hz, 2H), 3.94 (t, J=5.8 Hz, 2H), 2.17 (m, 2H), 1.43 (t, J=7.1 Hz, 3H).

Step-2: Ethyl 4-chloro-3-(3-((methylsulfonyl)oxy) propoxy)-5-nitrobenzoate

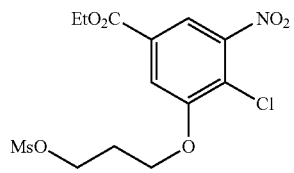 [SMILES: CCOC(=O)c1cc(OCCCOS(C)(=O)=O)c(Cl)c([N+](=O)[O-])c1]

Ethyl 4-chloro-3-(3-hydroxypropoxy)-5-nitrobenzoate (13 g, 42.8 mmol) was dissolved in 120 mL THF and the solution cooled to 0° C. Methanesulfonyl chloride (6.67 ml, 86 mmol) was added to it followed by triethylamine (23.87 ml, 171 mmol), and the reaction mixture was allowed to warm to RT over a period of 2 h. The reaction was quenched by the addition of water and extracted with ethyl acetate. The organic layer was dried over Na$_2$SO$_4$ and concentrated to get the crude product which was sufficiently pure for the next step and used as such. (13 g, 80%). ¹H NMR (400 MHz, CDCl$_3$) δ 8.07 (d, J=1.8 Hz, 1H), 7.79 (d, J=1.8 Hz, 1H), 4.53 (t, J=5.9 Hz, 2H), 4.45 (q, J=7.1 Hz, 2H), 4.32 (t, J=5.8 Hz, 2H), 3.05 (s, 3H), 2.37 (m, 3H), 1.44 (t, J=7.1 Hz, 3H); LCMS: m/z=404.1 (M+Na)$^+$ Step-3: Ethyl 3-(3-(5-carbamoyl-2-chloro-3-nitrophenoxy)propoxy)-4-chloro-5-nitrobenzoate

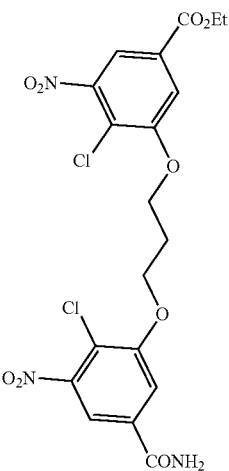 [SMILES: CCOC(=O)c1cc(OCCCOc2cc(C(N)=O)cc([N+](=O)[O-])c2Cl)c(Cl)c([N+](=O)[O-])c1]

To a solution of 4-chloro-3-hydroxy-5-nitrobenzamide (7.2 g, 33.2 mmol) in 150 mL DMF, potassium carbonate (11.49 g, 83 mmol) was added and the suspension was allowed to stir at room temperature. Ethyl 4-chloro-3-(3-((methylsulfonyl)oxy)propoxy)-5-nitrobenzoate (12.69 g, 33.2 mmol) was added after 15 min and the temperature was raised to 100° C. and the progress of the reaction monitored by TLC. After completion of the reaction, the mixture was poured into water and extracted with ethyl acetate. The organic layer was dried over Na$_2$SO$_4$ and concentrated to get the crude product which was washed with diethyl ether to obtain the product as a pale brown solid. (12.5 g, 75%). ¹H NMR (400 MHz, DMSO-d$_6$) δ 8.30 (s, 1H), 8.10 (d, J=1.7 Hz, 1H), 8.06 (d, J=1.8 Hz, 1H), 7.91 (d, J=1.9 Hz, 1H), 7.86 (d, J=1.8 Hz, 1H), 7.80 (s, 1H), 4.50-4.42 (m, 4H), 4.37 (q, J=7.1 Hz, 2H), 2.36 (m, 2H), 1.34 (t, J=7.1 Hz, 3H); LCMS: m/z=502.2 (M+H)$^+$ Step-4: Ethyl (E)-11-carbamoyl-1,13-dinitro-7,8,14, 15,18,19-hexahydro-6H-dibenzo [b,j][1,12]dioxa[4, 9]diazacyclopentadecine-3-carboxylate

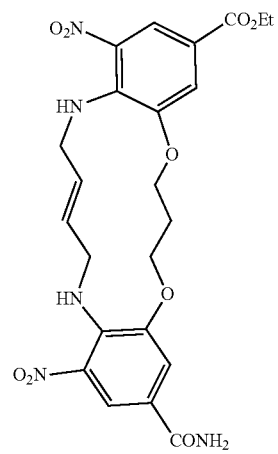 [SMILES: CCOC(=O)c1cc2c(c([N+](=O)[O-])c1)NC/C=C/CNc1c(cc(C(N)=O)cc1[N+](=O)[O-])OCCCO2]

To a stirred solution of ethyl 3-(3-(5-carbamoyl-2-chloro-3-nitrophenoxy)propoxy)-4-chloro-5-nitrobenzoate (20 g, 39.8 mmol) in a mixture of 300 mL ethanol and 100 mL THF was added (E)-but-2-ene-1,4-diamine dihydrochloride (8.23 g, 51.8 mmol) and DIPEA (41.7 ml, 239 mmol) and the reaction mixture was stirred at 120° C. for 30 h in an autoclave. The reaction mixture was then concentrated under reduced pressure and the dark red solid obtained was washed with minimum volume of ethanol followed by diethyl ether to obtain the product. (15 g, 73%). $^1$H NMR (400 MHz, DMSO-$d_6$) δ 8.36 (t, J=6.7 Hz, 1H), 8.28-8.21 (m, 2H), 8.07 (t, J=6.8 Hz, 1H), 8.01 (s, 1H), 7.63 (d, J=1.9 Hz, 1H), 7.53 (d, J=1.9 Hz, 1H), 7.33 (s, 1H), 5.74 (t, J=2.2 Hz, 2H), 4.29 (q, J=7.1 Hz, 2H), 4.21-4.08 (m, 8H), 2.23 (m, 2H), 1.31 (t, J=7.1 Hz, 3H); LCMS: m/z=515.57 (M+H)$^+$ Step-5: Ethyl (E)-1,13-diamino-11-carbamoyl-7,8,14,15,18,19-hexahydro-6H-dibenzo [b,j][1,12]dioxa[4,9]diazacyclopentadecine-3-carboxylate

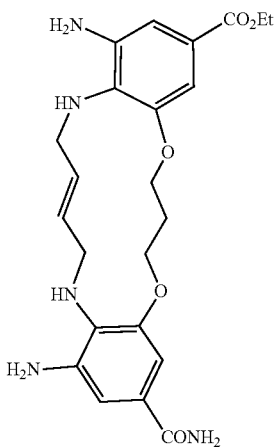 [SMILES: CCOC(=O)c1cc(N)c2c(c1)OCCCOc1cc(C(N)=O)cc(N)c1NC/C=C/CN2]

To a stirred suspension of ethyl (E)-11-carbamoyl-1,13-dinitro-7,8,14,15,18,19-hexahydro-6H-dibenzo[b,j][1,12]dioxa[4,9]diazacyclopentadecine-3-carboxylate (9.5 g, 18.43 mmol) in acetic acid (52.8 ml, 921 mmol), zinc (7.2 g, 111 mmol) powder was added portion wise at room temperature and the reaction mixture stirred for 1 h. The progress of the reaction was monitored by LCMS and after the starting material had completely converted into the product, the reaction mixture was filtered through a pad of celite. The filtrate containing the diamine in acetic acid was distilled off and the crude product was washed with diethyl ether followed by a 10% aq. NaHCO$_3$ solution. The diamine was then dried for the next reaction by azeotroping with toluene. (7.2 g, 86%). $^1$H NMR (400 MHz, DMSO-$d_6$) δ 7.63 (s, 1H), 7.02 (d, J=1.8 Hz, 1H), 6.98 (s, 1H), 6.92 (d, J=1.9 Hz, 1H), 6.90 (d, J=1.9 Hz, 1H), 6.87 (d, J=1.8 Hz, 1H), 5.53-5.36 (m, 2H), 4.82 (s, 2H), 4.66 (s, 2H), 4.23-4.08 (m, 6H), 2.28-2.16 (m, 2H), 1.29 (t, J=7.1 Hz, 3H); LCMS: m/z=456.23 (M+H)$^+$ Step-6: Ethyl (E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylate

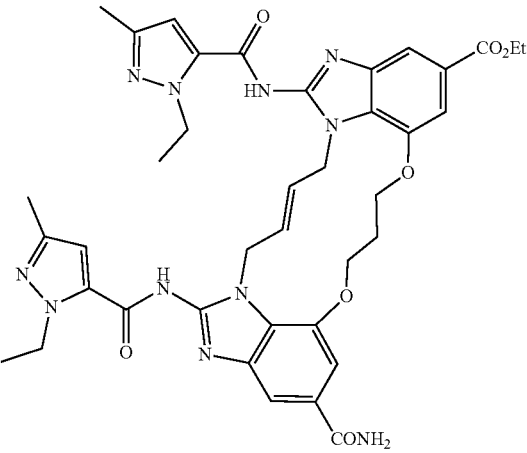 [SMILES: CCOC(=O)c1cc2c3c(c1)nc(NC(=O)c1cc(C)nn1CC)n3C/C=C/Cn1c(NC(=O)c3cc(C)nn3CC)nc3cc(C(N)=O)cc(c31)OCCCO2]

To a stirred solution of ethyl (E)-1,13-diamino-11-carbamoyl-7,8,14,15,18,19-hexahydro-6H-dibenzo[b,j][1,12]dioxa[4,9]diazacyclopentadecine-3-carboxylate (7.2 g, 15.81 mmol) in 100 mL DMF cooled to 0° C. was added 1-ethyl-3-methyl-1H-pyrazole-5-carbonyl isothiocyanate (6.17 g, 31.6 mmol). The reaction mixture was stirred at 0° C. for 30 minutes after which 3-(ethyliminomethylideneamino)-N,N-dimethylpropan-1-amine; hydrochloride (10.61 g, 55.3 mmol) followed by DIPEA (16.56 ml, 95 mmol) was added to the reaction mixture. After the addition the reaction mixture was allowed to warm to RT and stirred overnight. The DMF was then concentrated under reduced pressure and water was added to it resulting in the precipitation of the product. The precipitate was filtered and washed with water to get the crude product which was then purified by trituration with acetonitrile to get the product which was used as such in the next step. (8.5 g, 69%). LCMS: m/z=778.16 (M+H)$^+$ Step-7: (E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylic acid (Intermediate 1)

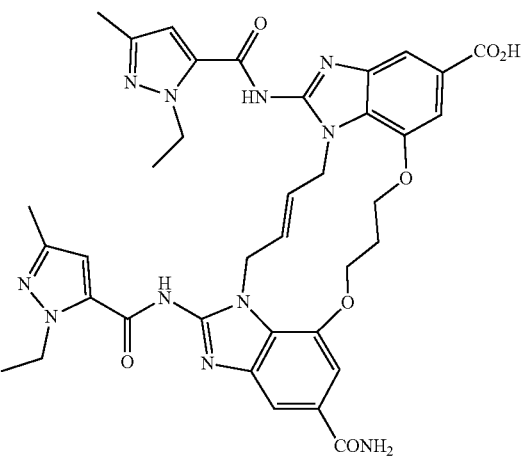 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)O)cc(c21)OCCCO3]

Ethyl (E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylate (11.5 g, 14.78 mmol) was suspended in a 1:1 mixture of 200 mL MeOH and THF and a solution of lithium hydroxide hydrate (3.10 g, 73.9 mmol) in 40 mL water was added to it resulting in the formation of a clear solution. The reaction mixture was stirred at room temperature and the progress of the hydrolysis was monitored by LCMS. After completion of the reaction, the volatiles were concentrated and 100 mL water was added. The aqueous portion was washed with diethyl ether and then acidified by the addition of 3 N HCl solution, resulting in the precipitation of the acid. The precipitate was filtered and washed with water to get the crude product which was then purified by trituration with acetonitrile. (8 g, 72%). $^1$H NMR (400 MHz, DMSO-d$_6$) δ 8.01 (s, 1H), 7.81 (s, 1H), 7.71 (s, 1H), 7.53 (d, J=7.5 Hz, 2H), 7.37 (s, 1H), 6.55 (s, 2H), 5.51 (s, 2H), 4.89 (s, 4H), 4.53 (q, J=7.1 Hz, 4H), 4.47-4.35 (m, 4H), 2.32-2.24 (m, 2H), 2.08 (s, 6H), 1.27 (t, J=7.1 Hz, 6H); LCMS: m/z=750.16 (M+H)$^+$ Synthesis of 2-(1H-tetrazol-5-yl)ethan-1-amine (Int. 2)

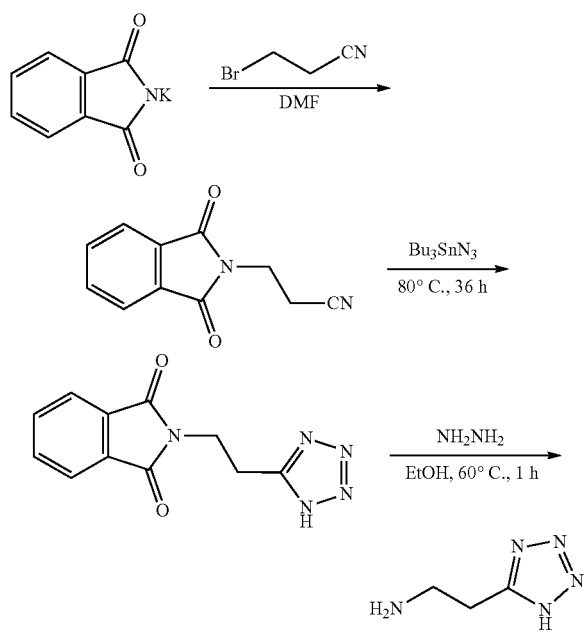

Step-1: Synthesis of 3-(1,3-dioxoisoindolin-2-yl)propanenitrile

To a stirred solution of potassium phthalimide (7 g, 37.8 mmol) in 50 mL DMF, 3-bromopropanenitrile (2.02 g, 15.12 mmol) was added and the mixture heated at 80° C. for 3 hr. After completion, the reaction was quenched by the addition of water and extracted with ethyl acetate. The organic layer was dried over Na$_2$SO$_4$ and concentrated to get the crude product which was purified on column to obtain the pure product (Yield=3.15 g, 96%). $^1$H NMR (400 MHz, CDCl$_3$) δ 7.93-7.90 (m, 2H), 7.79-7.77 (m, 2H), 4.04 (t, J=6.9 Hz, 2H), 2.83 (t, J=6.9 Hz, 2H).

Step-2: Synthesis of 2-(2-(1H-tetrazol-5-yl)ethyl)isoindoline-1,3-dione

To a solution of 3-(1,3-dioxoisoindolin-2-yl)propanenitrile (3.04 g, 15.22 mmol) in 50 mL dioxane was added azidotributyltin (10.35 ml, 37.8 mmol) and the mixture heated in a sealed tube at 80° C. for 36 hr. After completion, the reaction mixture was concentrated and diluted with ethyl acetate and the organic layer washed with brine. The organic layer was dried over Na$_2$SO$_4$ and the crude product was purified on column (Yield=2.0 g, 54%). $^1$H NMR (400 MHz, DMSO-d$_6$) δ 7.91-7.82 (m, 4H), 3.92 (t, J=6.8 Hz, 2H), 3.25 (t, J=6.8 Hz, 2H); LCMS: m/z=244.2 (M+H)$^+$ Step-3: Synthesis of 2-(1H-tetrazol-5-yl)ethan-1-amine 2-(2-(1H-tetrazol-5-yl)ethyl)isoindoline-1,3-dione (0.8 g, 3.29 mmol) was dissolved in 30 mL EtOH and hydrazine hydrate (823 mg, 16.45 mmol) was added to it and the reaction mixture heated at 60° C. for 1 hr. A white precipitate started to form which increased in amount as the reaction proceeded. The reaction mixture was then cooled to RT and filtered. The filtrate was concentrated to get the crude amine which was sufficiently pure for the next step and used as such (Yield=0.25 g, 67%). $^1$H NMR (400 MHz, DMSO-d$_6$) δ 3.04 (t, J=8.0 Hz, 2H), 2.90 (t, J=8.0 Hz, 2H); LCMS: m/z=114.07 (M+H)$^+$ Synthesis of (1R,4R)-4-(1H-tetrazol-5-yl)cyclohexan-1-amine trifluoroacetate (Int. 3a)

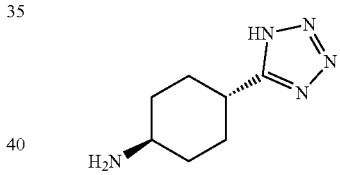

Step 1: Synthesis of tert-butyl ((1r,4r)-4-(1H-tetrazol-5-yl)cyclohexyl)carbamate Tert-butyl ((1r,4r)-4-cyanocyclohexyl)carbamate (3 g, 13.37 mmol), (Synthesized as in Journal of Medicinal Chemistry, 55(15):6866-6880; 2012), was dissolved in 40 mL DMF and sodium azide (3.48 g, 53.5 mmol) and ammonium chloride (7.15 g, 134 mmol) was added and the mixture heated in a sealed tube for 36 hr. After the completion of reaction, the mixture was filtered and the filtrate concentrated. The residue dissolved in ethyl acetate and the organic layer washed with brine. The organic layer was dried over Na$_2$SO$_4$ and concentrated to get the product (Yield=2.3 g, 63%). $^1$H NMR (400 MHz, DMSO-d$_6$) δ 6.83 (d, J=7.9 Hz, 1H), 3.30-3.21 (m, 1H), 2.93-2.82 (m, 1H), 2.09-1.99 (m, 2H), 1.96-1.83 (m, 2H), 1.53 (m, 2H), 1.39 (s, 9H), 1.37-1.22 (m, 2H); LCMS: m/z=268.46 (M+H)$^+$ Step 2: Synthesis of (1r,4r)-4-(1H-tetrazol-5-yl)cyclohexan-1-amine trifluoroacetate (Int. 3a)

Tert-butyl ((1r,4r)-4-(1H-tetrazol-5-yl)cyclohexyl)carbamate (2 g, 7.48 mmol) was dissolved in 40 mL CH$_2$Cl$_2$ and trifluoroacetic acid (8.65 ml, 112 mmol) was added and the reaction mixture stirred at room temperature for 1 h. After completion of the deprotection as monitored by TLC, the reaction mixture was evaporated to dryness and the solid was triturated with diethyl ether twice. The solid trifluoroacetate salt was filtered and washed with ether (Yield=1.1 g, 88%). $^1$H NMR (400 MHz, DMSO-$d_6$) δ 8.16-7.76 (m, 3H), 3.18-3.02 (m, 1H), 3.02-2.81 (m, 1H), 2.18-1.97 (m, 4H), 1.64-1.39 (m, 4H); LCMS: m/z=168.13 (M+H)$^+$ Synthesis of (1R,4R)-4-(1H-tetrazol-5-yl)cyclohexan-1-amine hydrochloride (Int. 3b)

Synthesized from tert-butyl ((1r,4r)-4-(1H-tetrazol-5-yl)cyclohexyl)carbamate, by following an analogous procedure described for deprotection in Step 2 as above, with replacement of trifluoroacetic acid with 4 N hydrochloric acid in dioxane (Yield=93%). $^1$H NMR (400 MHz, DMSO-$d_6$) δ 8.18 (brs, 3H), 3.12-3.00 (m, 1H), 3.00-2.89 (m, 1H), 2.09 (m, 4H), 1.67-1.45 (m, 4H); LCMS: m/z=168.13 (M+H)$^+$ Synthesis of (1S,4S)-4-(1H-tetrazol-5-yl)cyclohexan-1-amine (Int. 4)

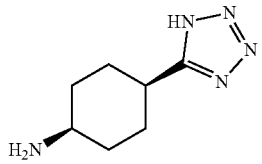 [SMILES: N[C@H]1CC[C@@H](c2nnn[nH]2)CC1]

Synthesized from tert-butyl ((1S,4S)-4-cyanocyclohexyl)carbamate (Synthesized as in PCT International Application Publication No. WO 2009145719), by following an analogous procedure described for Int. 3a as trifluoroacetate salt. (Yield=51%). LCMS: m/z=168.13 (M+H)$^+$ Synthesis of ethyl 1-(3-aminopropyl)-1H-pyrazole-4-carboxylate (Int. 5)

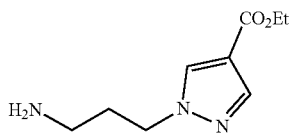

Step-1: ethyl 1-(3-(1,3-dioxoisoindolin-2-yl)propyl)-1H-pyrazole-4-carboxylate 2-(3-hydroxypropyl)isoindoline-1,3-dione (600 mg, 2.92 mmol) (Synthesized as in Angewandte Chemie, International Edition, 57(1):292-295; 2018) and ethyl 1H-pyrazole-4-carboxylate (451 mg, 3.22 mmol) was dissolved in 20 mL THF followed by the addition of triphenylphosphine (997 mg, 3.80 mmol). Diisopropyl azodicarboxylate (0.853 ml, 4.39 mmol) was added dropwise and after the addition the reaction mixture was stirred at RT for 4 hr. After completion, the reaction was quenched by the addition of water and extracted with ethyl acetate. The organic layer was dried over $Na_2SO_4$ and concentrated to get the crude product which was purified on column to obtain the pure product (Yield=400 mg, 42%). $^1$H NMR (400 MHz, $CDCl_3$) δ 8.02 (s, 1H), 7.90 (s, 1H), 7.89-7.85 (m, 2H), 7.77-7.74 (m, 2H), 4.30 (q, J=7.1 Hz, 2H), 4.21 (t, J=6.8 Hz, 2H), 3.77 (t, J=6.5 Hz, 2H), 2.33 (p, J=6.7 Hz, 2H), 1.36 (t, J=7.1 Hz, 3H); LCMS: m/z=328.3 (M+H)$^+$ Step-2: ethyl 1-(3-aminopropyl)-1H-pyrazole-4-carboxylate Synthesized from ethyl 1-(3-(1,3-dioxoisoindolin-2-yl)propyl)-1H-pyrazole-4-carboxylate obtained in Step 1, by following an analogous procedure described in Step 3 of Int. 2. (Yield=83%). $^1$H NMR (400 MHz, DMSO-$d_6$) δ 8.34 (s, 1H), 7.84 (s, 1H), 4.24-4.18 (m, 4H), 2.47 (t, J=6.6 Hz, 2H), 1.84 (m, 2H), 1.26 (t, J=7.1 Hz, 3H); LCMS: m/z=198.2 (M+H)$^+$ Synthesis of methyl 2-(aminomethyl)nicotinate hydrochloride (Int. 6)

Synthesized from methyl 2-cyanonicotinate by following the procedure reported in J. of Heterocyclic Chemistry, 1993, 30(2):473-476.

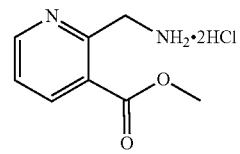

$^1$H NMR (400 MHz, DMSO-$d_6$) δ 8.84 (dd, J=4.8, 1.7 Hz, 1H), 8.51 (s, 2H), 8.38 (dd, J=7.9, 1.7 Hz, 1H), 7.62 (dd, J=7.9, 4.8 Hz, 2H), 4.52 (q, J=5.8 Hz, 2H), 3.90 (s, 3H).

Synthesis of 1-(3-aminopropyl)-1,4-dihydro-5H-tetrazol-5-one (Int. 7)

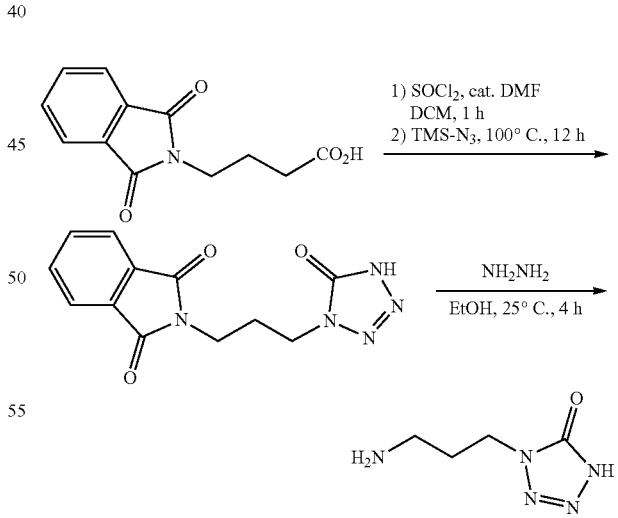

Step-1: 2-(3-(5-oxo-4,5-dihydro-1H-tetrazol-1-yl)propyl)isoindoline-1,3-dione 4-(1,3-dioxoisoindolin-2-yl)butanoic acid (1 g, 4.29 mmol) (Synthesized as in European Journal of Medicinal Chemistry, 158:184-200; 2018) was suspended in 50 mL DCM and a few drops of DMF was added to it. Thionyl chloride (0.47 ml, 6.43 mmol) was added dropwise at 0° C. and the reaction mixture was stirred at RT for 1 hr until the complete formation of acid chloride. The volatiles were then concentrated and the sticky residue azeotroped with toluene to remove any traces of excess thionyl chloride. The crude acid chloride was then dissolved in trimethylsilyl azide (4.55 ml, 34.3 mmol) and heated for 12 h at 100° C. in a sealed tube. The reaction mixture was then cooled and methanol was added resulting in precipitation of the product as a white solid (Yield=400 mg, 34%). $^1$H NMR (400 MHz, DMSO-$d_6$) δ 14.33 (brs, 1H), 7.94-7.71 (m, 4H), 3.91 (t, J=7.0 Hz, 2H), 3.64 (t, J=7.1 Hz, 2H), 2.09 (m, 2H); LCMS: m/z=274.2 (M+H)$^+$ Step-2: 1-(3-aminopropyl)-1,4-dihydro-5H-tetrazol-5-one Synthesized from 2-(3-(5-oxo-4,5-dihydro-1H-tetrazol-1-yl)propyl)isoindoline-1,3-dione obtained in Step 1, by following an analogous procedure described in Step 3 of Int. 2. (Yield=66%). $^1$H NMR (400 MHz, DMSO-$d_6$) δ 3.89-3.83 (m, 2H), 2.68-2.63 (m, 2H), 1.89-1.82 (m, 2H).

Synthesis of 3-(3-aminopropyl)-1,2,4-oxadiazol-5(4H)-one (Int. 8)

Step-2: 2-(3-(5-oxo-4,5-dihydro-1,2,4-oxadiazol-3-yl)propyl)isoindoline-1,3-dione To a solution of 4-(1,3-dioxoisoindolin-2-yl)-N-hydroxybutanimidamide (520 mg, 2.10 mmol) in 20 ml THF, CDI (443 mg, 2.73 mmol) was added and the reaction mixture heated at 80° C. for 12 hr. After the completion of reaction, the volatiles were concentrated and the residue dissolved in ethyl acetate and the organic layer washed with brine. The organic layer was dried over $Na_2SO_4$ and concentrated to get the crude product, which was sufficiently pure for the next step. $^1$H NMR (400 MHz, DMSO-$d_6$) δ 7.91-7.81 (m, 4H), 7.78 (brs, 1H), 3.63 (t, J=6.8 Hz, 2H), 2.21-2.14 (m, 2H), 1.91 (t, J=7.4 Hz, 2H); LCMS: m/z=274.21 (M+H)$^+$ Step-3: 3-(3-aminopropyl)-1,2,4-oxadiazol-5(4H)-one Synthesized from 2-(3-(5-oxo-4,5-dihydro-1,2,4-oxadiazol-3-yl)propyl)isoindoline-1,3-dione obtained in Step 2, by following an analogous procedure described in Step 3 of Int. 2. (Yield=40%). $^1$H NMR (400 MHz, DMSO-$d_6$) δ 2.83 (t, J=6.7 Hz, 2H), 2.31 (t, J=6.9 Hz, 2H), 1.75 (t, J=6.8 Hz, 2H).

Synthesis of 2-(8-oxa-3-azabicyclo[3.2.1]octan-3-yl)ethan-1-amine (Int. 9)

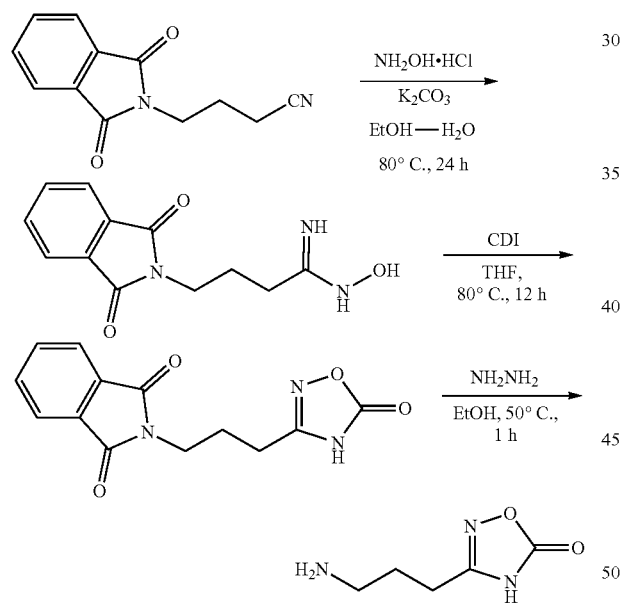

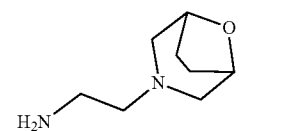

Step-1: 2-(2-(8-oxa-3-azabicyclo[3.2.1]octan-3-yl)ethyl)isoindoline-1,3-dione

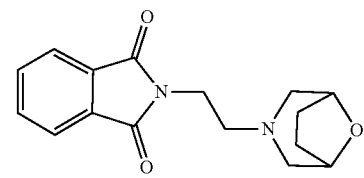 [SMILES: O=C1c2ccccc2C(=O)N1CCN1CC2CCC(C1)O2]

Step-1: Synthesis of 4-(1,3-dioxoisoindolin-2-yl)-N-hydroxybutanimidamide 4-(1,3-dioxoisoindolin-2-yl)butanenitrile (Synthesized as in J. of Organometallic Chemistry, 620(1-2):94-105; 2001) (4.5 g, 21.01 mmol) was dissolved in a mixture of 50 mL EtOH and 10 mL water. Hydroxylamine hydrochloride (3.65 g, 52.5 mmol) and $K_2CO_3$ (4.35 g, 31.5 mmol) were added and the reaction was heated for 24 hr at 80° C. after which the reaction mixture was concentrated and purified by column (Yield=600 mg, 12%). $^1$H NMR (400 MHz, DMSO-$d_6$) δ 8.74 (s, 1H), 7.94-7.81 (m, 4H), 5.36 (brs, 2H), 3.58 (t, J=7.1 Hz, 2H), 2.05-1.95 (m, 2H), 1.86-1.75 (m, 2H); LCMS: m/z=248.33 (M+H)$^+$ 2-(2-bromoethyl)isoindoline-1,3-dione (3 g, 11.81 mmol) (Org. Biomol. Chem., 9(12):4498-4506; 2011), KI (0.39 g, 2.36 mmol) and $K_2CO_3$ (3.26 g, 23.61 mmol) were added to a solution of (1R,5S)-8-oxa-3-azabicyclo[3.2.1]octane hydrochloride (1.77 g, 11.81 mmol) in 30 mL DMF at room temperature. The reaction mixture was heated at 90° C. for 12 h after which the reaction was quenched by the addition of water and extracted with ethyl acetate. The organic layer was dried over $Na_2SO_4$ and concentrated to get the crude product which was purified by column chromatography (Yield=2.5 g, 74%). $^1$H NMR (400 MHz, CDCl$_3$) δ 7.93-7.83 (m, 2H), 7.77-7.71 (m, 2H), 4.31-4.19 (m, 2H), 3.79 (t, J=6.1 Hz, 2H), 2.71-2.54 (m, 4H), 2.41-2.23 (m, 2H), 1.72-1.66 (m, 4H); LCMS: m/z=287.34 (M+H)$^+$ Step-2: 2-(8-oxa-3-azabicyclo[3.2.1]octan-3-yl)ethan-1-amine

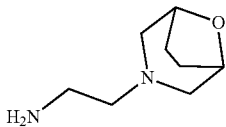

To a solution of 2-(2-(8-oxa-3-azabicyclo[3.2.1]octan-3-yl)ethyl)isoindoline-1,3-dione (1.5 g, 5.24 mmol) in 30 mL ethanol was added hydrazine (1.64 ml, 52.4 mmol) and the mixture was stirred under reflux for 1 h. The precipitated white solid was filtered off and washed with ethanol. The filtrate was concentrated under vacuum and resuspended in ethyl acetate and filtered again to remove traces of phthalimide byproduct. The filtrate upon concentration gave the product as a viscous yellow oil (Yield=0.82 g, 73%). $^1$H NMR (400 MHz, CDCl$_3$) δ 4.37-4.18 (m, 2H), 2.80-2.69 (m, 2H), 2.63-2.52 (m, 2H), 2.41 (dd, J=6.5, 5.2 Hz, 2H), 2.37-2.29 (m, 2H), 1.97-1.92 (m, 2H), 1.92-1.83 (m, 2H); GCMS: m/z=156.18 (M$^+$)

Synthesis of 3-(8-oxa-3-azabicyclo[3.2.1]octan-3-yl)propan-1-amine (Int. 10)

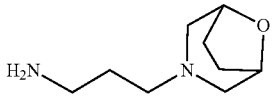

Step-1: 2-(3-(8-oxa-3-azabicyclo[3.2.1]octan-3-yl)propyl)isoindoline-1,3-dione: Synthesized from (1R,5S)-8-oxa-3-azabicyclo[3.2.1]octane hydrochloride and 2-(3-bromopropyl)isoindoline-1,3-dione (*Chem. Eur. J.*, 2014, 20(6): 1530-1538) by following an analogous procedure described in Step 1 of Int. 9. $^1$H NMR (400 MHz, CDCl$_3$) δ 7.90-7.83 (m, 2H), 7.76-7.69 (m, 2H), 4.38-4.22 (m, 2H), 3.86-3.73 (m, 2H), 2.66-2.51 (m, 2H), 2.37 (t, J=6.6 Hz, 2H), 2.32-2.18 (m, 2H), 1.95-1.77 (m, 6H); LCMS: m/z=301.34 (M+H)$^+$ Step-2: 3-(8-oxa-3-azabicyclo[3.2.1]octan-3-yl)propan-1-amine: Synthesized from 2-(3-(8-oxa-3-azabicyclo[3.2.1]octan-3-yl)propyl)isoindoline-1,3-dione obtained in Step 1, by following an analogous procedure described in Step 2 of Int. 9. $^1$H NMR (400 MHz, CDCl$_3$) δ 4.33-4.23 (m, 2H), 2.77 (t, J=6.8 Hz, 2H), 2.65-2.54 (m, 2H), 2.36 (t, J=6.9 Hz, 2H), 2.29-2.21 (m, 2H), 1.93-1.81 (m, 5H), 1.59 (p, J=6.8 Hz, 2H); GCMS: m/z=170.22 (M$^+$)

Synthesis of 4-(8-oxa-3-azabicyclo[3.2.1]octan-3-yl)butan-1-amine (Int. 11)

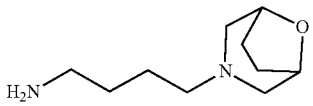

Step-1: 2-(4-(8-oxa-3-azabicyclo[3.2.1]octan-3-yl)butyl)isoindoline-1,3-dione: Synthesized from (1R,5S)-8-oxa-3-azabicyclo[3.2.1]octane hydrochloride and 2-(4-bromobutyl)isoindoline-1,3-dione (ACS Med. Chem. Lett., 2016, 7(3):245-249) by following an analogous procedure described in Step 1 of Int. 9. $^1$H NMR (400 MHz, CDCl$_3$) δ 7.86 (dd, J=5.4, 3.1 Hz, 2H), 7.74 (dd, J=5.4, 3.0 Hz, 2H), 4.39-4.21 (m, 2H), 3.72 (t, J=7.0 Hz, 2H), 2.43-2.21 (m, 3H), 2.00-1.80 (m, 3H), 1.74 (t, J=7.4 Hz, 2H), 1.70-1.59 (m, 4H), 1.58-1.40 (m, 2H); LCMS: m/z=315.40 (M+H)$^+$ Step-2: 4-(8-oxa-3-azabicyclo[3.2.1]octan-3-yl)butan-1-amine: Synthesized from 2-(4-(8-oxa-3-azabicyclo[3.2.1]octan-3-yl)butyl)isoindoline-1,3-dione obtained in Step 1, by following an analogous procedure described in Step 2 of Int. 9. $^1$H NMR (400 MHz, CDCl$_3$) δ 4.26 (dd, J=4.6, 2.3 Hz, 2H), 2.79 (t, J=6.7 Hz, 2H), 2.61-2.53 (m, 2H), 2.33-2.20 (m, 6H), 1.90 (dd, J=9.3, 2.0 Hz, 4H), 1.86-1.80 (m, 2H), 1.57-1.45 (m, 2H); LCMS: m/z=185.51 (M+H)$^+$ Synthesis of 3-(4-fluoropiperidin-1-yl)propan-1-amine (Int. 12)

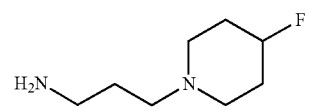 [SMILES: NCCCN1CCC(F)CC1]

Step-1: 2-(3-(4-fluoropiperidin-1-yl)propyl)isoindoline-1,3-dione: Synthesized from 4-Fluoropiperidine hydrochloride and 2-(3-bromopropyl)isoindoline-1,3-dione by following an analogous procedure described in Step 1 of Int. 9. $^1$H NMR (400 MHz, CDCl$_3$) δ 7.89-7.82 (m, 2H), 7.78-7.69 (m, 2H), 4.69-4.44 (m, 1H), 3.78 (t, J=6.9 Hz, 2H), 2.63-2.48 (m, 2H), 2.43 (t, J=6.9 Hz, 2H), 2.40-2.26 (m, 2H), 1.89 (q, J=6.9 Hz, 2H), 1.81-1.70 (m, 4H). LCMS: m/z=290.59 (M+H)$^+$ Step-2: 3-(4-fluoropiperidin-1-yl)propan-1-amine: Synthesized from 2-(3-(4-fluoropiperidin-1-yl)propyl)isoindoline-1,3-dione obtained in Step 1, by following an analogous procedure described in Step 2 of Int. 9. $^1$H NMR (400 MHz, CDCl$_3$) δ 4.69 (dt, J=50.5, 4.4 Hz, 1H), 2.77 (t, J=6.8 Hz, 2H), 2.59 (d, J=7.2 Hz, 3H), 2.47-2.29 (m, 3H), 1.95-1.85 (m, 4H), 1.73-1.59 (m, 4H). LCMS: m/z=160.28 (M+H)$^+$ Synthesis of (R)-3-(3-fluoropyrrolidin-1-yl)propan-1-amine (Int. 13)

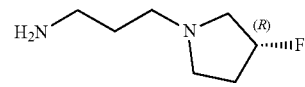

Step-1: (R)-2-(3-(3-fluoropyrrolidin-1-yl)propyl)isoindoline-1,3-dione: Synthesized from (R)-3-Fluoropyrrolidine hydrochloride and 2-(3-bromopropyl)isoindoline-1,3-dione by following an analogous procedure described in Step 1 of Int. 9. $^1$H NMR (400 MHz, CDCl$_3$) δ 7.90-7.78 (m, 2H), 7.77-7.65 (m, 2H), 5.10-5.01 (m, 1H), 3.78 (d, J=7.1 Hz, 2H), 2.89-2.64 (m, 3H), 2.60-2.54 (m, 2H), 2.40 (td, J=8.4, 6.2 Hz, 1H), 2.15-1.96 (m, 2H), 1.90 (t, J=6.8 Hz, 2H); LCMS: m/z=277.2 (M+H)$^+$ Step-2: (R)-3-(3-fluoropyrrolidin-1-yl)propan-1-amine: Synthesized from (R)-2-(3-(3-fluoropyrrolidin-1-yl)propyl)isoindoline-1,3-dione obtained in Step 1, by following an analogous procedure described in Step 2 of Int. 9. $^1$H NMR (400 MHz, CDCl$_3$) δ 5.15-5.06 (m, 1H), 3.03-2.92 (m, 1H), 2.90-2.83 (m, 1H), 2.80 (t, J=6.8 Hz, 2H), 2.69-2.65 (m, 1H), 2.58-2.48 (m, 2H), 2.47-2.36 (m, 1H), 2.25-2.14 (m, 1H), 2.13-2.06 (m, 1H), 1.69 (dq, J=8.1, 6.8 Hz, 2H); LCMS: m/z=147.3 (M+H)$^+$ Synthesis of (S)-3-(3-fluoropyrrolidin-1-yl)propan-1-amine (Int. 14)

Step-1: (S)-2-(3-(3-fluoropyrrolidin-1-yl)propyl)isoindoline-1,3-dione: Synthesized from (S)-3-Fluoropyrrolidine hydrochloride and 2-(3-bromopropyl)isoindoline-1,3-dione by following an analogous procedure described in Step 1 of Int. 9. $^1$H NMR (400 MHz, CDCl$_3$) δ 7.90-7.78 (m, 2H), 7.77-7.65 (m, 2H), 5.10-5.01 (m, 1H), 3.78 (d, J=7.1 Hz, 2H), 2.89-2.64 (m, 3H), 2.60-2.54 (m, 2H), 2.40-2.37 (m, 1H), 2.15-1.96 (m, 2H), 1.90 (t, J=6.8 Hz, 2H); LCMS: m/z=277.2 (M+H)$^+$ Step-2: (S)-3-(3-fluoropyrrolidin-1-yl)propan-1-amine: Synthesized from (S)-2-(3-(3-fluoropyrrolidin-1-yl)propyl)isoindoline-1,3-dione obtained in Step 1, by following an analogous procedure described in Step 2 of Int. 9. $^1$H NMR (400 MHz, CDCl$_3$) δ 5.15-5.06 (m, 1H), 3.03-2.92 (m, 1H), 2.90-2.83 (m, 1H), 2.80 (t, J=6.8 Hz, 2H), 2.69-2.55 (m, 1H), 2.58-2.48 (m, 2H), 2.47-2.36 (m, 1H), 2.25-2.14 (m, 1H), 2.13-2.06 (m, 1H), 1.69-1.65 (m, 2H); LCMS: m/z=147.3 (M+H)$^+$ Synthesis of 3-(4-(methylsulfonyl)piperidin-1-yl)propan-1-amine (Int. 15)

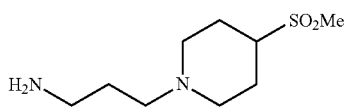 [SMILES: CS(=O)(=O)C1CCN(CCCN)CC1]

Step-1: 2-(3-(4-(methylsulfonyl)piperidin-1-yl)propyl)isoindoline-1,3-dione: Synthesized from 4-(methylsulfonyl)piperidine hydrochloride and 2-(3-bromopropyl)isoindoline-1,3-dione by following an analogous procedure described in Step 1 of Int. 9. $^1$H NMR (400 MHz, DMSO-d$_6$) δ 7.88-7.82 (m, 4H), 4.11-3.95 (m, 1H), 3.67-3.57 (m, 2H), 2.97-2.85 (m, 5H), 2.32 (t, J=6.6 Hz, 2H), 1.93-1.66 (m, 6H), 1.36-1.07 (m, 2H); LCMS: m/z=351.34 (M+H)$^+$ Step-2: 3-(4-(methylsulfonyl)piperidin-1-yl)propan-1-amine: Synthesized from 2-(3-(4-(methylsulfonyl)piperidin-1-yl)propyl)isoindoline-1,3-dione obtained in Step 1, by following an analogous procedure described in Step 2 of Int. 9. $^1$H NMR (400 MHz, DMSO-d$_6$) δ 3.05-2.86 (m, 6H), 2.66-2.54 (m, 2H), 2.31 (t, J=7.2 Hz, 2H), 2.09-1.82 (m, 4H), 1.63-1.44 (m, 4H); LCMS: m/z=221.45 (M+H)$^+$ Synthesis of 3-(3,3-difluoropyrrolidin-1-yl)propan-1-amine (Int. 16)

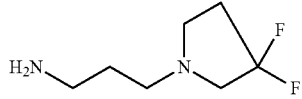 [SMILES: NCCCN1CCC(F)(F)C1]

Step-1: 2-(3-(3,3-difluoropyrrolidin-1-yl)propyl)isoindoline-1,3-dione: Synthesized from 3,3-difluoropyrrolidine hydrochloride and 2-(3-bromopropyl)isoindoline-1,3-dione by following an analogous procedure described in Step 1 of Int. 9. $^1$H NMR (400 MHz, CDCl$_3$) δ 7.93-7.82 (m, 2H), 7.79-7.70 (m, 2H), 3.80 (t, J=6.9 Hz, 2H), 2.88 (t, J=13.3 Hz, 2H), 2.71 (t, J=6.9 Hz, 2H), 2.58 (t, J=7.0 Hz, 2H), 2.16 (dq, J=14.7, 7.2 Hz, 2H), 1.88 (p, J=6.9 Hz, 2H); LCMS: m/z=295.21 (M+H)$^+$ Step-2: 3-(3,3-difluoropyrrolidin-1-yl)propan-1-amine: Synthesized from 2-(3-(3,3-difluoropyrrolidin-1-yl)propyl)isoindoline-1,3-dione obtained in Step 1, by following an analogous procedure described in Step 2 of Int. 9. $^1$H NMR (400 MHz, CDCl$_3$) δ 2.91 (t, J=13.3 Hz, 2H), 2.84-2.70 (m, 4H), 2.55 (t, J=7.2 Hz, 2H), 2.37-2.21 (m, 2H), 1.70-1.60 (m, 2H).

Synthesis of 3-(3,3-dimethylmorpholino)propan-1-amine (Int. 17)

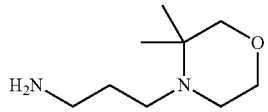

Step 1: 2-(3-(3,3-dimethylmorpholino)propyl)isoindoline-1,3-dione: Synthesized from 3,3-dimethylmorpholine (Eur. J. Org. Chem., 2011, 17:3156-3164) and 2-(3-bromopropyl)isoindoline-1,3-dione by following an analogous procedure described in Step 1 of Int. 9. $^1$H NMR (400 MHz, CDCl$_3$) δ 7.91-7.80 (m, 2H), 7.79-7.68 (m, 2H), 3.75-3.70 (m, 2H), 3.32 (s, 2H), 2.77 (t, J=6.7 Hz, 2H), 2.58-2.51 (m, 2H), 2.41 (t, J=6.8 Hz, 2H), 1.57 (p, J=6.8 Hz, 2H), 1.01 (s, 6H); LCMS: m/z=303.1 (M+H)$^+$ Step-2: 3-(3,3-dimethylmorpholino)propan-1-amine: Synthesized from 2-(3-(3,3-dimethylmorpholino)propyl)isoindoline-1,3-dione obtained in Step 1, by following an analogous procedure described in Step 2 of Int. 9. $^1$H NMR (400 MHz, CDCl$_3$) δ 3.75-3.70 (m, 2H), 3.32 (s, 2H), 2.77 (t, J=6.7 Hz, 2H), 2.58-2.51 (m, 2H), 2.41 (t, J=6.8 Hz, 2H), 1.57 (p, J=6.8 Hz, 2H), 1.01 (s, 6H); LCMS: m/z=172.95 (M+H)$^+$ Synthesis of ethyl (1S,3S)-3-aminocyclobutane-1-carboxylate (Int. 18)

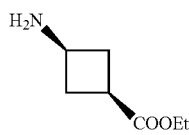

Synthesized from ethyl (1R,3R)-3-hydroxycyclobutane-1-carboxylate by following the procedure reported in WO2016/115090A1. ¹H NMR (400 MHz, Chloroform-d) δ 4.17-4.08 (m, 2H), 3.47-3.29 (m, 1H), 2.67 (tdd, J=9.4, 8.5, 7.1 Hz, 1H), 2.61-2.48 (m, 2H), 2.02-1.88 (m, 2H), 1.29-1.24 (m, 4H).

Synthesis of ethyl (1R,3R)-3-aminocyclobutane-1-carboxylate (Int. 19)

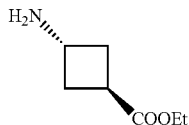

Synthesized from ethyl (1S,3S)-3-hydroxycyclobutane-1-carboxylate by following the procedure reported in WO2016/115090A1. ¹H NMR (400 MHz, DMSO-d₆) δ 4.08 (q, J=7.1 Hz, 2H), 3.58 (dtd, J=7.9, 6.9, 5.8 Hz, 1H), 3.09-3.01 (m, 1H), 2.41-2.31 (m, 2H), 2.10 (tdd, J=9.8, 6.9, 2.7 Hz, 2H), 1.19 (t, J=7.1 Hz, 3H).

Synthesis of ethyl 1-cyanocyclopropane-1-carboxylate (Int. 20)

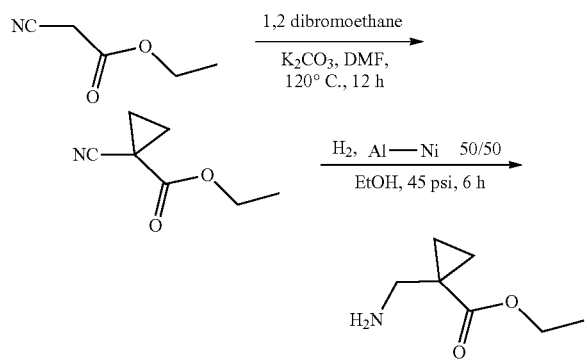

Step-1: Synthesis of ethyl 1-cyanocyclopropane-1-carboxylate 1,2-dibromoethane (19.93 g, 106 mmol) was dissolved in DMF (30 ml) and cooled to 0° C. ethyl 2-cyanoacetate (10 g, 88 mmol), K₂CO₃ (61.1 g, 442 mmol) was added and the resulting yellow slurry was stirred for 12 h at 120° C. The resulting mixture was extracted twice with ethyl acetate and the combined organic extracts were washed with water and brine and dried over sodium sulphate, filtered and concentrated to give crude material. ¹H NMR (400 MHz, Chloroform-d) δ 4.27 (q, J=7.2 Hz, 2H), 1.68 (dd, J=3.8, 3.1 Hz, 2H), 1.65-1.59 (m, 2H), 1.34 (t, J=7.1 Hz, 3H).

Step-2: Synthesis of ethyl 1-(aminomethyl)cyclopropane-1-carboxylate

To a solution of ethyl 1-cyanocyclopropane-1-carboxylate (1.0 g, 7.19 mmol) in Ethanol (Volume: 50 ml) was added Aluminum-nickel catalyst, Raney-type alloy, powder Al—Ni 50/50 (0.630 g, 7.19 mmol) (washed by ethanol several times) and stirred under H₂ pressure (45 psi) in Parr shaker for 6 h. Filtered reaction mixture through celite bed and concentrated under reduced pressure to get the crude product which was used as such. ¹H NMR (400 MHz, DMSO-d₆) δ 4.06 (dq, J=12.1, 7.1 Hz, 2H), 3.37-3.26 (m, 2H), 1.18 (q, J=7.0 Hz, 3H), 1.09 (h, J=4.0 Hz, 1H), 1.04 (q, J=3.8 Hz, 1H), 0.98-0.91 (m, 1H), 0.81 (q, J=3.8 Hz, 1H); LCMS: m/z=144.2 (M+H)⁺

Synthesis of methyl 2-(2-aminoethyl)nicotinate dihydrochloride (Int. 21)

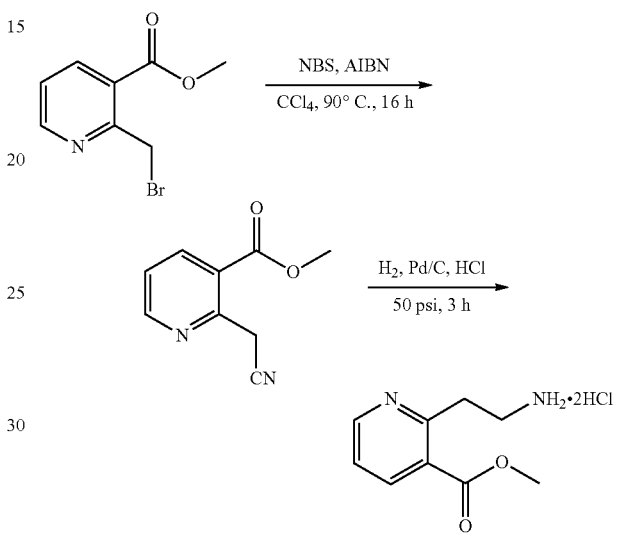

Step-1: methyl 2-(bromomethyl)nicotinate

To a stirred solution of methyl 2-methylnicotinate (4.5 g, 29.8 mmol), NBS (6.36 g, 35.7 mmol), AIBN (0.49 g, 2.98 mmol) in 50 mL carbon tetrachloride was stirred at 90° C. for 16 h under nitrogen. Once cooled, the reaction mixture was diluted with 25 mL water and the aqueous layer was extracted with dichloromethane (100 mL×2). The combined organic layers were dried over sodium sulphate and concentrated in vacuo, and the resulting residue was purified by flash chromatography using 18-20% of ethyl acetate in hexane to give the desired product as methyl 2-(bromomethyl)nicotinate (Yield=3.2 g, 47%). ¹H NMR (400 MHz, Chloroform-d) δ 8.73 (dd, J=4.8, 1.8 Hz, 1H), 8.30 (dd, J=7.9, 1.8 Hz, 1H), 7.45-7.29 (m, 1H), 5.06 (s, 2H), 4.00 (s, 3H).

Step-2: methyl 2-(cyanomethyl)nicotinate

To a stirred solution of methyl 2-(bromomethyl)nicotinate (3.0 g, 13.04 mmol), in 50 mL acetonitrile cooled to 0-5° C., was added TBAF (5.11 g, 19.56 mmol) and TMS-CN (2.59 g, 26.1 mmol) and stirred at 25-30° C. for 16 h under nitrogen. The progress of the reaction was monitored by TLC. Upon completion, the reaction mixture was diluted with 25 mL water and the aqueous layer was extracted with ethyl acetate (100 mL×2). The combined organic layers were dried over sodium sulphate and concentrated in vacuo, and the resulting residue was purified by flash chromatography using 20-40% of ethyl acetate in hexane to give the desired methyl 2-(cyanomethyl)nicotinate (Yield=1.6 g, 70%). $^1$H NMR (400 MHz, Chloroform-d) δ 8.78 (dd, J=4.8, 1.8 Hz, 1H), 8.37 (dd, J=7.9, 1.8 Hz, 1H), 7.43 (dd, J=8.0, 4.8 Hz, 1H), 4.45 (s, 2H), 3.99 (s, 3H).

Step-3: methyl 2-(2-aminoethyl)nicotinate dihydrochloride

In a parr shaker reactor, to the stirred solution of methyl 2-(cyanomethyl)nicotinate (0.50 g, 2.84 mmol) in methanol:DCM (Volume: 30 ml, Ratio: 3:1), was added Pd/C (0.302 g, 0.284 mmol) and HCl (0.35 ml, 4.26 mmol) and reaction was stirred under hydrogen pressure 50 psi for 3 h in parr shaker. Reaction was filtered through celite bed and the celite bed was washed with excess MeOH. Filtrate was conc. under reduced pressure to get methyl 2-(2-aminoethyl)nicotinate hydrochloride (Yield=0.5 g, 81%). $^1$H NMR (400 MHz, DMSO-d$_6$) δ 8.79-8.71 (m, 1H), 8.33-8.23 (m, 1H), 7.55-7.45 (m, 1H), 3.92-3.88 (m, 3H).

Synthesis of methyl 2-(3-aminopropyl)benzoate (Int. 22)

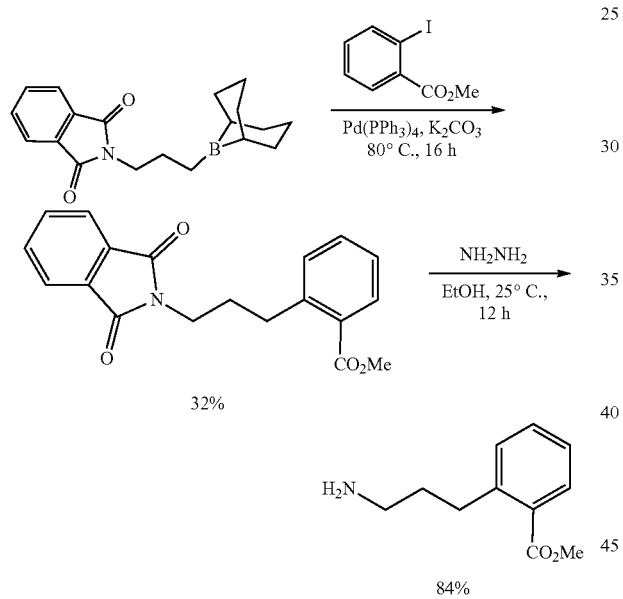

Step-1: Synthesis of methyl 2-(3-(1,3-dioxoisoindolin-2-yl)propyl)benzoate

Methyl 2-iodobenzoate (3.00 g, 11.45 mmol) was dissolved in 20 mL DMF and the solution degassed by passing nitrogen. A solution of 2-(3-(9-borabicyclo[3.3.1]nonan-9-yl)propyl)isoindoline-1,3-dione (3.54 g, 11.45 mmol) (Synthesized as in Angewandte Chemie, International Edition, 46(40), 7671-7673; 2007) in 30 mL THF was added to it, followed by the addition of tetrakis(triphenylphosphine) palladium(0) (0.66 g, 0.57 mmol) and a degassed solution of 3 M K$_2$CO$_3$ in 15 mL water. The reaction mixture was heated at 80° C. for 16 h after which it was diluted with ethyl acetate and the organic layer washed with brine. The organic layer was dried over Na$_2$SO$_4$ and the crude product was purified on column (Yield=1.2 g, 32%). $^1$H NMR (400 MHz, CDCl$_3$) δ 7.90-7.85 (m, 2H), 7.75-7.71 (m, 2H), 7.42 (td, J=7.5, 1.5 Hz, 1H), 7.31-7.23 (m, 3H), 3.86 (s, 3H), 3.80 (t, J=7.1 Hz, 2H), 3.06-2.96 (m, 2H), 2.10-1.96 (m, 2H); LCMS: m/z=323.84 (M+H)$^+$ Step-2: Synthesis of methyl 2-(3-aminopropyl)benzoate Synthesized from methyl 2-(3-(1,3-dioxoisoindolin-2-yl)propyl)benzoate obtained in Step 1, by following an analogous procedure described in Step 2 of Int. 9 (Yield=150 mg, 84%). $^1$H NMR (400 MHz, CDCl$_3$) δ 7.47-7.41 (m, 2H), 7.28-7.24 (m, 2H), 3.91 (s, 3H), 3.06-2.99 (m, 2H), 2.78 (t, J=7.0 Hz, 2H), 1.83-1.74 (m, 2H); GCMS: m/z=193.14 (M)$^+$ Synthesis of 2-(3-(4-ethoxy-4-oxido-1,4-azaphosphinan-1-yl)propyl)isoindoline-1,3-dione (Int. 23)

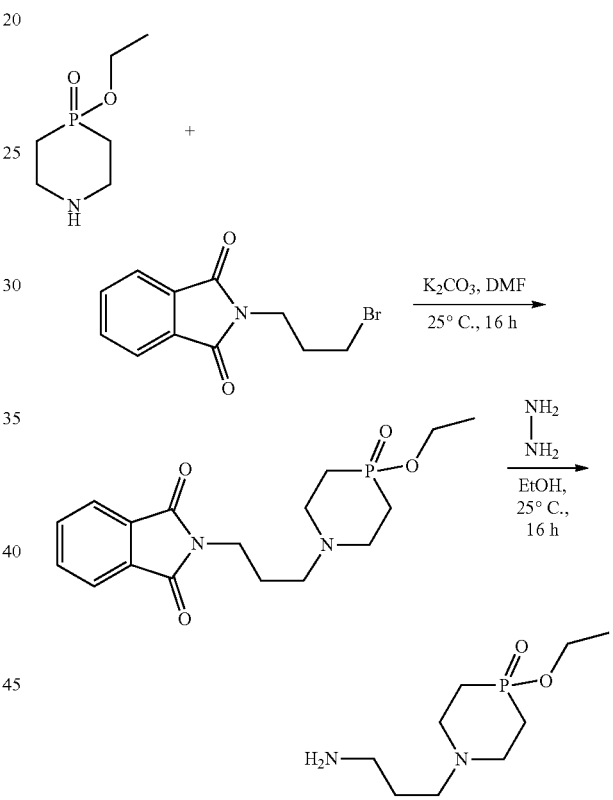

Step-1: Synthesis of 2-(3-(4-ethoxy-4-oxido-1,4-azaphosphinan-1-yl)propyl)isoindoline-1,3-dione To a solution of 4-ethoxy-1,4-azaphosphinane 4-oxide (1.50 g, 9.19 mmol) (prepared according to procedure reported in WO 2008090570) in 25 mL DMF was added Potassium carbonate (3.18 g, 22.98 mmol) and 2-(3-bromopropyl)isoindoline-1,3-dione (3.20 g, 11.95 mmol) and the reaction mixture stirred at 25° C. for 16 h. Reaction was monitored by TLC. After complete conversion, reaction mixture was concentrated to remove DMF and purified by silica gel column chromatography using 0-5% methanol in DCM to get 2-(3-(4-ethoxy-4-oxido-1,4-azaphosphinan-1-yl)propyl)isoindoline-1,3-dione (Yield=2.1 g, 65%). LCMS: 351.2 (M+H)$^+$ Step-2: Synthesis of 1-(3-aminopropyl)-4-ethoxy-1,4-azaphosphinane 4-oxide To a solution of 2-(3-(4-ethoxy-4-oxido-1,4-azaphosphinan-1-yl)propyl)isoindoline-1,3-dione (2.100 g, 5.99 mmol) in 30 mL ethanol was added hydrazine monohydrate (1.78 ml, 36.0 mmol) dropwise and the reaction mixture stirred at 25° C. for 16 h. The solid obtained was filtered through a buchner funnel and the filtrate was concentrated to get 1-(3-aminopropyl)-4-ethoxy-1,4-azaphosphinane 4-oxide (1.1 g, 4.99 mmol, 83% yield). LCMS: m/z=221.4 (M+H)$^+$ Example 1: (1S,4S)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 1)

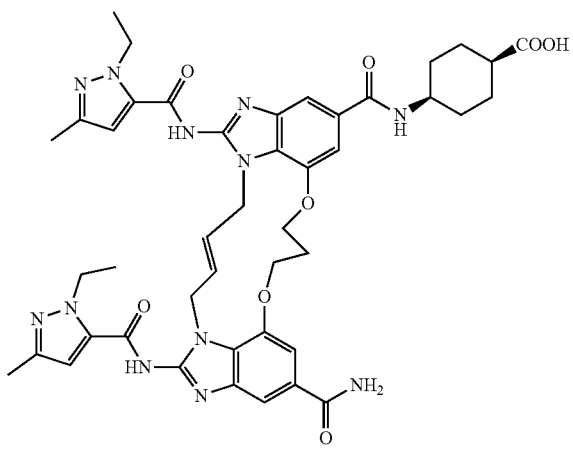 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@@H](C(=O)O)CC4)cc(c21)OCCCO3]

(E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-4-carboxylic acid (Intermediate 1) (0.25 g, 0.33 mmol) and methyl (1s,4s)-4-aminocyclohexane-1-carboxylate hydrochloride (0.08 g, 0.42 mmol) was dissolved in 10 mL DMF. TBTU (0.17 g, 0.53 mmol) followed by diisopropylethylamine (0.35 ml, 2.00 mmol) was added and the reaction mixture stirred at room temperature overnight. The DMF was then concentrated under reduced pressure and water was added to it resulting in the precipitation of the product. The precipitate was filtered and washed with water and the crude product was used as such in the next step. LCMS: m/z=889.19 (M+H)$^+$ The methyl ester (0.12 g, 0.14 mmol) was then subjected to ester hydrolysis by dissolving in a 25 mL of a mixture of THF-MeOH—H$_2$O (2:2:1) followed by the addition of LiOH (34 mg, 0.81 mmol). The reaction mixture was stirred at room temperature overnight and the volatiles concentrated followed by the addition of 2 N HCl resulting in the precipitation of the product acid. The precipitate was filtered and washed with water and purified by reverse phase preparative chromatography to obtain the final product as a white solid. (Yield=30 mg, 25%). $^1$H NMR (400 MHz, DMSO-d$_6$) 8.29-8.16 (m, 2H), 8.01 (brs, 1H), 7.71 (s, 1H), 7.70 (s, 1H), 7.54 (s, 1H), 7.49 (s, 1H), 7.39 (brs, 1H), 6.55 (s, 2H), 5.50-5.46 (m, 2H), 4.88 (brs, 4H), 4.53 (q, J=7.1 Hz, 4H), 4.48-4.37 (m, 4H), 4.21-4.00 (m, 1H), 3.94-3.81 (m, 1H), 2.33-2.25 (m, 2H), 2.12-1.96 (m, 8H), 1.74-1.64 (m, 2H), 1.64-1.48 (m, 4H), 1.26 (m, 6H); LCMS: m/z=875.06 (M+H)$^+$; HPLC Purity: 98.19%

Example 2: (1R,4R)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid sodium salt (Compound 2)

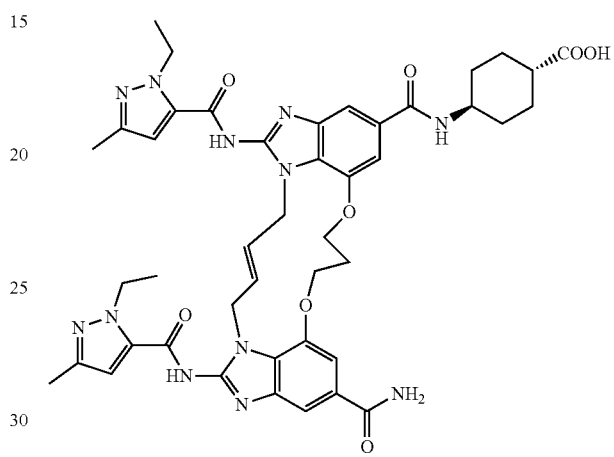

Synthesized from Intermediate 1 and methyl (1R,4R)-4-aminocyclohexane-1-carboxylate hydrochloride by following an analogous procedure described for the synthesis of Example 1.

Alternatively, the coupling was also done by using different coupling agent following the below mentioned procedure.

(E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-4-carboxylic acid (Intermediate 1) (19 g, 25.3 mmol) and methyl (1R,4R)-4-aminocyclohexane-1-carboxylate hydrochloride (6.38 g, 32.9 mmol) was dissolved in 150 mL DMSO. HOBt (11.64 g, 76 mmol) and EDC (19.43 g, 101 mmol) were added to the mixture followed by DIPEA (31.0 ml, 177 mmol) and the reaction stirred at RT for 18 h. After completion of the reaction as monitored by LCMS, the mixture was poured into water with stirring resulting in the precipitation of the crude product as a solid which was washed with acetonitrile followed by diethyl ether and dried. The crude product was column purified to remove polar impurities followed by solvent treatment after suspending in 1 L of THF-MeOH (1:1) and heating to 70° C. for 1 h. After cooling to room temperature the solid was filtered to obtain the purified product (Yield=15 g, 67%).

The methyl ester (15 g, 16.87 mmol) was then subjected to ester hydrolysis by dissolving in a 325 mL of a mixture of THF-MeOH—H$_2$O (2:2:1) followed by the addition of LiOH (5.67 g, 135 mmol). The reaction mixture was stirred at room temperature overnight and the volatiles concentrated followed by the addition of 2 N HCl resulting in the precipitation of the product acid. The precipitate was filtered and washed with water to obtain the final product as a white solid. (Yield=13 g, 88%).

The acid (11.7 g, 13.37 mmol) was then converted to its sodium salt by suspending it in 300 mL methanol and adding sodium bicarbonate (1.11 g, 13.24 mmol) dissolved in 60 mL of water. The heterogeneous mixture was stirred at RT for 1 h, by which time the suspension had cleared off into a milky solution. The volatiles were concentrated and the residue lyophilised to obtain the sodium salt of the title compound (Yield=11 g, 92%).

$^1$H NMR (400 MHz, DMSO-d$_6$) δ 8.13 (brs, 1H), 7.94 (brs, 1H), 7.70 (m, 2H), 7.47 (s, 1H), 7.42 (s, 1H), 7.28 (brs, 1H), 6.48 (s, 2H), 5.56-5.38 (m, 2H), 4.88 (brs, 4H), 4.53 (q, J=7.1 Hz, 4H), 4.43-4.36 (m, 4H), 3.81-3.70 (m, 1H), 2.31-2.24 (m, 2H), 2.07 (s, 6H), 2.05-2.00 (m, 1H), 1.97-1.85 (m, 4H), 1.43-1.32 (m, 4H), 1.24 (t, J=7.1 Hz, 6H); LCMS: m/z=875.18 (M+H)$^+$; HPLC Purity: 99.02%

Example 3: (E)-N-(3-(1H-tetrazol-5-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-4,12-dicarboxamide sodium salt (Compound 3)

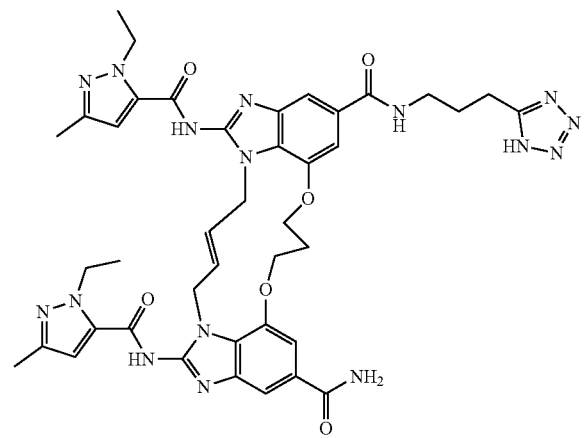 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCc4nnn[nH]4)cc(c21)OCCCO3]

(E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-4-carboxylic acid (Intermediate 1) (0.35 g, 0.47 mmol) and 3-(1H-tetrazol-5-yl)propan-1-amine (Synthesized as in Synth. Commun., 2000, 30(9), 1587-1591) (0.16 g, 1.35 mmol) was dissolved in 10 mL DMF. TBTU (0.22 g, 0.7 mmol) followed by diisopropylethylamine (0.33 ml, 1.86 mmol) was added and the reaction mixture stirred at room temperature overnight. The DMF was then concentrated under reduced pressure and water was added to it resulting in the precipitation of the product. The precipitate was filtered and washed with water and the crude product was purified by reverse phase preparative chromatography to obtain the pure product as off white solid. The isolated compound was then converted to its sodium salt as outlined in Example 2 (Yield=72 mg, 19%). $^1$H NMR (400 MHz, DMSO-d$_6$) δ 12.87 (brs, 1H), 9.04 (brs, 1H), 8.01 (brs, 1H), 7.77-7.68 (m, 2H), 7.63-7.48 (m, 2H), 7.36 (brs, 1H), 6.54 (s, 2H), 5.58-5.34 (m, 2H), 4.89 (brs, 4H), 4.57-4.50 (m, 6H), 4.46-4.39 (m, 2H), 3.42-3.38 (m, 2H), 2.75 (t, J=7.1 Hz, 2H), 2.32-2.25 (m, 2H), 2.08 (s, 6H), 1.95-1.84 (m, 2H), 1.26 (t, J=6.5 Hz, 6H); LCMS: m/z=858.93 (M+H)$^+$; HPLC Purity: 99.74%

Example 4: (E)-N-(2-(1H-tetrazol-5-yl)ethyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-4,12-dicarboxamide (Compound 4)

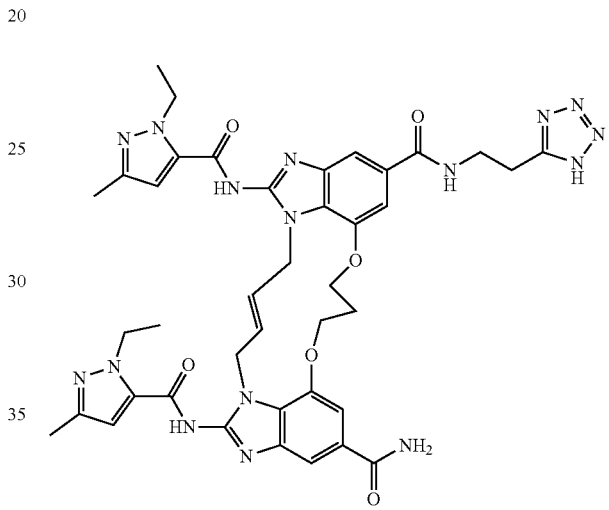

(E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-4-carboxylic acid (Intermediate 1) (0.35 g, 0.47 mmol) and 2-(1H-tetrazol-5-yl)ethan-1-amine (0.16 g, 1.4 mmol) (Int. 2) was dissolved in 10 mL DMF. TBTU (0.22 g, 0.7 mmol) followed by diisopropylethylamine (0.33 ml, 1.86 mmol) was added and the reaction mixture stirred at room temperature overnight. The DMF was then concentrated under reduced pressure and water was added to it resulting in the precipitation of the product. The precipitate was filtered and washed with water and the crude product was purified by reverse phase preparative chromatography to obtain the pure product as off white solid (Yield=35 mg, 9%). $^1$H NMR (400 MHz, DMSO-d$_6$) δ 12.90 (brs, 2H), 8.67 (t, J=5.7 Hz, 1H), 8.06-7.96 (m, 1H), 7.71 (s, 1H), 7.67 (s, 1H), 7.53 (s, 1H), 7.45 (s, 1H), 7.38 (s, 1H), 6.55 (s, 2H), 5.49 (s, 2H), 4.88 (s, 4H), 4.53 (m, 4H), 4.42 (q, J=6.0 Hz, 4H), 3.65 (q, J=6.7 Hz, 3H), 3.17-3.14 (m, 2H), 2.35-2.26 (m, 2H), 2.08 (s, 6H), 1.29-1.23 (m, 6H); LCMS: m/z=845.05 (M+H)$^+$; HPLC Purity: 99.78%

Example-5: (E)-2-(2-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)ethyl)benzoic acid sodium salt (Compound 5)

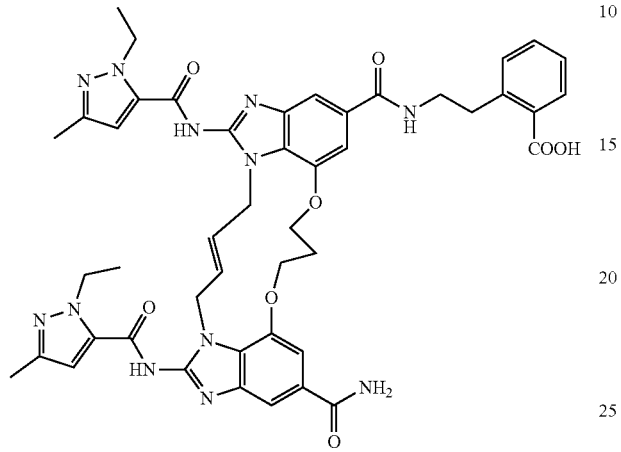

(E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylic acid (Intermediate 1) (4.2 g, 5.60 mmol) and methyl 2-(2-aminoethyl)benzoate hydrochloride (Synthesized as reported in Angewandte Chemie, International Edition, 56(43), 13351-13355; 2017) (1.81 g, 8.40 mmol) was dissolved in 20 mL DMF. TBTU (5.40 g, 16.80 mmol) followed by diisopropylethylamine (3.91 ml, 22.41 mmol) was added and the reaction mixture stirred at room temperature overnight. The DMF was then concentrated under reduced pressure and water was added to it resulting in the precipitation of the product. The precipitate was filtered and washed with water and the crude product was purified by reverse phase preparative chromatography to obtain the methyl ester intermediate (Yield=1.1 g, 22%). LCMS: m/z=911.06 (M+H)$^+$ The methyl ester (1.05 g, 1.15 mmol) was then subjected to ester hydrolysis by dissolving in a 45 mL of a mixture of THF-MeOH—H$_2$O (3:3:1) followed by the addition of LiOH (0.193 g, 8.07 mmol). The reaction mixture was stirred at room temperature overnight and the volatiles concentrated followed by the addition of 2 N HCl resulting in the precipitation of the product acid. The precipitate was filtered and washed with water to obtain the final product as a white solid (0.99 g, 96%) and converted to its sodium salt by following the procedure as outlined in Example 2. $^1$H NMR (400 MHz, DMSO-d$_6$) δ 12.81 (brs, 2H), 11.45 (brs, 1H), 8.32 (brs, 1H), 7.70 (s, 1H), 7.65-7.54 (m, 3H), 7.54-7.45 (m, 1H), 7.31 (brs, 1H), 7.23-7.14 (m, 2H), 7.13-7.04 (m, 1H), 6.53 (s, 2H), 5.50 (brs, 2H), 4.87 (brs, 4H), 4.56-4.42 (m, 8H), 3.49-3.43 (m, 2H), 3.11-3.01 (m, 2H), 2.36-2.33 (m, 2H), 2.08 (s, 6H), 1.26 (t, J=7.7 Hz, 6H); LCMS: m/z=897.06 (M+H)$^+$; HPLC Purity: 99.04%

Example-6: (E)-N-((1R,4R)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide sodium salt (Compound 6)

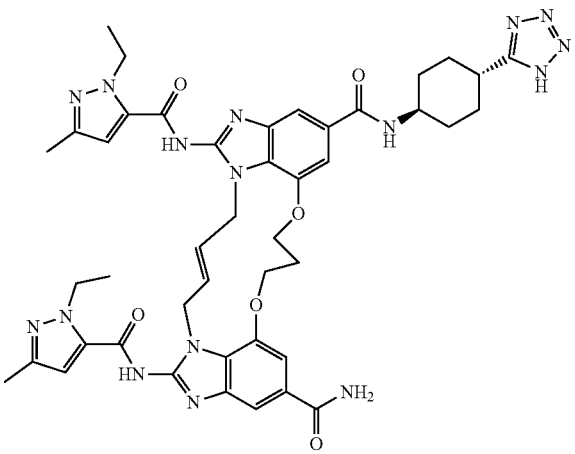 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@H](c5nnn[nH]5)CC4)cc(c21)OCCCO3]

Synthesized from Intermediate 1 and (1R,4R)-4-(1H-tetrazol-5-yl)cyclohexan-1-amine trifluoroacetate (Int. 3a) by following an analogous procedure described for the synthesis of Example-1 and converted to its sodium salt by following the procedure as outlined in Example 2. (Yield=60 mg, 14%). $^1$H NMR (400 MHz, DMSO-d$_6$) δ 12.89 (brs, 2H), 8.31 (d, J=7.8 Hz, 1H), 8.01 (brs, 1H), 7.71 (s, 2H), 7.54 (d, J=1.4 Hz, 1H), 7.51 (d, J=1.4 Hz, 1H), 7.39 (brs, 1H), 6.55 (s, 2H), 5.49 (s, 2H), 4.89 (s, 4H), 4.53 (d, J=7.3 Hz, 4H), 4.44 (d, J=5.3 Hz, 4H), 3.96-3.82 (m, 1H), 2.98 (t, J=11.8 Hz, 1H), 2.33-2.27 (m, 2H), 2.17-2.09 (m, 3H), 2.08 (s, 6H), 2.05-1.97 (m, 2H), 1.70-1.52 (m, 4H), 1.27 (t, J=7.1 Hz, 6H)); LCMS: m/z=899.9 (M+H)$^+$; HPLC Purity: 99.22%

Example-7: (E)-N-((1S,4S)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 7)

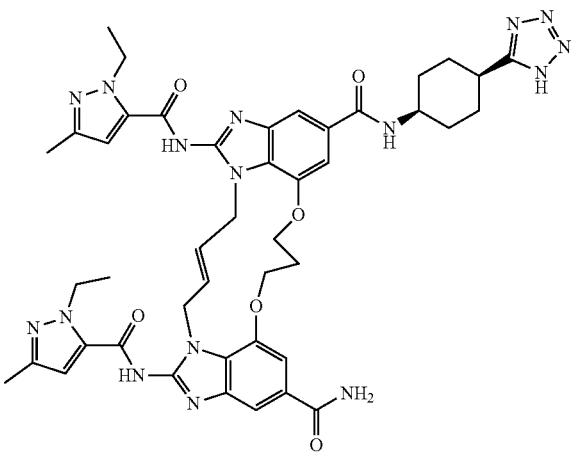 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@@H](c5nnn[nH]5)CC4)cc(c21)OCCCO3]

Synthesized from Intermediate 1 and (1S,4S)-4-(1H-tetrazol-5-yl)cyclohexan-1-amine trifluoroacetate (Int. 4) by following an analogous procedure described for the synthesis of Example-1. (Yield=15 mg, 8%). $^1$H NMR (400 MHz, DMSO-d$_6$) δ 12.88 (brs, 2H), 8.19-8.13 (m, 1H), 8.00 (brs, 1H), 7.71 (s, 1H), 7.68 (s, 1H), 7.53 (d, J=1.4 Hz, 1H), 7.46 (d, J=1.4 Hz, 1H), 7.38 (brs, 1H), 6.54 (s, 2H), 5.47 (d, J=1.9 Hz, 2H), 4.88 (s, 4H), 4.52 (d, J=7.4 Hz, 4H), 4.41 (dt, J=11.5, 5.5 Hz, 4H), 4.05-3.88 (m, 1H), 3.06-2.91 (m, 1H), 2.33-2.19 (m, 4H), 2.08 (s, 6H), 1.96-1.85 (m, 2H), 1.79-1.69 (m, 2H), 1.65-1.53 (m, 2H), 1.30-1.24 (m, 6H); LCMS: m/z=899.19 (M+H)$^+$; HPLC Purity: 98.38%

Example-8: (E)-1-(3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid sodium salt (Compound 8)

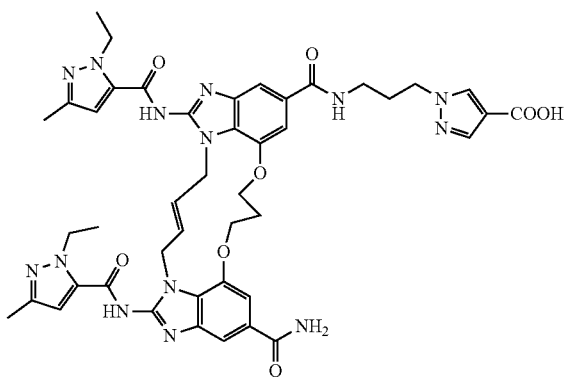 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCn4cc(C(=O)O)cn4)cc(c21)OCCCO3]

Synthesized from Intermediate 1 and ethyl 1-(3-aminopropyl)-1H-pyrazole-4-carboxylate (Int. 5) by following an analogous procedure described for the synthesis of Example-1 and converted to its sodium salt by following the procedure as outlined in Example 2. (Yield=650 mg, 11%). 1H NMR (400 MHz, DMSO-d$_6$) δ 12.85 (brs, 2H), 8.55 (t, J=5.4 Hz, 1H), 8.29 (s, 1H), 8.02 (s, 1H), 7.81 (s, 1H), 7.71 (d, J=1.2 Hz, 1H), 7.69 (d, J=1.2 Hz, 1H), 7.53 (d, J=1.3 Hz, 1H), 7.48 (d, J=1.4 Hz, 1H), 7.38 (s, 1H), 6.55 (s, 2H), 5.50 (d, J=1.8 Hz, 2H), 4.89 (s, 4H), 4.53 (q, J=7.1 Hz, 4H), 4.43 (q, J=4.9 Hz, 4H), 4.22 (t, J=6.7 Hz, 2H), 3.28-3.23 (m, 2H), 2.55-2.52 (m, 2H), 2.34-2.24 (m, 2H), 2.08 (s, 6H), 1.27 (t, J=7.1 Hz, 6H); LCMS: m/z=901.19 (M+H)$^+$; HPLC Purity: 99.36%

Example-9: (E)-2-((4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxamido)methyl)nicotinic acid (Compound 9)

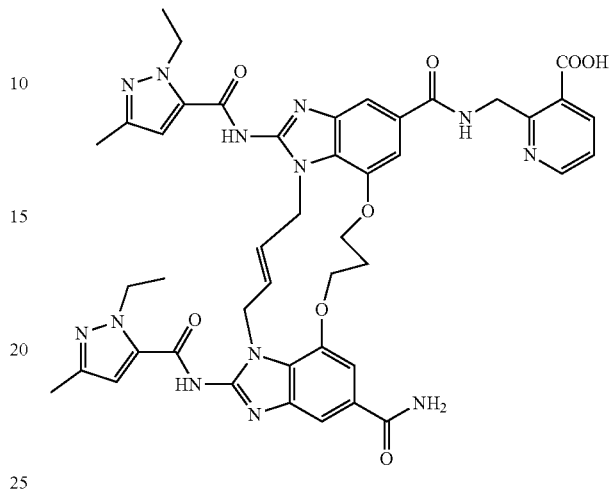

Synthesized from Intermediate 1 and methyl 2-(aminomethyl)nicotinate hydrochloride (Int. 6) by following an analogous procedure described for the synthesis of Example-1 (Yield=12 mg, 5.2%). $^1$H NMR (400 MHz, DMSO-d$_6$) δ 12.91 (s, 2H), 9.04 (s, 1H), 8.68-8.61 (m, 1H), 8.21 (dd, J=7.8, 1.8 Hz, 1H), 8.15 (s, 1H), 8.01 (s, 1H), 7.72 (d, J=5.2 Hz, 2H), 7.56 (d, J=13.1 Hz, 2H), 7.46-7.35 (m, 2H), 6.55 (s, 2H), 5.50 (s, 2H), 4.92 (d, J=18.5 Hz, 6H), 4.54 (d, J=7.4 Hz, 4H), 4.44 (s, 4H), 2.33-2.28 (m, 2H), 2.08 (s, 6H), 1.28-1.20 (m, 6H). LCMS: m/z=883.93 (M+H)$^+$; HPLC Purity: 99.04%

Example-10: (E)-1,15-bis(1-ethyl-3-methyl-1H-pyrazole-5-carboxamido)-N-(3-(5-oxo-4,5-dihydro-1H-tetrazol-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 10)

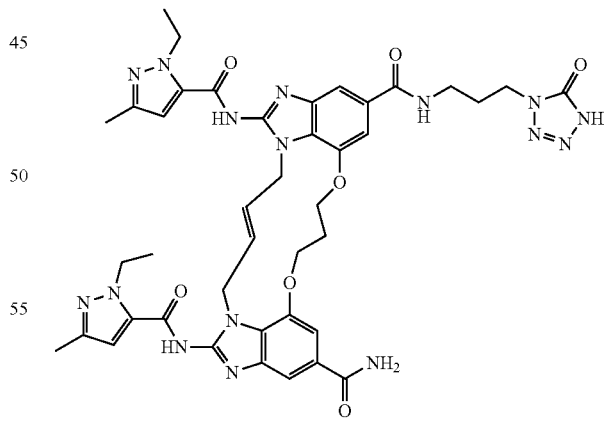

Synthesized from Intermediate 1 and 1-(3-aminopropyl)-1,4-dihydro-5H-tetrazol-5-one (Int. 7) by following an analogous procedure described for the synthesis of Example-1 (Yield=16 mg, 8%). $^1$H NMR (400 MHz, DMSO-d$_6$) δ 12.90 (brs, 2H), 8.62 (t, J=5.6 Hz, 1H), 8.01 (brs, 1H), 7.71 (s, 1H), 7.69 (s, 1H), 7.54 (d, J=1.4 Hz, 1H), 7.50 (s, 1H), 7.38 (brs, 1H), 6.55 (s, 2H), 5.50 (s, 2H), 4.89 (s, 4H), 4.53 (q, J=7.1 Hz, 4H), 4.43 (t, J=5.2 Hz, 4H), 3.94

(t, J=7.0 Hz, 2H), 3.40-3.36 (m, 2H), 2.34-2.25 (m, 2H), 2.07 (s, 6H), 1.99 (q, J=7.0 Hz, 2H), 1.27 (t, J=7.1 Hz, 6H); LCMS: m/z=875.06 (M+H)+; HPLC Purity: 99.70%

Example-11: (E)-1,15-bis(1-ethyl-3-methyl-1H-pyrazole-5-carboxamido)-N-(3-(5-oxo-4,5-dihydro-1,2,4-oxadiazol-3-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 11)

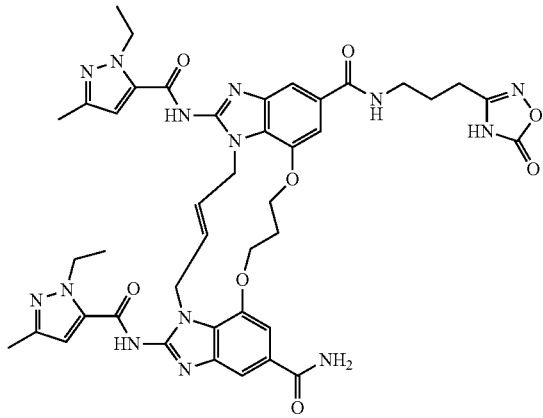 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCc4noc(=O)[nH]4)cc(c21)OCCCO3]

Synthesized from Intermediate 1 and 3-(3-aminopropyl)-1,2,4-oxadiazol-5(4H)-one (Int. 8) by following an analogous procedure described for the synthesis of Example-1 (Yield=12 mg, 7%). ¹H NMR (400 MHz, DMSO-$d_6$) δ 12.90 (brs, 2H), 8.63 (t, J=5.6 Hz, 1H), 8.01 (brs, 1H), 7.78-7.68 (m, 2H), 7.53 (s, 1H), 7.49 (s, 1H), 7.38 (brs, 1H), 6.55 (s, 2H), 5.50 (s, 2H), 4.89 (s, 4H), 4.54 (t, J=7.3 Hz, 4H), 4.44 (brs, 4H), 3.38-3.31 (m, 2H), 2.56-2.53 (m, 2H), 2.34-2.24 (m, 2H), 2.08 (s, 6H), 1.87 (m, 2H), 1.27 (t, J=7.1 Hz, 6H); LCMS: m/z=875.06 (M+H)+; HPLC Purity: 97.09%

Example 12: (8S,E)-N4-((1R,4S)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide sodium salt (Compound 12)

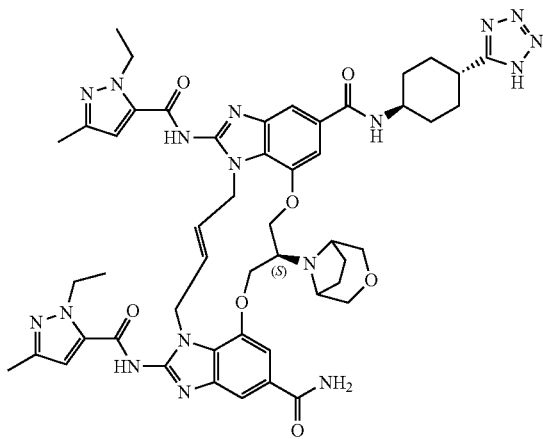

Step 1: Synthesis of ethyl 4-chloro-3-(3-hydroxy-2-(methoxymethoxy)propoxy)-5-nitrobenzoate

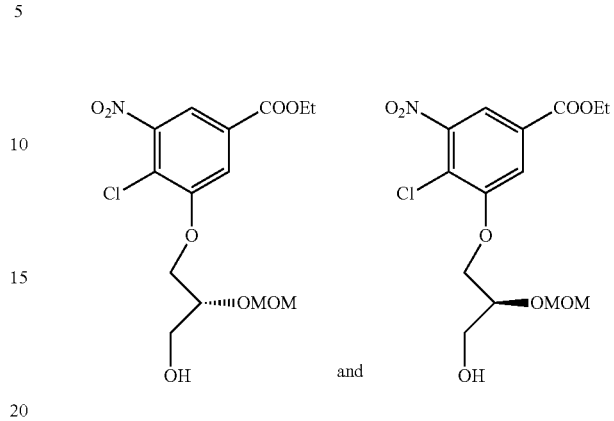

To a cooled solution of ethyl 4-chloro-3-hydroxy-5-nitrobenzoate (50 g, 204 mmol), 2-(methoxymethoxy)propane-1,3-diol (55.4 g, 407 mmol), triphenylphosphine (107 g, 407 mmol)) in THF (400 ml) was added DIAD (79 ml, 407 mmol), dropwise and reaction mixture was stirred at 25° C. for 2 h. Progress of reaction was monitored by TLC and after completion it was concentrated under reduced pressure to get crude material. Crude product was purified by column chromatography to get the desired product as mixture of enantiomers. Further, enantiomers were separated by chiral preparative HPLC as Peak1 (RT: 6.47) and Peak 2 (RT: 7.22) by using Chiral Pak IG 30×250 mm 5µ.

Peak 1: ethyl 4-chloro-3-(3-hydroxy-2-(methoxymethoxy)propoxy)-5-nitrobenzoate (Enantiomer 1, 15.5 gm, 36.9%)

¹H NMR (400 MHz, Chloroform-d) δ 8.06 (d, J=1.8 Hz, 1H), 7.80 (d, J=1.8 Hz, 1H), 4.90-4.82 (m, 2H), 4.44 (q, J=7.1 Hz, 2H), 4.30 (d, J=5.4 Hz, 2H), 4.14 (m, 1H), 3.93 (dd, J=12.0, 3.7 Hz, 1H), 3.85 (dd, J=12.0, 5.4 Hz, 1H), 3.48 (s, 3H), 1.44 (t, J=7.1 Hz, 3H); LCMS: m/z 362 [M+H]+

Peak 2: ethyl 4-chloro-3-(3-hydroxy-2-(methoxymethoxy)propoxy)-5-nitrobenzoate (Enantiomer 2, 12.6 gm, 29.5%)

¹H NMR (400 MHz, Chloroform-d) δ 8.06 (d, J=1.8 Hz, 1H), 7.80 (d, J=1.8 Hz, 1H), 4.90-4.82 (m, 2H), 4.44 (q, J=7.1 Hz, 2H), 4.30 (d, J=5.4 Hz, 2H), 4.14 (m, 1H), 3.93 (dd, J=12.0, 3.7 Hz, 1H), 3.85 (dd, J=12.0, 5.4 Hz, 1H), 3.48 (s, 3H), 1.44 (t, J=7.1 Hz, 3H); LCMS: m/z 362 [M+H]+

Step 2: Synthesis of tert-butyl 4-chloro-3-(3-(2-chloro-5-(ethoxycarbonyl)-3-nitrophenoxy)-2-(methoxymethoxy)propoxy)-5-nitrobenzoate

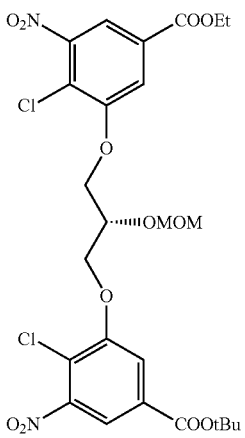

To a cooled solution of tert-butyl 4-chloro-3-hydroxy-5-nitrobenzoate (7.52 g, 27.5 mmol), ethyl 4-chloro-3-(3-hydroxy-2-(methoxymethoxy)propoxy)-5-nitrobenzoate (Enantiomer 1 of Step 1, 10.0 g, 27.5 mmol), triphenylphosphine (10.82 g, 41.2 mmol)) in THF (200 ml) was added DIAD (10.69 ml, 55.0 mmol), dropwise and reaction mixture was stirred at 25° C. for 2 hrs. Progress of reaction was monitored by TLC and after completion it was concentrated under reduced pressure to get crude material. Which was purified by column chromatography to get the desired product (8.89 gm, yield: 70.2%).

$^1$H NMR (400 MHz, DMSO-$d_6$) δ 8.10 (d, J=1.8 Hz, 1H), 8.04 (d, J=1.7 Hz, 1H), 7.90 (d, J=1.8 Hz, 1H), 7.84 (d, J=1.8 Hz, 1H), 4.83 (s, 2H), 4.58 (m, 2H), 4.49 (dd, J=10.4, 5.6 Hz, 2H), 4.43 (q, J=4.4 Hz, 1H), 4.38 (q, J=7.1 Hz, 2H), 3.34 (s, 3H), 1.57 (s, 9H), 1.35 (t, J=7.1 Hz, 3H).

Step 3: Synthesis of tert-butyl (S)-4-chloro-3-(3-(2-chloro-5-(ethoxycarbonyl)-3-nitrophenoxy)-2-hydroxypropoxy)-5-nitrobenzoate

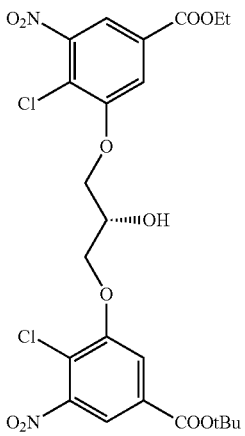

To a cooled solution of tert-butyl-4-chloro-3-(3-(2-chloro-5-(ethoxycarbonyl)-3-nitrophenoxy)-2-(methoxymethoxy)propoxy)-5-nitrobenzoate (Step 2, 12 g, 19.37 mmol), carbon tetrabromide (1.285 g, 3.87 mmol), triphenyl phosphine (1.016 g, 3.87 mmol)) in dichloroethane (200 ml) was added and reaction mixture was stirred at 60° C. for 4 hrs. Progress of reaction was monitored by TLC and after completion it was concentrated and purified by column chromatography to get the desired product (7.99 gm, yield: 72.4%).

$^1$H NMR (400 MHz, Chloroform-d) δ 8.10 (d, J=1.8 Hz, 1H), 8.00 (d, J=1.8 Hz, 1H), 7.85 (d, J=1.8 Hz, 1H), 7.81 (d, J=1.8 Hz, 1H), 4.60 (q, J=5.1 Hz, 1H), 4.51-4.40 (m, 6H), 1.63 (s, 9H), 1.44 (t, J=7.2 Hz, 3H).

Confirmation of absolute stereochemistry for tert-butyl (S)-4-chloro-3-(3-(2-chloro-5-(ethoxycarbonyl)-3-nitrophenoxy)-2-hydroxypropoxy)-5-nitrobenzoate by its synthesis from (S)-oxiran-2-ylmethanol Synthesis of tert-butyl (S)-4-chloro-3-(3-(2-chloro-5-(ethoxycarbonyl)-3-nitrophenoxy)-2-hydroxypropoxy)-5-nitrobenzoate

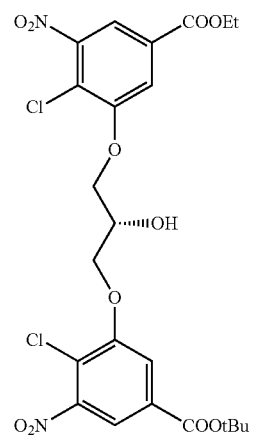

To a cooled solution of ethyl 4-chloro-3-hydroxy-5-nitrobenzoate (2.0 g, 8.14 mmol), (S)-oxiran-2-ylmethanol (0.603 g, 8.14 mmol), triphenylphosphine (4.27 g, 16.29 mmol)) in THF (150 ml) was added DIAD (3.17 ml, 16.29 mmol), dropwise and reaction was stirred at 25° C. for 2 hrs. Progress of reaction was monitored by TLC and after completion it was concentrated to get crude material. Crude product was purified by column chromatography to get ethyl (R)-4-chloro-3-nitro-5-(oxiran-2-ylmethoxy)benzoate (1.4 gm, yield: 57%).

$^1$H NMR (400 MHz, Chloroform-d) δ 8.07 (d, J=1.7 Hz, 1H), 7.83 (d, J=1.8 Hz, 1H), 4.51 (dd, J=11.2, 2.6 Hz, 1H), 4.44 (q, J=7.1 Hz, 2H), 4.16 (dd, J=11.2, 5.6 Hz, 1H), 3.54-3.42 (m, 1H), 2.99 (t, J=4.5 Hz, 1H), 2.89 (dd, J=4.8, 2.6 Hz, 1H), 1.44 (t, J=7.1 Hz, 3H).

To a solution of tert-butyl 4-chloro-3-hydroxy-5-nitrobenzoate (1.524 g, 5.57 mmol), ethyl (R)-4-chloro-3-nitro-5-(oxiran-2-ylmethoxy)benzoate (1.4 g, 4.64 mmol), 2,6-lutidine (1.622 ml, 13.92 mmol)) in IPA 100 ml was added and reaction mixture was stirred at 100° C. for 12 hr in a sealed tube. Progress of reaction was monitored by TLC and after completion it was concentrated under reduced pressure to get crude material, which was purified by column chromatography to get tert-butyl (S)-4-chloro-3-(3-(2-chloro-5-

(ethoxycarbonyl)-3-nitrophenoxy)-2-hydroxypropoxy)-5-nitrobenzoate (2.2 gm, Yield: 75%).

Absolute stereochemistry of step 3 product was confirmed by running chiral HPLC with this product (tert-butyl (S)-4-chloro-3-(3-(2-chloro-5-(ethoxycarbonyl)-3-nitrophenoxy)-2-hydroxypropoxy)-5-nitrobenzoate), as for both the products RT in chiral HPLC (Chiral Pak IG 30×250 mm 5μ) was same (RT: 9.99) whereas RT of its (R) enantiomer was 11.13.

$^1$H NMR (400 MHz, Chloroform-d) δ 8.10 (d, J=1.8 Hz, 1H), 8.00 (d, J=1.8 Hz, 1H), 7.85 (d, J=1.8 Hz, 1H), 7.81 (d, J=1.8 Hz, 1H), 4.60 (q, J=5.1 Hz, 1H), 4.49-4.39 (m, 6H), 1.63 (s, 9H), 1.45 (t, J=7.1 Hz, 3H).

Step 4: Synthesis of tert-butyl (S)-4-chloro-3-(3-(2-chloro-5-(ethoxycarbonyl)-3-nitrophenoxy)-2-(((trifluoromethyl)sulfonyl)oxy)propoxy)-5-nitrobenzoate

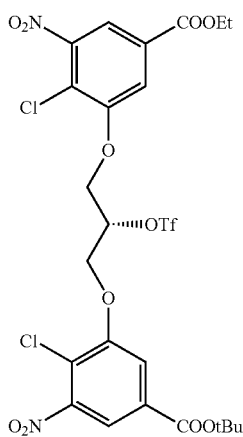

To a cooled solution of tert-butyl (S)-4-chloro-3-(3-(2-chloro-5-(ethoxycarbonyl)-3-nitrophenoxy)-2-hydroxypropoxy)-5-nitrobenzoate (Step 3, 8.0 g, 13.90 mmol), 2,6-lutidine (5.96 g, 55.6 mmol), in dichloromethane (100 ml) was added triflic anhydride (7.85 g, 27.8 mmol) and reaction mixture was stirred at 0° C. for 4 h. Progress of reaction was monitored by TLC and after completion it was diluted with dichloromethane, quenched with 1N HCl, both layers were separated, organic layer was washed with water and concentrated and purified by column chromatography (9.8 gm, Yield: 98%).

$^1$H NMR (400 MHz, Chloroform-d) δ 8.15 (d, J=1.7 Hz, 1H), 8.05 (d, J=1.7 Hz, 1H), 7.83 (d, J=1.8 Hz, 1H), 7.79 (d, J=1.7 Hz, 1H), 5.63 (q, J=4.7 Hz, 1H), 4.67 (t, J=5.3 Hz, 4H), 4.47 (q, J=7.1 Hz, 2H), 1.64 (s, 9H), 1.45 (t, J=7.1 Hz, 3H).

Step 5: Synthesis of tert-butyl 3-((2R)-2-(3-oxa-8-azabicyclo[3.2.1]octan-8-yl)-3-(2-chloro-5-(ethoxycarbonyl)-3-nitrophenoxy)propoxy)-4-chloro-5-nitrobenzoate

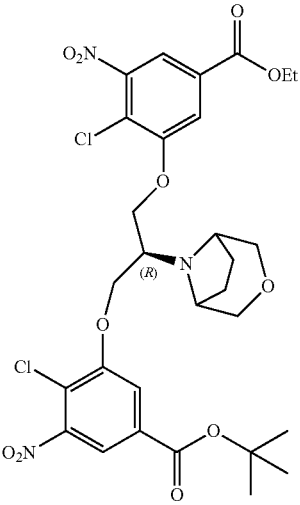

To a cooled solution of (1R,5S)-3-oxa-8-azabicyclo[3.2.1]octane hydrochloride (4.15 g, 27.7 mmol) in THF (100 ml) was added triethyl amine (7.72 ml, 55.4 mmol) and stirred for 30 min at 0° C. and then added tert-butyl (S)-4-chloro-3-(3-(2-chloro-5-(ethoxycarbonyl)-3-nitrophenoxy)-2-(((trifluoromethyl)sulfonyl)oxy)propoxy)-5-nitrobenzoate (Step 4, 9.8 g, 13.85 mmol) and stirred at same temperature for 12 h. Progress of reaction was monitored by TLC and after completion it was concentrated and purified by column chromatography to get the desired compound (6.5 gm, Yield: 70.6%).

$^1$H NMR (400 MHz, Chloroform-d) δ 8.07 (d, J=1.7 Hz, 1H), 7.97 (d, J=1.7 Hz, 1H), 7.85 (s, 1H), 7.81 (s, 1H), 4.44 (q, J=7.2 Hz, 6H), 3.77 (s, 2H), 3.61 (d, J=10.5 Hz, 2H), 3.40-3.20 (m, 3H), 2.06 (s, 4H), 1.62 (s, 9H), 1.44 (t, J=7.1 Hz, 3H); LCMS: m/z 669.97[M+H]$^+$ Step 6: Synthesis of 3-(tert-butyl) 11-ethyl (7R,E)-1,13-diamino-7-(3-oxa-8-azabicyclo[3.2.1]octan-8-yl)-7,8,14,15,18,19-hexahydro-6H-dibenzo[b,j][1,12]dioxa[4,9]diazacyclopentadecine-3,11-dicarboxylate

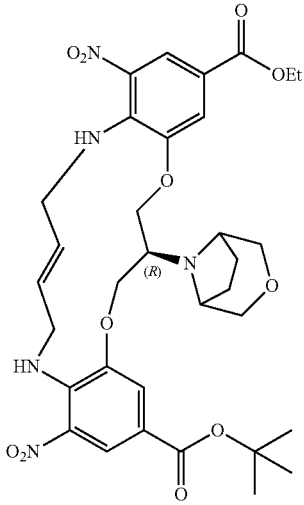

To a solution of tert-butyl 3-((2R)-2-(3-oxa-8-azabicyclo[3.2.1]octan-8-yl)-3-(2-chloro-5-(ethoxycarbonyl)-3-nitrophenoxy)propoxy)-4-chloro-5-nitrobenzoate (Step 5, 6.5 g, 9.69 mmol) in ethanol (80 ml) in sealed tube was added (E)-but-2-ene-1,4-diamine dihydrochloride (2.159 g, 13.57 mmol) and DIPEA (13.55 ml, 78 mmol) and stirred the reaction mixture at 105° C. for 24 h. Progress of reaction was monitored by TLC and after completion it was cooled to room temperature and the solid obtained was filtered and dried to get crude material as desired product (5.96 gm, Yield: 89.8%).

$^1$H NMR (400 MHz, DMSO-$d_6$) δ 7.60 (d, J=2.0 Hz, 2H), 7.55 (d, J=1.9 Hz, 2H), 5.63 (s, 2H), 4.37 (q, J=6.1, 5.5 Hz, 4H), 4.29 (q, J=7.1 Hz, 5H), 4.18 (s, 1H), 4.06 (m, 2H), 3.77 (dd, J=9.8, 5.5 Hz, 2H), 3.66-3.58 (m, 2H), 3.50-3.40 (m, 2H), 1.95 (d, J=7.0 Hz, 2H), 1.82 (t, J=6.4 Hz, 2H), 1.53 (s, 9H), 1.31 (t, J=7.1 Hz, 3H); LCMS: m/z 684.27[M+H]$^+$

Step 7: Synthesis of 3-(tert-butyl) 11-ethyl (7R,E)-1,13-diamino-7-(3-oxa-8-azabicyclo[3.2.1]octan-8-yl)-7,8,14,15,18,19-hexahydro-6H-dibenzo[b,j][1,12]dioxa[4,9]diazacyclopentadecine-3,11-dicarboxylate

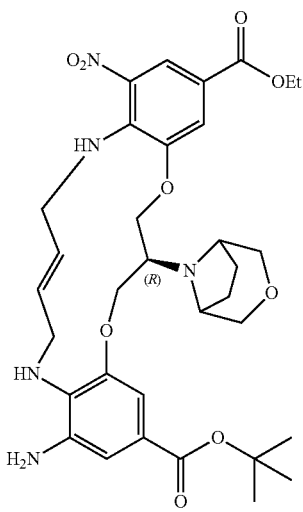

To a stirred suspension of 3-(tert-butyl) 11-ethyl (7R,E)-1,13-diamino-7-(3-oxa-8-azabicyclo[3.2.1]octan-8-yl)-7,8,14,15,18,19-hexahydro-6H-dibenzo[b,j][1,12]dioxa[4,9]diazacyclopentadecine-3,11-dicarboxylate (Step 6, 6.0 g, 8.78 mmol) in THF (75 ml) and Ethanol (75 ml) was added sodium dithionite (15.28 g, 88 mmol) (solution in 50 ml of water) at 0° C. Ammonium hydroxide (27.3 ml, 176 mmol) was added at same temperature. Reaction mixture was warmed to 25° C. and stirred for 3 h. Progress of reaction was monitored by LCMS. Solid was filtered off and organic solvents were removed from mother liquor under vacuo. Water (20 ml) was added and extracted with 10% methanol in ethyl acetate (3 times). The organic layer was dried with sodium sulphate and concentrated to get crude residue. Solid was washed in ether to get title compound (5.1 gm, Yield: 93.2%).

LCMS: m/z 624.09 [M+H]$^+$

Step 8: Synthesis of 12-(tert-butyl) 4-ethyl (8R,E)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylate

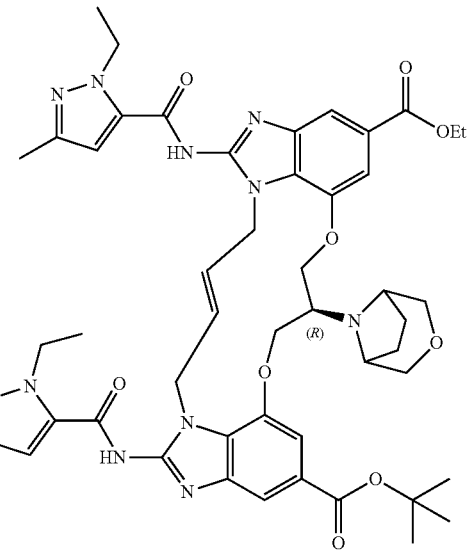

To a stirred solution of 3-(tert-butyl) 11-ethyl (7R,E)-1,13-diamino-7-(3-oxa-8-azabicyclo[3.2.1]octan-8-yl)-7,8,14,15,18,19-hexahydro-6H-dibenzo[b,j][1,12]dioxa[4,9]diazacyclopentadecine-3,11-dicarboxylate (Step 7, 5.1 g, 8.18 mmol) in DMF (Volume: 50 ml), 1-ethyl-3-methyl-1H-pyrazole-5-carbonyl isothiocyanate (2.87 g, 14.72 mmol) in 1 ml of DMF was added at 0° C. and stirred for 30 min followed by EDC (6.27 g, 32.7 mmol) and triethylamine (9.12 ml, 65.4 mmol) were added at 0° C. and stirred for 16 h. Progress of the reaction was monitored by LCMS. After completion the mixture was concentrated under reduced pressure, water was added solid was filtered and dried to get crude material which was purified by column chromatography employing methanol in dichloromethane as eluent to afford desired product (4.0 gm, Yield: 52.8%).

$^1$H NMR (400 MHz, DMSO-$d_6$) δ 12.92 (d, J=6.7 Hz, 2H), 7.84 (d, J=1.3 Hz, 1H), 7.82 (d, J=1.3 Hz, 1H), 7.63 (d, J=1.4 Hz, 1H), 7.55 (d, J=1.3 Hz, 1H), 6.49 (s, 2H), 5.33 (s, 2H), 4.95 (m, 2H), 4.87-4.75 (m, 2H), 4.63-4.55 (m, 2H), 4.49 (d, J=6.7 Hz, 4H), 4.37-4.30 (m, 4H), 3.97 (m, 2H), 3.70 (d, J=10.2 Hz, 2H), 3.60 (d, J=4.4 Hz, 2H), 3.52 (d, J=10.3 Hz, 2H), 2.90 (d, J=5.2 Hz, 1H), 2.30 (s, 6H), 1.82 (d, J=7.7 Hz, 2H), 1.56 (s, 9H), 1.34 (t, J=7.1 Hz, 3H), 1.24 (m, 6H).

LCMS: m/z 946.32 [M+H]$^+$

Step 9: Synthesis of (8S,E)-8-(3-oxa-8-azabicyclo[3.2.1]octan-8-yl)-4-(ethoxycarbonyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylic acid Step 10: Synthesis of ethyl (8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylate

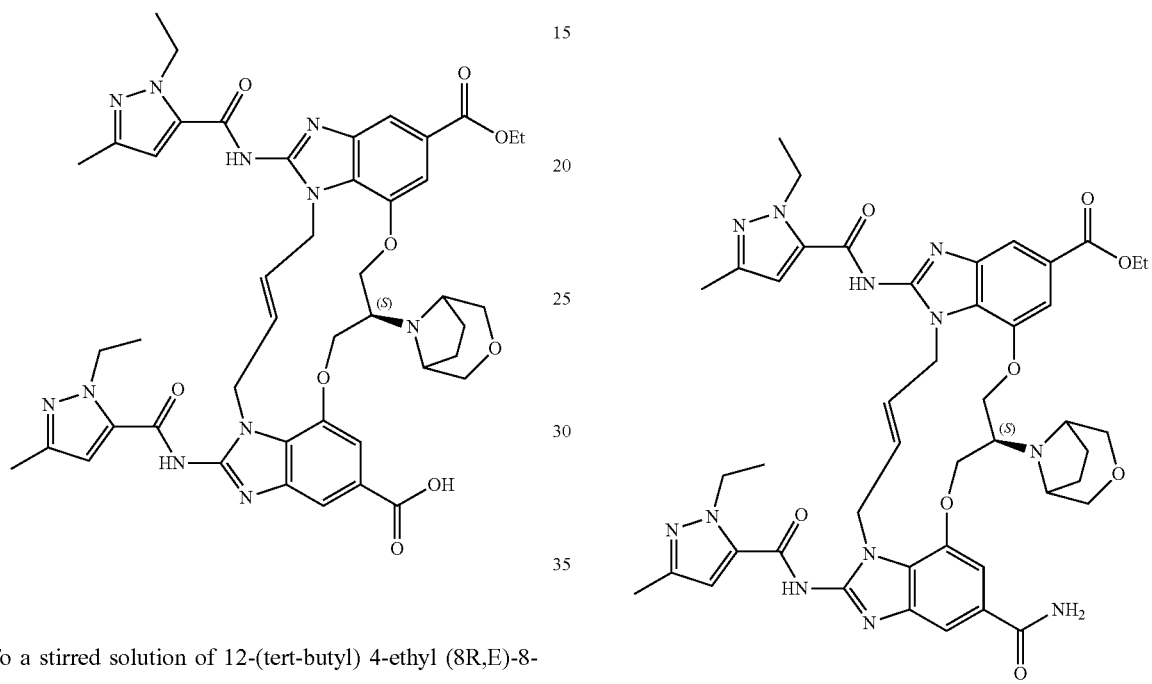

To a stirred solution of 12-(tert-butyl) 4-ethyl (8R,E)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylate (Step 8, 4.0 g, 4.23 mmol) in DCM (40 ml), trifluoroacetic acid (13.03 ml, 169 mmol) was added at 25° C. and stirred for 4 h. Progress of the reaction was monitored by LCMS. After completion the mixture was concentrated under reduced pressure and washed with diethyl ether dried to get crude material which was forwarded for further transformation (3.75 gm, Yield: 99%).

$^1$H NMR (400 MHz, DMSO-$d_6$) δ 13.00 (s, 2H), 10.40-10.25 (br s, 1H), 7.89 (d, J=1.2 Hz, 1H), 7.87 (d, J=1.2 Hz, 1H), 7.75 (d, J=1.3 Hz, 1H), 7.71 (s, 1H), 6.54 (s, 2H), 5.53 (s, 2H), 5.02-4.92 (m, 4H), 4.88-4.76 (m, 2H), 4.51 (q, J=7.6 Hz, 6H), 4.35 (q, J=7.0 Hz, 3H), 4.28 (m, 1H), 4.07-3.98 (m, 2H), 3.86 (s, 2H), 3.69-3.61 (m, 1H), 2.38-2.29 (m, 2H), 2.18 (q, J=7.5, 7.0 Hz, 2H), 2.06 (s, 6H), 1.34 (t, J=7.1 Hz, 3H), 1.26 (t, J=7.1 Hz, 6H).

LCMS: m/z 890.06 [M+H]$^+$ (8S,E)-8-(3-oxa-8-azabicyclo[3.2.1]octan-8-yl)-4-(ethoxycarbonyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxylic acid (Step 9, 3.75 g, 4.21 mmol) was dissolved in DMF (10 ml), TBTU (1.764 g, 5.48 mmol) and DIPEA (3.68 ml, 21.07 mmol) was added to it. Ammonium chloride (7.89 g, 147 mmol) was added and the reaction mixture was allowed to stir at 25° C. for 2 h. Progress of the reaction was monitored by LCMS. The reaction mixture concentrated to dryness and then water was added solid obtained was filtered and dried to get the desired product (3.70 gm, Yield: 98%).

LCMS: m/z 889.06 [M+H]$^+$

Step 11: Synthesis of (8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylic acid Step 12: Synthesis of (8S,E)-N4-((1R,4S)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide sodium salt (Compound 12)

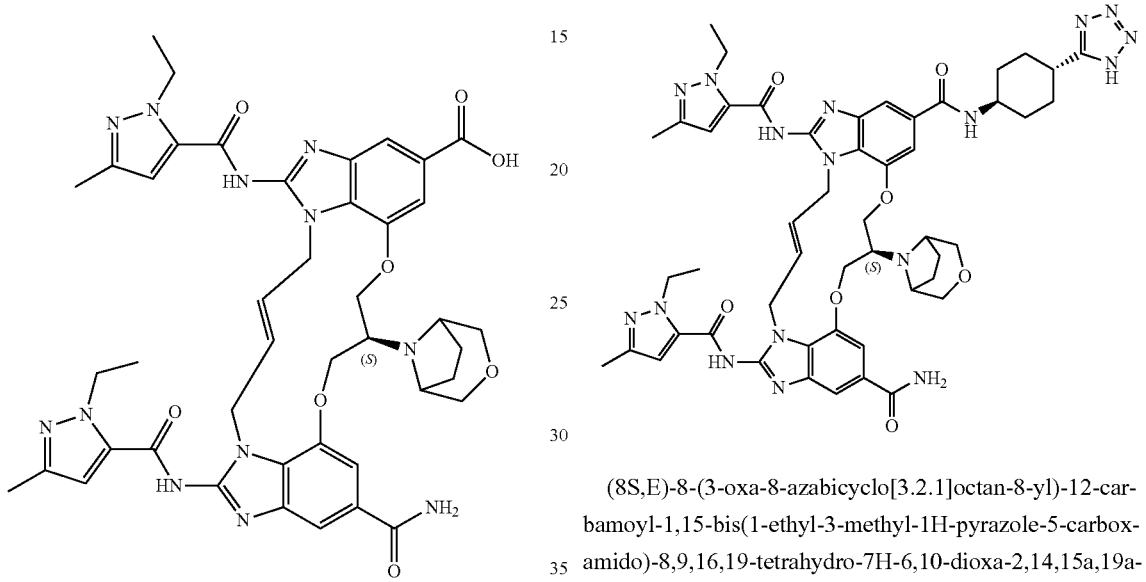

To the stirred solution of ethyl (8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylate (Step 10, 3.70 g, 4.16 mmol) in ethanol (40 ml) and THF (: 40 ml) was added lithium hydroxide hydrate (1.746 g, 41.6 mmol) solution in water (10 ml) at room temperature and stirred for 16 h at 50° C. Progress of the reaction was monitored by LCMS, reaction was conc. under reduced pressure and water was added, pH was adjusted to acidic by using 1N HCl, solid precipitates out which was filtered and dried to get the title compound (3.4 gm, Yield: 94.8%).

$^1$H NMR (400 MHz, DMSO-d$_6$) δ 13.20-12.81 (m, 2H), 11.73 (s, 1H), 8.08 (s, 1H), 7.87 (d, J=1.4 Hz, 1H), 7.77 (m, 3H), 7.45 (s, 1H), 7.28-7.13 (m, 1H), 6.53 (s, 2H), 5.46 (s, 2H), 5.12-4.77 (m, 6H), 4.50 (m, 7H), 4.41-4.26 (m, 2H), 3.85-3.55 (m, 5H), 2.33 (s, 1H), 2.15 (s, 2H), 2.05 (s, 6H), 1.81-1.72 (m, 1H), 1.25 (t, J=7.1 Hz, 6H).

LCMS: m/z 861.05 [M+H]$^+$ (8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylic acid (Step 11, 600 mg, 0.697 mmol) was dissolved in DMSO (10 ml), EDC (401 mg, 2.091 mmol) and DIPEA (0.609 ml, 3.48 mmol), (1R,4R)-4-(1H-tetrazol-5-yl)cyclohexan-1-amine hydrochloride (Int. 3b) (284 mg, 1.394 mmol) was added to it. HOBT (320 mg, 2.091 mmol) was added and the reaction mixture was allowed to stir at room temperature overnight. The reaction was monitored by LCMS. The reaction mixture was concentrated to remove DIPEA and then water was added, solid obtained was filtered and dried to get crude product. Purified by reverse phase preparative HPLC. The isolated product was then converted to its sodium salt as outlined in Example 2 (0.14 gm, Yield: 19.8%).

$^1$H NMR (400 MHz, DMSO-d$_6$) δ 12.87 (s, 2H), 8.27 (m, 1H), 8.00 (s, 1H), 7.72 (m, 2H), 7.62 (s, 1H), 7.57 (s, 1H), 7.38 (s, 1H), 6.50 (s, 2H), 5.40 (s, 2H), 4.99 (d, J=16.9 Hz, 2H), 4.80 (m, 2H), 4.62 (m, 2H), 4.50 (d, J=7.5 Hz, 4H), 3.94 (m, 2H), 3.87 (m, 1H), 3.69 (d, J=10.2 Hz, 2H), 3.61 (m, 1H), 3.54 (d, J=9.9 Hz, 2H), 2.94 (s, 2H), 2.14-2.07 (m, 2H), 2.04 (s, 6H), 1.97 (m, 5H), 1.82 (d, J=7.2 Hz, 2H), 1.60 (m, 5H), 1.25 (m, 6H); LCMS: m/z 1010.21 [M+H]$^+$; HPLC Purity: 99.89%

Example 13: (8R,E)-N4-((1R,4R)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide sodium salt (Compound 13)

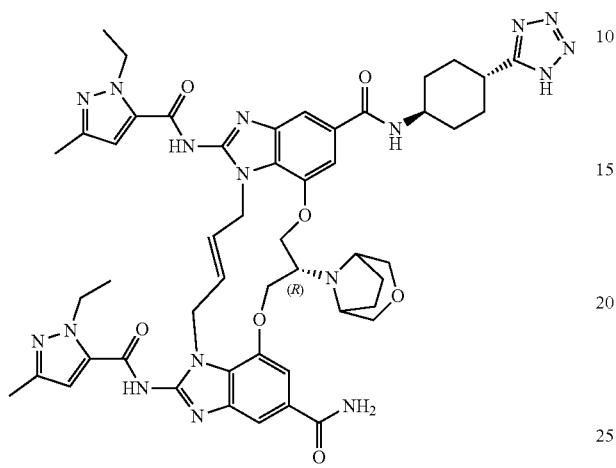

Synthesized from step 1 product of example 12 (Enantiomer 2) and (1R,4R)-4-(1H-tetrazol-5-yl)cyclohexan-1-amine hydrochloride (Int. 3b) by following an analogous procedure described for the synthesis of Example 12.

$^1$H NMR (400 MHz, DMSO-d$_6$) δ 12.87 (s, 2H), 8.27 (m, 1H), 8.00 (s, 1H), 7.72 (m, 2H), 7.62 (s, 1H), 7.57 (s, 1H), 7.38 (s, 1H), 6.50 (s, 2H), 5.40 (s, 2H), 4.99 (d, J=16.9 Hz, 2H), 4.80 (m, 2H), 4.62 (m, 2H), 4.50 (d, J=7.5 Hz, 4H), 3.94 (m, 2H), 3.87 (m, 1H), 3.69 (d, J=10.2 Hz, 2H), 3.61 (m, 1H), 3.54 (d, J=9.9 Hz, 2H), 2.94 (s, 2H), 2.14-2.07 (m, 2H), 2.04 (s, 6H), 1.97 (m, 5H), 1.82 (d, J=7.2 Hz, 2H), 1.60 (m, 5H), 1.25 (m, 6H); LCMS: m/z 1010.21 [M+H]$^+$; HPLC Purity: 99.81%

Example 14: (1S,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid sodium salt (Compound 14)

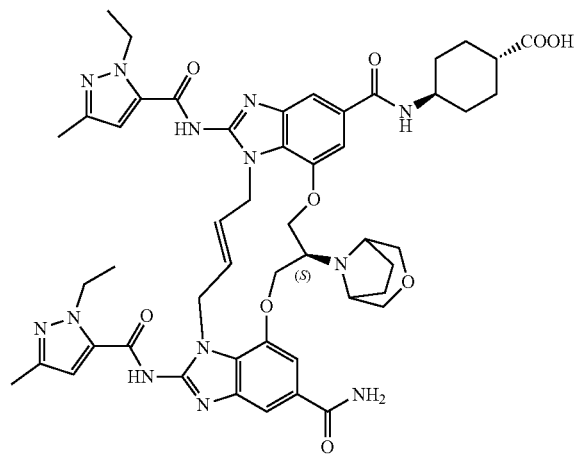

Step 1: Synthesis of methyl (1S,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylate

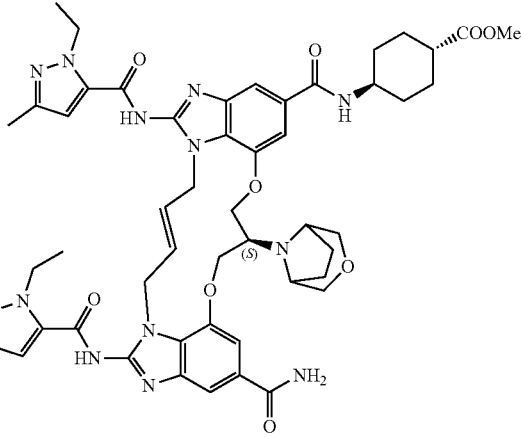

(8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylic acid (Step 11 product of example 12, 600 mg, 0.697 mmol) was dissolved in DMSO (10 ml), EDC (401 mg, 2.091 mmol) and DIPEA (0.609 ml, 3.48 mmol), methyl (1R,4R)-4-aminocyclohexane-1-carboxylate hydrochloride (284 mg, 1.394 mmol) was added to it. HOBT (320 mg, 2.091 mmol) was added and the reaction mixture was allowed to stir at room temperature overnight. The reaction was monitored by LCMS. The reaction mixture was concentrated to remove DIPEA and then water was added, solid obtained was filtered and dried to get crude material which was purified by reverse phase preparative HPLC to get the desired compound (0.23 gm, Yield: 49.4%).

$^1$H NMR (400 MHz, DMSO-d$_6$) δ 12.86 (bs, 2H), 8.21 (m, 1H), 8.00 (s, 1H), 7.72 (d, J=1.2 Hz, 1H), 7.69 (d, J=1.2 Hz, 1H), 7.62 (s, 1H), 7.54 (s, 1H), 7.37 (s, 1H), 6.49 (d, J=1.5 Hz, 2H), 5.40 (d, J=4.9 Hz, 2H), 4.99 (m, 2H), 4.79 (m, 2H), 4.60 (dt, J=9.8, 4.4 Hz, 2H), 4.50 (m, 4H), 3.94 (m, 2H), 3.83-3.73 (m, 1H), 3.69 (d, J=10.1 Hz, 2H), 3.61 (m, 5H), 3.53 (d, J=10.7 Hz, 2H), 2.93 (q, J=5.3 Hz, 1H), 2.30 (m, 1H), 2.04 (s, 6H), 1.99-1.90 (m, 6H), 1.81 (d, J=7.2 Hz, 2H), 1.51-1.36 (m, 4H), 1.25 (m, 6H); LCMS: m/z 1000.21 [M+H]$^+$

163

Step 2: (1S,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid sodium salt (Compound 14)

164

Example 15: (1R,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid sodium salt (Compound 15)

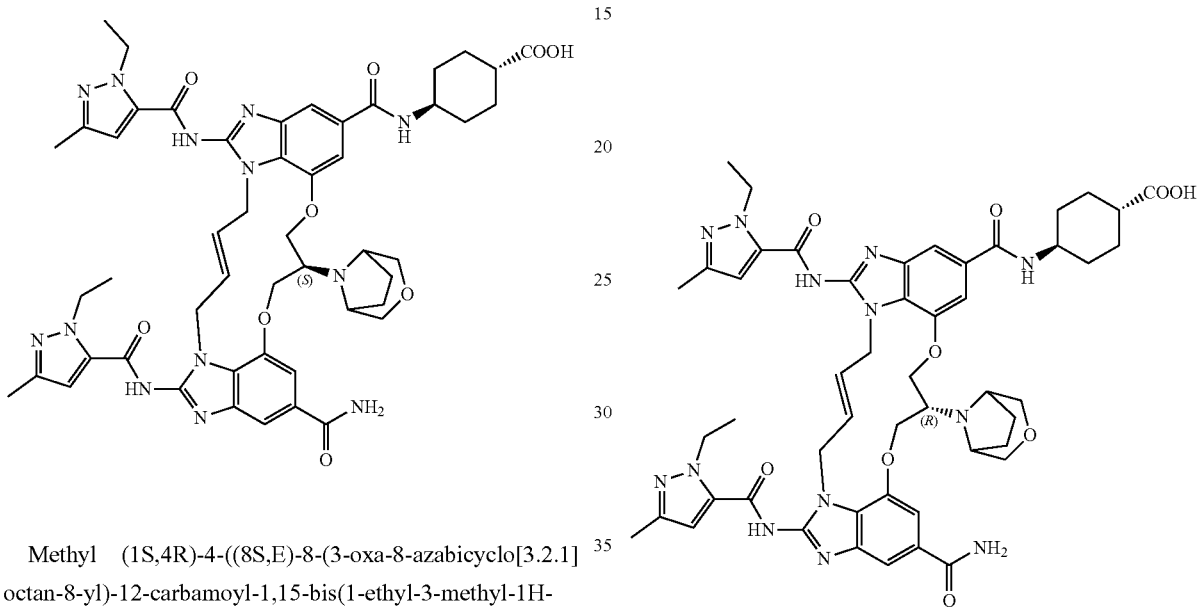

Methyl (1S,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylate (Step 1, 210 mg, 0.210 mmol) was dissolved in THF (10 ml), methanol (10 ml) & water (5 ml). Lithium hydroxide hydrate (88 mg, 2.100 mmol) was added and the reaction mixture was allowed to stir at room temperature for overnight. The reaction was monitored by LCMS. The reaction mixture concentrated to dryness and then water was added, neutralized by dil HCl, solid was filtered and then dried to obtain title compound. The isolated acid was then converted to its sodium salt as outlined in Example 2 (0.15 gm, Yield: 72.4%).

$^1$H NMR (400 MHz, DMSO-$d_6$) δ 12.94 (s, 2H), 12.11 (s, 1H), 11.3 (br s, 1H), 8.37 (s, 1H), 8.05 (s, 1H), 7.74 (d, J=1.4 Hz, 4H), 7.46 (s, 1H), 6.52 (s, 2H), 5.41 (s, 2H), 4.99 (m, 4H), 4.81 (m, 2H), 4.50 (m, 6H), 4.25 (m, 1H), 3.78 (m, 2H), 3.69-3.51 (m, 2H), 2.99-2.89 (m, 1H), 2.30 (d, J=6.9 Hz, 2H), 2.17 (s, 3H), 2.09 (s, 3H), 2.04 (m, 4H), 1.97 (s, 2H), 1.95-1.87 (m, 2H), 1.42 (m, 4H), 1.25 (m, 6H); LCMS: m/z 986.21 [M+H]$^+$; HPLC Purity: 99.80%

Synthesized from step 1 product of example 12 (Enantiomer 2) and methyl (1R,4R)-4-aminocyclohexane-1-carboxylate hydrochloride by following an analogous procedures described for the synthesis of Example 12 & 14.

$^1$H NMR (400 MHz, DMSO-$d_6$) δ 12.94 (s, 2H), 12.11 (s, 1H), 11.3 (br s, 1H), 8.37 (s, 1H), 8.05 (s, 1H), 7.74 (d, J=1.4 Hz, 4H), 7.46 (s, 1H), 6.52 (s, 2H), 5.41 (s, 2H), 4.99 (m, 4H), 4.81 (m, 2H), 4.50 (m, 6H), 4.25 (m, 1H), 3.78 (m, 2H), 3.69-3.51 (m, 2H), 2.99-2.89 (m, 1H), 2.30 (d, J=6.9 Hz, 2H), 2.17 (s, 3H), 2.09 (s, 3H), 2.04 (m, 4H), 1.97 (s, 2H), 1.95-1.87 (m, 2H), 1.42 (m, 4H), 1.25 (m, 6H); LCMS: m/z 986.21 [M+H]$^+$; HPLC Purity: 99.75%

Example 16: (8S,E)-N4-(3-(1H-tetrazol-5-yl)propyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide sodium salt (Compound 16)

Synthesized from step 11 product of example 12 and 3-(1H-tetrazol-5-yl)propan-1-amine, by following an analogous procedure described for the synthesis of Example 12.

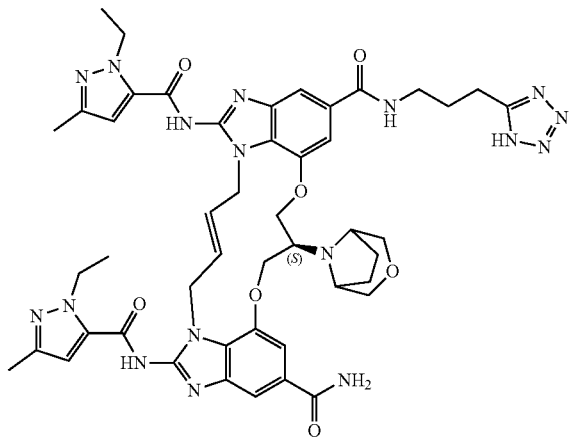

$^1$H NMR (400 MHz, DMSO-d$_6$) δ 12.88 (s, 2H), 8.57 (m, 1H), 8.00 (s, 1H), 7.71 (m, 2H), 7.62 (s, 1H), 7.56 (s, 1H), 7.38 (s, 1H), 6.49 (s, 2H), 5.42 (s, 2H), 4.99 (m, 2H), 4.85-4.75 (m, 2H), 4.60 (d, J=10.7 Hz, 2H), 4.51 (q, J=7.0 Hz, 4H), 3.94 (m, 2H), 3.68 (d, J=10.1 Hz, 2H), 3.60 (s, 2H), 3.57-3.49 (m, 2H), 2.95 (m, 4H), 2.08 (m, 2H), 2.04 (s, 6H), 1.98 (dd, J=15.1, 7.7 Hz, 4H), 1.81 (d, J=7.7 Hz, 2H), 1.25 (t, J=7.1 Hz, 6H); LCMS: m/z 970.33 [M+H]$^+$; HPLC Purity: 99.61%

Example 17: (8R,E)-N4-(3-(1H-tetrazol-5-yl)propyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide sodium salt (Compound 17)

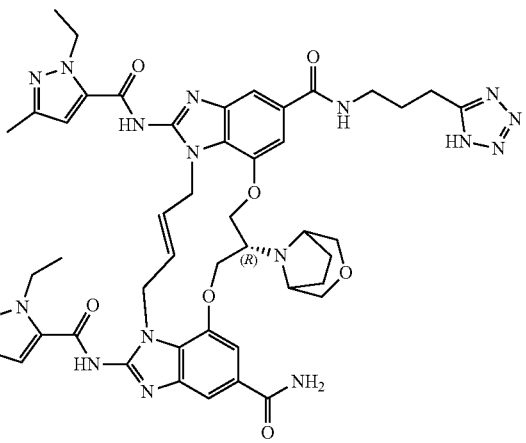

Synthesized from step 1 product of example 12 (Enantiomer 2) and 3-(1H-tetrazol-5-yl)propan-1-amine by following an analogous procedure described for the synthesis of Example 12.

$^1$H NMR (400 MHz, DMSO-d$_6$) δ 12.88 (s, 2H), 8.57 (m, 1H), 8.00 (s, 1H), 7.71 (m, 2H), 7.62 (s, 1H), 7.56 (s, 1H), 7.38 (s, 1H), 6.49 (s, 2H), 5.42 (s, 2H), 4.99 (m, 2H), 4.85-4.75 (m, 2H), 4.60 (d, J=10.7 Hz, 2H), 4.51 (q, J=7.0 Hz, 4H), 3.94 (m, 2H), 3.68 (d, J=10.1 Hz, 2H), 3.60 (s, 2H), 3.57-3.49 (m, 2H), 2.95 (m, 4H), 2.08 (m, 2H), 2.04 (s, 6H), 1.98 (dd, J=15.1, 7.7 Hz, 4H), 1.81 (d, J=7.7 Hz, 2H), 1.25 (t, J=7.1 Hz, 6H); LCMS: m/z 970.33 [M+H]$^+$; HPLC Purity: 99.90%

Example 18: 1-(3-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid sodium salt (Compound 18)

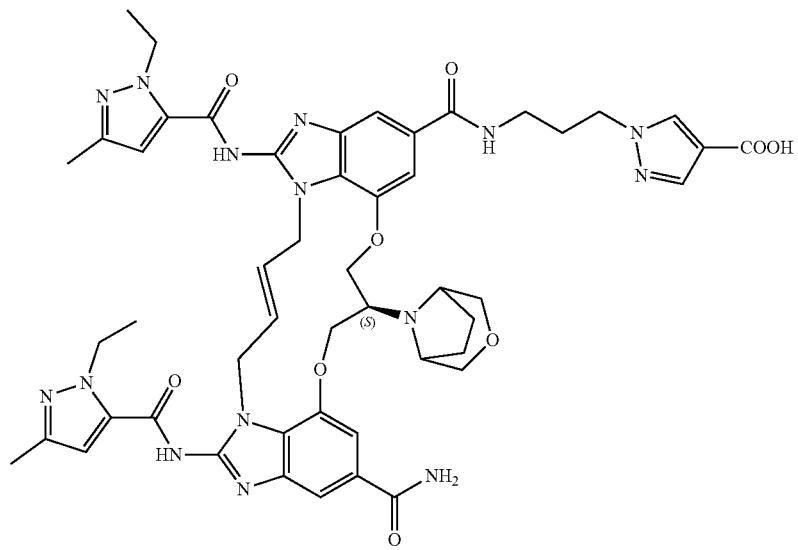

Synthesized from step 11 product of example 12 (Enantiomer 1) and ethyl 1-(3-aminopropyl)-1H-pyrazole-4-carboxylate, by following an analogous procedure described for the synthesis of Example 12 & 14.

$^1$H NMR (400 MHz, DMSO-$d_6$) δ 12.96 (bs, 2H), 12.32 (s, 1H), 11.19 (s, 1H), 8.72 (s, 1H), 8.35 (s, 1H), 8.05 (s, 1H), 7.83 (s, 1H), 7.75 (m, 3H), 7.47 (s, 1H), 6.52 (s, 2H), 5.42 (s, 2H), 5.11-4.75 (m, 6H), 4.50 (m, 6H), 4.23 (m, 3H), 3.89 (m, 2H), 3.74-3.49 (m, 3H), 3.27 (d, J=7.8 Hz, 2H), 2.94 (m, 1H), 2.30 (d, J=9.6 Hz, 1H), 2.22-1.75 (m, 11H), 1.24 (m, 6H); LCMS: m/z 1012.21 [M+H]$^+$; HPLC Purity: 98.43%

Example 19: 1-(3-((8R,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid sodium salt (Compound 19)

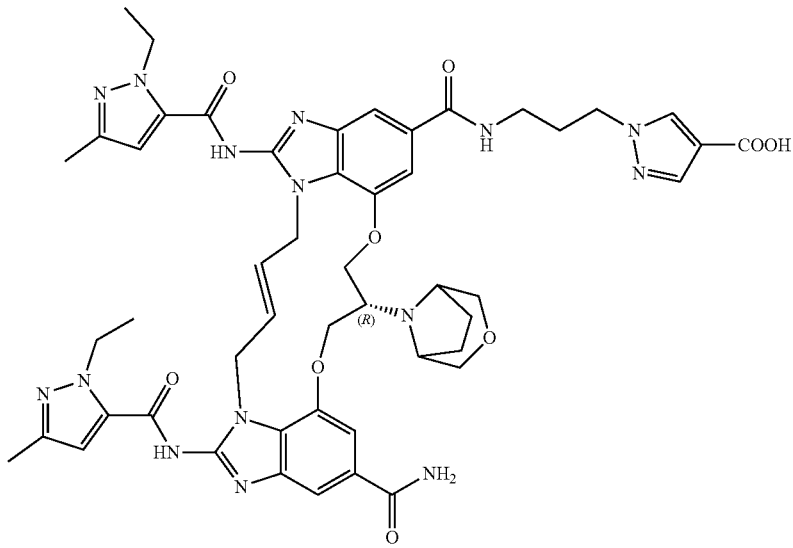

Synthesized from step 1 product of example 12 (Enantiomer 2) and ethyl 1-(3-aminopropyl)-1H-pyrazole-4-carboxylate, by following an analogous procedures described for the synthesis of Example 12 & 14.

$^1$H NMR (400 MHz, DMSO-$d_6$) δ 12.96 (bs, 2H), 12.32 (s, 1H), 11.19 (s, 1H), 8.72 (s, 1H), 8.35 (s, 1H), 8.05 (s, 1H), 7.83 (s, 1H), 7.75 (m, 3H), 7.47 (s, 1H), 6.52 (s, 2H), 5.42 (s, 2H), 5.11-4.75 (m, 6H), 4.50 (m, 6H), 4.23 (m, 3H), 3.89 (m, 2H), 3.74-3.49 (m, 3H), 3.27 (d, J=7.8 Hz, 2H), 2.94 (m, 1H), 2.30 (d, J=9.6 Hz, 1H), 2.22-1.75 (m, 11H), 1.24 (m, 6H); LCMS: m/z 1012.21 [M+H]$^+$; HPLC Purity: 99.78%

Example 20: (1R,4R)-4-((E)-8-(8-oxa-3-azabicyclo [3.2.1]octan-3-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 20)

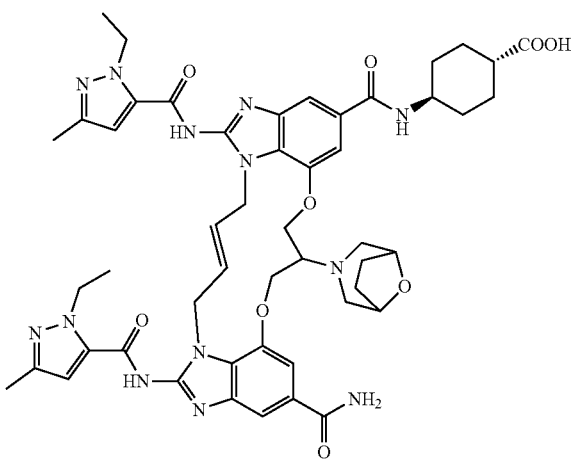 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@H](C(=O)O)CC4)cc(c21)OCC(N1CC2CCC(C1)O2)CO3]

Step-1: diethyl 2-((1R,5S)-8-oxa-3-azabicyclo [3.2.1]octan-3-yl)malonate

To a stirred solution of diethyl 2-bromomalonate (5.0 g, 20.91 mmol), in chloroform (50 ml) was added 8-oxa-3-azabicyclo[3.2.1]octane hydrochloride (4.69 g, 31.4 mmol) and TEA (14.58 ml, 105 mmol) at room temperature and heated the reaction mixture at 60° C. for 12 h. Reaction was monitored by using TLC. The reaction mixture was concentrated to get crude product, which was purified by combi flash using 15-20% ethyl acetate in hexanes to get the title compound (3.5 g, 61.7% yield).

LCMS (ESI): m/z 272.08 (M+H)+

$^1$H NMR (400 MHz, DMSO-d$_6$) δ 4.20 (d, J=2.6 Hz, 3H), 4.15 (m, 4H), 2.70 (dd, J=11.0, 2.1 Hz, 2H), 2.61 (dt, J=10.8, 1.3 Hz, 2H), 1.92-1.74 (m, 2H), 1.74-1.64 (m, 2H), 1.20 (t, J=7.1 Hz, 6H).

Step-2: 2-((1R,5S)-8-oxa-3-azabicyclo[3.2.1]octan-3-yl)propane-1,3-diol

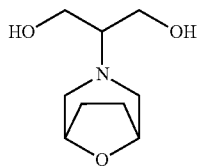

Diethyl 2-(8-oxa-3-azabicyclo[3.2.1]octan-3-yl)malonate (3.50 g, 12.90 mmol) in THF (20 ml) was added to lithium aluminium hydride (2.448 g, 64.5 mmol) solution in THF (20 ml) at 0° C. The resulting solution was stirred at 25° C. for 5 h. The mixture was quenched by adding ethyl acetate 25 ml and saturated aqueous NaCl solution dropwise. The solid obtained was filtered through celite pad and the filtrate was concentrated to get crude product, which was purified by column chromatography using 10% methanol in dichloromethane to afford title compound (1.5 g, 62.1% yield).

LCMS (ESI): m/z 188.14 (M+H)+

$^1$H NMR (400 MHz, DMSO-d$_6$) δ 4.16 (dq, J=4.5, 2.2 Hz, 2H), 3.44 (qd, J=10.9, 6.1 Hz, 4H), 2.69 (dd, J=11.2, 2.0 Hz, 2H), 2.44 (dt, J=11.2, 1.3 Hz, 2H), 2.36 (m, 1H), 1.86-1.77 (m, 2H), 1.72-1.61 (m, 2H).

Step 3: diethyl 5,5'-((2-(8-oxa-3-azabicyclo[3.2.1] octan-3-yl)propane-1,3-diyl)bis(oxy))bis(4-chloro-3-nitrobenzoate)

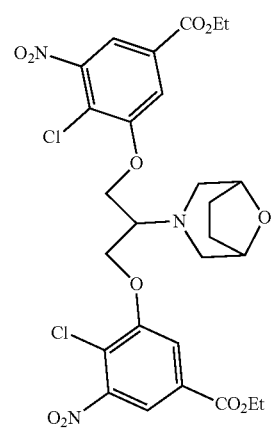 [SMILES: CCOC(=O)c1cc(OCC(COc2cc(C(=O)OCC)cc([N+](=O)[O-])c2Cl)N2CC3CCC(C2)O3)c(Cl)c([N+](=O)[O-])c1]

Ethyl 4-chloro-3-hydroxy-5-nitrobenzoate (514 g, 2094 mmol), 2-((1R,5S)-8-oxa-3-azabicyclo[3.2.1]octan-3-yl)propane-1,3-diol (196 g, 1047 mmol) and triphenylphosphine (1098 g, 4187 mmol) was dissolved in 6 L of THF and DIAD (0.814 L, 4187 mmol) was added dropwise. After the addition, the reaction mixture was heated at 55° C. for 16 h. The progress of the reaction was monitored by TLC and after completion; the reaction mixture was concentrated to get the crude material. This crude was suspended in ethyl acetate and stirred at −78° C. for 30 min after which the precipitated triphenylphosphine oxide was filtered and the filtrate concentrated. The residue was triturated with ethanol and stirred at −78° C. for 30 min after which the precipitated pure product was filtered and washed with cold ethanol and dried to get the title compound (Yield: 400 g, 60%).

$^1$H NMR (400 MHz, DMSO-d$_6$) δ 8.10 (d, J=1.8 Hz, 2H), 7.90 (d, J=1.8 Hz, 2H), 4.57-4.46 (m, 4H), 4.38 (q, J=7.1 Hz, 4H), 4.20 (t, J=3.4 Hz, 2H), 3.37 (t, J=5.8 Hz, 1H), 2.86 (dd, J=11.0, 2.0 Hz, 2H), 2.64 (d, J=10.6 Hz, 2H), 1.80 (t, J=5.9 Hz, 2H), 1.71-1.59 (m, 2H), 1.35 (t, J=7.1 Hz, 6H); LCMS (ESI): m/z 642.3 (M+H)+

Step 4: diethyl (E)-7-(8-oxa-3-azabicyclo[3.2.1]
octan-3-yl)-1,13-dinitro-7,8,14,15,18,19-hexahydro-
6H-dibenzo[b,j][1,12]dioxa[4,9]diazacyclopentade-
cine-3,11-dicarboxylate

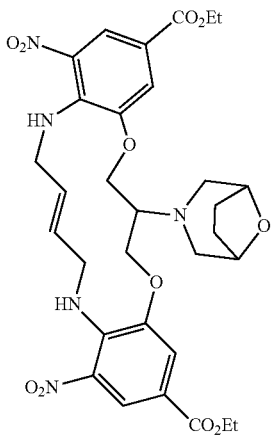 [SMILES: CCOC(=O)c1cc2c(c([N+](=O)[O-])c1)NC/C=C/CNc1c(cc(C(=O)OCC)cc1[N+](=O)[O-])OCC(N1CC3CCC(C1)O3)CO2]

To a solution of diethyl 5,5'-((2-(8-oxa-3-azabicyclo[3.2.1]octan-3-yl)propane-1,3-diyl)bis(oxy))bis(4-chloro-3-nitrobenzoate (Step 3, 400 g, 623 mmol) in a solvent mixture of ethanol (3700 ml) and THF (500 mL) in 10 lit autoclave was added (E)-but-2-ene-1,4-diamine dihydrochloride (139 g, 872 mmol) and DIPEA (1087 ml, 6226 mmol) and stirred the reaction mixture at 110° C. for 24 h. The progress of the reaction was monitored by TLC. Reaction mixture was cooled to room temperature and the solid obtained was filtered and dried to get the product as a red solid (Yield: 360 g, 88%).

$^1$H NMR (400 MHz, DMSO-$d_6$) δ 8.35 (t, J=6.7 Hz, 2H), 8.26 (d, J=1.9 Hz, 2H), 7.59 (d, J=2.0 Hz, 2H), 5.66 (d, J=1.8 Hz, 2H), 4.40 (dd, J=9.8, 5.0 Hz, 2H), 4.34-4.24 (m, 8H), 4.05 (dd, J=15.5, 6.7 Hz, 2H), 3.87 (dd, J=9.8, 6.0 Hz, 2H), 3.22 (t, J=5.5 Hz, 1H), 2.77 (dd, J=10.9, 2.1 Hz, 2H), 2.63 (d, J=10.6 Hz, 2H), 1.93 (t, J=6.0 Hz, 2H), 1.79-1.67 (m, 2H), 1.31 (t, J=7.1 Hz, 6H); LCMS (ESI): m/z 656.10 (M+H)$^+$

Step 5: diethyl (E)-1,13-diamino-7-(8-oxa-3-azabi-
cyclo[3.2.1]octan-3-yl)-7,8,14,15,18,19-hexahydro-
6H-dibenzo[b,j][1,12]dioxa[4,9]diazacyclopentade-
cine-3,11-dicarboxylate

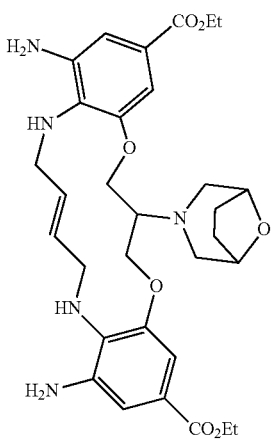

To a stirred suspension of diethyl (E)-7-(8-oxa-3-azabicyclo[3.2.1]octan-3-yl)-1,13-dinitro-7,8,14,15,18,19-hexahydro-6H-dibenzo[b,j][1,12]dioxa[4,9]diazacyclopentadecine-3,11-dicarboxylate (Step 4, 200 g, 305 mmol) in THF (1500 ml) and ethanol (500 ml) was added Sodium dithionite (531 g, 3050 mmol) (solution in 750 ml of water) at 0° C. Ammonium hydroxide (713 ml, 4576 mmol) was added at the same temperature. Reaction mixture was warmed to 25° C. and stirred for 3 h. Progress of reaction was monitored by LCMS. Solid was filtered off and organic solvents were removed under vacuum. Water was added to the reaction mixture and extracted with DCM (4×250 ml). The organic layer was dried over sodium sulphate and concentrated to get crude residue. Solid was washed with ether to get the crude diamine which was used as such in the next step (Yield: 167 g, 92%).

LCMS (ESI): m/z 596.4 (M+H)$^+$

Step 6: Synthesis of diethyl (E)-8-(8-oxa-3-azabicy-
clo[3.2.1]octan-3-yl)-1,15-bis(1-ethyl-3-methyl-1H-
pyrazole-5-carboxamido)-8,9,16,19-tetrahydro-7H-6,
10-dioxa-2,14,15a,19a-tetraazacyclopentadeca[3,2,1-
cd:8,9,10-c'd']diindene-4,12-dicarboxylate

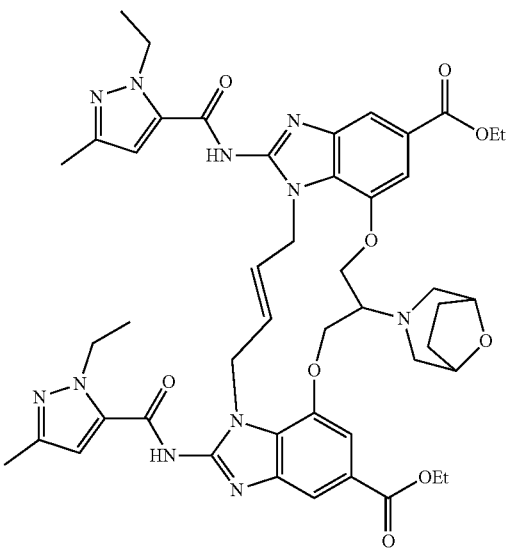 [SMILES: CCOC(=O)c1cc2c3c(c1)nc(NC(=O)c1cc(C)nn1CC)n3C/C=C/Cn1c(NC(=O)c3cc(C)nn3CC)nc3cc(C(=O)OCC)cc(c31)OCC(N1CC3CCC(C1)O3)CO2]

To a stirred solution of diethyl (E)-1,13-diamino-7-(8-oxa-3-azabicyclo[3.2.1]octan-3-yl)-7,8,14,15,18,19-hexahydro-6H-dibenzo[b,j][1,12]dioxa[4,9]diazacyclopentadecine-3,11-dicarboxylate (Step 5, 143 g, 240 mmol) in DMF (1200 ml), 1-ethyl-3-methyl-1H-pyrazole-5-carbonyl isothiocyanate (89 g, 456 mmol) in 100 ml of DMF was added at 0° C. and stirred for 30 min. EDC (138 g, 720 mmol) and TEA (201 ml, 1440 mmol) were added at 0° C. after which the reaction mixture was warmed to room temperature and stirred for 18 hr. Reaction was monitored by LCMS. After completion the mixture was conc. under reduced pressure, water was added and the solid obtained was filtered and dried to get the crude material. This was then washed with 50% EA in hexane to remove non polar impurities & then with 10% THF in acetonitrile to remove polar impurities, to obtain the pure product (Yield: 100 g, 45%).

$^1$H NMR (400 MHz, DMSO-$d_6$) δ 12.93 (s, 2H), 7.84 (d, J=1.2 Hz, 2H), 7.68-7.49 (m, 2H), 6.53 (s, 2H), 5.44 (brs, 2H), 4.87 (brs, 4H), 4.61-4.48 (m, 10H), 4.41-4.23 (m, 4H), 3.04 (s, 1H), 2.87 (d, J=10.5 Hz, 2H), 2.67 (m, 4H), 1.99 (s, 6H), 1.86-1.75 (m, 2H), 1.27 (t, J=7.1 Hz, 6H), 1.18 (t, J=7.1 Hz, 6H); LCMS (ESI): m/z 917.94 (M+H)+

Step 7: (E)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylic acid To the stirred solution of diethyl (E)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylate (Step 6, 100 g, 109 mmol) in a solvent mixture of methanol (1000 ml) and THF (1000 ml) was added lithium hydroxide monohydrate (36.6 g, 871 mmol) by dissolving it in 300 mL H₂O. The reaction mixture was heated at 50° C. and stirred for 16 h. The progress of the reaction was monitored by LCMS, and after completion the reaction mixture was conc. under reduced pressure and water was added. The pH was adjusted to 6, by using 1N HCl, and the solid precipitated out was filtered. The solid diacid was washed with ethyl acetate to obtain the title compound (Yield: 92 g, 98%).

¹H NMR (400 MHz, DMSO-d₆) δ 7.71 (s, 2H), 7.54 (s, 2H), 6.46 (s, 2H), 5.38 (s, 2H), 4.98-4.76 (m, 4H), 4.52 (q, J=7.0 Hz, 6H), 4.27 (d, J=4.6 Hz, 2H), 4.15 (t, J=8.7 Hz, 2H), 3.07 (s, 1H), 2.87 (d, J=10.4 Hz, 2H), 2.68 (d, J=9.9 Hz, 2H), 2.06 (s, 6H), 2.04-2.01 (m, 2H), 1.74 (dd, J=7.9, 3.9 Hz, 2H), 1.24 (t, J=7.1 Hz, 6H); LCMS (ESI): m/z 862.05 (M+H)+

Step 8: (E)-8-(8-oxa-3-azabicyclo[3.2.1]octan-3-yl)-1,15-bis(1-ethyl-3-methyl-1H-pyrazole-5-carboxamido)-12-(((1R,4R)-4-(methoxycarbonyl)cyclohexyl)carbamoyl)-8,9,16,19-tetrahydro-7H-6,10-dioxa-2,14,15a,19a-tetraazacyclopentadeca[3,2,1-cd:8,9,10-c'd']diindene-4-carboxylic acid

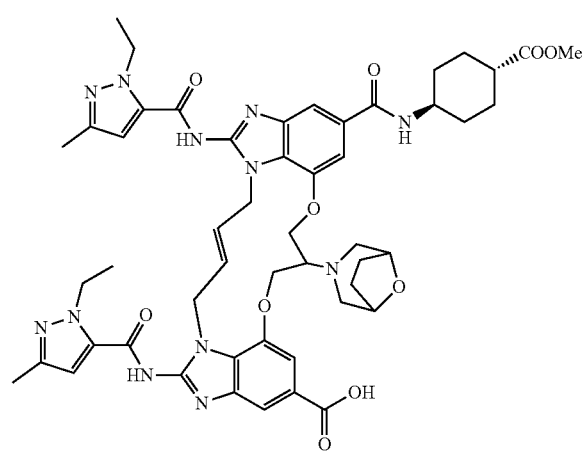 [SMILES: CCn1nc(C)cc1C(=O)Nc1nc2cc(C(=O)O)cc3c2n1C/C=C/Cn1c(NC(=O)c2cc(C)nn2CC)nc2cc(C(=O)N[C@H]4CC[C@H](C(=O)OC)CC4)cc(c21)OCC(N1CC2CCC(C1)O2)CO3]

To a stirred solution of (E)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylic acid (Step 7, 0.6 g, 0.70 mmol) in 6 mL DMF was added sequentially, methyl (1R,4R)-4-aminocyclohexane-1-carboxylate hydrochloride (0.17 g, 0.87 mmol), [benzotriazol-1-yloxy(dimethylamino)methylidene]-dimethylazanium; tetrafluoroborate (0.34 g, 1.04 mmol) and DIPEA (0.24 mL, 1.39 mmol) and the reaction mixture stirred for 1.5 h at room temperature. The progress of the reaction was monitored by LCMS and after completion, the reaction mixture was concentrated and water was added resulting in the formation of a solid which was filtered and used as such in the next step.

LCMS (ESI): m/z 1001.21 (M+H)+

Step 9: methyl (1R,4R)-4-((E)-8-(8-oxa-3-azabicyclo[3.2.1]octan-3-yl)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxamido)cyclohexane-1-carboxylate

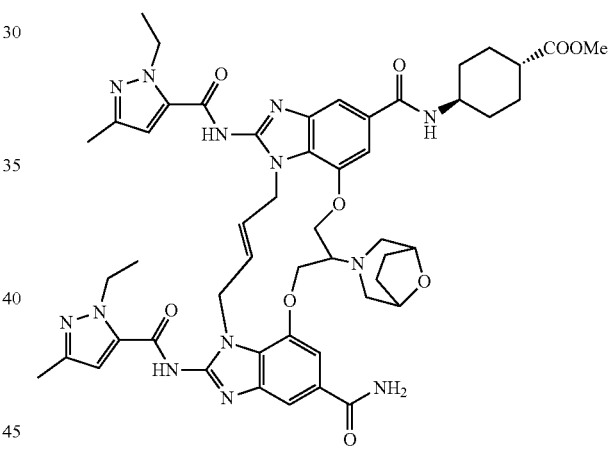

To a stirred solution of (E)-8-(8-oxa-3-azabicyclo[3.2.1]octan-3-yl)-1,15-bis(1-ethyl-3-methyl-1H-pyrazole-5-carboxamido)-12-(((1R,4R)-4-(methoxycarbonyl)cyclohexyl)carbamoyl)-8,9,16,19-tetrahydro-7H-6,10-dioxa-2,14,15a,19a-tetraazacyclopentadeca[3,2,1-cd:8,9,10-c'd']diindene-4-carboxylic acid (Step 8, 0.6 g, 0.60 mmol) dissolved in 5 mL DMF, ammonium chloride (0.16 g, 3.00 mmol), [benzotriazol-1-yloxy(dimethylamino)methylidene]-dimethylazanium; tetrafluoroborate (0.29 g, 0.90 mmol) and DIPEA (0.155 g, 1.199 mmol) was added and the reaction mixture stirred for 2 h at room temperature. The progress of the reaction was monitored by LCMS and after completion, the reaction mixture was concentrated and water was added resulting in the formation of a solid which was filtered and the required product purified from the crude by reverse phase preparative chromatography.

LCMS (ESI): m/z 1000.33 (M+H)+

Step 10: (1R,4R)-4-((E)-8-(8-oxa-3-azabicyclo[3.2.1]octan-3-yl)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxamido)cyclohexane-1-carboxylic acid (Compound 20)

Example 21: (E)-N-(3-(1H-tetrazol-5-yl)propyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca [3,2,1-cd:8,9,10-c'd']diindene-4,12-dicarboxamide (Compound 21)

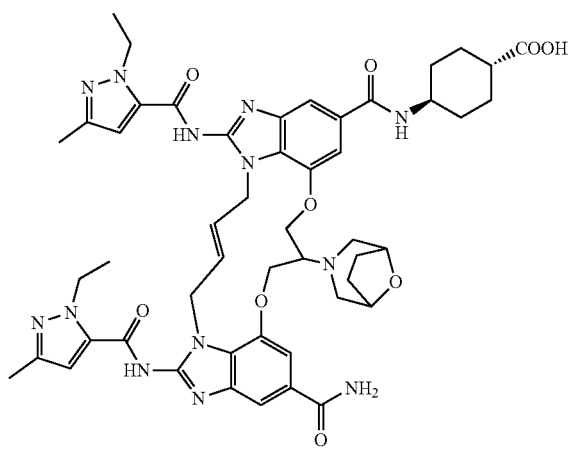 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4CC[C@H](C(=O)O)CC4)cc(c21)OCC(N1CC2CCC(C1)O2)CO3]

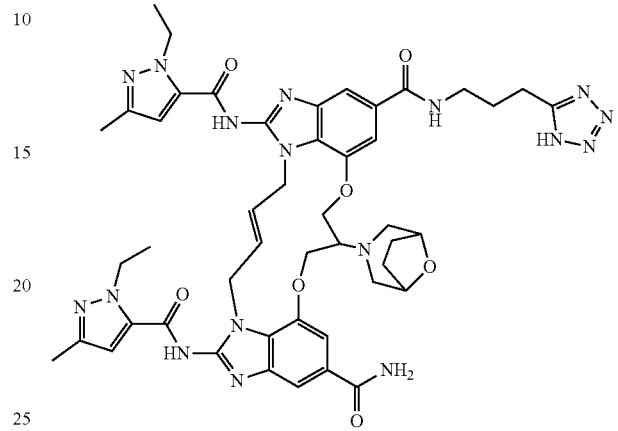

Methyl (1R,4R)-4-((E)-8-(8-oxa-3-azabicyclo[3.2.1]octan-3-yl)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxamido)cyclohexane-1-carboxylate (Step 9, 0.12 g, 0.12 mmol) obtained after purification was suspended in a solvent mixture of 6 mL methanol:THF:H$_2$O (1:1:1). LiOH (0.03 g, 1.20 mmol) was added and the reaction mixture stirred for 12 hr at room temperature. After completion of the hydrolysis, the volatiles were concentrated, and water was added to dilute the reaction mixture. The solution was then carefully neutralized with 1N HCl. The resulting suspension was centrifuged and the solid was collected and dried to get (1R,4R)-4-((E)-8-(8-oxa-3-azabicyclo[3.2.1]octan-3-yl)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxamido)cyclohexane-1-carboxylic acid (0.09 g, 76% yield).

$^1$H NMR (400 MHz, DMSO-d$_6$) δ 12.84 (s, 2H), 8.22 (m, 1H), 8.00 (s, 1H), 7.69 (s, 1H), 7.64 (s, 1H), 7.56 (s, 1H), 7.46 (s, 1H), 7.40 (s, 1H), 6.53 (m, 2H), 5.46 (m, 2H), 4.87 (m, 4H), 4.65-4.44 (m, 6H), 4.29 (s, 2H), 4.19 (s, 2H), 3.75 (s, 1H), 3.08 (s, 1H), 2.92-2.84 (m, 2H), 2.73-2.66 (m, 2H), 2.18 (s, 1H), 2.10-1.89 (m, 12H), 1.77 (d, J=7.3 Hz, 2H), 1.42 (m, 4H), 1.27-1.23 (m, 6H); LCMS (ESI): mm/z 986.21 (M+H)$^+$; HPLC Purity: 99.19%

Step 1: (E)-12-((3-(1H-tetrazol-5-yl)propyl)carbamoyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylic acid

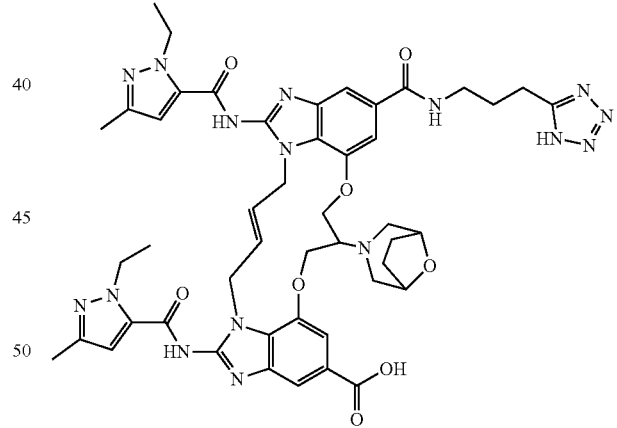

Synthesized analogously by following the procedure detailed in Step 8 of Example 20 by using (E)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylic acid and 3-(1H-tetrazol-5-yl)propan-1-amine hydrochloride.
LCMS (ESI): m/z 971.33 (M+H)$^+$
Step 2: (E)-N-(3-(1H-tetrazol-5-yl)propyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide

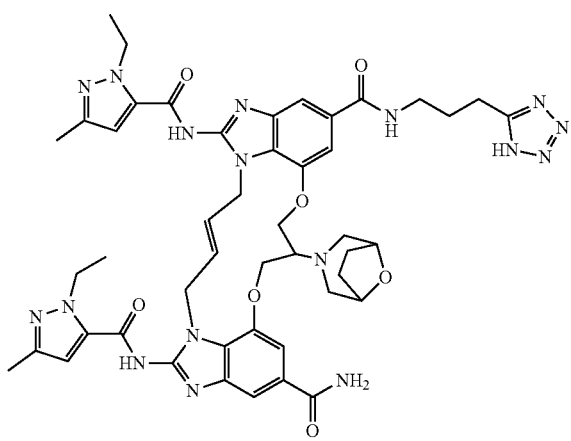 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCc4nnn[nH]4)cc(c21)OCC(N1CC2CCC(C1)O2)CO3]

Synthesized analogously by following the procedure detailed in Step 9 of Example 20 by using the product from Step 1 and ammonium chloride and purification by reverse phase preparative chromatography.

$^1$H NMR (400 MHz, DMSO-d$_6$) δ 12.88 (d, J=3.9 Hz, 2H), 8.58 (m, 1H), 8.00 (s, 1H), 7.69 (s, 1H), 7.65 (s, 1H), 7.57 (s, 1H), 7.50 (s, 1H), 7.41 (s, 1H), 6.53 (m, 2H), 5.49 (m, 2H), 4.88 (m, 4H), 4.63-4.44 (m, 6H), 4.29 (d, J=4.9 Hz, 2H), 4.24-4.15 (m, 2H), 3.08 (s, 1H), 2.96 (t, J=7.7 Hz, 2H), 2.88 (d, J=10.4 Hz, 2H), 2.81-2.62 (m, 2H), 2.20-1.92 (m, 10H), 1.75 (d, J=4.2 Hz, 4H), 1.30-1.23 (m, 6H); LCMS (ESI): m/z 970.20 (M+H)$^+$; HPLC Purity: 96.27%

Example 22: (E)-N-((1R,4R)-4-(1H-tetrazol-5-yl)cyclohexyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca [3,2,1-cd:8,9,10-c'd']diindene-4,12-dicarboxamide (Compound 22)

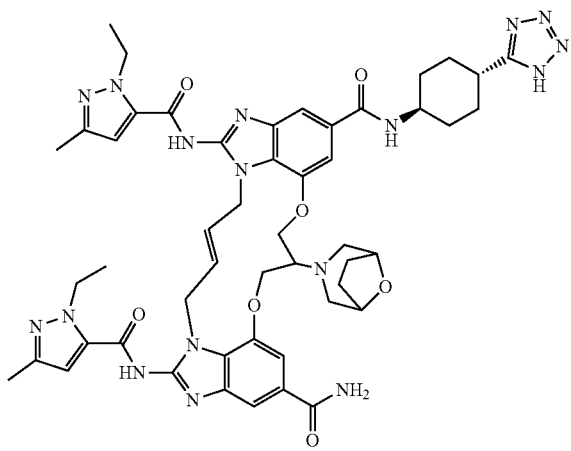 [SMILES: CCn1nc(C)cc1C(=O)Nc1nc2cc(C(=O)O)cc3c2n1C/C=C/Cn1c(NC(=O)c2cc(C)nn2CC)nc2cc(C(=O)N[C@H]4CC[C@H](c5nnn[nH]5)CC4)cc(c21)OCC(N1CC2CCC(C1)O2)CO3]

Step 1: (E)-12-(((1R,4R)-4-(1H-tetrazol-5-yl)cyclohexyl)carbamoyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylic acid

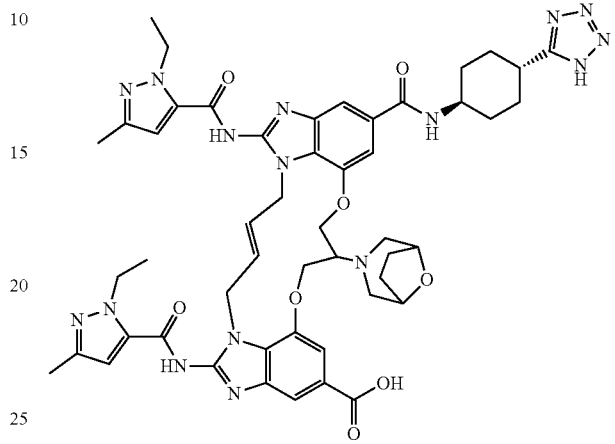

Synthesized analogously by following the procedure detailed in Step 8 of Example 20 by using (E)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxylic acid and (1R,4R)-4-(1H-tetrazol-5-yl)cyclohexan-1-amine hydrochloride (Int. 3b).
LCMS (ESI): m/z 1011.21 (M+H)$^+$ Step 2: (E)-N-((1R,4R)-4-(1H-tetrazol-5-yl)cyclohexyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-4,12-dicarboxamide

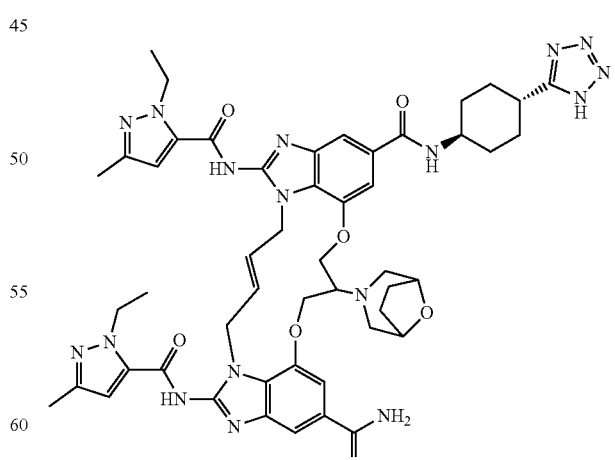

Synthesized analogously by following the procedure detailed in Step 9 of Example 20 by using the product from Step 1 and ammonium chloride and purification by reverse phase preparative chromatography.

¹H NMR (400 MHz, DMSO-d₆) δ 12.95 (s, 1H), 8.31 (m, 1H), 8.01 (s, 1H), 7.70 (s, 1H), 7.66 (s, 1H), 7.57 (d, J=1.3 Hz, 1H), 7.49 (s, 1H), 7.42 (s, 1H), 6.53 (m, 2H), 5.47 (m, 2H), 4.88 (m, 4H), 4.71-4.48 (m, 6H), 4.30 (s, 2H), 4.20 (q, J=10.5 Hz, 2H), 3.98-3.75 (m, 1H), 3.09 (s, 1H), 3.03-2.93 (m, 1H), 2.92-2.83 (m, 2H), 2.71 (s, 1H), 2.70-2.65 (m, 1H), 2.12 (d, J=12.2 Hz, 2H), 2.08-1.99 (m, 11H), 1.76 (s, 2H), 1.62 (m, 4H), 1.29-1.23 (m, 6H); LCMS (ESI): m/z 1010.21 (M+H)⁺; HPLC Purity: 97.05%

Example 23: (E)-1-(3-(8-(8-oxa-3-azabicyclo[3.2.1]octan-3-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 23)

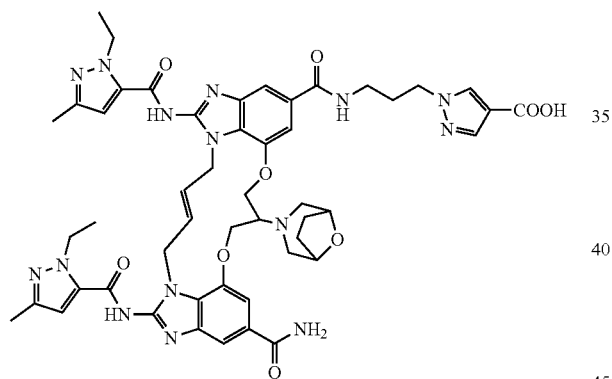

Synthesized from step 7 product of example 20 and ethyl 1-(3-aminopropyl)-1H-pyrazole-4-carboxylate (Int. 5) by following an analogous procedure described in Steps 8, 9 & 10 of Example 20. (Yield: 22.0%)

¹H NMR (400 MHz, DMSO-d₆) δ 8.50 (brs, 1H), 8.40 (s, 2H), 8.26 (s, 1H), 7.98 (brs, 1H), 7.79 (s, 1H), 7.64 (s, 1H), 7.53 (s, 1H), 7.46 (s, 1H), 6.50 (s, 2H), 5.54-5.31 (m, 2H), 4.88 (m, 4H), 4.63-4.46 (m, 6H), 4.28 (s, 2H), 4.21 (t, J=6.8 Hz, 4H), 3.27 (d, J=6.7 Hz, 2H), 3.14-3.03 (m, 1H), 2.88 (d, J=10.5 Hz, 2H), 2.76-2.65 (m, 2H), 2.08-1.99 (m, 10H), 1.83-1.66 (m, 2H), 1.24 (m, 6H); LCMS (ESI): m/z 1012.21 (M+H)⁺; HPLC Purity: 99.29%

Example 24: (E)-N-((1R,4R)-4-(1H-tetrazol-5-yl)cyclohexyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 24)

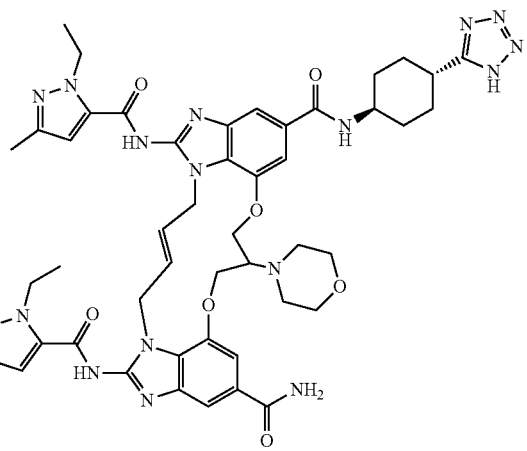

Step 1: Synthesis of diethyl 5,5'-((2-(methoxymethoxy)propane-1,3-diyl)bis(oxy))bis(4-chloro-3-nitrobenzoate)

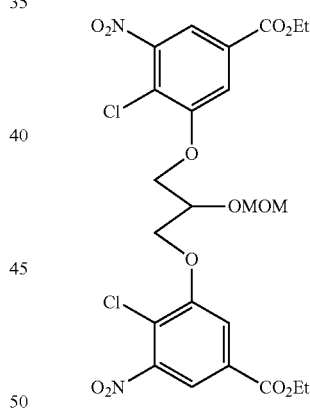

To a cooled solution of ethyl 4-chloro-3-hydroxy-5-nitrobenzoate (325 g, 1323 mmol), 2-(methoxymethoxy)propane-1,3-diol (90 g, 662 mmol), triphenylphosphine (694 g, 2646 mmol)) in THF (2 L) was added DIAD (0.515 1, 2646 mmol), dropwise and reaction mixture was stirred at 60° C. for 16 h. The progress of the reaction was monitored by TLC. Reaction mixture was concentrated to get crude material, to this IPA (200 ml) was added and stirred for 30 min at room temperature and then at −78° C. for 30 min, filtered solid, dried well to afford pure diethyl 5,5'-((2-(methoxymethoxy)propane-1,3-diyl)bis(oxy))bis(4-chloro-3-nitrobenzoate, (yield=230 g, 59%).

¹H NMR (400 MHz, Chloroform-d) δ 8.08 (d, J=1.7 Hz, 2H), 7.84 (d, J=1.8 Hz, 2H), 4.91 (s, 2H), 4.58-4.40 (m, 10H), 3.48 (s, 3H), 1.44 (t, J=7.1 Hz, 6H).

Step 2: Synthesis of diethyl 5,5'-((2-hydroxypropane-1,3-diyl)bis(oxy))bis(4-chloro-3-nitrobenzoate)

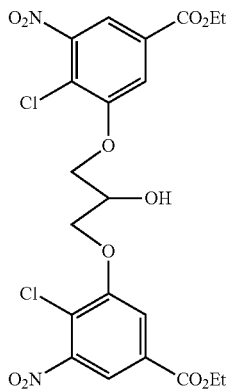 [SMILES: CCOC(=O)c1cc(OCC(O)COc2cc(C(=O)OCC)cc([N+](=O)[O-])c2Cl)c(Cl)c([N+](=O)[O-])c1]

To a cooled solution of diethyl 5,5'-((2-(methoxymethoxy)propane-1,3-diyl)bis(oxy))bis(4-chloro-3-nitrobenzoate) (step 1, 23.0 g, 38.9 mmol) in DCM (150 ml) and Ethanol (150 ml) was added HCl in dioxane (97.2 ml, 388.9 mmol), and reaction mixture was stirred at 25° C. for 12 h. The progress of the reaction was monitored by TLC. Reaction mixture was concentrated and dissolved in DCM (200 ml) and washed by 8% sodium bicarbonate solution and by water, organic phase was dried over sodium sulphate and distilled under reduced pressure to get diethyl 5,5'-((2-hydroxypropane-1,3-diyl)bis(oxy))bis(4-chloro-3-nitrobenzoate), (yield=21.0 g 97%).

$^1$H NMR (400 MHz, Chloroform-d) δ 8.10 (d, J=1.7 Hz, 2H), 7.85 (d, J=1.8 Hz, 2H), 4.61 (p, J=5.1 Hz, 1H), 4.50-4.40 (m, 7H), 3.72 (s, 3H), 1.44 (t, J=7.1 Hz, 5H).

Step 3: Synthesis of diethyl 5,5'-((2-(((trifluoromethyl)sulfonyl)oxy)propane-1,3-diyl)bis(oxy))bis(4-chloro-3-nitrobenzoate)

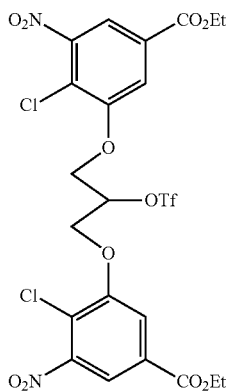 [SMILES: CCOC(=O)c1cc(OCC(COc2cc(C(=O)OCC)cc([N+](=O)[O-])c2Cl)OS(=O)(=O)C(F)(F)F)c(Cl)c([N+](=O)[O-])c1]

To a cooled solution of diethyl 5,5'-((2-hydroxypropane-1,3-diyl)bis(oxy))bis(4-chloro-3-nitrobenzoate) (step 2, 21.0 g, 38.4 mmol), in DCM (200 ml) 2,6-lutidine (17.9 ml, 153.5 mmol), trifluoromethanesulfonic anhydride (16.2 g, 57.6 mmol)) was added dropwise and reaction mixture was stirred at 0° C. for 1 h. The progress of the reaction was monitored by TLC. Reaction mixture was quenched in 2N aqueous HCl and extracted by DCM and washed with water, dried over sodium sulphate and concentrated under reduced pressure to get diethyl 5,5'-((2-(((trifluoromethyl) sulfonyl)oxy)propane-1,3-diyl)bis(oxy))bis(4-chloro-3-nitrobenzoate) (yield=24.0 g, 92%).

$^1$H NMR (400 MHz, Chloroform-d) δ 8.15 (d, J=1.7 Hz, 2H), 7.83 (d, J=1.7 Hz, 2H), 5.64 (p, J=4.8 Hz, 1H), 4.70-4.66 (m, 4H), 4.47 (q, J=7.1 Hz, 4H), 3.73 (s, 1H), 1.45 (t, J=7.1 Hz, 6H).

Step 4: Synthesis of diethyl 5,5'-((2-morpholinopropane-1,3-diyl)bis(oxy))bis(4-chloro-3-nitrobenzoate)

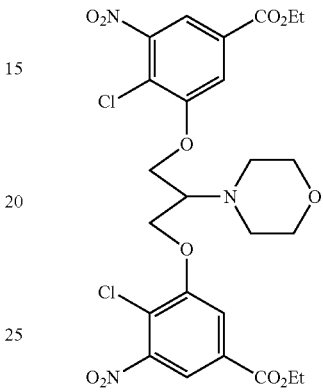

To a cooled solution of morpholine (1.924 g, 22.08 mmol) in THF (300 ml) was added TEA (1.847 ml, 13.25 mmol) and stirred for 30 min at room temperature. Reaction mixture was cooled to 0° C. and then added solution of diethyl 5,5'-((2-(((trifluoromethyl)sulfonyl)oxy)propane-1,3-diyl) bis(oxy))bis(4-chloro-3-nitrobenzoate) (step 3, 7.5 g, 11.04 mmol) in THF (30 ml), stirred at 25° C. for 12 h. The progress of the reaction was monitored by TLC. Reaction mixture was concentrated and purified by column chromatography to get desired product (yield=2.8 g, 41.1%).

$^1$H NMR (400 MHz, DMSO-d$_6$) δ 8.10 (d, J=1.8 Hz, 2H), 7.93 (d, J=1.8 Hz, 2H), 4.54 (d, J=5.7 Hz, 4H), 4.38 (q, J=7.1 Hz, 4H), 3.53 (t, J=4.5 Hz, 4H), 3.44 (m, 1H), 2.79 (t, J=4.6 Hz, 4H), 1.35 (t, J=7.1 Hz, 6H); LCMS (ESI): m/z 615.84 (M+H)$^+$

Step 5: diethyl (E)-7-morpholino-1,13-dinitro-7,8,14,15,18,19-hexahydro-6H-dibenzo[b,j][1,12]dioxa[4,9]diazacyclopentadecine-3,11-dicarboxylate

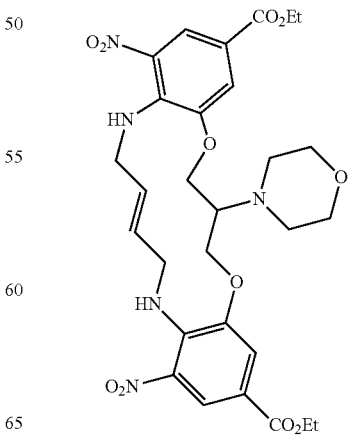

To a solution of diethyl 5,5'-((2-morpholinopropane-1,3-diyl)bis(oxy))bis(4-chloro-3-nitrobenzoate) (step 4, 40.0 g, 62.6 mmol) in a solvent mixture of ethanol (350 ml) and THF (50 mL) in 1 lit autoclave was added (E)-but-2-ene-1,4-diamine dihydrochloride (13.9 g, 87.2 mmol) and DIPEA (108 ml, 622.6 mmol) and stirred the reaction mixture at 110° C. for 24 h. The progress of the reaction was monitored by TLC. Reaction mixture was cooled to room temperature and the solid obtained was filtered and dried to get the product as a red solid (Yield: 36.0 g, 88%).

$^1$H NMR (400 MHz, DMSO-$d_6$) δ 8.37 (m, 2H), 8.26 (d, J=1.9 Hz, 2H), 7.64 (d, J=2.0 Hz, 2H), 5.73-5.63 (m, 2H), 4.53-4.41 (m, 2H), 4.35-4.24 (m, 6H), 4.11-4.01 (m, 2H), 3.94-3.85 (m, 2H), 3.64 (t, J=4.4 Hz, 4H), 3.32-3.23 (m, 1H), 2.74 (t, J=4.6 Hz, 4H), 1.31 (t, J=7.1 Hz, 6H); LCMS (ESI): m/z 629.96 (M+H)$^+$

Step 6: diethyl (E)-1,13-diamino-7-morpholino-7,8,14,15,18,19-hexahydro-6H-dibenzo[b,j][1,12]dioxa[4,9]diazacyclopentadecine-3,11-dicarboxylate

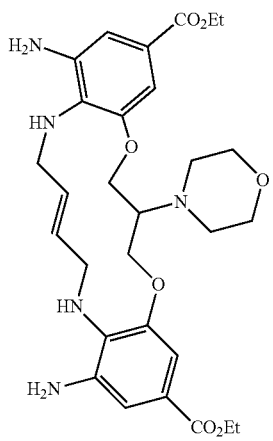 [SMILES: CCOC(=O)c1cc2c(c([N+](=O)[O-])c1)NC/C=C/CNc1c(cc(C(=O)OCC)cc1[N+](=O)[O-])OCC(N1CCOCC1)CO2]

To a stirred suspension of diethyl (E)-7-morpholino-1,13-dinitro-7,8,14,15,18,19-hexahydro-6H-dibenzo[b,j][1,12]dioxa[4,9]diazacyclopentadecine-3,11-dicarboxylate (step 5, 20.0 g, 30.8 mmol) in THF (150 ml) and ethanol (50 ml) was added Sodium dithionite (53.1 g, 305.0 mmol) (solution in 750 ml of water) at 0° C. Ammonium hydroxide (71.3 ml, 457.6 mmol) was added at the same temperature. Reaction mixture was warmed 25° C. and stirred C for 3 h. Progress of reaction was monitored by LCMS. Solid was filtered off and organic solvents were removed under vacuum. Water was added to the reaction mixture and extracted with DCM (2×250 ml). The organic layer was dried over sodium sulphate and concentrated to get crude residue. Solid was washed with ether to get the crude diamine which was used as such in the next step (Yield: 16.7 g, 92%).

$^1$H NMR (400 MHz, DMSO-$d_6$) δ 7.31-7.08 (m, 4H), 7.04-7.01 (m, 2H), 7.00-6.92 (m, 2H), 5.52-5.39 (m, 2H), 4.34-4.20 (m, 8H), 3.71-3.61 (m, 4H), 3.57-3.46 (m, 4H), 3.45-3.38 (m, 1H), 2.87-2.67 (m, 4H), 1.31-1.27 (m, 6H); LCMS (ESI): m/z 570.20 (M+H)$^+$

Step 7: diethyl (E)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxylate

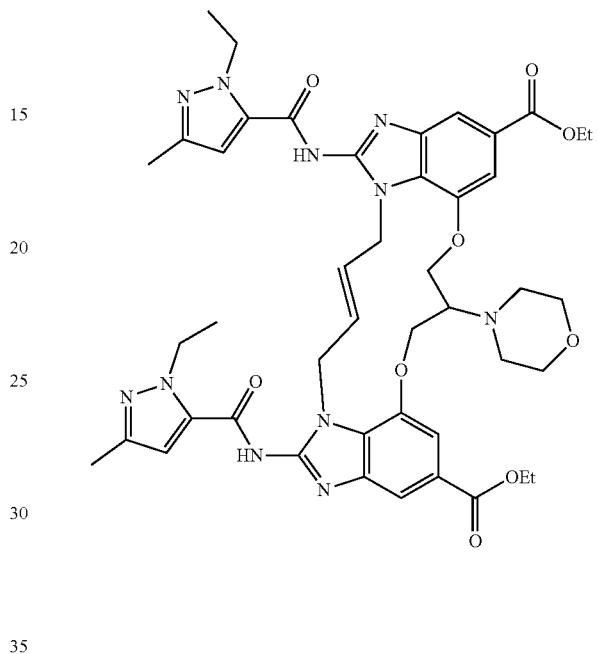

To a stirred solution of diethyl diethyl (E)-1,13-diamino-7-morpholino-7,8,14,15,18,19-hexahydro-6H-dibenzo[b,j][1,12]dioxa[4,9]diazacyclopentadecine-3,11-dicarboxylate (step 6, 14.3 g, 24.5 mmol) in DMF (120 ml), 1-ethyl-3-methyl-1H-pyrazole-5-carbonyl isothiocyanate (8.9 g, 45.6 mmol) in 20 ml of DMF was added at 0° C. and stirred for 30 min. EDC (13.8 g, 72.0 mmol) and TEA (20.1 ml, 144.0 mmol) were added at 0° C. after that and the reaction mixture stirred for 18 hr. Reaction was monitored by LCMS. After completion the mixture was conc. under reduced pressure, water was added and the solid obtained was filtered and dried to get the crude material. This was then washed with 50% EA in hexane to remove non polar impurities & then with 10% THF in acetonitrile to remove polar impurities, to obtain the pure product (Yield: 10.0 g, 45%).

$^1$H NMR (400 MHz, DMSO-$d_6$) δ 12.92 (s, 2H), 7.84 (d, J=1.3 Hz, 2H), 7.69 (d, J=1.4 Hz, 2H), 6.55 (s, 2H), 5.62-5.49 (m, 2H), 4.97-4.82 (m, 4H), 4.70-4.59 (m, 2H), 4.59-4.48 (m, 4H), 4.38-4.24 (m, 6H), 3.76-3.62 (m, 4H), 3.15-3.05 (m, 1H), 2.86-2.75 (m, 4H), 2.08 (s, 6H), 1.35 (t, J=7.1 Hz, 6H), 1.28 (t, J=7.1 Hz, 6H); LCMS (ESI): m/z 892.06 (M+H)$^+$

Step 8: (E)-4-(ethoxycarbonyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-12-carboxylic acid Step 9: ethyl (E)-12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxylate

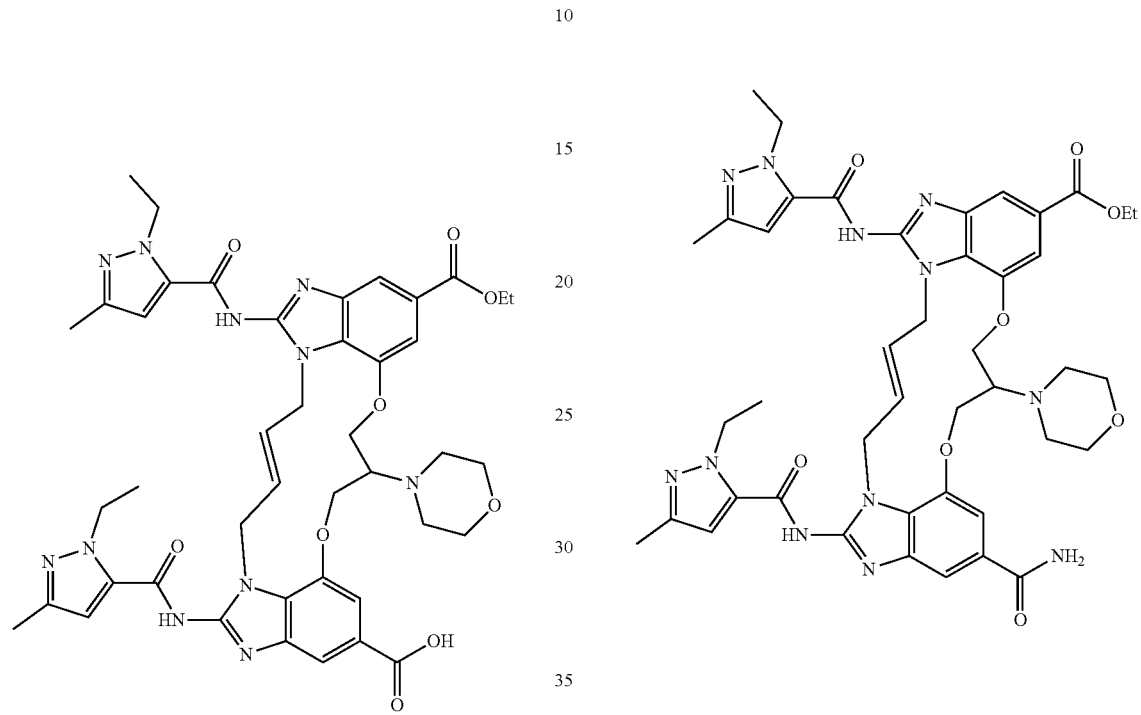

To the stirred solution of diethyl (E)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxylate (Step 7, 1.0 g, 1.089 mmol) in ethanol (20 ml) and THF (20 ml) was added lithium hydroxide hydrate (0.183 g, 4.36 mmol) by dissolving in H$_2$O (Volume: 5 ml) at room temperature and stirred for 16 h at 50° C. The reaction was monitored by LCMS, reaction was conc. under reduced pressure and water was added pH was adjusted to acidic by using 1N HCl, solid was precipitated out which was filtered and dried to get (E)-4-(ethoxycarbonyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-12-carboxylic acid (600 mg, 61.9% yield).

LCMS (ESI): m/z 864.06 (M+H)$^+$ (E)-4-(ethoxycarbonyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-12-carboxylic acid (Step 8, 1.0 g, 1.124 mmol) was dissolved in DMF (10 ml), EDC (0.470 g, 1.461 mmol) and DIPEA (0.981 ml, 5.62 mmol) was added to it. Ammonium chloride (2.104 g, 39.3 mmol) was added and the reaction mixture was stirred at room temperature overnight. The reaction was monitored by LCMS. The reaction mixture concentrated to dryness and then water was added solid obtained was filtered and dried to get product (600 mg, 0.674 mmol, 60.9% yield).

$^1$H NMR (400 MHz, DMSO-d$_6$) δ 12.97-12.84 (m, 2H), 8.00 (s, 1H), 7.84 (d, J=1.3 Hz, 1H), 7.75-7.65 (m, 2H), 7.62 (d, J=1.4 Hz, 1H), 7.42 (s, 1H), 6.56 (s, 1H), 6.53 (s, 1H), 5.55 (s, 2H), 5.08-4.73 (m, 4H), 4.70-4.47 (m, 6H), 4.41-4.30 (m, 2H), 4.30-4.19 (m, 2H), 3.79-3.60 (m, 4H), 3.15-3.05 (m, 1H), 2.89-2.74 (m, 4H), 2.09-2.04 (m, 6H), 1.35 (t, J=7.1 Hz, 3H), 1.31-1.25 (m, 6H); LCMS (ESI) m/z 863.18 (M+H)$^+$

187

Step 10: (E)-12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxylic acid

188

Step 11: (E)-N-((1R,4R)-4-(1H-tetrazol-5-yl)cyclohexyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 24)

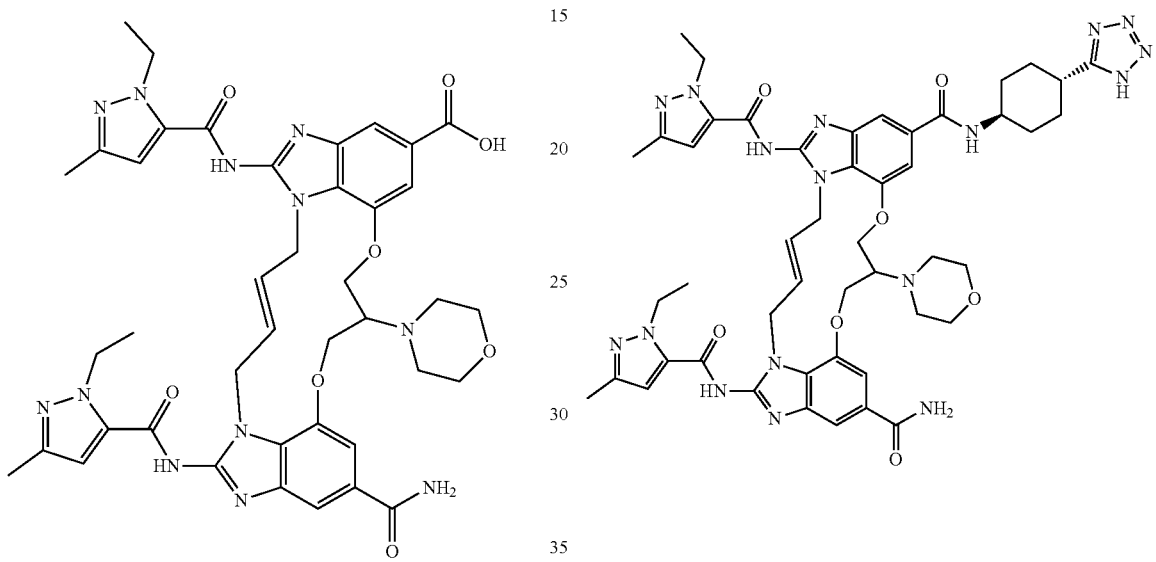

To the stirred solution of ethyl ethyl (E)-12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxylate (Step 9, 900 mg, 1.012 mmol) in MeOH (10 ml) and THF (10 ml) was added lithium hydroxide hydrate (425 mg, 10.12 mmol) by dissolving in H$_2$O (Volume: 5 ml) at room temperature and stirred for 16 h at 50° C. The reaction was monitored by LCMS, reaction was conc. under reduced pressure and water was added pH was adjusted to acidic by using 1N HCl, solid was precipitated out which was filtered and dried to get the desired product (840 mg, Yield: 86%).

$^1$H NMR (400 MHz, DMSO-d$_6$) δ 8.16 (s, 1H), 7.94 (s, 2H), 7.89 (d, J=1.2 Hz, 1H), 7.78 (d, J=1.1 Hz, 1H), 7.49 (s, 1H), 6.54 (s, 1H), 6.52 (s, 1H), 5.44-5.29 (m, 2H), 5.20-5.08 (m, 2H), 5.03-4.84 (m, 4H), 4.57-4.37 (m, 6H), 4.08-4.01 (m, 4H), 3.70-3.47 (m, 5H), 2.05-2.03 (m, 6H), 1.27-1.23 (m, 6H); LCMS (ESI): m/z 835.26 (M+H)$^+$ (E)-12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxylic acid (Step 10, 600 mg, 0.697 mmol) was dissolved in DMSO (10 ml), EDC (401 mg, 2.091 mmol) and DIPEA (0.609 ml, 3.48 mmol), (1R,4R)-4-(1H-tetrazol-5-yl)cyclohexan-1-amine hydrochloride (284 mg, 1.394 mmol) (Int. 3b) was added to it. HOBT (320 mg, 2.091 mmol) was added and the reaction mixture was allowed to stir at RT overnight. The reaction was monitored by LCMS. The reaction mixture was concentrated to remove DIPEA and then water was added, solid obtained was filtered and dried to get crude product. Purified by reverse phase preparative HPLC. (Yield: 21.0%)

$^1$H NMR (400 MHz, DMSO-d$_6$) δ 12.88 (s, 2H), 8.30 (m, 1H), 8.01 (s, 1H), 7.71 (s, 1H), 7.69 (s, 1H), 7.64 (s, 1H), 7.58 (s, 1H), 7.41 (s, 1H), 6.54 (m, 2H), 5.61-5.46 (m, 2H), 4.98-4.81 (m, 4H), 4.72-4.62 (m, 2H), 4.56-4.47 (m, 3H), 4.28-4.16 (m, 2H), 3.95-3.77 (m, 2H), 3.74-3.60 (m, 4H), 3.20-3.13 (m, 1H), 3.02-2.93 (m, 1H), 2.92-2.77 (m, 4H), 2.22-1.88 (m, 10H), 1.71-1.48 (m, 4H), 1.30-1.20 (m, 6H); LCMS (ESI): m/z 984.08 (M+H)$^+$; HPLC Purity: 99.36%

Example 25: (E)-N-(3-(1H-tetrazol-5-yl)propyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 25)

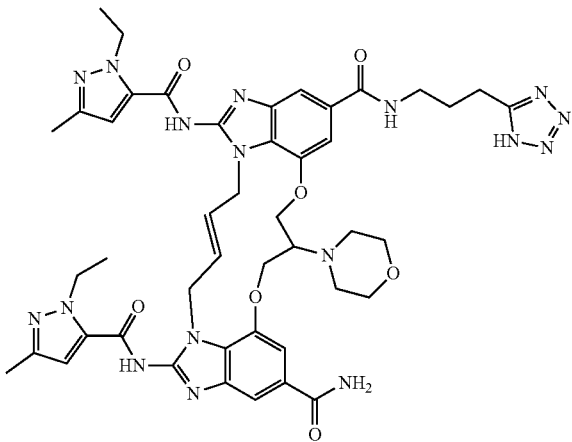 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCc4nnn[nH]4)cc(c21)OCC(N1CCOCC1)CO3]

Synthesized from step 10 product of example 24 and 3-(1H-tetrazol-5-yl)propan-1-amine by following an analogous procedure described in step 11 of Example 24. (Yield: 26.0%)

$^1$H NMR (400 MHz, DMSO-d$_6$) δ 13.01-12.81 (m, 2H), 8.60 (m, 1H), 8.00 (s, 1H), 7.70 (m, 2H), 7.64 (s, 1H), 7.58 (s, 1H), 7.41 (s, 1H), 6.53 (s, 2H), 5.60-5.42 (m, 2H), 5.04-4.81 (m, 4H), 4.72-4.59 (m, 2H), 4.58-4.46 (m, 4H), 4.24-4.13 (m, 2H), 3.73-3.63 (m, 4H), 3.41-3.37 (m, 2H), 3.16 (s, 1H), 3.00-2.91 (m, 2H), 2.90-2.77 (m, 4H), 2.06 (s, 6H), 2.04-1.93 (m, 4H), 1.33-1.25 (m, 6H); LCMS (ESI): m/z 944.20 (M+H)$^+$; HPLC Purity: 99.22%

Example 26: (1R,4R)-4-((E)-12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 26)

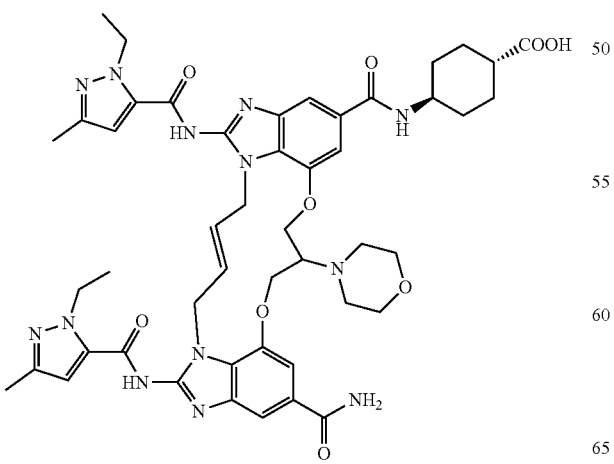

Synthesized from step 10 product of example 24 and methyl (1R,4R)-4-aminocyclohexane-1-carboxylate hydrochloride by following an analogous procedures described in steps 1 & 2 of Example 14. (Yield: 24.0%)

$^1$H NMR (400 MHz, DMSO-d$_6$) δ 12.87 (s, 1H), 8.28-8.08 (m, 1H), 8.00 (s, 1H), 7.71 (s, 1H), 7.67 (s, 1H), 7.63 (s, 1H), 7.55 (s, 1H), 7.41 (s, 1H), 6.53 (s, 2H), 5.70-5.34 (m, 2H), 5.05-4.78 (m, 4H), 4.65 (t, J=11.6 Hz, 2H), 4.56-4.37 (m, 4H), 4.30-4.09 (m, 2H), 3.86-3.73 (m, 1H), 3.74-3.62 (m, 4H), 3.21-3.08 (m, 1H), 2.96-2.76 (m, 4H), 2.25-2.11 (m, 1H), 2.07-2.09 (m, 6H), 2.00-1.88 (m, 4H), 1.53-1.32 (m, 4H), 1.31-1.24 (m, 6H); LCMS (ESI) m/z 960.20 (M+H)$^+$; HPLC Purity: 99.02%

Example 27: (E)-1-(3-(12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 27)

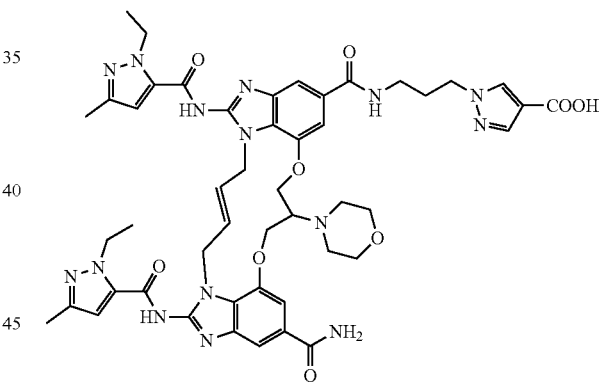

Synthesized from step 10 product of example 24 and ethyl 1-(3-aminopropyl)-1H-pyrazole-4-carboxylate (Int. 5) by following an analogous procedures described in steps 1 & 2 of Example 14. (Yield: 28.0%)

$^1$H NMR (400 MHz, DMSO-d$_6$) δ 8.53 (m, 1H), 8.00 (s, 1H), 7.71 (s, 1H), 7.68 (s, 1H), 7.64 (s, 1H), 7.58 (s, 1H), 7.41 (s, 1H), 6.54 (s, 2H), 5.52 (d, J=4.1 Hz, 2H), 5.00-4.77 (m, 4H), 4.70-4.61 (m, 2H), 4.59-4.44 (m, 4H), 4.30-4.14 (m, 6H), 3.75-3.61 (m, 4H), 3.27-3.22 (m, 2H), 3.21-3.10 (m, 1H), 2.90-2.77 (m, 4H), 2.06 (s, 8H), 1.29-1.25 (m, 8H); LCMS (ESI): m/z 986.21 (M+H)$^+$; HPLC Purity: 99.26%

Example 28: (E)-1,15-bis(1-ethyl-3-methyl-1H-pyrazole-5-carboxamido)-N-(2-morpholinoethyl)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 28)

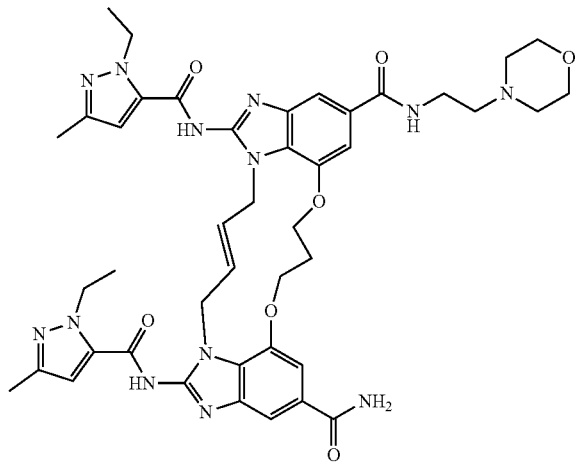 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCN4CCOCC4)cc(c21)OCCCO3]

(E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylic acid (Intermediate 1) (0.2 g, 0.27 mmol) and 2-morpholinoethan-1-amine (0.17 g, 1.33 mmol) was dissolved in 5 mL DMF. TBTU (0.17 g, 0.54 mmol) followed by diisopropylethylamine (0.28 ml, 1.60 mmol) was added and the reaction mixture stirred at room temperature overnight. The DMF was then concentrated under reduced pressure and water was added to it resulting in the precipitation of the product. The precipitate was filtered and washed with water and the crude product was purified by reverse phase preparative chromatography to obtain the pure product. This was then converted to its hydrochloride salt by stirring with 3 N methanolic HCl for 15 min, concentrating the mixture and triturating the resultant solid with diethyl ether to obtain the salt as an off white solid (15 mg, 6.5%). $^1$H NMR (400 MHz, DMSO-$d_6$) δ 12.95 (brs, 2H), 10.67 (brs, 1H), 8.95 (t, J=5.5 Hz, 1H), 8.03 (brs, 1H), 7.74 (s, 1H), 7.71 (s, 1H), 7.66 (s, 1H), 7.54 (s, 1H), 7.39 (brs, 1H), 6.56 (s, 1H), 6.55 (s, 1H), 5.56-5.42 (m, 2H), 4.89 (brs, 4H), 4.55-4.42 (m, 8H), 4.02-3.99 (m, 2H), 3.83 (t, J=12.1 Hz, 2H), 3.74-3.68 (m, 2H), 3.59 (d, J=12.2 Hz, 2H), 3.37-3.31 (m, 2H), 3.19-3.10 (m, 2H), 2.33-2.26 (m, 2H), 2.08 (s, 6H), 1.30-1.25 (m, 6H); LCMS: m/z=862.18 (M+H)$^+$; HPLC Purity: 98.18%

Example 29 (E)-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carbonyl)glycine (Compound 29)

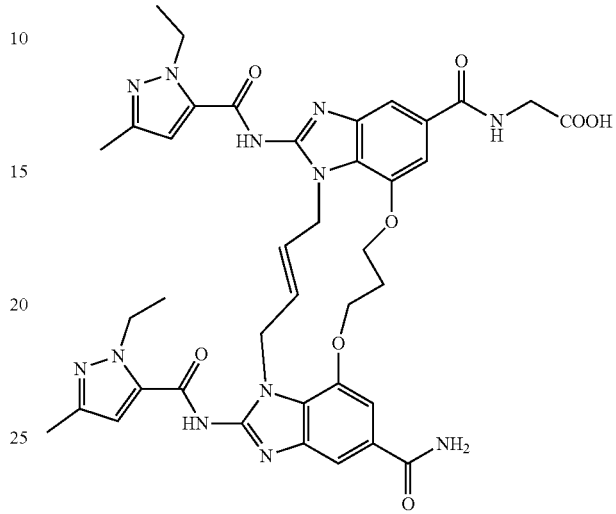

(E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxylic acid (Intermediate 1) (0.3 g, 0.40 mmol) and tert-butyl glycinate (0.17 g, 0.80 mmol) was dissolved in 5 mL DMF. TBTU (0.19 g, 0.60 mmol) followed by diisopropylethylamine (0.28 ml, 1.60 mmol) was added and the reaction mixture stirred at room temperature overnight. The DMF was then concentrated under reduced pressure and water was added to it resulting in the precipitation of the product. The precipitate was filtered and washed with water and the crude product was purified by reverse phase preparative chromatography to obtain the tert-butyl ester intermediate (70 mg, 20%). LCMS: m/z=877.06 (M+H)$^+$ To a stirred solution of tert-butyl (E)-3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propanoate (70 mg, 0.08 mmol) in 10 mL DCM was added TFA (0.13 ml, 1.60 mmol) and stirred for 1 h. After deprotection of the tert-butyl group as monitored by LCMS, the reaction mixture was evaporated to dryness and the resulting solid washed with ether and dried to obtain the final product (39 mg, 61%). $^1$H NMR (400 MHz, DMSO-$d_6$) δ 12.93 (brs, 2H), 8.86 (t, J=5.9 Hz, 1H), 8.01 (brs, 1H), 7.72 (s, 1H), 7.71 (s, 1H), 7.53 (s, 2H), 7.38 (brs, 1H), 6.56 (s, 2H), 5.54-5.48 (m, 2H), 4.89 (brs, 4H), 4.53 (q, J=7.1 Hz, 4H), 4.47-4.41 (m, 4H), 3.96 (d, J=5.8 Hz, 2H), 2.32-2.24 (m, 2H), 2.08 (s, 6H), 1.30-1.24 (m, 6H); LCMS: m/z=807.04 (M+H)$^+$; HPLC Purity: 100.0%

Example 30: (E)-N-(2-(8-oxa-3-azabicyclo[3.2.1]octan-3-yl)ethyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 30)

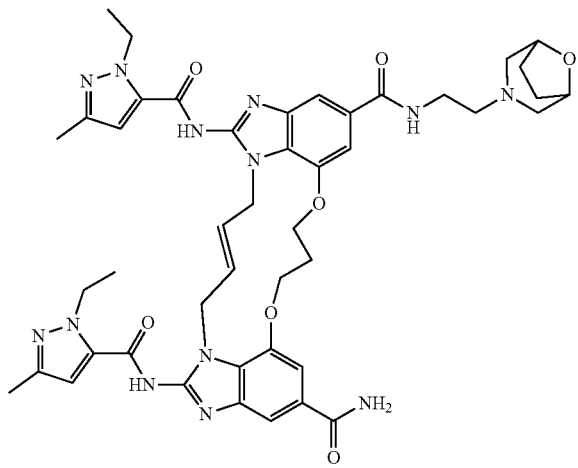 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCN4CC5CCC(C4)O5)cc(c21)OCCCO3]

Synthesized from Intermediate 1 and 2-(8-oxa-3-azabicyclo[3.2.1]octan-3-yl)ethan-1-amine (Int 9) by following an analogous procedure described for the synthesis of Example 28 (Yield=80 mg, 19%). $^1$H NMR (400 MHz, DMSO-d$_6$) δ 10.36 (bs, 1H), 9.07 (t, J=5.3 Hz, 1H), 8.03 (bs, 1H), 7.74 (s, 1H), 7.71 (s, 1H), 7.67 (s, 1H), 7.54 (s, 1H), 7.38 (bs, 1H), 6.57 (s, 1H), 6.56 (s, 1H), 5.57-5.43 (m, 2H), 4.89 (bs, 4H), 4.56-4.43 (m, 10H), 3.76-3.68 (m, 2H), 3.53-3.44 (m, 2H), 3.35-3.26 (m, 2H), 3.16 (t, J=10.7 Hz, 2H), 2.32-2.23 (m, 4H), 2.08 (s, 6H), 2.00-1.92 (m, 2H), 1.27 (m, 6H); LCMS: m/z=888.19 (M+H)$^+$; HPLC Purity: 99.79%

Example 31: (E)-3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propanoic acid (Compound 31)

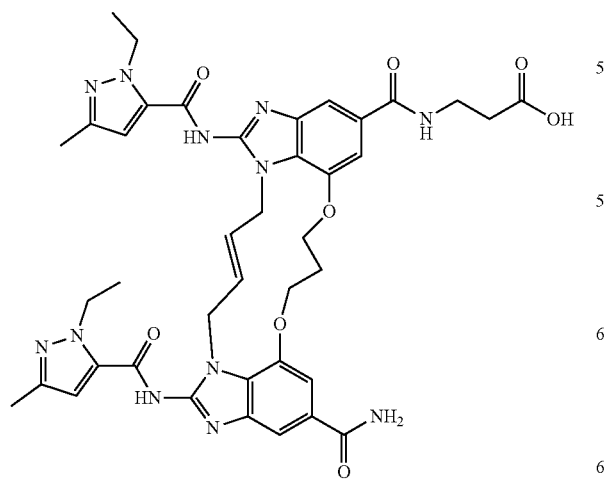

Synthesized from Intermediate 1 and tert-butyl 3-aminopropanoate by following an analogous procedure described for the synthesis of Example 29 (Yield=40 mg, 61%). $^1$H NMR (400 MHz, DMSO-d$_6$) δ 12.91 (brs, 2H), 8.56 (t, J=5.5 Hz, 1H), 8.01 (brs, 1H), 7.71 (s, 1H), 7.68 (s, 1H), 7.53 (s, 1H), 7.49 (s, 1H), 7.39 (brs, 1H), 6.55 (s, 2H), 5.51-5.48 (m, 2H), 4.88 (brs, 4H), 4.53 (q, J=7.0 Hz, 4H), 4.46-4.40 (m, 4H), 3.50-3.46 (m, 2H), 2.56-2.55 (m, 2H), 2.31-2.25 (m, 2H), 2.08 (s, 6H), 1.29-1.25 (m, 6H); LCMS: m/z=821.05 (M+H)$^+$; HPLC Purity: 99.18%

Example 32: (E)-1,15-bis(1-ethyl-3-methyl-1H-pyrazole-5-carboxamido)-N-(3-morpholinopropyl)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 32)

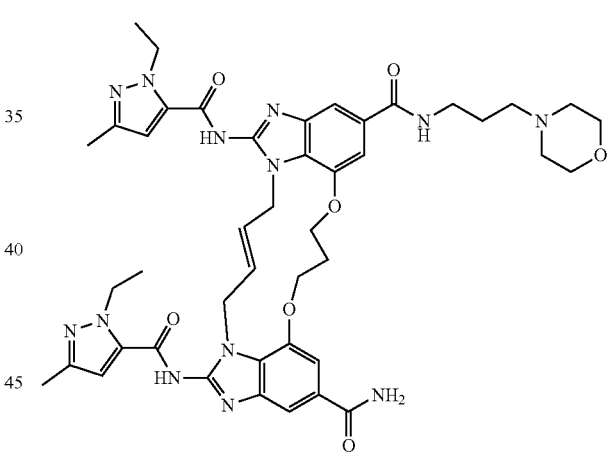

Synthesized from Intermediate 1 and 3-morpholinopropan-1-amine by following an analogous procedure described for the synthesis of Example 28 (Yield=61 mg, 14%). $^1$H NMR (400 MHz, DMSO-d$_6$) δ 12.92 (brs, 2H), 10.79 (s, 1H), 8.80 (t, J=5.7 Hz, 1H), 8.02 (bs, 1H), 7.80-7.64 (m, 2H), 7.58 (s, 1H), 7.55 (s, 1H), 7.39 (bs, 1H), 6.57 (s, 1H), 6.56 (s, 1H), 5.59-5.35 (m, 2H), 4.89 (bs, 4H), 4.60-4.46 (m, 8H), 4.01-3.93 (m, 2H), 3.80 (t, J=12.1 Hz, 2H), 3.47-3.33 (m, 4H), 3.21-3.01 (m, 4H), 2.33-2.26 (m, 2H), 2.08 (s, 6H), 2.04-1.95 (m, 2H), 1.27 (t, J=7.1, 1.4 Hz, 6H); LCMS: m/z=876.18 (M+H)$^+$; HPLC Purity: 99.25%

Example 33: (E)-N-(3-(8-oxa-3-azabicyclo[3.2.1]
octan-3-yl)propyl)-1,15-bis(1-ethyl-3-methyl-1H-
pyrazole-5-carboxamido)-8,9,16,19-tetrahydro-7H-6,
10-dioxa-2,14,15a,19a-tetraazacyclopentadeca[3,2,1-
cd:8,9,10-c'd']diindene-4,12-dicarboxamide
hydrochloride (Compound 33)

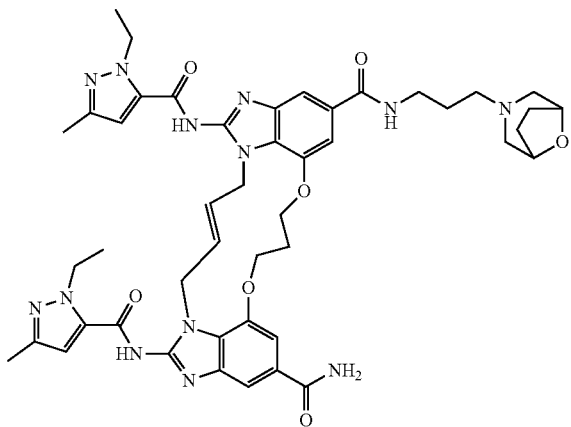 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCN4CC5CCC(C4)O5)cc(c21)OCCCO3]

Synthesized from Intermediate 1 and 3-(8-oxa-3-azabicyclo[3.2.1]octan-3-yl)propan-1-amine (Int. 10) by following an analogous procedure described for the synthesis of Example 28 (Yield=60 mg, 14%). $^1$H NMR (400 MHz, DMSO-d$_6$) δ 10.07 (brs, 1H), 8.80 (t, J=5.8 Hz, 1H), 8.03 (brs, 1H), 7.72-7.70 (m, 2H), 7.57 (s, 1H), 7.54 (s, 1H), 7.39 (brs, 1H), 6.57 (s, 1H), 6.56 (s, 1H), 5.63-5.35 (m, 2H), 4.89 (brs, 4H), 4.61-4.39 (m, 10H), 3.40-3.25 (m, 4H), 3.09 (t, J=10.2 Hz, 4H), 2.33-2.27 (m, 2H), 2.22-2.15 (m, 2H), 2.08 (s, 6H), 2.03-1.89 (m, 4H), 1.27 (t, J=7.1, 1.5 Hz, 6H); LCMS: m/z=902.19 (M+H)$^+$; HPLC Purity: 99.17%

Example 34: (E)-N-(4-(8-oxa-3-azabicyclo[3.2.1]
octan-3-yl)butyl)-1,15-bis(1-ethyl-3-methyl-1H-
pyrazole-5-carboxamido)-8,9,16,19-tetrahydro-7H-6,
10-dioxa-2,14,15a,19a-tetraazacyclopentadeca[3,2,1-
cd:8,9,10-c'd']diindene-4,12-dicarboxamide
hydrochloride (Compound 34)

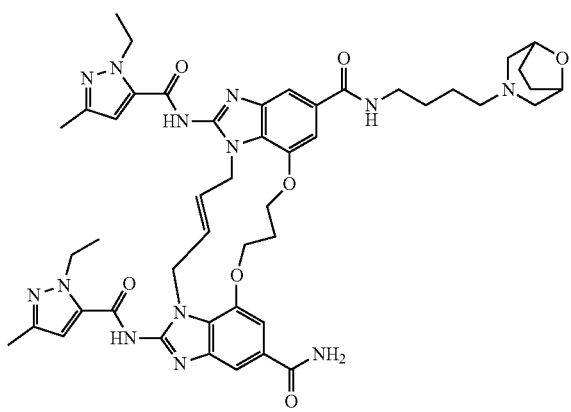 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCCN4CC5CCC(C4)O5)cc(c21)OCCCO3]

Synthesized from Intermediate 1 and 4-(8-oxa-3-azabicyclo[3.2.1]octan-3-yl)butan-1-amine (Int. 11) by following an analogous procedure described for the synthesis of Example 28 (Yield=20 mg, 7%). $^1$H NMR (400 MHz, DMSO-d$_6$) δ 12.92 (brs, 2H), 10.11 (brs, 1H), 8.65 (t, J=5.7 Hz, 1H), 8.03 (brs, 1H), 7.72-7.69 (m, 2H), 7.56 (s, 1H), 7.54 (s, 1H), 7.39 (brs, 1H), 6.56 (s, 2H), 5.59-5.39 (m, 2H), 4.89 (brs, 4H), 4.56-4.44 (m, 10H), 3.35-3.27 (m, 4H), 3.11-3.02 (m, 4H), 2.32-2.26 (m, 2H), 2.20-2.14 (m, 2H), 2.08 (s, 6H), 1.97-1.91 (m, 2H), 1.81-1.73 (m, 2H), 1.58-1.49 (m, 2H), 1.27 (t, J=7.1 Hz, 6H); LCMS: m/z=915.57 (M+H)$^+$; HPLC Purity: 98.36%

Example 35: (E)-(2-(4-carbamoyl-1,15-bis(1-ethyl-
3-methyl-1H-pyrazole-5-carboxamido)-8,9,16,19-
tetrahydro-7H-6,10-dioxa-2,14,15a,19a-tetraazacy-
clopentadeca[3,2,1-cd:8,9,10-c'd']diindene-12-
carboxamido)ethyl)-L-proline hydrochloride salt
(Compound 35)

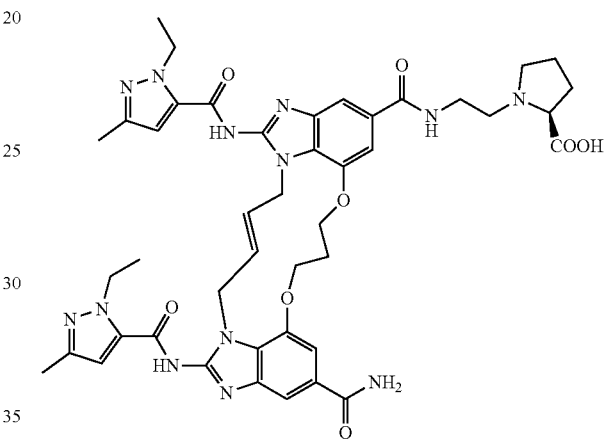

(E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd'] diindene-4-carboxylic acid (Intermediate 1) (0.25 g, 0.33 mmol) and methyl (2-aminoethyl)-L-prolinate (Synthesized as in WO2017202390) (0.11 g, 0.66 mmol) was dissolved in 5 mL DMF. TBTU (0.22 g, 0.70 mmol) followed by diisopropylethylamine (0.23 ml, 1.33 mmol) was added and the reaction mixture stirred at room temperature overnight. The DMF was then concentrated under reduced pressure and water was added to it resulting in the precipitation of the product. The precipitate was filtered and washed with water and the crude product was purified by reverse phase preparative chromatography to obtain the methyl ester intermediate. LCMS: m/z=904.19 (M+H)$^+$ The methyl ester (0.015 g, 0.017 mmol) was then subjected to ester hydrolysis by dissolving in a 2.5 mL of a mixture of THF-MeOH—H$_2$O (2:2:1) followed by the addition of LiOH (4 mg, 0.083 mmol). The reaction mixture was stirred at room temperature overnight and the volatiles concentrated followed by the addition of 2 N HCl resulting in the precipitation of the product acid. The precipitate was filtered and washed with water to obtain the final product as a white solid (10 mg, 65%). $^1$H NMR (400 MHz, DMSO-d$_6$) δ 12.92 (brs, 2H), 9.08 (brs, 1H), 8.06 (brs, 1H), 7.73-7.70 (m, 3H), 7.56 (s, 1H), 7.39 (brs, 1H), 6.55 (s, 2H), 5.57-5.40 (m, 2H), 4.89 (brs, 4H), 4.64-4.32 (m, 10H), 3.95-3.85 (m, 1H), 3.76-3.54 (m, 4H), 2.32-2.24 (m, 2H), 2.12-2.01 (m, 10H), 1.27 (t, J=7.1 Hz, 6H); LCMS: m/z=890.06 (M+H)$^+$; HPLC Purity: 95.03%

Example 36: (E)-1,15-bis(1-ethyl-3-methyl-1H-pyrazole-5-carboxamido)-N-(3-(4-(methylsulfonyl)piperazin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 36)

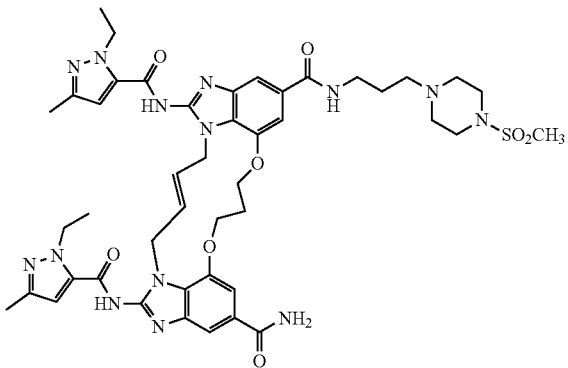 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCN4CCN(S(C)(=O)=O)CC4)cc(c21)OCCCO3]

Synthesized from Intermediate 1 and 3-(4-(methylsulfonyl)piperazin-1-yl)propan-1-amine (Synthesized as in US 20070293494) by following an analogous procedure described for the synthesis of Example 28 (Yield=60 mg, 13%). $^1$H NMR (400 MHz, DMSO-$d_6$) δ 12.85 (brs, 2H) 10.84 (brs, 1H), 8.78 (t, J=5.8 Hz, 1H), 8.03 (brs, 1H), 7.73-7.70 (m, 2H), 7.56 (s, 1H), 7.55 (s, 1H), 7.39 (brs, 1H), 6.57 (s, 1H), 6.56 (s, 1H), 5.57-5.41 (m, 2H), 4.89 (brs, 4H), 4.56-4.51 (m, 4H), 4.46-4.43 (m, 4H), 3.76-3.68 (m, 2H), 3.64-3.56 (m, 2H), 3.42-3.34 (m, 2H), 3.31-3.11 (m, 6H), 3.02 (s, 3H), 2.33-2.26 (m, 2H), 2.08 (s, 6H), 2.03-1.97 (m, 2H), 1.27 (t, J=7.1 Hz, 6H); LCMS: m/z=953.20 (M+H)$^+$; HPLC Purity: 99.88%

Example 37: (E)-N-(3-(4,4-difluoropiperidin-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 37)

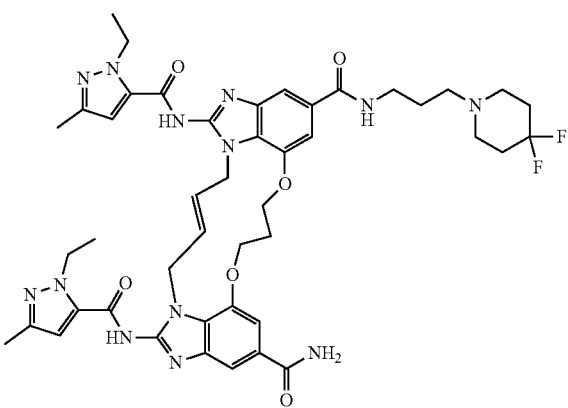 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCN4CCC(F)(F)CC4)cc(c21)OCCCO3]

Synthesized from Intermediate 1 and 3-(4,4-difluoropiperidin-1-yl)propan-1-amine (Synthesized as in US 20050256153) by following an analogous procedure described for the synthesis of Example 28 (Yield=65 mg, 15%). $^1$H NMR (400 MHz, DMSO-$d_6$) δ 12.95 (brs, 2H), 10.66 (s, 1H), 8.74 (t, J=5.8 Hz, 1H), 8.02 (brs, 1H), 7.72-7.70 (m, 2H), 7.55-7.53 (m, 2H), 7.39 (brs, 1H), 6.56 (s, 1H), 6.55 (s, 1H), 5.57-5.40 (m, 2H), 4.89 (brs, 4H), 4.52 (q, J=7.1 Hz, 4H), 4.43 (q, J=5.8 Hz, 4H), 3.68-3.62 (m, 2H), 3.42-3.34 (m, 4H), 3.26-3.10 (m, 4H), 2.41-2.28 (m, 4H), 2.10-2.06 (m, 6H), 2.04-1.96 (m, 2H), 1.27 (td, J=7.1, 1.7 Hz, 6H); LCMS: m/z=910.19 (M+H)$^+$; HPLC Purity: 99.03%

Example 38: (E)-1,15-bis(1-ethyl-3-methyl-1H-pyrazole-5-carboxamido)-N-(4-morpholinobutyl)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 38)

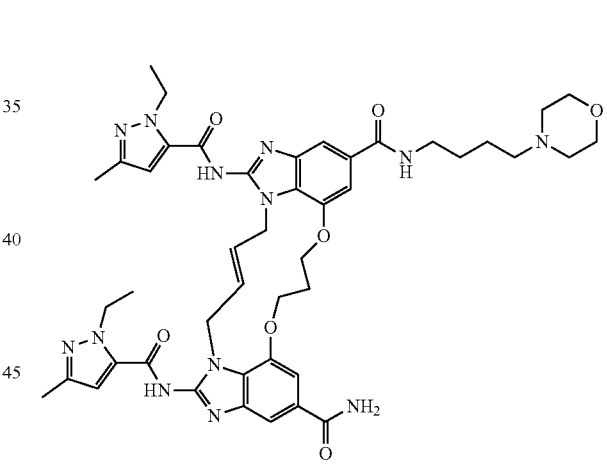

Synthesized from Intermediate 1 and 4-morpholinobutan-1-amine (Synthesized as in *Eur. J. Med. Chem.*, 2014, 84:200-205) by following an analogous procedure described for the synthesis of Example 28 (Yield=20 mg, 8%). $^1$H NMR (400 MHz, DMSO-$d_6$) δ 10.72 (brs, 1H), 8.65 (t, J=5.7 Hz, 1H), 8.04 (brs, 1H), 7.72-7.68 (m, 2H), 7.60-7.50 (m, 2H), 7.39 (brs, 1H), 6.56 (s, 2H), 5.58-5.39 (m, 2H), 4.89 (m, 4H), 4.53 (q, J=7.1 Hz, 4H), 4.46-4.43 (m, 4H), 4.01-3.92 (m, 2H), 3.83-3.72 (m, 2H), 3.47-3.37 (m, 2H), 3.37-3.29 (m, 2H), 3.15-3.00 (m, 4H), 2.33-2.21 (m, 2H), 2.08 (s, 6H), 1.76 (s, 2H), 1.65-1.54 (m, 2H), 1.27 (t, J=7.1 Hz, 6H); LCMS: m/z=890.19 (M+H)$^+$; HPLC Purity: 96.77%

Example 39: (E)-1,15-bis(1-ethyl-3-methyl-1H-pyrazole-5-carboxamido)-N-(3-(4-fluoropiperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 39)

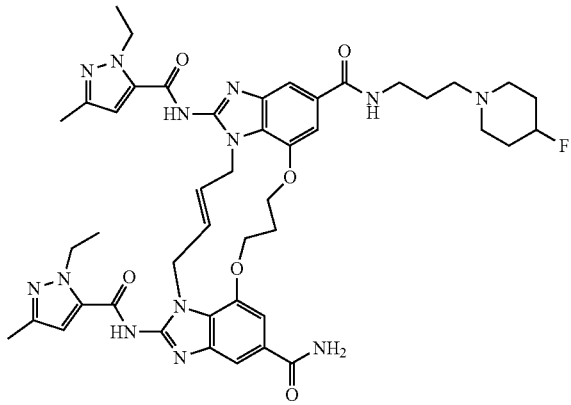 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCN4CCC(F)CC4)cc(c21)OCCCO3]

Synthesized from Intermediate 1 and 3-(4-fluoropiperidin-1-yl)propan-1-amine (Int. 12) by following an analogous procedure described for the synthesis of Example 28 (Yield=15 mg, 5%). $^1$H NMR (400 MHz, DMSO-d$_6$) δ 12.95 (brs, 2H), 10.42 (s, 1H), 8.78 (t, J=5.2 Hz, 1H), 8.03 (brs, 1H), 7.73-7.70 (m, 2H), 7.57 (s, 1H), 7.55 (s, 1H), 7.39 (brs, 1H), 6.56 (s, 1H), 6.55 (s, 1H) 5.61-5.40 (m, 2H), 4.89 (brs, 4H), 4.53 (q, J=7.1 Hz, 4H), 4.48-4.41 (m, 4H), 3.57-3.49 (m, 1H), 3.47-3.33 (m, 4H), 3.19-3.00 (m, 4H), 2.59-2.55 (m, 2H), 2.34-2.26 (m, 2H), 2.24-2.14 (m, 2H), 2.08 (s, 6H), 2.04-1.95 (m, 2H), 1.31-1.25 (m, 6H); LCMS: m/z=892.19 (M+H)$^+$; HPLC Purity: 99.79%

Example-40: (E)-1,15-bis(1-ethyl-3-methyl-1H-pyrazole-5-carboxamido)-N-(methylsulfonyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 40)

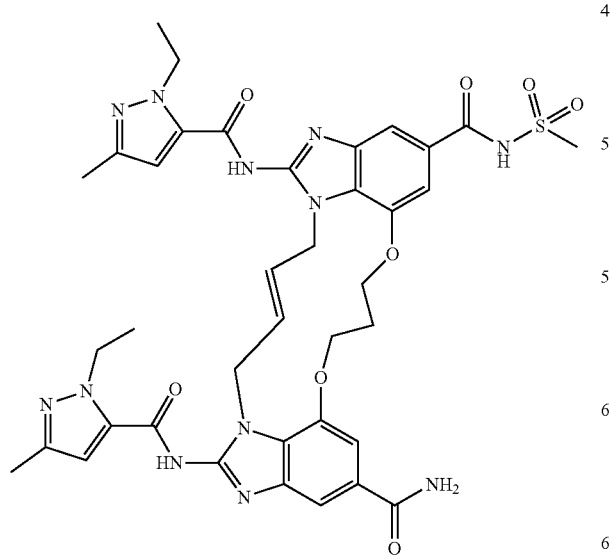

Synthesized from Intermediate 1 and methanesulfonamide by following an analogous procedure described for the synthesis of Example-28. 1H NMR (400 MHz, DMSO-d6) δ 12.97-12.88 (m, 2H), 12.18 (brs, 1H), 8.01 (brs, 1H), 7.79 (s, 1H), 7.71 (s, 1H), 7.64 (s, 1H), 7.53 (s, 1H), 7.38 (brs, 1H), 6.55 (s, 2H), 5.50 (s, 2H), 4.89 (brs, 4H), 4.54 (q, J=7.1 Hz, 4H), 4.43 (t, J=5.3 Hz, 4H), 3.34 (s, 3H), 2.32-2.27 (m, 2H), 2.10-2.06 (m, 6H), 1.27 (t, J=7.2 Hz, 6H); LCMS: m/z=826.92 (M+H)$^+$ Example 41: (R,E)-1,15-bis(1-ethyl-3-methyl-1H-pyrazole-5-carboxamido)-N-(3-(3-fluoropyrrolidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 41)

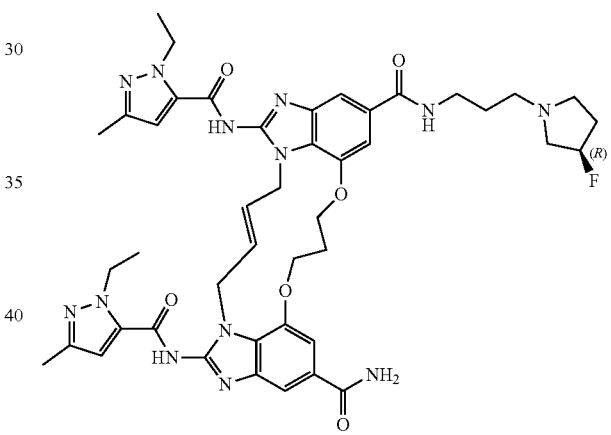

Synthesized from Intermediate 1 and (R)-3-(3-fluoropyrrolidin-1-yl)propan-1-amine (Int. 13) by following an analogous procedure described for the synthesis of Example 28 (Yield=20 mg, 7%). $^1$H NMR (400 MHz, DMSO-d$_6$) δ 12.84 (s, 2H), 8.51 (t, J=5.7 Hz, 1H), 8.01 (brs, 1H), 7.71 (s, 1H), 7.68 (s, 1H), 7.53 (s, 1H), 7.48 (d, J=1.5 Hz, 1H), 7.38 (brs, 1H), 6.55 (s, 2H), 5.50 (s, 2H), 5.32-5.07 (m, 1H), 4.89 (brs, 4H), 4.54 (t, J=7.1 Hz, 4H), 4.43 (d, J=5.2 Hz, 4H), 3.45-3.35 (m, 2H), 2.88-2.78 (m, 2H), 2.64-2.58 (m, 1H), 2.48-2.45 (m, 3H), 2.32-2.25 (m, 2H), 2.20-2.11 (m, 1H), 2.08 (s, 6H), 1.98-1.78 (m, 1H), 1.77-1.68 (m, 2H), 1.26 (d, J=7.3 Hz, 6H); LCMS: m/z=878.19 (M+H)$^+$; HPLC Purity: 97.69%

Example 42: (S,E)-1,15-bis(1-ethyl-3-methyl-1H-pyrazole-5-carboxamido)-N-(3-(3-fluoropyrrolidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 42)

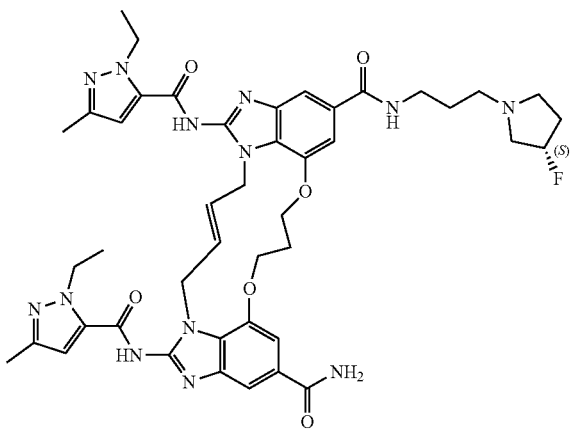

Synthesized from Intermediate 1 and (S)-3-(3-fluoropyrrolidin-1-yl)propan-1-amine (Int. 14) by following an analogous procedure described for the synthesis of Example 28 (Yield=18 mg, 6%). $^1$H NMR (400 MHz, DMSO-$d_6$) δ 8.67-8.40 (m, 1H), 8.01 (brs, 1H), 7.71 (s, 1H), 7.67 (s, 1H), 7.53 (s, 1H), 7.48 (s, 1H), 7.38 (brs, 1H), 6.55 (s, 2H), 5.49 (s, 2H), 5.30-5.20 (m, 1H), 4.89 (s, 4H), 4.53 (q, J=7.1 Hz, 4H), 4.43 (d, J=5.2 Hz, 4H), 3.34-3.31 (m, 2H), 2.90-2.70 (m, 2H), 2.64-2.59 (m, 1H), 2.45-2.40 (m, 2H), 2.32-2.25 (m, 3H), 2.20-2.11 (m, 1H), 2.08 (s, 6H), 1.96-1.78 (m, 1H), 1.74-1.68 (m, 2H), 1.27 (t, J=7.1 Hz, 6H). LCMS: m/z=878.19 (M+H)$^+$; HPLC Purity: 95.28%

Example 43: (E)-1,15-bis(1-ethyl-3-methyl-1H-pyrazole-5-carboxamido)-N-(2-(methylsulfonamido)ethyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 43)

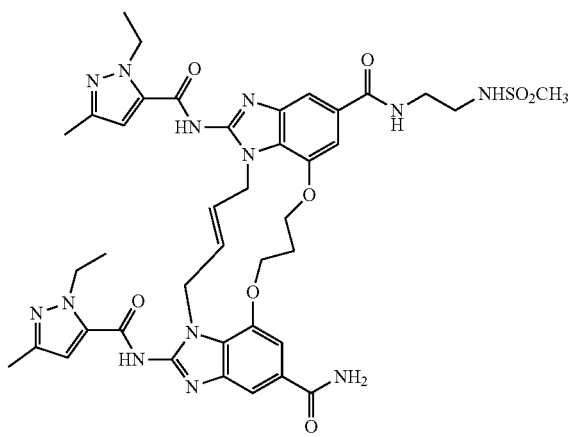

Synthesized from Intermediate 1 and N-(2-aminoethyl)methanesulfonamide (Synthesized as in Organometallics, 2012, 31(16):5958-5967) by following an analogous procedure described for the synthesis of Example 28 (Yield=18 mg, 5%). $^1$H NMR (400 MHz, DMSO-$d_6$) δ 12.89 (brs, 2H), 8.57 (t, J=5.7 Hz, 1H), 8.00 (s, 1H), 7.71 (d, J=1.2 Hz, 1H), 7.69 (s, 1H), 7.52 (d, J=1.4 Hz, 1H), 7.50 (s, 1H), 7.38 (brs, 1H), 7.19 (t, J=6.0 Hz, 1H), 6.55 (s, 2H), 5.50 (s, 2H), 4.89 (brs, 4H), 4.66-4.31 (m, 8H), 3.49-3.37 (m, 2H), 3.21-3.11 (m, 2H), 2.94 (s, 3H), 2.37-2.29 (m, 2H), 2.08 (s, 6H), 1.35-1.20 (m, 6H); LCMS: m/z=870.18 (M+H)$^+$; HPLC Purity: 96.74%

Example 44: (E)-1,15-bis(1-ethyl-3-methyl-1H-pyrazole-5-carboxamido)-N-(3-(4-(methylsulfonyl)piperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 44)

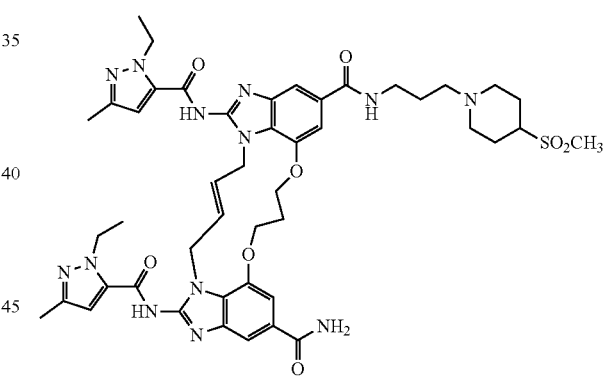

Synthesized from Intermediate 1 and 3-(4-(methylsulfonyl)piperidin-1-yl)propan-1-amine (Int. 15) by following an analogous procedure described for the synthesis of Example 28 (Yield=9 mg, 3%). $^1$H NMR (400 MHz, DMSO-$d_6$) δ 12.87 (brs, 2H), 8.48 (t, J=5.6 Hz, 1H), 8.01 (brs, 1H), 7.69 (d, J=1.2 Hz, 1H), 7.67 (s, 1H), 7.53 (d, J=1.4 Hz, 1H), 7.48 (s, 1H), 7.38 (brs, 1H), 6.55 (s, 2H), 5.50 (s, 2H), 4.89 (brs, 4H), 4.66-4.19 (m, 8H), 3.26-3.15 (m, 3H), 3.06-2.99 (m, 2H), 2.92 (s, 3H), 2.41-2.28 (m, 4H), 2.08 (s, 6H), 2.02-1.89 (m, 4H), 1.76-1.55 (m, 4H), 1.31-1.18 (m, 6H); LCMS: m/z=952.20 (M+H)$^+$; HPLC Purity: 98.13%

Example 45: (E)-N-(3-(3,3-difluoropyrrolidin-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 45)

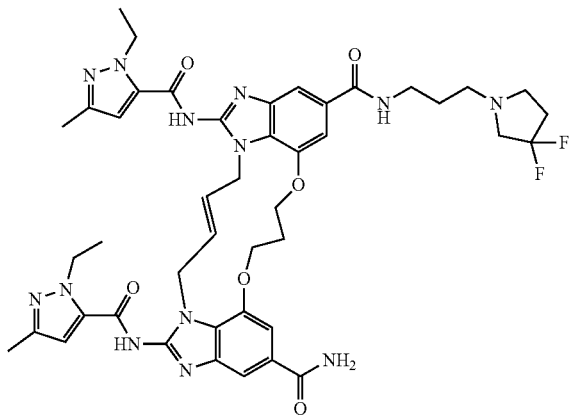 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCN4CCC(F)(F)C4)cc(c21)OCCCO3]

Synthesized from Intermediate 1 and 3-(3,3-difluoropyrrolidin-1-yl)propan-1-amine (Int. 16) by following an analogous procedure described for the synthesis of Example 28 (Yield=18 mg, 5%). $^1$H NMR (400 MHz, DMSO-d$_6$) δ 12.89 (brs, 2H), 8.50 (t, J=5.7 Hz, 1H), 8.01 (brs, 1H), 7.71 (s, 1H), 7.67 (s, 1H), 7.53 (s, 1H), 7.48 (s, 1H), 7.38 (brs, 1H), 6.55 (s, 2H), 5.50 (s, 2H), 4.89 (brs, 4H), 4.69-4.21 (m, 8H), 2.89 (t, J=13.5 Hz, 2H), 2.77-2.65 (m, 2H), 2.48-2.15 (m, 8H), 2.07 (s, 6H), 1.79-1.65 (m, 2H), 1.30-1.18 (m, 6H); LCMS: m/z=896.19 (M+H)$^+$; HPLC Purity: 96.30%

Example 46: (E)-N-(3-((2R,6S)-2,6-dimethylmorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 46)

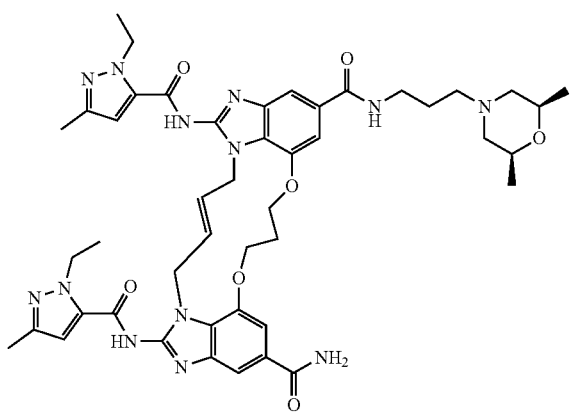

Synthesized from Intermediate 1 and 3-((2R,6S)-2,6-dimethylmorpholino)propan-1-amine (Synthesized as in WO2005058871) by following an analogous procedure described for the synthesis of Example 28 (Yield=50 mg, 11%). $^1$H NMR (400 MHz, DMSO-d$_6$) δ 12.87 (brs, 2H), 8.48 (t, J=5.5 Hz, 1H), 8.00 (brs, 1H), 7.71 (d, J=1.3 Hz, 1H), 7.67 (d, J=1.3 Hz, 1H), 7.53 (d, J=1.4 Hz, 1H), 7.47 (d, J=1.5 Hz, 1H), 7.38 (brs, 1H), 6.55 (s, 2H), 5.49 (s, 2H), 4.89 (brs, 4H), 4.52 (t, J=7.2 Hz, 4H), 4.43 (d, J=5.6 Hz, 4H), 3.59-3.51 (m, 2H), 2.78 (s, 1H), 2.75 (s, 1H), 2.60-2.55 (m, 2H), 2.32-2.26 (m, 4H), 2.08 (s, 6H), 1.77-1.67 (m, 2H), 1.57 (t, J=10.6 Hz, 2H), 1.27 (t, J=7.1 Hz, 6H), 1.05 (d, J=6.2 Hz, 6H); LCMS: m/z=904.31 (M+H)$^+$; HPLC Purity: 99.10%

Example 47: (E)-N-(3-(1,1-dioxidothiomorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide hydrochloride (Compound 47)

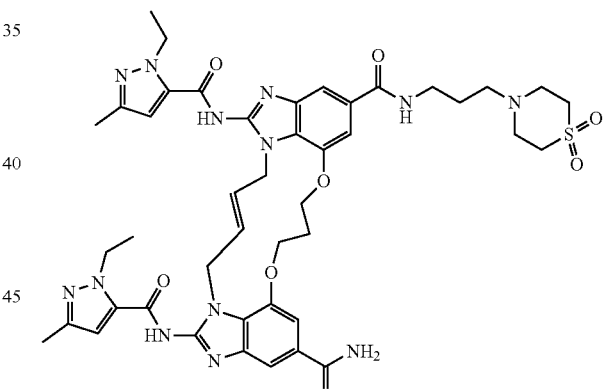

Synthesized from Intermediate 1 and 4-(3-aminopropyl)thiomorpholine 1,1-dioxide (Synthesized as in WO2014104272) by following an analogous procedure described for the synthesis of Example 28 (Yield=60 mg, 13%). $^1$H NMR (400 MHz, DMSO-d$_6$) δ 12.89 (brs, 2H), 8.48 (t, J=5.7 Hz, 1H), 8.01 (brs, 1H), 7.71 (s, 1H), 7.67 (s, 1H), 7.53 (s, 1H), 7.47 (s, 1H), 7.38 (brs, 1H), 6.55 (s, 2H), 5.50 (s, 2H), 4.89 (brs, 4H), 4.53 (q, J=7.1 Hz, 4H), 4.43 (q, J=5.4 Hz, 4H), 3.12-3.06 (m, 4H), 2.93-2.88 (m, 4H), 2.57-2.54 (m, 4H), 2.32-2.27 (m, 2H), 2.08 (s, 6H), 1.71-1.69 (m, 2H), 1.27 (t, J=7.1 Hz, 6H); LCMS: m/z=925.19 (M+H)$^+$; HPLC Purity: 99.03%

Example 48: (E)-N-(3-(1H-imidazol-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 48)

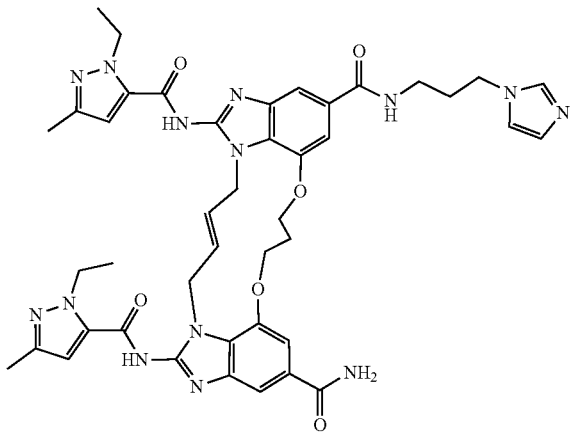 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCn4ccnc4)cc(c21)OCCCO3]

Synthesized from Intermediate 1 and 3-(1H-imidazol-1-yl)propan-1-amine by following an analogous procedure described for the synthesis of Example 28 (Yield=18 mg, 5%). $^1$H NMR (400 MHz, DMSO-$d_6$) δ 12.89 (brs, 2H), 8.53 (t, J=5.7 Hz, 1H), 8.01 (brs, 1H), 7.72-7.67 (m, 3H), 7.53 (s, 1H), 7.47 (s, 1H), 7.38 (brs, 1H), 7.24 (d, J=1.3 Hz, 1H), 6.92 (d, J=1.1 Hz, 1H), 6.55 (s, 2H), 5.50 (brs, 2H), 4.89 (brs, 4H), 4.53 (q, J=7.1 Hz, 4H), 4.43 (q, J=5.2 Hz, 4H), 4.05 (t, J=6.9 Hz, 2H), 3.28-3.26 (m, 2H), 2.33-2.26 (m, 2H), 2.08 (s, 6H), 1.98 (q, J=6.9 Hz, 2H), 1.31-1.23 (m, 6H); LCMS: m/z=856.93 (M+H)$^+$; HPLC Purity: 95.10%

Example 49: (S,E)-2-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)-3-(dimethylamino)propanoic acid (Compound 49)

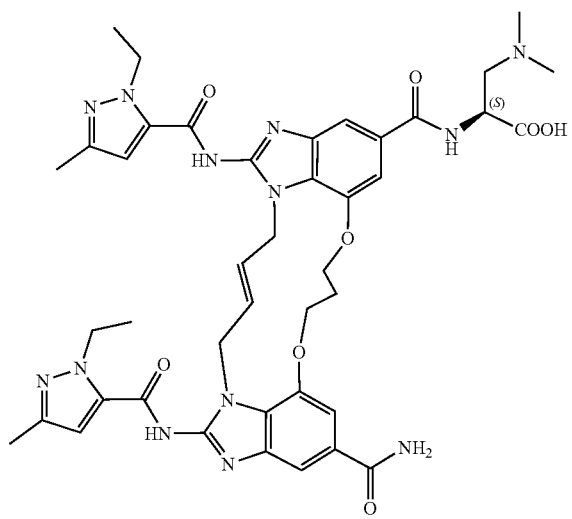

Synthesized from Intermediate 1 and methyl (S)-2-amino-3-(dimethylamino)propanoate 2,2,2-trifluoroacetate (Synthesized as in EP1366018, 2016) by following an analogous procedure described for the synthesis of Example 35 (Yield=10 mg, 38%). $^1$H NMR (400 MHz, DMSO-$d_6$) δ 12.92 (s, 2H), 8.36 (d, J=7.2 Hz, 1H), 8.23 (s, 1H), 8.01 (s, 1H), 7.72 (dd, J=4.0, 1.2 Hz, 2H), 7.53 (dd, J=4.7, 1.3 Hz, 2H), 7.38 (s, 1H), 6.55 (s, 2H), 5.49 (d, J=1.7 Hz, 2H), 4.89 (s, 4H), 4.52-4.40 (m, 9H), 3.07-2.85 (m, 2H), 2.61-2.53 (m, 6H), 2.39-2.22 (m, 2H), 2.07 (s, 6H), 1.27 (t, J=7.1 Hz, 6H); LCMS: m/z=864.06 (M+H)$^+$; HPLC Purity: 96.40%

Example 50: (E)-1,15-bis(1-ethyl-3-methyl-1H-pyrazole-5-carboxamido)-N-(3-(pyridin-2-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 50)

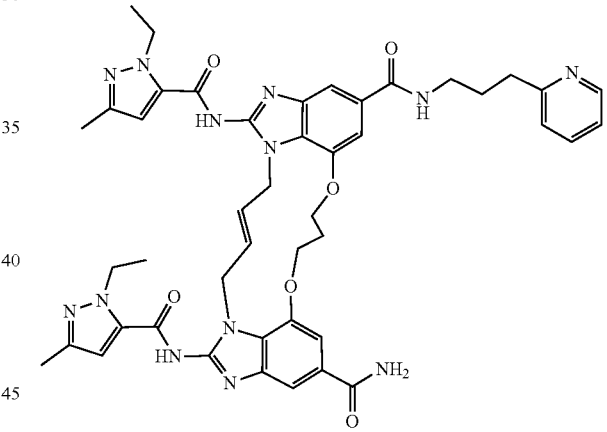

Synthesized from Intermediate 1 and 3-(pyridin-2-yl)propan-1-amine (Synthesized as in *MedChemComm*, 2014, 5(1):72-81) by following an analogous procedure described for the synthesis of Example 28 (Yield=80 mg, 19%). $^1$H NMR (400 MHz, DMSO-$d_6$) δ 12.89 (brs, 2H), 8.60-8.52 (m, 1H), 8.51-8.47 (m, 1H), 8.00 (brs, 1H), 7.77-7.67 (m, 3H), 7.53 (d, J=1.2 Hz, 1H), 7.49 (d, J=1.4 Hz, 1H), 7.38 (brs, 1H), 7.31 (d, J=7.8 Hz, 1H), 7.27-7.16 (m, 1H), 6.55 (s, 2H), 5.50 (s, 2H), 4.89 (brs, 4H), 4.53 (q, J=7.1 Hz, 4H), 4.47-4.40 (m, 4H), 2.87-2.75 (m, 2H), 2.57-2.53 (m, 2H), 2.33-2.27 (m, 2H), 2.08 (s, 6H), 2.01-1.92 (m, 2H), 1.29-1.21 (m, 6H); LCMS: m/z=868.06 (M+H)$^+$; HPLC Purity: 99.49%

Example 51: (E)-1,15-bis(1-ethyl-3-methyl-1H-pyrazole-5-carboxamido)-N-(3-(4-(trifluoromethyl)piperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide formate (Compound 51)

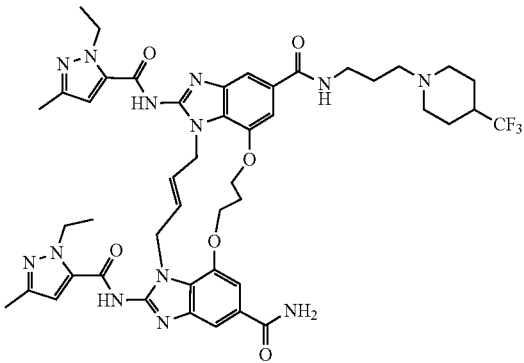 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCN4CCC(C(F)(F)F)CC4)cc(c21)OCCCO3]

Synthesized from Intermediate 1 and 3-(4-(trifluoromethyl)piperidin-1-yl)propan-1-amine (Synthesized as in US2005/256153) by following an analogous procedure described for the synthesis of Example 28 (Yield=60 mg, 13%). $^1$H NMR (400 MHz, DMSO-$d_6$) δ 12.88 (s, 2H), 8.48 (t, J=5.7 Hz, 1H), 8.00 (brs, 1H), 7.71 (s, 1H), 7.67 (d, J=1.2 Hz, 1H), 7.53 (d, J=1.4 Hz, 1H), 7.47 (d, J=1.4 Hz, 1H), 7.38 (brs, 1H), 6.55 (s, 2H), 5.50 (s, 2H), 4.89 (brs, 4H), 4.54 (t, J=7.1 Hz, 4H), 4.43 (q, J=5.2 Hz, 4H), 3.40-3.35 (m, 1H), 3.34-3.26 (m, 2H), 3.00-2.93 (m, 2H), 2.37 (t, J=7.1 Hz, 2H), 2.32-2.26 (m, 2H), 2.08 (s, 6H), 1.97-1.86 (m, 2H), 1.83-1.66 (m, 4H), 1.50-1.37 (m, 2H), 1.27 (t, J=7.1 Hz, 6H); LCMS: m/z=942.20 (M+H)$^+$; HPLC Purity: 99.43%

Example 52: (E)-N-(3-(3,3-dimethylmorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 52)

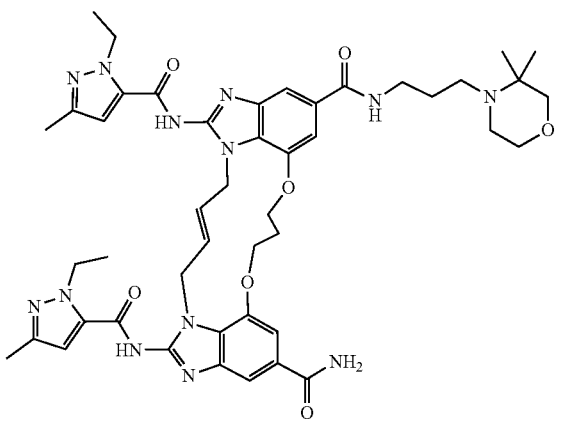 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCCCN4CCOCC4(C)C)cc(c21)OCCCO3]

Synthesized from Intermediate 1 and 3-(3,3-dimethylmorpholino)propan-1-amine (Int. 17) by following an analogous procedure described for the synthesis of Example 28 (Yield=6 mg, 2%). $^1$H NMR (400 MHz, DMSO-$d_6$) δ 12.86 (brs, 2H), 8.43 (t, J=5.5 Hz, 1H), 8.01 (brs, 1H), 7.71 (d, J=1.2 Hz, 1H), 7.66 (d, J=1.2 Hz, 1H), 7.53 (d, J=1.4 Hz, 1H), 7.46 (d, J=1.4 Hz, 1H), 7.38 (brs, 1H), 6.55 (s, 2H), 5.50 (s, 2H), 4.89 (s, 4H), 4.53 (q, J=7.1 Hz, 4H), 4.43 (q, J=5.5 Hz, 4H), 3.60 (t, J=4.9 Hz, 2H), 3.36-3.29 (m, 2H), 3.21 (s, 2H), 2.51-2.45 (m, 2H), 2.41-2.37 (m, 2H), 2.32-2.26 (m, 2H), 2.08 (s, 6H), 1.65 (p, J=7.0 Hz, 2H), 1.27 (t, J=7.1 Hz, 6H), 0.94 (s, 6H); LCMS: m/z=904.19 (M+H)$^+$; HPLC Purity: 96.54%

Example-53: (E)-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carbonyl)glycyl-L-valine (Compound 53)

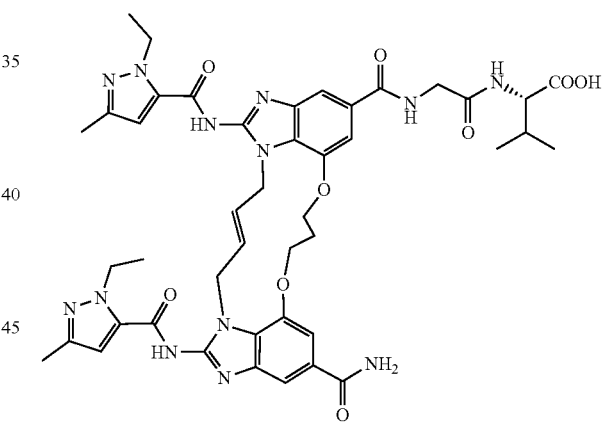

Synthesized from Intermediate 1 and tert-butyl glycyl-L-valinate (synthesized as in *Eur. J. Org. Chem.*, 2017, 37:5592-5596) by following an analogous procedure described for the synthesis of Example-29. 1H NMR (400 MHz, DMSO-d6) δ 12.91 (brs, 2H), 8.75 (t, J=5.8 Hz, 1H), 8.02 (brs, 2H), 7.71 (s, 2H), 7.54 (brs, 2H), 7.38 (brs, 1H), 6.55 (s, 2H), 5.50 (s, 2H), 4.89 (brs, 4H), 4.53 (d, J=7.4 Hz, 4H), 4.43 (d, J=5.2 Hz, 4H), 4.16 (t, J=8.0 Hz, 1H), 4.01-3.88 (m, 2H), 2.42-2.40 (m, 1H), 2.30 (t, J=8.0 Hz, 2H), 2.08 (s, 6H), 1.27 (t, J=7.2 Hz, 6H), 0.89 (dd, J=6.9, 1.6 Hz, 6H); LCMS: m/z=906.19 (M+H)$^+$

209

Example-54: (E)-N,N'-(12-carbamoyl-4-(1H-tetrazol-5-yl)-8,9,16,19-tetrahydro-7H-6,10-dioxa-2,14,15a,19a-tetraazacyclopentadeca[3,2,1-cd:8,9,10-c'd']diindene-1,15-diyl)bis(1-ethyl-3-methyl-1H-pyrazole-5-carboxamide) (Compound 54)

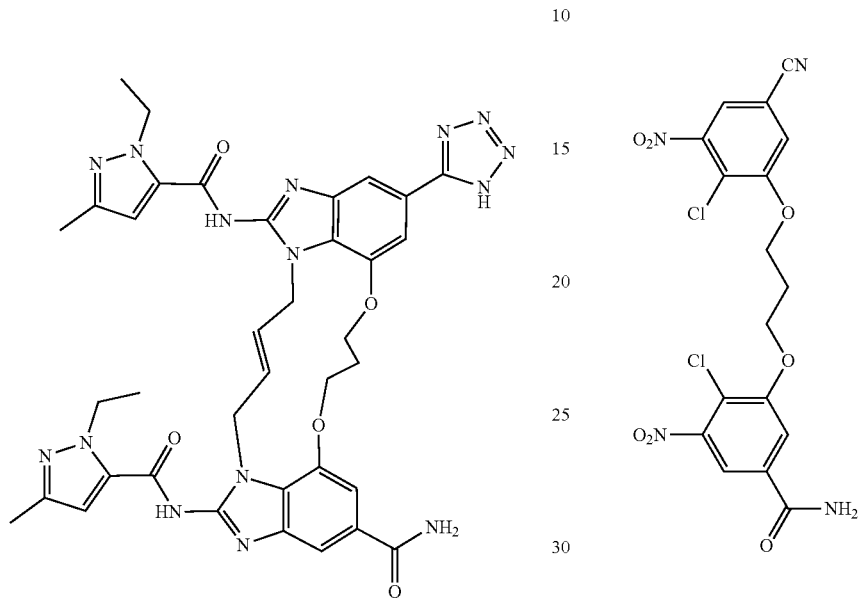

Step 1: Synthesis of 4-chloro-3-hydroxy-5-nitrobenzonitrile

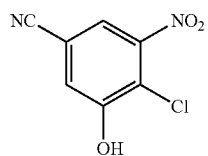 [SMILES: N#Cc1cc(O)c(Cl)c([N+](=O)[O-])c1]

4-chloro-3-hydroxy-5-nitrobenzamide (2.0 g, 9.23 mmol) was added to trichloromethylcarbonochloridate (7.31 g, 36.9 mmol) in 25 mL acetonitrile and the reaction mixture refluxed for 12 h. The progress of the reaction was monitored by TLC. After completion, the reaction was quenched by the addition of water. The mixture was extracted with EtOAc and the combined organic solution was washed with brine and dried over Na$_2$SO$_4$, concentrated and purified by column chromatography. $^1$H NMR (400 MHz, DMSO-d$_6$) δ 12.14 (s, 1H), 8.08 (d, J=1.8 Hz, 1H), 7.56 (d, J=1.9 Hz, 1H).

210

Step 2: Synthesis of 4-chloro-3-(3-(2-chloro-5-cyano-3-nitrophenoxy)propoxy)-5-nitrobenzamide 4-chloro-3-hydroxy-5-nitrobenzamide (500 mg, 2.31 mmol) was dissolved in 6 ml NMP in a 20 ml microwave vial and 1,3-dibromopropane (1.4 g, 6.93 mmol) followed by DIPEA (1.21 ml, 6.93 mmol) was added to it and the reaction mixture was heated at 130° C. for 3 h in a microwave. The mixture was then poured into 100 ml of water and the aqueous phase was extracted three times with EtOAc. The combined organic solution was washed with brine and dried over Na$_2$SO$_4$, concentrated and purified by column chromatography to obtain 3-(3-bromopropoxy)-4-chloro-5-nitrobenzamide as an intermediate. This was dissolved in 6 ml NMP in a 20 ml microwave vial and 4-chloro-3-hydroxy-5-nitrobenzonitrile (458 mg, 2.31 mmol) followed by DIPEA (1.21 ml, 6.93 mmol) was added to it and the reaction mixture was heated at 130° C. for 3 h in a microwave. The mixture was then poured into 100 ml of water and the precipitated product was filtered and dried. $^1$H NMR (400 MHz, DMSO-d$_6$) δ 8.32-8.23 (m, 1H), 8.08 (dd, J=10.8, 1.7 Hz, 1H), 7.91 (d, J=1.8 Hz, 1H), 7.79 (s, 1H), 4.48-4.44 (m, 2H), 3.41-3.25 (m, 2H), 2.20-2.18 (m, 2H).

Step 3: Synthesis of (E)-11-cyano-1,13-dinitro-7,8,14,15,18,19-hexahydro-6H-dibenzo[b,j][1,12]dioxa[4,9]diazacyclopentadecine-3-carboxamide

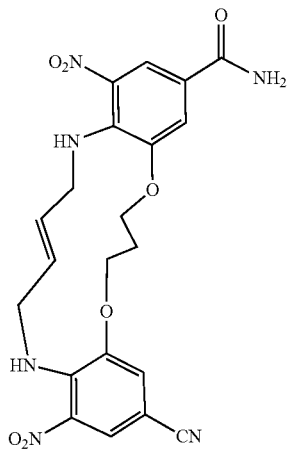

4-chloro-3-(3-(2-chloro-5-cyano-3-nitrophenoxy)propoxy)-5-nitrobenzamide (1.1 g, 2.42 mmol) was dissolved in 10 mL DMSO and (E)-but-2-ene-1,4-diamine dihydrochloride (0.38 g, 2.42 mmol) followed by DIPEA (3.38 ml, 19.33 mmol) were added and the reaction mixture heated at 100° C. for 12 h. The reaction mixture was then poured into 100 ml of water and the product precipitated out as a solid which was filtered and dried. LCMS: m/z=469.09 (M+H)$^+$ Step 4: Synthesis of (E)-1,13-diamino-11-cyano-7,8,14,15,18,19-hexahydro-6H-dibenzo[b,j][1,12]dioxa[4,9]diazacyclopentadecine-3-carboxamide

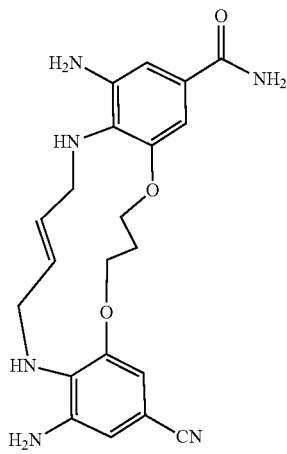 [SMILES: N#Cc1cc2c(c([N+](=O)[O-])c1)NC/C=C/CNc1c(cc(C(N)=O)cc1[N+](=O)[O-])OCCCO2]

(E)-11-cyano-1,13-dinitro-7,8,14,15,18,19-hexahydro-6H-dibenzo[b,j][1,12]dioxa[4,9]diazacyclopentadecine-3-carboxamide (1 g, 4.27 mmol) was dissolved in a mixture of 25 THF and 10 mL MeOH and a solution of sodium hydrosulfite (7.43 g, 42.7 mmol) in 50 mL water was added to the it at 0° C. followed by aqueous ammonia solution (9.24 ml, 107 mmol). The reaction mixture was stirred for 1 h and after completion of the reaction as judged from LCMS, the volatiles were concentrated, and the residue extracted with a mixture of 1:1 THF and ethyl acetate repeatedly. The organic layer was dried over Na$_2$SO$_4$ and concentrated to get the crude product which was used as such in the next step. LCMS: m/z=409.29 (M+H)$^+$ Step 5: Synthesis of (E)-1,15-diamino-4-cyano-8,9,16,19-tetrahydro-7H-6,10-dioxa-2,14,15a,19a-tetraazacyclopentadeca[3,2,1-cd:8,9,10-c'd']diindene-12-carboxamide dihydrobromide

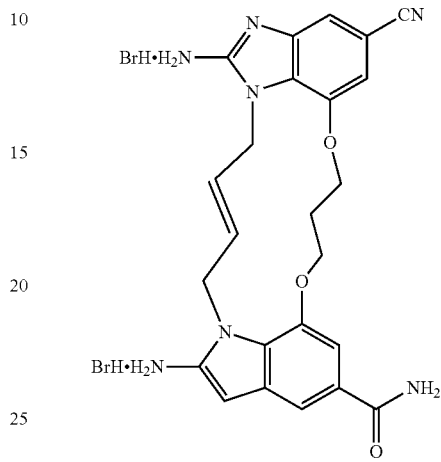

(E)-1,13-diamino-11-cyano-7,8,14,15,18,19-hexahydro-6H-dibenzo[b,j][1,12]dioxa[4,9]diazacyclopentadecine-3-carboxamide (700 mg, 1.714 mmol) was suspended in 50 mL DMF and cyanic bromide (1.8 g, 17.14 mmol) was added to it. The mixture was allowed to stir overnight at room temperature and the suspension slowly turned into a homogenous green colored solution. The progress of the reaction was monitored by LCMS. After completion, the DMF was concentrated under reduced pressure and the solid obtained was washed with a mixture of MeCN-MeOH (7:3) and filtered to obtain the product as the dihydrobromide salt. LCMS: m/z=459.29 (M+H)$^+$ Step 6: (E)-N,N'-(12-carbamoyl-4-cyano-8,9,16,19-tetrahydro-7H-6,10-dioxa-2,14,15a,19a-tetraazacyclopentadeca[3,2,1-cd:8,9,10-c'd']diindene-1,15-diyl)bis(1-ethyl-3-methyl-1H-pyrazole-5-carboxamide)

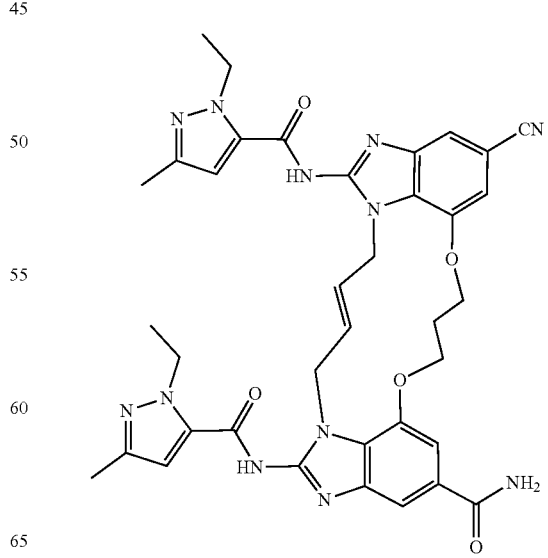

(E)-1,15-diamino-4-cyano-8,9,16,19-tetrahydro-7H-6,10-dioxa-2,14,15a,19a-tetraazacyclopentadeca[3,2,1-cd:8,9,10-c'd']diindene-12-carboxamide dihydrobromide (150 mg, 0.24 mmol) and 1-ethyl-3-methyl-1H-pyrazole-5-carboxylic acid (112 mg, 0.72 mmol) was dissolved in 5 ml NMP and DIPEA (0.34 ml, 1.93 mmol) was added to it followed by HATU (276 mg, 0.725 mmol) and the reaction mixture was stirred for 30 min at RT followed by 130° C. in a microwave for 1 h. After the completion of the reaction, the reaction mixture was poured into a cold saturated brine solution and the precipitated brown solid was filtered. The solid was washed several times with acetonitrile and purified by prep HPLC to obtain the pure product. $^1$H NMR (400 MHz, DMSO-$d_6$) δ 12.96 (s, 2H), 8.00 (s, 1H), 7.70 (s, 1H), 7.62-7.31 (m, 4H), 6.56 (d, J=14.8 Hz, 2H), 5.50 (s, 2H), 4.88 (s, 4H), 4.62-4.32 (m, 9H), 2.29 (d, J=10.0 Hz, 2H), 2.08 (s, 6H), 1.32-1.22 (m, 6H); LCMS: m/z=731.65 (M+H)$^+$ Step 7: (E)-N,N'-(12-carbamoyl-4-(1H-tetrazol-5-yl)-8,9,16,19-tetrahydro-7H-6,10-dioxa-2,14,15a,19a-tetraazacyclopentadeca[3,2,1-cd:8,9,10-c'd']diindene-1,15-diyl)bis(1-ethyl-3-methyl-1H-pyrazole-5-carboxamide)

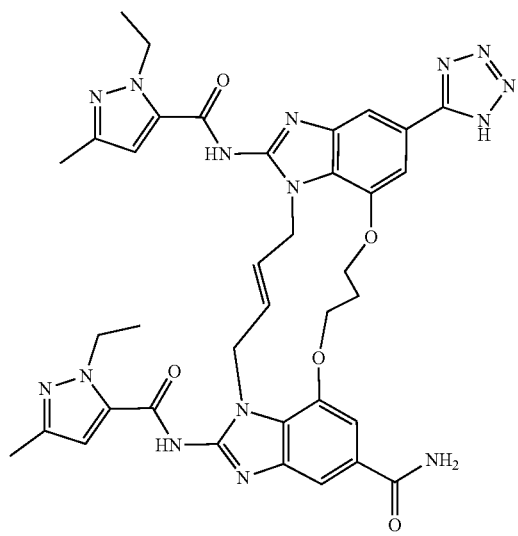 [SMILES: CCn1nc(C)cc1C(=O)Nc1nc2cc(C(N)=O)cc3c2n1C/C=C/Cn1c(NC(=O)c2cc(C)nn2CC)nc2cc(-c4nnn[nH]4)cc(c21)OCCCO3]

(E)-N,N'-(12-carbamoyl-4-cyano-8,9,16,19-tetrahydro-7H-6,10-dioxa-2,14,15a,19a-tetraazacyclopentadeca[3,2,1-cd:8,9,10-c'd']diindene-1,15-diyl)bis(1-ethyl-3-methyl-1H-pyrazole-5-carboxamide) (170 mg, 0.233 mmol) was dissolved in 10 mL DMF in a sealed tube. Sodium azide (378 mg, 5.82 mmol) and ammonium chloride (311 mg, 5.82 mmol) were added and the reaction mixture heated for 4 h at 120° C. After completion of the reaction, the DMF was distilled off and water was added resulting in precipitation of the crude product. The solid was filtered and purified by reverse phase preparative chromatography to obtain the pure product. $^1$H NMR (400 MHz, DMSO-$d_6$) δ 12.99-12.85 (m, 2H), 8.01 (brs, 1H), 7.87 (s, 1H), 7.71 (s, 1H), 7.65 (s, 1H), 7.53 (s, 1H), 7.38 (brs, 1H), 6.55 (s, 2H), 5.61-5.45 (m, 2H), 4.90 (brs, 4H), 4.60-4.50 (m, 4H), 4.50-4.32 (m, 4H), 2.37-2.30 (m, 2H), 2.08 (s, 6H), 1.31-1.25 (m, 6H); LCMS: m/z=774.16 (M+H)$^+$ Example-55: (1S,3S)-3-((E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca [3,2,1-cd:8,9,10-c'd']diindene-12-carboxamido)cyclobutane-1-carboxylic acid
(Compound 55)

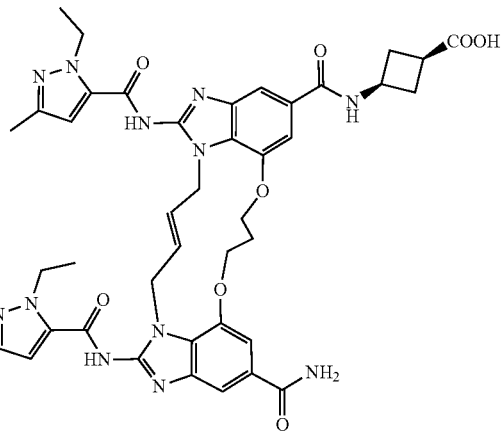

Synthesized from Intermediate 1 and ethyl (1S,3S)-3-aminocyclobutane-1-carboxylate (Int. 18) by following an analogous procedure described for the synthesis of Example-35 (Yield=25 mg, 54%). $^1$H NMR (400 MHz, DMSO-$d_6$) δ 12.90 (s, 2H), 8.68 (t, J=7.8 Hz, 1H), 8.01 (s, 1H), 7.71 (dd, J=6.9, 1.2 Hz, 2H), 7.53 (d, J=11.0 Hz, 2H), 7.38 (s, 1H), 6.55 (s, 2H), 5.50 (s, 2H), 4.89 (s, 4H), 4.53 (q, J=7.1 Hz, 4H), 4.43 (d, J=8.0 Hz, 4H), 2.46 (t, J=4.8 Hz, 5H), 2.27 (dd, J=20.0, 9.5 Hz, 4H), 2.08 (s, 6H), 1.34-1.20 (m, 6H). LCMS: m/z=847.05 (M+H)$^+$; HPLC Purity: 91.42%

Example-56: (1R,3R)-3-((E)-4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca [3,2,1-cd:8,9,10-c'd']diindene-12-carboxamido)cyclobutane-1-carboxylic acid
(Compound 56)

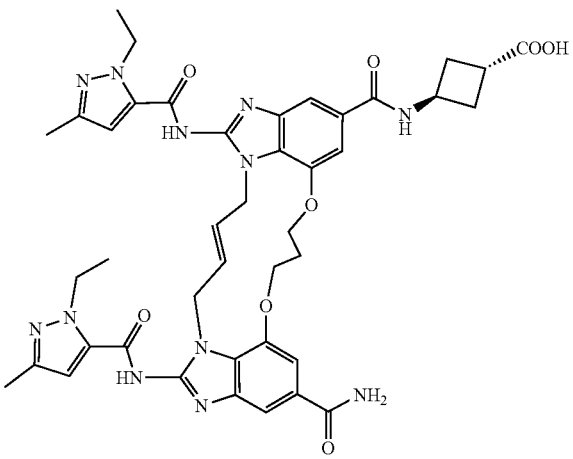 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)N[C@H]4C[C@H](C(=O)O)C4)cc(c21)OCCCO3]

Synthesized from Intermediate 1 and ethyl (1R,3R)-3-aminocyclobutane-1-carboxylate (Int. 19) by following an analogous procedure described for the synthesis of Example-35 (Yield=18 mg, 7%). $^1$H NMR (400 MHz, DMSO-d$_6$) δ 12.85 (s, 3H), 8.69 (d, J=7.4 Hz, 1H), 8.28 (s, 1H), 8.01 (s, 1H), 7.70 (dd, J=12.9, 1.2 Hz, 2H), 7.51 (dd, J=18.8, 1.4 Hz, 2H), 7.38 (s, 1H), 6.55 (s, 2H), 5.50 (s, 2H), 4.89 (s, 4H), 4.56 (dq, J=21.0, 7.5 Hz, 5H), 4.44 (s, 4H), 2.42-2.22 (m, 5H), 2.08 (d, J=6.1 Hz, 5H), 1.31-1.16 (m, 8H). LCMS: m/z=847.05 (M+H)$^+$; HPLC Purity: 91.06%

Example-57: Synthesis of (E)-1-((12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)methyl)cyclopropane-1-carboxylic acid (Compound 57)

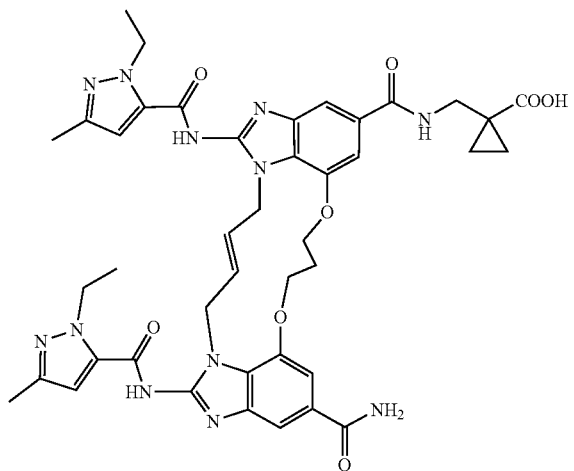 [SMILES: CCn1nc(C)cc1C(=O)Nc1nc2cc(C(N)=O)cc3c2n1C/C=C/Cn1c(NC(=O)c2cc(C)nn2CC)nc2cc(C(=O)NCC4(C(=O)O)CC4)cc(c21)OCCCO3]

Synthesized from Intermediate 1 and ethyl 1-cyanocyclopropane-1-carboxylate (Int. 20) by following an analogous procedure described for the synthesis of Example-35 (Yield=22 mg, 17%). $^1$H NMR (400 MHz, DMSO-d$_6$) δ 8.37 (t, J=5.8 Hz, 1H), 8.02 (s, 1H), 7.69 (d, J=13.6 Hz, 2H), 7.52 (d, J=14.0 Hz, 2H), 7.39 (s, 1H), 6.55 (s, 2H), 5.49 (s, 2H), 4.88 (s, 4H), 4.52 (q, J=7.1 Hz, 4H), 4.43 (q, J=4.5 Hz, 4H), 3.59 (d, J=5.7 Hz, 2H), 2.30 (q, J=5.8 Hz, 2H), 2.07 (s, 6H), 1.26 (t, J=7.1 Hz, 7H), 1.07 (q, J=3.8, 3.3 Hz, 2H), 0.96 (q, J=4.3, 3.9 Hz, 2H). LCMS: m/z=847.05 [M+H]$^+$; HPLC Purity: 99.57%

Example-58: (E)-2-(2-(4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxamido)ethyl)nicotinic acid (Compound 58)

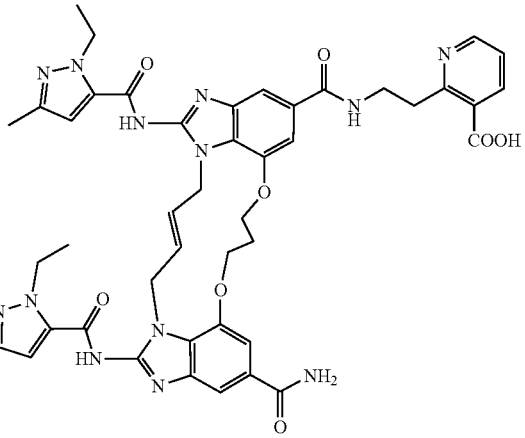

Synthesized from Intermediate 1 and methyl 2-(2-aminoethyl)nicotinate dihydrochloride (Int. 21) by following an analogous procedure described for the synthesis of Example-35 (Yield=14 mg, 8.3%). $^1$H NMR (400 MHz, DMSO-d$_6$) δ 8.61 (t, J=5.7 Hz, 1H), 8.41 (d, J=7.9 Hz, 1H), 8.04 (s, 1H), 7.71 (d, J=1.2 Hz, 1H), 7.59 (dd, J=28.5, 1.3 Hz, 3H), 7.47 (d, J=1.4 Hz, 1H), 7.38 (s, 1H), 6.56 (s, 2H), 5.50 (d, J=1.8 Hz, 2H), 4.89 (s, 3H), 4.53 (q, J=7.1 Hz, 4H), 4.44 (d, J=5.4 Hz, 4H), 3.72 (q, J=6.6 Hz, 3H), 3.49 (t, J=6.9 Hz, 2H), 3.17 (s, 3H), 2.57-2.52 (m, 11H), 2.29 (d, J=6.2 Hz, 2H), 2.08 (s, 5H), 1.27 (t, J=7.1 Hz, 6H). LCMS: m/z=898.90 (M+H)$^+$; HPLC Purity: 99.20%

Example-59: (E)-2-(3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)benzoic acid (Compound 59)

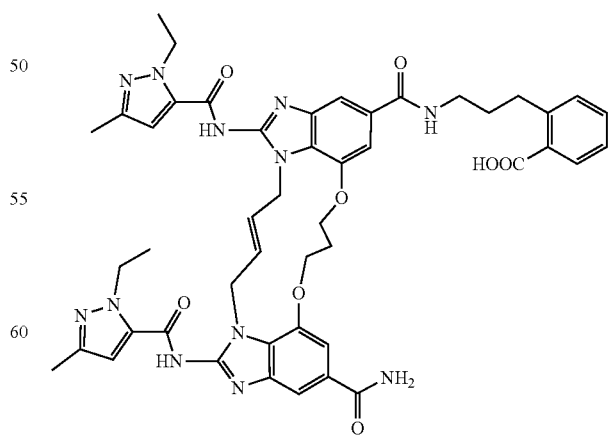

Synthesized from Intermediate 1 and methyl 2-(3-aminopropyl)benzoate (Int. 22) by following an analogous procedure described for the synthesis of Example-35 (Yield=25 mg, 16%). ¹H NMR (400 MHz, DMSO-d₆) δ 12.89 (brs, 3H), 8.51 (s, 1H), 8.01 (brs, 1H), 7.89-7.78 (m, 1H), 7.76-7.67 (m, 2H), 7.57-7.44 (m, 3H), 7.43-7.28 (m, 3H), 6.54 (s, 2H), 5.50 (s, 2H), 4.89 (s, 4H), 4.53 (q, J=7.1 Hz, 4H), 4.42 (brs, 4H), 3.33-3.25 (m, 2H), 3.00 (t, J=7.8 Hz, 2H), 2.36-2.25 (m, 2H), 2.08 (s, 6H), 1.91-1.75 (m, 2H), 1.27 (t, J=7.1 Hz, 6H); LCMS: m/z=911.06 (M+H)⁺; HPLC Purity: 98.37%

Example-60: (E)-N-(3-(4-ethoxy-4-oxido-1,4-aza-phosphinan-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide, hydrogen chloride salt (Compound 60)

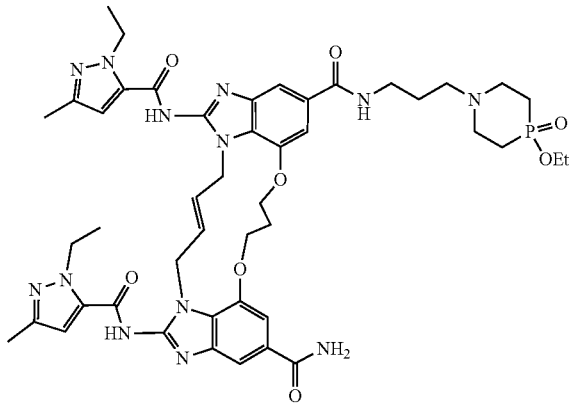 [SMILES: CCOP1(=O)CCN(CCCNC(=O)c2cc3c4c(c2)nc(NC(=O)c2cc(C)nn2CC)n4C/C=C/Cn2c(NC(=O)c4cc(C)nn4CC)nc4cc(C(N)=O)cc(c42)OCCCO3)CC1]

Synthesized from Intermediate 1 and 2-(3-(4-ethoxy-4-oxido-1,4-azaphosphinan-1-yl)propyl)isoindoline-1,3-dione (Int. 23) by following an analogous procedure described for the synthesis of Example-28 (Yield=12 mg, 15.7%). ¹H NMR (400 MHz, DMSO-d₆) δ 11.28 (s, 1H), 8.80 (t, J=5.8 Hz, 1H), 8.05 (bs, 1H), 7.71 (s, 2H), 7.61-7.57 (m, 1H), 7.55 (s, 1H), 7.39 (bs, 1H), 6.57 (d, J=1.7 Hz, 2H), 5.57-5.43 (m, 2H), 4.89 (bs, 4H), 4.53 (q, J=7.1 Hz, 4H), 4.45 (q, J=5.3 Hz, 4H), 4.13-3.97 (m, 2H), 3.83-3.59 (m, 2H), 3.59-3.37 (m, 2H), 3.38-3.29 (m, 2H), 3.28-3.11 (m, 4H), 2.34-2.21 (m, 4H), 2.09 (s, 6H), 2.06-1.96 (m, 2H), 1.34-1.21 (m, 9H); LCMS: m/z=92.50 (M+H)⁺; HPLC Purity: 98.37%

Biological Assay—Determination of Apparent Solubility/Extended Kinetic Solubility by UHPLC Test sample preparation: About 0.5 mg of the test sample was weighed and transferred in duplicate in 1 mL glass inserts of 96 well plates. 5 µL of DMSO and 1 ml of phosphate buffer were added. Allowed for equilibrium in an orbital shaker at 37° C. for 24 hrs. Later, allowed it cool to room temperature and centrifuged the 96 well plate (at 240×10 RPM for 20 min) and supernatant material was taken into collection plate, covered it with the heat resistant aluminum sheet or supernatant material was directly taken into HPLC sample vial.

Injected diluent as blank and linearity solutions in duplicate. Recorded the chromatograms and plotted the calibration curve, concentration (X-axis) versus Area (y-axis). The correlation coefficient for calibration curve should be not less than 0.95. If above criteria passes, then injected the test samples and recorded the chromatograms. In case saturated peaks are observed, then diluted the test sample with diluent as appropriate.

Calculated the slope and intercept of the calibration curve. From the standard curve, determined the solubility of the sample in µM (micromolar).

Compounds were soluble as shown in Table 2 below, which is an essential characteristic for administration (such as intravenous administration) of STING agonists.

TABLE 2

| Solubility Data | |
|---|---|
| Compound No. | Solubility (micromolar) |
| 2 (Sodium Salt) | 3569 |
| 3 (Sodium Salt) | 928 |
| 4 | 149 |
| 5 (Sodium Salt) | 1120 |
| 6 (Sodium Salt) | 3499 |
| 8 (Sodium Salt) | 5229 |
| 9 | 100 |
| 10 | 631 |
| 11 | 98 |
| 12 (Sodium Salt) | 14227 |
| 14 (Sodium Salt) | 6799 |
| 16 (Sodium Salt) | 243 |
| 18 (Sodium Salt) | 250 |

Biological Assay—Stimulation of Human STING Signaling in THP1 Cell Line

Compounds were tested for their STING activation potential using human THP1-Blue™ ISG SEAP based reporter cell line (Invivogen). Briefly, THP1-Blue ISG cells (100,000 cells/well) in 96 well plate were treated with varying concentrations of test and reference compounds and incubated at 37° C. with 5% CO₂ for 18-20 hours. The control untreated cells were also set up. Post incubation, the cell supernatant was tested for SEAP (Secreted Embryonic Alkaline Phosphatase) activity using the QuantiBlue™ substrate reagent (Invivogen). The formation of blue coloured product was quantified by measuring absorbance at wavelength of 620 nm using PheraStar/Tecan reader. The average of duplicate readouts for each data point was plotted in GraphPad prism 6 against the concentration of test or reference compound to calculate EC₅₀ value. The fold of SEAP induction or increase in luminescence at different data points was estimated against the un-stimulated cell control set.

Compounds 2, 3, 4, 5, 6, 8, 11, 12, 14, 16 and 18 have shown EC₅₀ value ranging from 1 to 10 nM.

Compounds 1, 7, 9, 10, 17, 19, 20 and 22 have shown EC₅₀ value ranging from 11-100 nM.

Compounds 13, 15, 21, 23, 24, 25, 26 and 27 have shown EC₅₀ value 101 nM-2.5 micromolar.

Quantification of Cytokine Secretion in Mouse or Human Whole Blood in Response to STING Agonists Compounds were tested for their ability to induce cytokine secretion, particularly IFNβ in the mouse or human whole blood. Mouse blood was collected from C57 mice utilizing heparin as an anticoagulant. Human blood was collected in sodium heparin containing vacutainers. Mouse or human blood was diluted in 1:3 ratio (four fold) with serum-free RPMI medium containing 2× Penicillin-Streptomycin solution. Diluted whole blood (150 µL) was seeded in U-bottom plates and added with 50 µl test compound prepared in RPMI medium and mixed twice with a pipette followed by incubation the plate at 37° C. for 4 h (mice) and 5 h (human). Test compounds were added at a final concentrations of 3 µM. After the incubation period, the samples were centrifuged at 2500 rpm for 5 min, and supernatant was collected and transferred to a V bottom plate and stored immediately at −80° C. Samples were processed for quantification of IFNβ by ELISA utilizing commercially available kits measuring either mouse IFNβ (VeriKine Mouse IFN Beta ELISA, PBL assay science, Catalog No 42400-2) or human IFNβ (VeriKine Human IFN Beta ELISA, PBL assay science, Catalog No. 41410-2), respectively. IFNβ levels were expressed in pg/mL.

In mouse whole blood assay, compounds 2, 3, 4, 5, 6, 8, 9, 10, 11, 12, 14, 16 and 18 have shown IFNβ secretion ranging from 200-1000 pg/mL at 1 μM concentration at 4 h time point.

In human whole blood assay, compounds 2, 3, 4, 5, 6, 8, 9, 10, 11, 12, 14, 16 and 18 have shown IFNβ secretion ranging from 200-600 pg/mL at 3 μM concentration at 5 h time point.

Effect of Compounds on Tumor Volume in CT26 Allograft BALB/c Mice Model by Intravenous (i.v.) Administration Healthy, female BALB/c mice in the age group of 5-8 weeks issued from Research Animal Facility (RAF). These mice were housed in individually ventilated cages (IVC) in the experimental animal room and were acclimatized not less than 5 days prior to cell inoculation. All the experimental activities were carried out inside the biosafety cabinet to ensure sterility. Under aseptic conditions, Allograft tumor model was generated by inoculating BALB/c mice with 0.1 million CT26 single cell suspension (colorectal cancer model), using 1 mL disposable syringe fitted with a 26G ½" sterile needle. Each mouse was inoculated with 100 μL of CT26 cell suspension in phosphate buffered saline (PBS) media, subcutaneously in right flank region. Mice were randomized into different groups, post cell inoculation, with approximately equal mean and equal variation (S.E.M.) of tumor volumes in various treatment groups including vehicle control group.

Tumor size was measured with Vernier caliper when the tumor became palpable. Tumor volume (T. V.) was calculated by using the formula:

$$\text{Tumor volume (mm}^3) = (L \times W^2)/2$$

Where, L—Length of tumor, W—Width of tumor

Mice were selected and randomized, on the basis of tumor volume, into required no. of groups with approximately equal mean and equal variation on day 1 of treatment, post-tumor cell inoculation. All study groups were treated via intravenous route on day 1, 4 and 8 dosing schedule, through lateral tail vein at a dose volume of 5 mL/kg.

Tumor sizes were measured with Vernier caliper twice weekly and body weights of mice were recorded daily.

Percent tumor growth inhibition (% TGI) was calculated using the formula:

$$\% \text{ TGI} = [1 - (T_f - T_i)/(C_f - C_i)] \times 100$$

Wherein Tf and Ti are the final and initial test tumor volumes, respectively, and Cf and Ci are the final and initial control mean tumor volumes, respectively.

Percent Tumor Regression (% TR) was calculated using the formula:

$$\% \text{ TR} = [(\text{Initial } T.V. - \text{Final } T.V.)/(\text{Initial } T.V.)] \times 100$$

Wherein T.V.=Tumor Volume

Body weight change (%) was calculated by using the formula:

$$\text{Body weight change (\%)} = [(\text{Final } B.Wt. - \text{Initial } B.Wt.)/\text{Initial } B.Wt.] \times 100$$

Wherein B.Wt.=Body weight

Figure 1B:
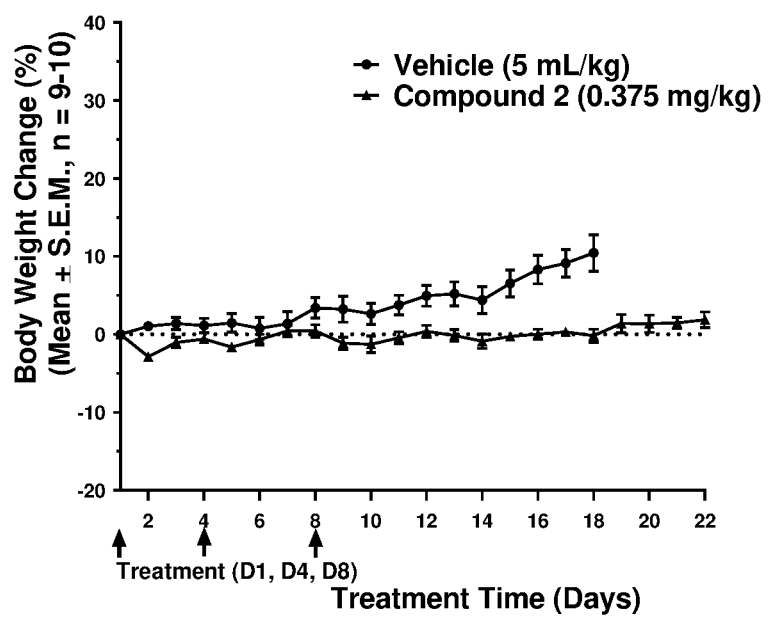
FIG. 1B shows the effect of Compound 2 in CT26 Ectopic Allograft BALB/c Mice Model on body weight change on the same subjects in FIG. 1A.

FIGS. 1A & 1B show the effect of a representative compound of the invention, Compound 2, in CT26 Ectopic Allograft BALB/c Mice Model, on tumor volume reduction and body weight change, respectively, indicating that Compound 2 reduces tumor volume, with 7 out of 9 subjects exhibiting complete tumor regression. Compound 2 was administered to the subjects (n=9) at the indicated dose at days 1, 4, and 8.

Figure 2A:
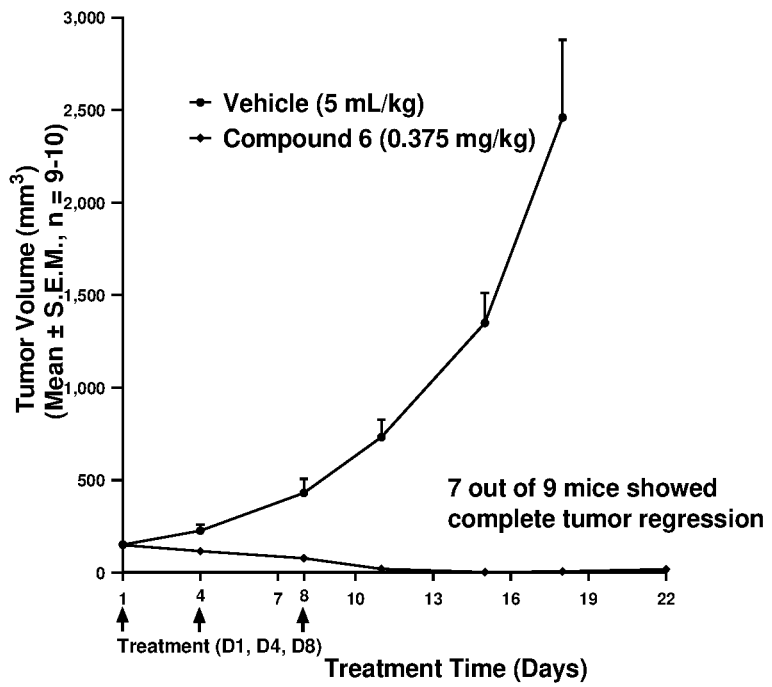
FIG. 2A shows the effect of a representative compound of the invention, Compound 6, in CT26 Ectopic Allograft BALB/c Mice Model, on tumor volume reduction, indicating that Compound 6 reduces tumor volume, with 7 out of 9 subjects exhibiting complete tumor regression. Compound 6 was administered to the subjects (n=9) at the indicated dose at days 1, 4, and 8.
Figure 2B:
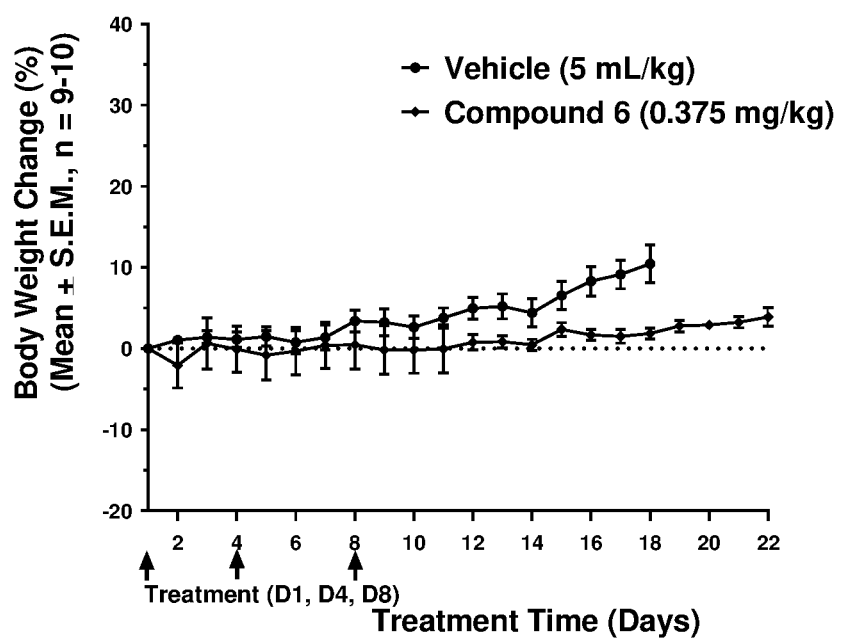
FIG. 2B shows the effect of Compound 6 in CT26 Ectopic Allograft BALB/c Mice Model on body weight change on the same subjects in FIG. 2A.

FIGS. 2A & 2B show the effect of a representative compound of the invention, Compound 6, in CT26 Ectopic Allograft BALB/c Mice Model, on tumor volume reduction and body weight change, respectively, indicating that Compound 6 reduces tumor volume, with 7 out of 9 subjects exhibiting complete tumor regression. Compound 6 was administered to the subjects (n=9) at the indicated dose at days 1, 4, and 8.

Figure 3A:
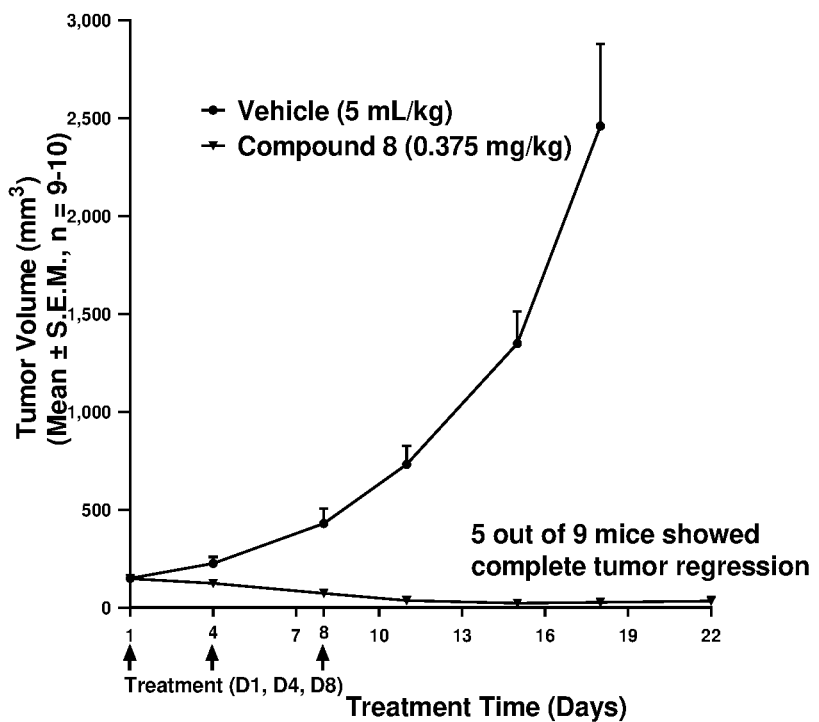
FIG. 3A shows the effect of a representative compound of the invention, Compound 8, in CT26 Ectopic Allograft BALB/c Mice Model, on tumor volume reduction, indicating that Compound 8 reduces tumor volume, with 5 out of 9 subjects exhibiting complete tumor regression. Compound 8 was administered to the subjects (n=9) at the indicated dose at days 1, 4, and 8.
Figure 3B:
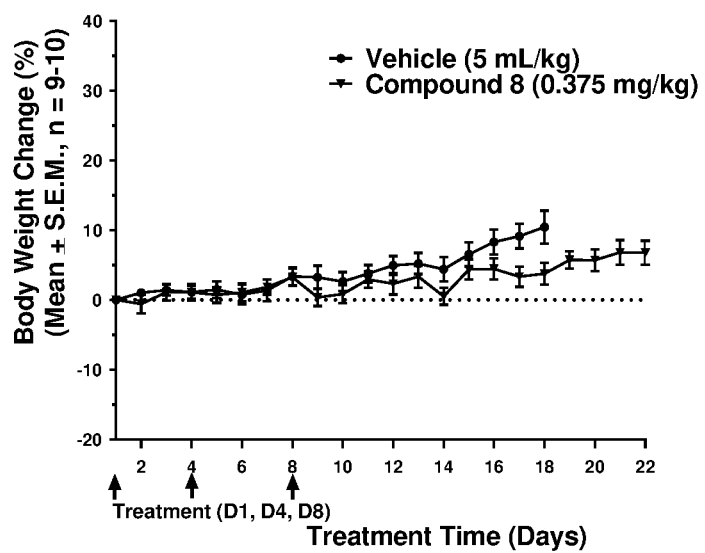
FIG. 3B shows the effect of Compound 8 in CT26 Ectopic Allograft BALB/c Mice Model on body weight change on the same subjects in FIG. 3A.

FIGS. 3A & 3B show the effect of a representative compound of the invention, Compound 8, in CT26 Ectopic Allograft BALB/c Mice Model, on tumor volume reduction and body weight change, respectively, indicating that Compound 8 reduces tumor volume, with 5 out of 9 subjects exhibiting complete tumor regression. Compound 8 was administered to the subjects (n=9) at the indicated dose at days 1, 4, and 8.

Figure 4A:
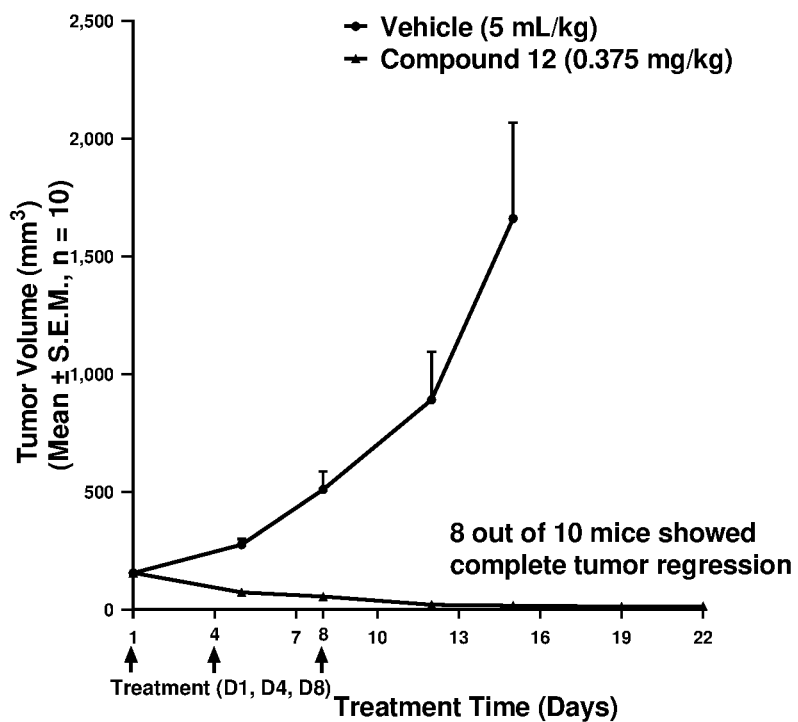
FIG. 4A shows the effect of a representative compound of the invention, Compound 12, in CT26 Ectopic Allograft BALB/c Mice Model, on tumor volume reduction, indicating that Compound 12 reduces tumor volume, with 8 out of 10 subjects exhibiting complete tumor regression. Compound 12 was administered to the subjects (n=10) at the indicated dose at days 1, 4, and 8.
Figure 4B:
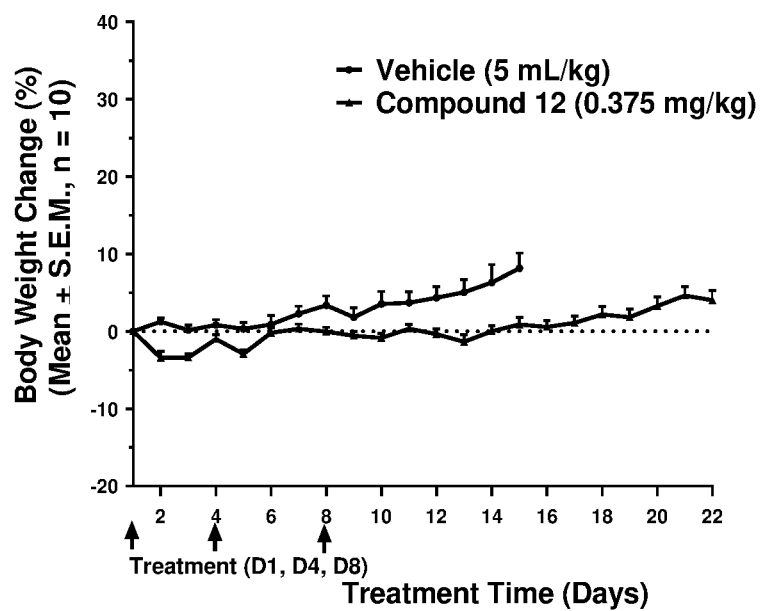
FIG. 4B shows the effect of Compound 12 in CT26 Ectopic Allograft BALB/c Mice Model on body weight change on the same subjects in FIG. 4A.

FIGS. 4A & 4B show the effect of a representative compound of the invention, Compound 12, in CT26 Ectopic Allograft BALB/c Mice Model, on tumor volume reduction and body weight change, respectively, indicating that Compound 12 reduces tumor volume, with 8 out of 10 subjects exhibiting complete tumor regression. Compound 12 was administered to the subjects (n=10) at the indicated dose at days 1, 4, and 8.

Figure 5A:
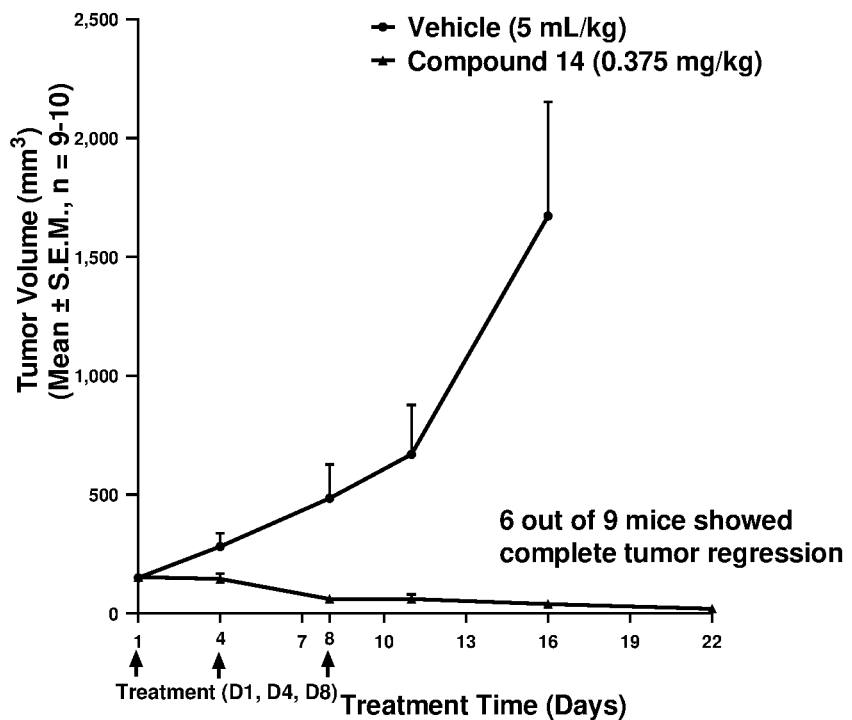
FIG. 5A shows the effect of a representative compound of the invention, Compound 14, in CT26 Ectopic Allograft BALB/c Mice Model on tumor volume reduction, indicating that Compound 14 reduces tumor volume, with 6 out of 9 subjects exhibiting complete tumor regression. Compound 14 was administered to the subjects (n=9) at the indicated dose at days 1, 4, and 8.
Figure 5B:
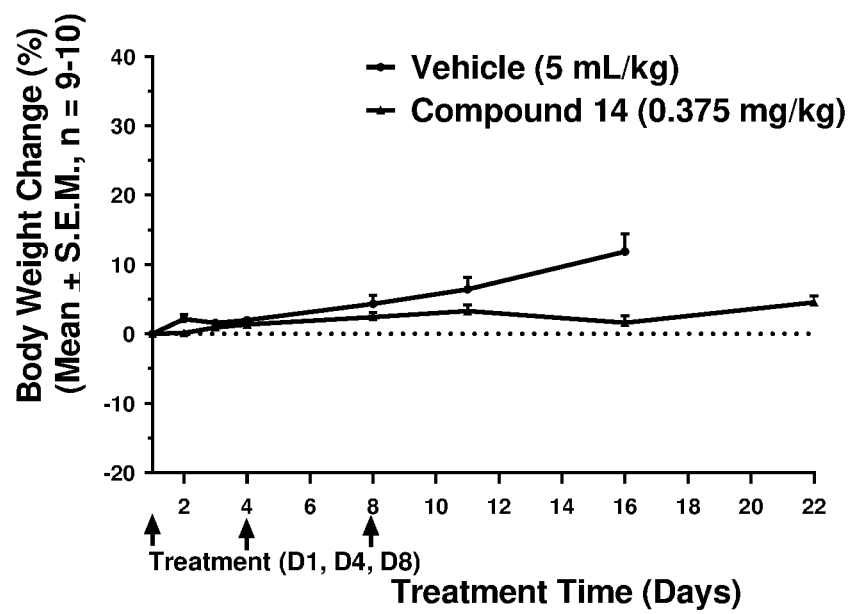
FIG. 5B shows the effect of Compound 14 in CT26 Ectopic Allograft BALB/c Mice Model on body weight change on the same subjects in FIG. 5A.

FIGS. 5A & 5B show the effect of a representative compound of the invention, Compound 14, in CT26 Ectopic Allograft BALB/c Mice Model on tumor volume reduction and body weight change, indicating that Compound 14 reduces tumor volume, with 6 out of 9 subjects exhibiting complete tumor regression. Compound 14 was administered to the subjects (n=9) at the indicated dose at days 1, 4, and 8.

Figure 6:
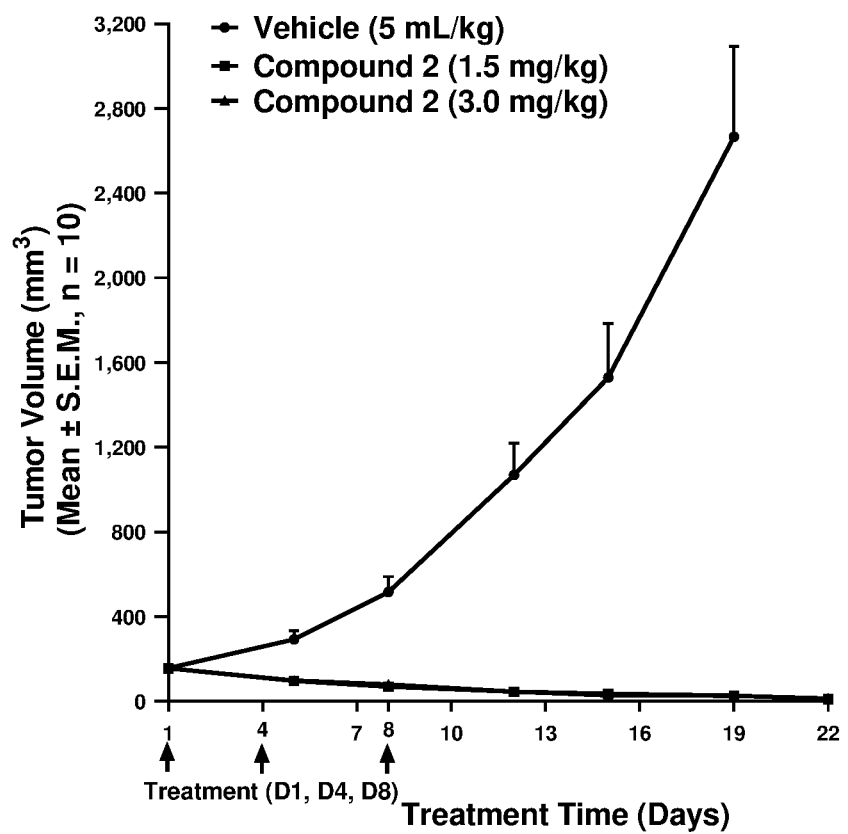
FIG. 6 shows the effect of Compound 2 at high dose in CT26 Ectopic Allograft BALB/c Mice Model wherein Compound 2 at two different doses reduces tumor volume (the plot lines for the two doses of Compound 2 overlap). Compound 2 was administered to the subjects (n=10) at the indicated dose at days 1, 4, and 8.

FIG. 6 shows the effect of Compound 2 at high dose in CT26 Ectopic Allograft BALB/c Mice Model wherein Compound 2 at two different doses reduces tumor volume (the plot lines for the two doses of Compound 2 overlap). Compound 2 was administered to the subjects (n=10) at the indicated dose at days 1, 4, and 8.

Additionally, more than 75% of the mice showed more than 70% tumor regression after day 21 in CT26 Ectopic Allograft BALB/c Mice Model when Compounds 2, 6, 8, 12 or 14 are dosed at 0.375 mpk (mg/kg), or Compound 2 is dosed at 1.5 mpk (mg/kg) or 3 mpk (mg/kg). Also, Compound 2 maintained high efficacy even at 3 mpk (mg/kg) without significant effect on body weight (<10%).

Pharmacokinetic and Pharmacodynamic Profiling and Estimation of Immune Cell Infiltration in Tumors Following Treatment with Compounds 2, 6, 8, 12 and 14

Serum and tumor cytokine levels and corresponding compound concentrations in mouse plasma were determined following single-dose intravenous administration in CT26 (murine colorectal carcinoma) tumor-bearing mice. Briefly, naïve BALB/c mice in the age group of 6-8 weeks were inoculated with 0.1 million CT-26 cells/animal in phosphate buffered saline (PBS), subcutaneously. Upon reaching tumor volume of 150-300 mm³ animals were administered with single i.v. dose of vehicle, test compounds, Compound 2, Compound 6, Compound 8, Compound 12 and Compound 14 at 0.375 mg/kg, in a dose volume of 5 mL/kg. Blood and tumor samples were harvested at various time points up to 24 h post-dose. Tumor samples were homogenized and prepared for cytokine estimation (ELISA) and compound concentration were determined by LC-MS/MS. Serum aliquots and tumor samples were snap-frozen and stored at −80° C. till further analysis. Serum and tumor samples were evaluated for Interferon beta (IFNβ), interleukin-6 (IL-6) and tumor necrosis factor alpha (TNFα) by enzyme linked immunosorbent assay (ELISA) using kits from R & D systems (Quantikine mouse IL-6 and TNFα kits) and PBL biosciences (Verikine mouse IFNβ kit).

Cytokine analysis from mouse serum samples: For IL-6 and TNFα estimation, 50 μL of test samples or internal standard or control were applied to wells in duplicates and incubated for 2 h at room temperature, followed by aspiration and washing four times with 400 μL of wash buffer. 100 μL of mouse IL-6 or TNFα conjugate solution was added and incubated further for 2 h at room temperature and followed later by 4 wash cycles. 100 μL of substrate solution was added to each well with addition of stop solution after 30 min. Optical density was measured at 450 nm averaged and was used for further calculations following subtraction of respective blank controls. Cytokine concentrations were determined by interpolating the optical density of samples into the reference standard curve utilizing four parameter logistic (4-PL) curve-fit. Cytokine concentrations were normalized with their respective dilution factors and represented in pg/mL. For IFNβ estimation, 100 μL test sample or internal standard or controls were applied to the wells in duplicates and incubated for 1 h at room temperature followed by three washes and addition of the anti-mouse IFNβ antibody solution with further 1 h incubation. This was followed by addition of horseradish peroxidase (HRP) solution and three washes, later addition of TMB substrate and reading the optical density at 450 nm. Optical densities were blank-subtracted and interpolated to the reference standard utilizing the four parameter logistic (4-PL) curve-fit. Cytokine concentrations were normalized with their respective dilution factors and represented in pg/mL. Tables 4 and 5 indicate cytokine levels for compounds 2, 6, 8, 12, and 14 in serum and tumor at different administered doses.

Cytokine analysis from tumor samples: Tumor samples were homogenized in a bead-based homogenizer and lysates were prepared with buffer supplemented with 1% Triton X-100 and protease inhibitors. Cytokine levels were estimated by ELISA and expressed as pg/g tumor.

Bioanalysis of plasma and tumor samples: Plasma and tumor concentrations of test compounds were determined by LC-MS/MS method. Tumor samples were homogenized utilizing a bead-based homogenizer. Plasma samples and tumor homogenates were extracted using protein precipitation method with organic solution containing respective internal standards. Plasma and tumor concentrations were determined against respective calibration curve. Table 3 indicates the concentration of Compound 2 in plasma and tumor at different administered doses. Table 4 indicates the concentration of Compounds 6, 8, 12, and 14 in plasma and tumor at different administered doses. Table 5 indicates cytokine levels for Compound 2 in serum and tumor at different doses. Table 6 indicates cytokine levels for Compounds 6, 8, 12 and 14 in serum and tumor at 0.375 mpk.

Compounds have shown slower clearance in tumor than in plasma, which is also reflected in the higher cytokine levels in tumor compared to serum. In addition, significant levels of cytokines were observed in tumor even at 24 h. Compound 2 showed sustained levels in tumor and it also correlated with sustained cytokine levels, thus offering higher tolerability.

TABLE 3

Concentration of Compound 2 in plasma and tumor at different doses

| Compound 2 (mg/kg) | Time (h) | Plasma Conc. (μM) | Tumor Conc. (μM) |
|---|---|---|---|
| 0.093 | 3.5 | 0.11 ± 0.01 | 0.07 ± 0.02 |
|  | 8 | 0.03 ± 0.00 | 0.06 ± 0.03 |
| 0.187 | 3.5 | 0.22 ± 0.02 | 0.09 ± 0.02 |
|  | 8 | 0.04 ± 0.01 | 0.12 ± 0.08 |
| 0.375 | 3.5 | 0.47 ± 0.06 | 0.23 ± 0.12 |
|  | 8 | 0.08 ± 0.01 | 0.14 ± 0.05 |
|  | 12 | 0.05 ± 0.01 | 0.11 ± 0.06 |

TABLE 4

Concentration of Compounds 6, 8, 12 and 14 in plasma and tumor at 0.375 mpk

| Compound | Dose (mg/kg) | Time (h) | Plasma Conc. (μM) | Tumor Conc. (μM) |
|---|---|---|---|---|
| Compound 6 | 0.375 | 3.5 | 0.44 ± 0.14 | 0.29 ± 0.12 |
|  |  | 8 | 0.13 ± 0.06 | 0.25 ± 0.04 |
|  |  | 12 | 0.05 ± 0.01 | 0.20 ± 0.05 |
|  |  | 24 | 0.01, BLQ, BLQ | 0.26 ± 0.03 |
| Compound 8 | 0.375 | 3.5 | 0.04 ± 0.01 | 0.09 ± 0.01 |
|  |  | 8 | 0.02 ± 0.01 | 0.06 ± 0.01 |
|  |  | 12 | 0.02 ± 0.01 | 0.06 ± 0.00 |
|  |  | 24 | BLQ | BLQ |
| Compound 12 | 0.375 | 3.5 | 0.44 ± 0.05 | 0.36 ± 0.13 |
|  |  | 8 | 0.18 ± 0.05 | 0.19 ± 0.08 |
|  |  | 12 | 0.09 ± 0.02 | 0.30 ± 0.12 |
|  |  | 24 | 0.02 ± 0.00 | 0.13 ± 0.04 |
| Compound 14 | 0.375 | 3.5 | 0.45 ± 0.07 | 0.17 ± 0.02 |
|  |  | 8 | 0.09 ± 0.01 | 0.13 ± 0.02 |
|  |  | 12 | 0.07 ± 0.06 | 0.16 ± 0.06 |
|  |  | 24 | BLQ | 0.18 ± 0.06 |

TABLE 5

Cytokine levels for Compound 2 in serum and tumor at different doses

| Compound 2 (mg/kg) | Time (h) | Serum Cytokines (pg/ml) | | | Tumor Cytokines (pg/g) | | |
|---|---|---|---|---|---|---|---|
|  |  | IFNβ | IL-6 | TNFα | IFNβ | IL-6 | TNFα |
| 0.093 | 3.5 | 446 | 1323 | 261 | 4000 | 4580 | 2460 |
|  | 8 | 64 | 662 | 210 | 955 | 1100 | 637 |
| 0.187 | 3.5 | 1920 | 3139 | 574 | 4169 | 4798 | 3201 |
|  | 8 | 127 | 738 | 136 | 962 | 2244 | 531 |
| 0.375 | 3.5 | 8540 | 6014 | 1242 | 8044 | 8103 | 6074 |
|  | 8 | 263 | 1201 | 160 | 1723 | 2715 | 617 |
|  | 12 | 14 | 372 | 50 | 323 | 2794 | 298 |

TABLE 6

Cytokine levels for Compounds 6, 8, 12 and 14 in serum and tumor at 0.375 mpk

| Compound | Dose (mg/kg) | Time (h) | Serum IFNβ | Tumor IFNβ |
|---|---|---|---|---|
| Compound 6 | 0.375 | 3.5 | 3375 ± 528.4 | 6931 ± 1236.8 |
|  |  | 8 | 215 ± 39.9 | 1814 ± 369.3 |
|  |  | 12 | BLQ | 1916 ± 842.7 |
|  |  | 24 | BLQ | 506 ± 239.1 |

TABLE 6-continued

Cytokine levels for Compounds 6, 8, 12 and 14 in serum and tumor at 0.375 mpk

| Compound | Dose (mg/kg) | Time (h) | Serum IFNβ | Tumor IFNβ |
|---|---|---|---|---|
| Compound 8 | 0.375 | 3.5 | 20553 ± 3011.24 | 7975 ± 1164.2 |
|  |  | 8 | 307 ± 64.6 | 1182 ± 321.2 |
|  |  | 12 | 43 ± 33.5 | 284 ± 84.2 |
|  |  | 24 | BLQ | 197 ± 84.7 |
| Compound 12 | 0.375 | 3.5 | 4248 ± 706 | 6190 ± 687.0 |
|  |  | 8 | 568 ± 48.6 | 1144 ± 128.9 |
|  |  | 12 | 16 ± 15.7 | 789 ± 378.2 |
|  |  | 24 | BLQ | 94 ± 48.3 |
| Compound 14 | 0.375 | 3.5 | 768 ± 330.8 | 2433 ± 653.8 |
|  |  | 8 | 415 ± 8.7 | 2137 ± 261.8 |
|  |  | 12 | 5 ± 5 | 752 ± 126.6 |
|  |  | 24 | BLQ | 380 ± 239 |

Estimation of immune cell infiltration in tumors: CT-26 tumor-bearing Balb/c mice were treated intravenously with 0.375 mg/kg of test compounds and blood and tumors were processed for analysis of $CD8^+$, $CD3^+$ and $CD45^+$ T cells at 24 h and 96 h after start of treatment. Blood samples were subjected to RBC lysis and the cells were recovered by centrifugation. Following wash with PBS, the cells were blocked using TruStain FcX™ blocking antibody and stained with fluorophore-tagged anti-CD45, anti-CD3 and anti-CD8 antibodies. Tumor samples were minced and subjected to tissue digestion using freshly prepared collagenase-IV solution (1 mg/ml) containing DNase (0.05 mg/ml) for 1-1.5 h at 37° C. and 150-200 rpm. Single cell suspension was prepared by filtering it through a 100 μm mesh and checked for cell viability. Cells were stained with various antibodies as mentioned above. The distinct T cell subsets were analysed on FACS Canto II (BD) and percentage of each population was calculated after initial gating of $CD45^+$ lymphocyte population.

Treatment with single i.v. dose of 0.375 mg/kg with Compounds 2 (FIG. 7A & 7B), 6, 8 or 12 led to an increase in % $CD3^+CD8^+$ T cells infiltrating the tumor as compared to the vehicle-treated group 96 h post treatment initiation, Table 7.

Figure 7A:
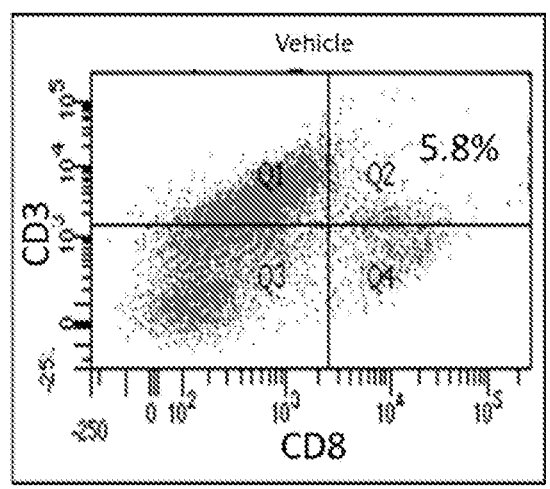
FIG. 7A shows a flow cytometry plot of the percentage of $CD3^+CD8^+$ T cells infiltration in the tumor 96 h post treatment with vehicle.
Figure 7B:
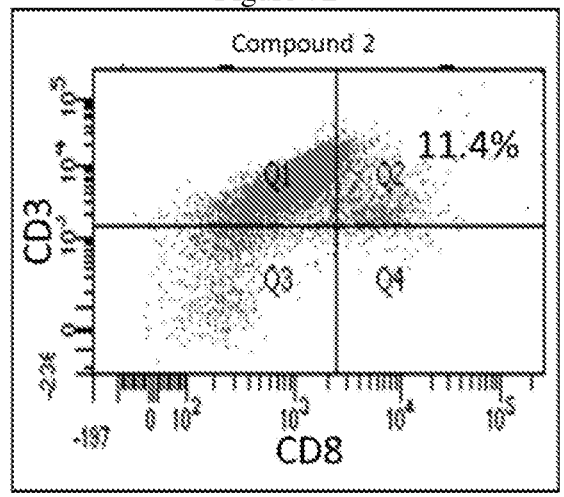
FIG. 7B shows representative data of a flow cytometry plot of the percentage of $CD3^+CD8^+$ T cells infiltration in the tumor 96 h post treatment with a representative compound of the invention, Compound 2, indicating a higher percentage of T cell infiltration over that of vehicle control.

For example, FIG. 7A shows a flow cytometry plot of the percentage of $CD3^+CD8^+$ T cells infiltration in the tumor 96 h post treatment with vehicle (DMA (10%): CrEL (10%): PEG300 (20%): N. Saline (60%)). FIG. 7B shows representative data of a flow cytometry plot of the percentage of $CD3^+CD8^+$ T cells infiltration in the tumor 96 h post treatment with a representative compound of the invention, Compound 2, indicating a higher percentage of T cell infiltration over that of vehicle control.

TABLE 7

% $CD3^+CD8^+$ T cells infiltration in tumor 96 h post treatment

| Treatment | % $CD3^+CD8^+$ T cells |
|---|---|
| Vehicle | 5.3 ± 0.8 |
| Compound 2 (0.375 mg/kg) | 11.2 ± 0.2 |
| Vehicle | 8.8 ± 1.6 |
| Compound 8 (0.375 mg/kg) | 15.5 ± 2.2 |
| Compound 6 (0.375 mg/kg) | 13.9 ± 1.3 |
| Vehicle | 4.4 ± 0.6 |
| Compound 12 (0.375 mg/kg) | 12.2 ± 0.5 |

Treatment of Cancer Model Types

A variety of cancer tumor models are created using the methods described herein for a range of cancer types. Cancer cell lines are allografted into mice using known methods. It is expected that the tumor size in mice following administration of the compounds of formula (I) or formula (II) or prodrugs thereof will be reduced relative to vehicle control. The following cell types can serve as models for various cancer types: 4-T1 and EMT-6 (breast cancer), B16BL6 and B16F10 (melanoma), H22 (liver), RM1 (prostate) and Pan02 (pancreatic cancer).

The invention described and claimed herein have many attributes and embodiments including, but not limited to, those set forth or described or referenced in this Detailed Disclosure. It is not intended to be all-inclusive and the invention described and claimed herein are not limited to or by the features or embodiments identified in this Detailed Disclosure, which is included for purposes of illustration only and not restriction. A person having ordinary skill in the art will readily recognise that many of the components and parameters may be varied or modified to a certain extent or substituted for known equivalents without departing from the scope of the invention. It should be appreciated that such modifications and equivalents are herein incorporated as if individually set forth. The invention also includes all of the steps, features, compositions and compounds referred to or indicated in this specification, individually or collectively, and any and all combinations of any two or more of said steps or features.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicant reserves the right to physically incorporate into this specification any and all materials and information from any such patents, publications, scientific articles, web sites, electronically available information, and other referenced materials or documents. Reference to any applications, patents and publications in this specification is not, and should not be taken as, an acknowledgment or any form of suggestion that they constitute valid prior art or form part of the common general knowledge in any country in the world.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, and in embodiments or examples of the invention, any of the terms "comprising," "consisting essentially of," and "consisting of" may be replaced with either of the other two terms in the specification. The methods and processes illustratively described herein suitably may be practiced in differing orders of steps, and that they are not necessarily restricted to the orders of steps indicated herein or in the claims. It is also that as used herein and in the appended claims, the singular forms "a," "an," and "the" include plural reference unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicant. Furthermore, titles, headings, or the like are provided to enhance the reader's comprehension of this document, and should not be read as limiting the scope of the invention. Any examples of aspects, embodiments or components of the invention referred to herein are to be considered non-limiting.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

The invention claimed is:

1. A compound of Formula (II), and its tautomeric form, its stereoisomer, its pharmaceutically acceptable salt, its hydrate, or solvate thereof,

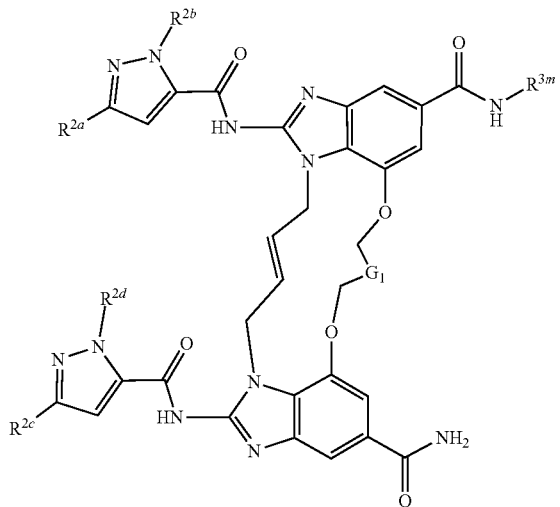

(II)

wherein, $R^{3m}$ is optionally substituted cycloalkyl, optionally substituted heterocyclyl, optionally substituted heterocyclylalkyl, optionally substituted heteroarylalkyl, and optionally substituted arylalkyl;

$G_1$ is independently selected from —$CH_2$— or

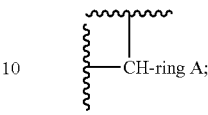

ring A is optionally substituted heterocyclyl, and optionally substituted heteroaryl;

$R^{2a}$, $R^{2b}$, $R^{2c}$, and $R^{2d}$ are each independently selected from hydrogen, optionally substituted $C_1$-$C_6$ alkyl, and optionally substituted $C_3$-$C_5$ monocyclic cycloalkyl; when 'alkyl' group is substituted, it is substituted with 1 to 4 substituents independently selected from halogen, oxo (=O), alkyl, perhaloalkyl, cycloalkyl, aryl, heteroaryl, heterocyclyl, —N($R^4$)$_2$, —C(=O)OH, —N(H)—$SO_2$-alkyl, and —$OR^4$;

when 'carbocycle' or 'cycloalkyl' group is substituted, it is substituted with 1 to 4 substituents independently selected from halogen, alkyl, perhaloalkyl, heteroaryl, heterocyclyl, —N($R^4$)$_2$, —C(=O)OH, and —$OR^4$;

when 'heterocycle' or 'heterocyclyl' group is substituted, it is substituted with 1 to 4 substituents independently selected from oxo (=O), halogen, cyano, alkyl, perhaloalkyl, heterocyclyl, —$OR^4$, —OP(O)($OR^4$)$_2$, —P(O)($OR^4$)$_2$, —P(O)($OR^4$)$R^{4a}$, —$SO_2R^{4a}$, —C(=O)OH, —C(=O)N(H)$R^4$, —C(=O)N(alkyl)$R^4$, —N(H)C(=O) $R^{4a}$, —N(H)—$SO_2$-alkyl, —N(H)$R^4$, and —N(alkyl)$R^4$;

when the 'aryl' group is substituted, it is substituted with 1 to 4 substituents selected from halogen, cyano, alkyl, perhaloalkyl, cycloalkyl, heterocyclyl, —O-alkyl, —O-perhaloalkyl, —N(alkyl) alkyl, —N(H)alkyl, —$SO_2$-alkyl, —N(alkyl)C(=O)alkyl, —N(H)C(=O) alkyl, —C(=O)N(alkyl)alkyl, —C(=O)N(H)alkyl, —C(=O) $NH_2$, —$SO_2$N(alkyl)alkyl, —$SO_2$N(H)alkyl, —$SO_2NH_2$, —OP(O)($OR^4$)$_2$, —P(O)($OR^4$)$_2$, —P(O)($OR^4$)$R^{4a}$, and —C(=O)OH;

when the 'heteroaryl' group is substituted, it is substituted with 1 to 4 substituents selected from halogen, cyano, alkyl, perhaloalkyl, cycloalkyl, heterocyclyl, —O-alkyl, —O-perhaloalkyl, —N(alkyl)alkyl, —N(H)alkyl, —$SO_2$-alkyl, —N(alkyl)C(=O)alkyl, —N(H)C(=O)alkyl, —C(=O)N(alkyl)alkyl, —C(=O)N(H)alkyl, —C(=O)$NH_2$, —$SO_2$N(alkyl)alkyl, —$SO_2$N(H)alkyl, —$SO_2NH_2$, —OP(O)($OR^4$)$_2$, —P(O)($OR^4$)$_2$, —P(O)($OR^4$)$R^{4a}$, and —C(=O)OH;

each $R^4$ is independently selected from hydrogen, alkyl, and cycloalkyl;

each $R^{4a}$ is independently selected from alkyl, and cycloalkyl.

2. The compound according to claim 1, wherein $G_1$ is —$CH_2$.

3. The compound according to claim 1, wherein $G_1$ is

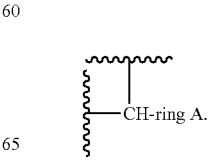

4. The compound according to claim 1, wherein ring A is optionally substituted heterocyclyl or optionally substituted heteroaryl.

5. The compound according to claim 4, wherein ring A is

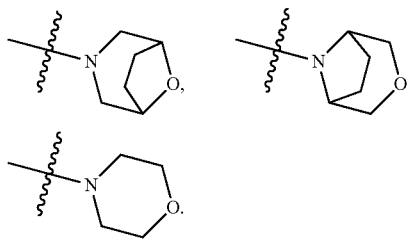

6. The compound according to claim 1, wherein $R^{3m}$ is

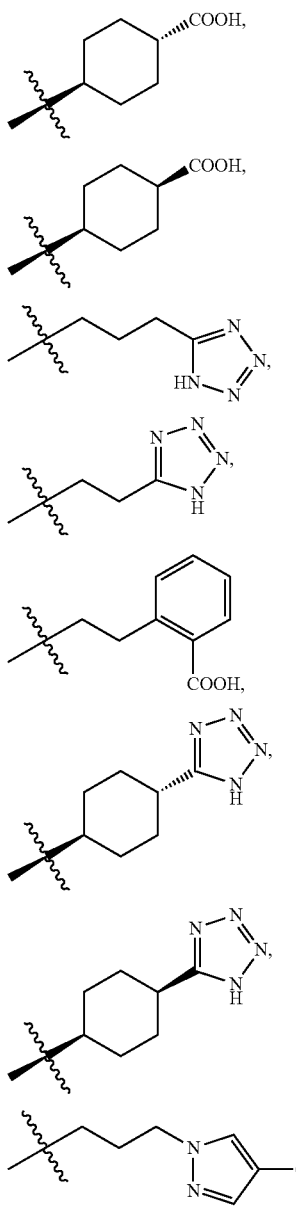

-continued

7. The compound according to claim 1, wherein the compound is selected from:
- (1S,4S)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 1);
- (1R,4R)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 2);
- (E)-N-(3-(1H-tetrazol-5-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 3);
- (E)-N-(2-(1H-tetrazol-5-yl)ethyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 4);
- (E)-2-(2-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)ethyl)benzoic acid (Compound 5);
- (E)-N-((1R,4R)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 6);
- (E)-N-((1S,4S)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 7);
- (E)-1-(3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 8);
- (E)-2-((12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)methyl)nicotinic acid (Compound 9);
- (E)-1,15-bis(1-ethyl-3-methyl-1H-pyrazole-5-carboxamido)-N-(3-(5-oxo-4,5-dihydro-1H-tetrazol-1-yl)propyl)-8,9,16,19-tetrahydro-7H-6,10-dioxa-2,14,15a,
19a-tetraazacyclopentadeca[3,2,1-cd:8,9,10-c'd']
diindene-4,12-dicarboxamide (Compound 10);
(E)-1,15-bis(1-ethyl-3-methyl-1H-pyrazole-5-carbox-
amido)-N-(3-(5-oxo-4,5-dihydro-1,2,4-oxadiazol-3-yl)
propyl)-8,9,16,19-tetrahydro-7H-6,10-dioxa-2,14,15a,
19a-tetraazacyclopentadeca[3,2,1-cd:8,9,10-c'd']
diindene-4,12-dicarboxamide (Compound 11);
(8S,E)-N4-((1R,4S)-4-(1H-tetrazol-5-yl)cyclohexyl)-8-
(3-oxa-8-azabicyclo[3.2.1]octan-8-yl)-1,15-bis(1-
ethyl-3-methyl-1H-pyrazole-5-carboxamido)-8,9,16,
19-tetrahydro-7H-6,10-dioxa-2,14,15a,19a-
tetraazacyclopentadeca[3,2,1-cd:8,9,10-c'd']diindene-
4,12-dicarboxamide (Compound 12);
(8R,E)-N4-((1R,4R)-4-(1H-tetrazol-5-yl)cyclohexyl)-8-
(3-oxa-8-azabicyclo[3.2.1]octan-8-yl)-1,15-bis(1-
ethyl-3-methyl-1H-pyrazole-5-carboxamido)-8,9,16,
19-tetrahydro-7H-6,10-dioxa-2,14,15a,19a-
tetraazacyclopentadeca[3,2,1-cd:8,9,10-c'd']diindene-
4,12-dicarboxamide (Compound 13);
(1S,4R)-4-((8S,E)-8-(3-oxa-8-azabicyclo[3.2.1]octan-8-
yl)-12-carbamoyl-1,15-bis(1-ethyl-3-methyl-1H-pyra-
zole-5-carboxamido)-8,9,16,19-tetrahydro-7H-6,10-di-
oxa-2,14,15a,19a-tetraazacyclopentadeca[3,2,1-cd:8,9,
10-c'd']diindene-4-carboxamido)cyclohexane-1-
carboxylic acid (Compound 14);
(1R,4R)-4-((8R,E)-8-(3-oxa-8-azabicyclo[3.2.1]octan-8-
yl)-12-carbamoyl-1,15-bis(1-ethyl-3-methyl-1H-pyra-
zole-5-carboxamido)-8,9,16,19-tetrahydro-7H-6,10-di-
oxa-2,14,15a,19a-tetraazacyclopentadeca[3,2,1-cd:8,9,
10-c'd']diindene-4-carboxamido)cyclohexane-1-
carboxylic acid (Compound 15);
(8S,E)-N4-(3-(1H-tetrazol-5-yl)propyl)-8-(3-oxa-8-
azabicyclo[3.2.1]octan-8-yl)-1,15-bis(1-ethyl-3-
methyl-1H-pyrazole-5-carboxamido)-8,9,16,19-tetra-
hydro-7H-6,10-dioxa-2,14,15a,19a-
tetraazacyclopentadeca[3,2,1-cd:8,9,10-c'd']diindene-
4,12-dicarboxamide (Compound 16);
(8R,E)-N4-(3-(1H-tetrazol-5-yl)propyl)-8-(3-oxa-8-
azabicyclo[3.2.1]octan-8-yl)-1,15-bis(1-ethyl-3-
methyl-1H-pyrazole-5-carboxamido)-8,9,16,19-tetra-
hydro-7H-6,10-dioxa-2,14,15a,19a-
tetraazacyclopentadeca[3,2,1-cd:8,9,10-c'd']diindene-
4,12-dicarboxamide (Compound 17);
1-(3-((8S,E)-8-(3-oxa-8-azabicyclo[3.2.1]octan-8-yl)-12-
carbamoyl-1,15-bis(1-ethyl-3-methyl-1H-pyrazole-5-
carboxamido)-8,9,16,19-tetrahydro-7H-6,10-dioxa-2,
14,15a,19a-tetraazacyclopentadeca[3,2,1-cd:8,9,10-
c'd']diindene-4-carboxamido)propyl)-1H-pyrazole-4-
carboxylic acid (Compound 18);
1-(3-((8R,E)-8-(3-oxa-8-azabicyclo[3.2.1]octan-8-yl)-
12-carbamoyl-1,15-bis(1-ethyl-3-methyl-1H-pyrazole-
5-carboxamido)-8,9,16,19-tetrahydro-7H-6,10-dioxa-
2,14,15a,19a-tetraazacyclopentadeca[3,2,1-cd:8,9,10-
c'd']diindene-4-carboxamido)propyl)-1H-pyrazole-4-
carboxylic acid (Compound 19);
(1R,4R)-4-((E)-8-(8-oxa-3-azabicyclo[3.2.1]octan-3-yl)-
12-carbamoyl-1,15-bis(1-ethyl-3-methyl-1H-pyrazole-
5-carboxamido)-8,9,16,19-tetrahydro-7H-6,10-dioxa-
2,14,15a,19a-tetraazacyclopentadeca[3,2,1-cd:8,9,10-
c'd']diindene-4-carboxamido)cyclohexane-1-
carboxylic acid (Compound 20);
(E)-N-(3-(1H-tetrazol-5-yl)propyl)-8-(8-oxa-3-azabicy-
clo[3.2.1]octan-3-yl)-1,15-bis(1-ethyl-3-methyl-1H-
pyrazole-5-carboxamido)-8,9,16,19-tetrahydro-7H-6,
10-dioxa-2,14,15a,19a-tetraazacyclopentadeca[3,2,1-
cd:8,9,10-c'd']diindene-4,12-dicarboxamide
(Compound 21);
(E)-N-((1R,4R)-4-(1H-tetrazol-5-yl)cyclohexyl)-8-(8-
oxa-3-azabicyclo[3.2.1]octan-3-yl)-1,15-bis(1-ethyl-3-
methyl-1H-pyrazole-5-carboxamido)-8,9,16,19-tetra-
hydro-7H-6,10-dioxa-2,14,15a,19a-
tetraazacyclopentadeca[3,2,1-cd:8,9,10-c'd']diindene-
4,12-dicarboxamide (Compound 22);
(E)-1-(3-(8-(8-oxa-3-azabicyclo[3.2.1]octan-3-yl)-12-
carbamoyl-1,15-bis(1-ethyl-3-methyl-1H-pyrazole-5-
carboxamido)-8,9,16,19-tetrahydro-7H-6,10-dioxa-2,
14,15a,19a-tetraazacyclopentadeca[3,2,1-cd:8,9,10-
c'd']diindene-4-carboxamido)propyl)-1H-pyrazole-4-
carboxylic acid (Compound 23);
(E)-N-((1R,4R)-4-(1H-tetrazol-5-yl)cyclohexyl)-1,15-bis
(1-ethyl-3-methyl-1H-pyrazole-5-carboxamido)-8-
morpholino-8,9,16,19-tetrahydro-7H-6,10-dioxa-2,14,
15a,19a-tetraazacyclopentadeca[3,2,1-cd:8,9,10-c'd']
diindene-4,12-dicarboxamide (Compound 24);
(E)-N-(3-(1H-tetrazol-5-yl)propyl)-1,15-bis(1-ethyl-3-
methyl-1H-pyrazole-5-carboxamido)-8-morpholino-8,
9,16,19-tetrahydro-7H-6,10-dioxa-2,14,15a,19a-tet-
raazacyclopentadeca[3,2,1-cd:8,9,10-c'd']diindene-4,
12-dicarboxamide (Compound 25);
(1R,4R)-4-((E)-12-carbamoyl-1,15-bis(1-ethyl-3-methyl-
1H-pyrazole-5-carboxamido)-8-morpholino-8,9,16,19-
tetrahydro-7H-6,10-dioxa-2,14,15a,19a-tetraazacyclo-
pentadeca[3,2,1-cd:8,9,10-c'd']diindene-4-
carboxamido)cyclohexane-1-carboxylic acid
(Compound 26);
(E)-1-(3-(12-carbamoyl-1,15-bis(1-ethyl-3-methyl-1H-
pyrazole-5-carboxamido)-8-morpholino-8,9,16,19-tet-
rahydro-7H-6,10-dioxa-2,14,15a,19a-tetraazacyclo-
pentadeca[3,2,1-cd:8,9,10-c'd']diindene-4-
carboxamido)propyl)-1H-pyrazole-4-carboxylic acid
(Compound 27);
(E)-1,15-bis(1-ethyl-3-methyl-1H-pyrazole-5-carbox-
amido)-N-(2-morpholinoethyl)-8,9,16,19-tetrahydro-
7H-6,10-dioxa-2,14,15a,19a-tetraazacyclopentadeca
[3,2,1-cd:8,9,10-c'd']diindene-4,12-dicarboxamide
(Compound 28);
(E)-(12-carbamoyl-1,15-bis(1-ethyl-3-methyl-1H-pyra-
zole-5-carboxamido)-8,9,16,19-tetrahydro-7H-6,10-di-
oxa-2,14,15a,19a-tetraazacyclopentadeca[3,2,1-cd:8,9,
10-c'd']diindene-4-carbonyl)glycine (Compound 29);
(E)-N-(2-(8-oxa-3-azabicyclo[3.2.1]octan-3-yl)ethyl)-1,
15-bis(1-ethyl-3-methyl-1H-pyrazole-5-carboxamido)-
8,9,16,19-tetrahydro-7H-6,10-dioxa-2,14,15a,19a-tet-
raazacyclopentadeca[3,2,1-cd:8,9,10-c'd']diindene-4,
12-dicarboxamide (Compound 30);
(E)-1,15-bis(1-ethyl-3-methyl-1H-pyrazole-5-carbox-
amido)-N-(3-morpholinopropyl)-8,9,16,19-tetrahydro-
7H-6,10-dioxa-2,14,15a,19a-tetraazacyclopentadeca
[3,2,1-cd:8,9,10-c'd']diindene-4,12-dicarboxamide
(Compound 32);
(E)-N-(3-(8-oxa-3-azabicyclo[3.2.1]octan-3-yl)propyl)-
1,15-bis(1-ethyl-3-methyl-1H-pyrazole-5-carbox-
amido)-8,9,16,19-tetrahydro-7H-6,10-dioxa-2,14,15a,
19a-tetraazacyclopentadeca[3,2,1-cd:8,9,10-c'd']
diindene-4,12-dicarboxamide (Compound 33);
(E)-N-(4-(8-oxa-3-azabicyclo[3.2.1]octan-3-yl)butyl)-1,
15-bis(1-ethyl-3-methyl-1H-pyrazole-5-carboxamido)-
8,9,16,19-tetrahydro-7H-6,10-dioxa-2,14,15a,19a-tet-
raazacyclopentadeca[3,2,1-cd:8,9,10-c'd']diindene-4,
12-dicarboxamide (Compound 34);

(E)-(2-(4-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-12-carboxamido)ethyl)-L-proline (Compound 35);

(E)-1,15-bis(1-ethyl-3-methyl-1H-pyrazole-5-carboxamido)-N-(3-(4-(methylsulfonyl)piperazin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 36);

(E)-N-(3-(4,4-difluoropiperidin-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 37);

(E)-1,15-bis(1-ethyl-3-methyl-1H-pyrazole-5-carboxamido)-N-(4-morpholinobutyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 38);

(E)-1,15-bis(1-ethyl-3-methyl-1H-pyrazole-5-carboxamido)-N-(3-(4-fluoropiperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 39);

(R,E)-1,15-bis(1-ethyl-3-methyl-1H-pyrazole-5-carboxamido)-N-(3-(3-fluoropyrrolidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 41);

(S,E)-1,15-bis(1-ethyl-3-methyl-1H-pyrazole-5-carboxamido)-N-(3-(3-fluoropyrrolidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 42);

(E)-1,15-bis(1-ethyl-3-methyl-1H-pyrazole-5-carboxamido)-N-(3-(4-(methylsulfonyl)piperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 44);

E)-N-(3-(3,3-difluoropyrrolidin-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 45);

(E)-N-(3-((2R,6S)-2,6-dimethylmorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 46);

(E)-N-(3-(1,1-dioxidothiomorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 47);

(E)-N-(3-(1H-imidazol-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 48);

(E)-1,15-bis(1-ethyl-3-methyl-1H-pyrazole-5-carboxamido)-N-(3-(pyridin-2-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 50);

(E)-1,15-bis(1-ethyl-3-methyl-1H-pyrazole-5-carboxamido)-N-(3-(4-(trifluoromethyl)piperidin-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 51);

(E)-N-(3-(3,3-dimethylmorpholino)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 52);

(E)-N,N'-(12-carbamoyl-4-(1H-tetrazol-5-yl)-8,9,16,19-tetrahydro-7H-6,10-dioxa-2,14,15a,19a-tetraazacyclopentadeca[3,2,1-cd:8,9,10-c'd']diindene-1,15-diyl)bis(1-ethyl-3-methyl-1H-pyrazole-5-carboxamide (Compound 54);

(1S,3S)-3-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclobutane-1-carboxylic acid (Compound 55);

(1R,3R)-3-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclobutane-1-carboxylic acid (Compound 56);

(E)-1-((12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)methyl)cyclopropane-1-carboxylic acid (Compound 57);

(E)-2-(2-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)ethyl)nicotinic acid (Compound 58);

(E)-2-(3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)benzoic acid (Compound 59);

(E)-N-(3-(4-ethoxy-4-oxido-1,4-azaphosphinan-1-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 60).

8. The compound according to claim 7, wherein the compound is selected from:

(1S,4S)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 1);

(1R,4R)-4-((E)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 2);

(E)-N-(3-(1H-tetrazol-5-yl)propyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 3);

(E)-N-(2-(1H-tetrazol-5-yl)ethyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 4);

(E)-2-(2-(12-carbamoyl-1,15-bis(1-ethyl-3-methyl-1H-pyrazole-5-carboxamido)-8,9,16,19-tetrahydro-7H-6, 10-dioxa-2,14,15a,19a-tetraazacyclopentadeca[3,2,1-cd:8,9,10-c'd']diindene-4-carboxamido)ethyl)benzoic acid (Compound 5);

(E)-N-((1R,4R)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 6);

(E)-N-((1S,4S)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 7);

(E)-1-(3-(12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 8);

(E)-2-((12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)methyl)nicotinic acid (Compound 9);

(E)-1,15-bis(1-ethyl-3-methyl-1H-pyrazole-5-carboxamido)-N-(3-(5-oxo-4,5-dihydro-1H-tetrazol-1-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 10);

(E)-1,15-bis(1-ethyl-3-methyl-1H-pyrazole-5-carboxamido)-N-(3-(5-oxo-4,5-dihydro-1,2,4-oxadiazol-3-yl)propyl)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 11);

(8S,E)-N4-((1R,4S)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 12);

(8R,E)-N4-((1R,4R)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 13);

(1S,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 14);

(1R,4R)-4-((8R,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 15);

(8S,E)-N4-(3-(1H-tetrazol-5-yl)propyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 16);

(8R,E)-N4-(3-(1H-tetrazol-5-yl)propyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 17);

1-(3-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 18);

1-(3-((8R,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 19);

(1R,4R)-4-((E)-8-(8-oxa-3-azabicyclo[3.2.1]octan-3-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 20);

(E)-N-(3-(1H-tetrazol-5-yl)propyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 21);

(E)-N-((1R,4R)-4-(1H-tetrazol-5-yl)cyclohexyl)-8-(8-oxa-3-azabicyclo[3.2.1]octan-3-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 22);

(E)-1-(3-(8-(8-oxa-3-azabicyclo[3.2.1]octan-3-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 23);

(E)-N-((1R,4R)-4-(1H-tetrazol-5-yl)cyclohexyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 24);

(E)-N-(3-(1H-tetrazol-5-yl)propyl)-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 25);

(1R,4R)-4-((E)-12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 26);

(E)-1-(3-(12-carbamoyl-1,15-bis(1-ethyl-3-methyl-1H-pyrazole-5-carboxamido)-8-morpholino-8,9,16,19-tetrahydro-7H-6,10-dioxa-2,14,15a,19a-tetraazacyclopentadeca[3,2,1-cd:8,9,10-c'd']diindene-4-carboxamido)propyl)-1H-pyrazole-4-carboxylic acid (Compound 27).

9. The compound according to claim 7, wherein the compound is selected from:

(1R,4R)-4-((E)-12-carbamoyl-1,15-bis(1-ethyl-3-methyl-1H-pyrazole-5-carboxamido)-8,9,16,19-tetrahydro-7H-6,10-dioxa-2,14,15a, 19a-tetraazacyclopentadeca[3,2,1-cd:8,9,10-c'd']diindene-4-carboxamido)cyclohexane-1-carboxylic acid (Compound 2);

(E)-N-((1R,4R)-4-(1H-tetrazol-5-yl)cyclohexyl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 6);

(E)-1-(3-(12-carbamoyl-1,15-bis(1-ethyl-3-methyl-1H-pyrazole-5-carboxamido)-8,9,16,19-tetrahydro-7H-6,10-dioxa-2,14,15a, 19a-tetraazacyclopentadeca[3,2,1-cd:8,9,10-c'd']diindene-4-carboxamido)propyl)-1H-pyrazole-4-carboxylic acid (Compound 8);

(8S,E)-N4-((1R,4S)-4-(1H-tetrazol-5-yl)cyclohexyl)-8-(3-oxa-8-azabicyclo[3.2.1]octan-8-yl)-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4,12-dicarboxamide (Compound 12);

(1S,4R)-4-((8S,E)-8-(3-oxa-8-azabicyclo[3.2.1]octan-8-yl)-12-carbamoyl-1,15-bis(1-ethyl-3-methyl-1H-pyrazole-5-carboxamido)-8,9,16,19-tetrahydro-7H-6,10-dioxa-2,14,15a,19a-tetraazacyclopentadeca[3,2,1-cd:8,9,10-c'd']diindene-4-carboxamido)cyclohexane-1-carboxylic acid (Compound 14).

10. A pharmaceutical composition comprising a compound of Formula (I), Formula (II), or a pharmaceutically acceptable salt thereof as claimed in claim 1 and at least one or more pharmaceutically acceptable excipients.

11. Use of a compound of Formula (II), or a pharmaceutically acceptable salt thereof as claimed in claim 1 for the manufacture of a medicament for the treatment of a disease or condition in which activation of STING is beneficial.

12. A Compound of Formula (II) of claim 3 for use in treating a disease or condition in which activation of STING is beneficial in a subject in need thereof, the use comprising administering to the subject a therapeutically effective amount of a compound of Formula (II), or a pharmaceutically acceptable salt thereof as claimed in claim 1.

13. A Compound of Formula (II) of claim 3 for use in treating a disease or condition as claimed in claim 12, wherein the disease or condition is cancer or one or more infectious diseases.

14. A Compound of Formula (II) of claim 3 for use in treating a disease or condition as claimed in claim 12, wherein the disease or condition is cancer, and wherein the cancer is one or more solid tumors, leukemia, lymphoma, or a combination thereof.

15. A Compound of Formula (II) of claim 3 for use in treating a disease or condition as claimed in claim 12, wherein the disease or condition is one or more infectious diseases, wherein infectious diseases is viral infection, bacterial infection, or a combination thereof.

16. A Compound of Formula (II) of claim 3 for use in treating cancer or tumor as claimed in claim 13, wherein the cancer is selected from brain cancer, renal cancer, testicular cancer, cancer of urethra, rectal cancer, cancer of fallopian tubes, penile cancer, vaginal cancer, stomach cancer, skin cancer, liver cancer, gastrointestinal stromal tumors, urothelial cancer, thyroid cancer, parathyroid gland cancer, adrenal cancer, bone cancer, oral cancer, ovarian cancer, uterine cancer, head and neck sqamous cell carcinoma, endometrial cancer, gall bladder cancer, renal cancer, bladder cancer, orophyrangeal cancer, lymph node cancer, gliobalstoma, astrocytoma, glioblastoma multiforme or sarcomas of soft tissue, fibrosarcoma, chondrosarcoma, hemangioma, teratoma, lipoma, myxoma, fibroma, rhabdomyoma, teratoma, cholangiocarcinoma, myeloma, Ewing's sarcoma, myeloma, Hodgkin's disease, non-Hodgkin's lymphoma, follicular lymphoma, mantle cell lymphoma, Burkitt's lymphoma, lymphoblastic T-cell lymphoma, marginal zone lymphoma, cutaneous T cell lymphoma, CNS lymphoma, small lymphocytic lymphoma, lymphoplasmacytic lymphoma, diffuse large cell lymphoma (DLBCL), peripheral T-cell lymphoma, anaplastic large cell lymphoma, primary mediastinal lymphoma, mycosis fungoides, small non-cleaved cell lymphoma, lymphoblastic lymphoma, immunoblastic lymphoma, primary effusion lymphoma, HIV associated (or AIDS related) lymphomas, lymphoblastic T cell leukemia, chronic myelogenous leukemia, acute lymphoblastic T cell leukemia, lymphoblastic T cell leukemia, acute myelobastic leukemia, hairy-cell leukemia, chronic neutrophilic leukemia, mantle cell leukemia, acute megakaryocytic leukemia, multiple myeloma, megakaryoblastic leukemia, erythroleukemia, plasmacytoma, promyelocytic leukemia, chronic myelomonocytic leukemia, myelodysplastic syndrome, myelofibrosis, chronic myelogenous leukemia, polycythemia vera, thrombocythemia, chronic lymphocytic leukemia, prolymphocytic leukemia, hairy cell leukemia, Waldenstrom's macroglobulinemia, Castleman's disease, chronic neutrophilic leukemia, immunoblastic large cell leukemia or plasmacytoma.

17. A Compound of Formula (II) of claim 3 for use in treating a viral infection as claimed in claim 13, wherein the viral infection is HIV, HPV, HCV, HBV, alphavirus, rotavirus or influenza infection.

18. A Compound of Formula (II) of claim 1 for use in treating a disease or condition as claimed in claim 13, wherein the compound is used with one or more additional therapies.

19. A Compound of Formula (II) of claim 1 for use in treating a disease or condition with one or more additional therapies as claimed in claim 18, wherein the additional therapies are chemotherapy, immunotherapy, radiotherapy, or a combination thereof.

20. A Compound of Formula (II) of claim 1 for use in treating a disease or condition as claimed in claim 12, wherein the compound is used as a vaccine adjuvant.

21. A composition comprising (i) a compound of Formula (II), or a pharmaceutically acceptable salt thereof, as claimed in claim 1, and {ii} one or more antigens, one or more antigen compositions, or a combination thereof.

* * * * *